(12) United States Patent
Chang et al.

(10) Patent No.: US 10,893,036 B2
(45) Date of Patent: Jan. 12, 2021

(54) BUSINESS MESSAGING INTERFACE

(71) Applicant: Apple Inc., Cupertino, CA (US)

(72) Inventors: Jae Woo Chang, Cupertino, CA (US); Marcel Van Os, Santa Cruz, CA (US); Freddy A Anzures, San Francisco, CA (US); Nicole R Ryan, San Francisco, CA (US); Hoan Pham, San Jose, CA (US); Aaron Melim, Cupertino, CA (US); Mischa Mclachlan, Cupertino, CA (US); Tommy Rochette, Cupertino, CA (US); Gokul Thirumalai, Cupertino, CA (US); Scott Lopatin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 15/980,521

(22) Filed: May 15, 2018

(65) Prior Publication Data

US 2018/0337918 A1 Nov. 22, 2018

Related U.S. Application Data

(60) Provisional application No. 62/671,365, filed on May 14, 2018, provisional application No. 62/507,107, filed on May 16, 2017.

(51) Int. Cl.
*H04L 29/06* (2006.01)
*H04M 1/725* (2006.01)
(Continued)

(52) U.S. Cl.
CPC .............. *H04L 63/08* (2013.01); *G06F 3/048* (2013.01); *G06F 3/0488* (2013.01);
(Continued)

(58) Field of Classification Search
CPC ... H04L 63/0861; H04L 51/16; H04L 63/108; H04L 67/306; H04L 9/3213; H04L 63/08;
(Continued)

(56) References Cited

U.S. PATENT DOCUMENTS 7,120,455 B1 * 10/2006 Chen ....................... H04L 51/04
455/466
2009/0222526 A1 * 9/2009 Cox ..................... G06Q 10/107
709/206

(Continued)

FOREIGN PATENT DOCUMENTS

EP         3159837 A1    4/2017
WO    2013169849 A2   11/2013

OTHER PUBLICATIONS

International Search Report and Written Opinion dated Jul. 4, 2018 in International Patent Application No. PCT/US2018/032831.

*Primary Examiner* — Huan V Doan
(74) *Attorney, Agent, or Firm* — McGuireWoods LLP

(57) ABSTRACT

The present disclosure generally relates to messaging user interfaces. The method includes displaying a messaging session between a user of the device and a respective participant in the message session other than the user of the device in a messaging user interface, wherein the respective participant is associated with a user account of the user. While the messaging session is active, the method also includes displaying, on the display, a first credential verification affordance in the messaging user interface. The method further includes detecting one or more user inputs to authenticate with the user account. After detecting the one or more user inputs to authenticate with the user account, in accordance with a determination that the authentication with the user account was successful, the method further includes providing an indication that the user was successfully (Continued)

authenticated with the user account to the respective participant via the messaging user interface.

22 Claims, 103 Drawing Sheets

(51) Int. Cl.

| | | |
|---|---|---|
| *H04L 9/32* | (2006.01) | |
| *G06F 3/0488* | (2013.01) | |
| *G06F 3/0481* | (2013.01) | |
| *G06F 3/048* | (2013.01) | |
| *H04L 12/58* | (2006.01) | |
| *G06K 9/00* | (2006.01) | |
| *H04L 29/08* | (2006.01) | |
| *G06F 21/62* | (2013.01) | |
| *G06Q 10/10* | (2012.01) | |
| *G06Q 10/00* | (2012.01) | |

(52) U.S. Cl.
CPC ........ *G06F 3/04812* (2013.01); *H04L 9/3213* (2013.01); *H04L 63/108* (2013.01); *H04M 1/72552* (2013.01); *G06F 3/0481* (2013.01); *G06F 21/6218* (2013.01); *G06K 9/00288* (2013.01); *G06Q 10/00* (2013.01); *G06Q 10/10* (2013.01); *G06Q 10/103* (2013.01); *G06Q 10/109* (2013.01); *H04L 51/16* (2013.01); *H04L 63/0861* (2013.01); *H04L 67/306* (2013.01)

(58) Field of Classification Search
CPC .... G06F 3/048; G06F 3/04812; G06F 3/0488; G06F 3/0481; G06F 21/6218; G06Q 10/10; G06Q 10/00; G06Q 10/109; G06Q 10/103; G06K 9/00288; H04M 1/72552
See application file for complete search history.

(56) References Cited

U.S. PATENT DOCUMENTS

| | | | |
|---|---|---|---|
| 2009/0249459 A1* | 10/2009 | Coughlin | G06Q 20/40 726/7 |
| 2011/0029420 A1* | 2/2011 | Bianco | G06Q 10/06 705/32 |
| 2012/0165618 A1* | 6/2012 | Algoo | A61B 5/744 600/300 |
| 2012/0297190 A1* | 11/2012 | Shen | H04L 9/0866 713/168 |
| 2014/0040040 A1* | 2/2014 | Townsend | G06Q 30/0279 705/14.66 |
| 2015/0039908 A1* | 2/2015 | Lee | G06F 21/35 713/193 |
| 2015/0149928 A1 | 5/2015 | Li | |
| 2015/0334067 A1 | 11/2015 | Zonka | |
| 2016/0266733 A1* | 9/2016 | Alon | H04L 67/18 |
| 2016/0334969 A1 | 11/2016 | Reckhow et al. | |
| 2017/0180276 A1 | 6/2017 | Gershony et al. | |
| 2017/0277993 A1* | 9/2017 | Beaver | G06Q 30/00 |
| 2017/0331824 A1* | 11/2017 | Pender | H04L 63/0892 |
| 2019/0114697 A1 | 4/2019 | Lasker et al. | |

* cited by examiner

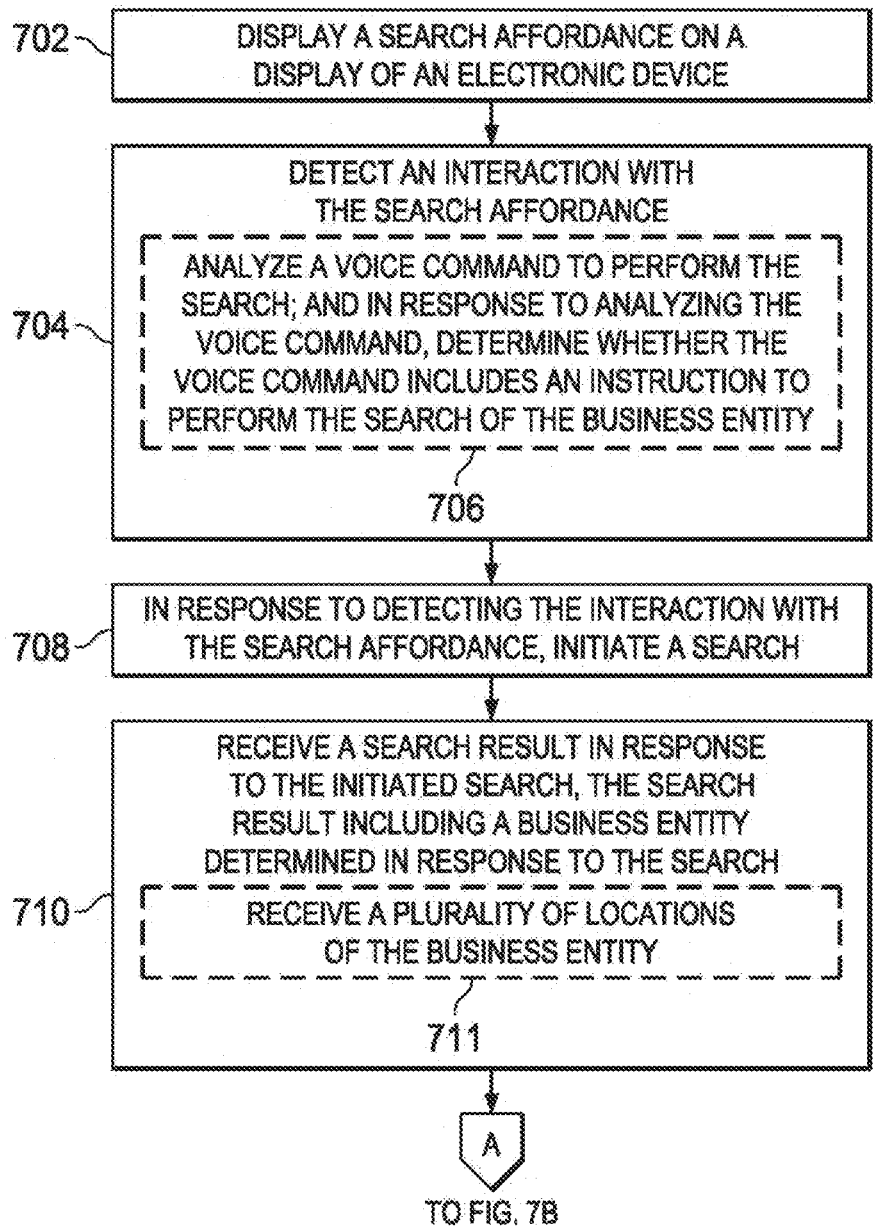

FROM FIG. 7B

724 — DETERMINE A RESPONSE TIME FOR THE BUSINESS ENTITY TO RESPOND TO AN INITIAL MESSAGE; AND IN RESPONSE TO DETERMINING THE RESPONSE TIME, DISPLAY THE RESPONSE TIME

726 — DETERMINE A RESPECTIVE RESPONSE TIME OF EACH LOCATION OF A PLURALITY OF LOCATIONS OF THE BUSINESS ENTITY; IN RESPONSE TO DETERMINING THE RESPECTIVE RESPONSE TIME OF EACH LOCATION OF THE PLURALITY OF LOCATIONS OF THE BUSINESS ENTITY, ARRANGE A DISPLAY OF THE PLURALITY OF LOCATIONS OF THE BUSINESS ENTITY BASED ON THE RESPECTIVE RESPONSE TIME OF EACH LOCATION OF THE PLURALITY OF LOCATIONS OF THE BUSINESS ENTITY; AND DISPLAY THE RESPECTIVE RESPONSE TIMES OF THE PLURALITY OF LOCATIONS OF THE BUSINESS ENTITY

728 — DETERMINE AN UPDATED RESPONSE TIME OF A LOCATION OF THE PLURALITY OF LOCATIONS OF THE BUSINESS ENTITY; IN RESPONSE TO DETERMINING THE UPDATED RESPONSE TIME, REARRANGE THE DISPLAY OF THE PLURALITY OF THE LOCATIONS OF THE BUSINESS ENTITIES BASED ON THE UPDATED RESPONSE TIME; AND DISPLAY THE UPDATED RESPONSE TIME

FROM FIG. 9B

908 — GENERATE A BUSINESS MESSAGING USER INTERFACE, WHEREIN THE BUSINESS MESSAGING USER INTERFACE INCLUDES THE BRAND IDENTIFIER ASSOCIATED WITH THE BUSINESS ENTITY AND THE BUSINESS INDICIA

916 — DISPLAY A CONTACT USER INTERFACE AFFORDANCE; DETECT AN INTERACTION WITH THE CONTACT USER INTERFACE AFFORDANCE; AND IN RESPONSE TO DETECTING THE INTERACTION WITH THE CONTACT USER INTERFACE AFFORDANCE, GENERATE A CONTACT USER INTERFACE, WHEREIN THE CONTACT USER INTERFACE HAS AT LEAST ONE CONTACT ASSOCIATED WITH THE BUSINESS ENTITY AND AT LEAST ONE CONTACT NOT ASSOCIATED WITH ANY BUSINESS ENTITY, WHEREIN A CONTACT AFFORDANCE ASSOCIATED WITH THE BUSINESS ENTITY INCLUDES THE BUSINESS INDICIA

918 — SIMULTANEOUSLY: i) DISPLAY A PORTION OF THE BUSINESS MESSAGING USER INTERFACE ON THE DISPLAY; AND ii) DISPLAY A PORTION OF THE CONTACT

921 — DISPLAY A CONTACT ARRANGEMENT AFFORDANCE WITHIN THE CONTACT USER INTERFACE; DETECT AN INTERACTION WITH THE CONTACT ARRANGEMENT AFFORDANCE; AND IN RESPONSE TO DETECTING THE INTERACTION WITH THE CONTACT ARRANGEMENT AFFORDANCE: I) ARRANGE THE AT LEAST ONE CONTACT ASSOCIATED WITH THE BUSINESS ENTITY INTO A FIRST GROUP; AND II) ARRANGE THE AT LEAST ONE CONTACT NOT ASSOCIATED WITH ANY BUSINESS ENTITY IN A SECOND GROUP

922 — DETERMINE, IN ACCORDANCE WITH THE DETERMINATION THAT THE MESSAGE TO BE COMMUNICATED IS WITH THE BUSINESS ENTITY, WHETHER THE BUSINESS ENTITY IS A VERIFIED BUSINESS ENTITY OR AN UNVERIFIED BUSINESS ENTITY; AND GENERATE, IN ACCORDANCE WITH THE DETERMINATION THAT THE BUSINESS ENTITY IS A VERIFIED ENTITY, THE BUSINESS MESSAGING USER INTERFACE TO INCLUDE A VERIFICATION IDENTIFIER

924 — DETERMINE AN APPROXIMATE RESPONSE TIME OF THE BUSINESS ENTITY; AND IN RESPONSE TO DETERMINING THE APPROXIMATE RESPONSE TIME, DISPLAY THE APPROXIMATE RESPONSE TIME IN THE BUSINESS MESSAGING USER INTERFACE

FIG. 9C

FROM FIG. 11C

1146 — DISPLAY A LIST OF ONE OR MORE LOCATION AFFORDANCES IN THE BUSINESS LOCATION USER INTERFACE, EACH LOCATION AFFORDANCE OF THE ONE OR MORE LOCATION AFFORDANCES BEING ASSOCIATED WITH A LOCATION OF THE BUSINESS ENTITY

1148 — DETERMINE A RESPONSE TIME FROM EACH LOCATION OF THE ONE OR MORE LOCATIONS OF THE BUSINESS ENTITY; ARRANGE THE ONE OR MORE LOCATION AFFORDANCES BASED ON THE RESPONSE TIME OF THE ONE OR MORE LOCATIONS OF THE BUSINESS ENTITY; AND DISPLAY THE RESPONSE TIME FROM AT LEAST ONE OF THE ONE OR MORE LOCATIONS IN THE BUSINESS LOCATION USER INTERFACE

1150 — DETERMINE A DISTANCE TO EACH LOCATION OF THE ONE OR MORE LOCATIONS OF THE BUSINESS ENTITY; ARRANGE THE ONE OR MORE LOCATION AFFORDANCES BASED ON THE DISTANCE TO THE ONE OR MORE LOCATIONS OF THE BUSINESS ENTITY; AND DISPLAY THE DISTANCE TO AT LEAST ONE OF THE ONE OR MORE LOCATIONS OF THE CONVERSATION TRANSCRIPT

1152 — DETECT AN INDICATION TO SELECT A LOCATION AFFORDANCE OF THE ONE OR MORE LOCATION AFFORDANCES; AND DISPLAY A LOCATION SUBMISSION AFFORDANCE IN THE MESSAGE INPUT AREA IN RESPONSE TO DETECTING THE INDICATION TO SELECT THE LOCATION AFFORDANCE

1154 — DISPLAY A LOCATION SUBMISSION AFFORDANCE IN THE CONVERSATION TRANSCRIPT IN RESPONSE TO DETECTING AN INDICATION TO SELECT THE LOCATION SUBMISSION AFFORDANCE

1156 — DETECT AN INTERACTION WITH THE LOCATION SUBMISSION AFFORDANCE TO CHANGE THE SELECTED LOCATION AFFORDANCE; AND IN RESPONSE TO DETECTING THE INTERACTION TO CHANGE THE SELECTED LOCATION AFFORDANCE, RE-DISPLAYING THE LOCATION AFFORDANCE OF THE ONE OR MORE LOCATION AFFORDANCES

FIG. 11F

FROM FIG. 11C

1158
DISPLAY ONE OR MORE APPOINTMENT TIME AFFORDANCES IN THE CALENDAR USER INTERFACE, EACH APPOINTMENT TIME AFFORDANCE OF THE ONE OR MORE APPOINTMENT TIME AFFORDANCES IS ASSOCIATED WITH A TIME TO SCHEDULE AN APPOINTMENT WITH THE BUSINESS ENTITY, AND THE TIME ASSOCIATED WITH EACH APPOINTMENT TIME AFFORDANCE IS A TIME SLOT IN WHICH THE BUSINESS ENTITY HAS AN APPOINTMENT AVAILABLE

1160
DETERMINE A SCHEDULE OF THE USER; AND DISPLAY A DESCRIPTION OF THE SCHEDULE OF THE USER IN THE CALENDAR USER INTERFACE

1162
DETERMINE A SUGGESTED TIME TO SCHEDULE THE APPOINTMENT WITH THE BUSINESS ENTITY BASED ON THE SCHEDULE OF THE USER; AND DISPLAY THE SUGGESTED TIME IN THE CALENDAR USER INTERFACE

1164
DETERMINE A SUGGESTED TIME TO SCHEDULE THE APPOINTMENT WITH THE BUSINESS ENTITY BASED ON A TRAVEL TIME; AND DISPLAY THE SUGGESTED TIME IN THE CALENDAR USER INTERFACE

1168
DISPLAY AN APPOINTMENT CONFIRMATION AFFORDANCE IN THE CONVERSATION TRANSCRIPT IN RESPONSE TO DETECTING AN INDICATION TO SELECT AN APPOINTMENT AFFORDANCE OF THE ONE OR MORE APPOINTMENT TIME AFFORDANCES

1170
DETECT AN INDICATION TO SELECT THE APPOINTMENT TIME CONFIRMATION IN THE CONVERSATION TRANSCRIPT; AND OVERLAY THE MESSAGING USER INTERFACE WITH AN APPOINTMENT USER INTERFACE

TO FIG. 11E

FIG. 11H

FROM
FIG. 11C

1172

1174

DETECT AN INPUT INDICATIVE OF PAYMENT INFORMATION OF THE USER; DISPLAY THE PAYMENT INFORMATION IN A PAYMENT INFORMATION INPUT AREA OF THE ACCOUNT MANAGEMENT USER INTERFACE; AND TRANSMIT THE PAYMENT INFORMATION OF THE USER FOR PROCESSING UPON DETECTING A CONFIRMATION TO TRANSMIT THE PAYMENT INFORMATION

DETECT AN INPUT INDICATIVE OF A PERSONAL SIGNATURE; DETERMINE WHETHER THE PERSONAL SIGNATURE MATCHES A VERIFIED PERSONAL SIGNATURE; POPULATE THE PAYMENT INFORMATION INPUT AREA WITH PAYMENT INFORMATION OF THE USER UPON DETERMINING THAT THE PERSONAL SIGNATURE MATCHES THE VERIFIED PERSONAL SIGNATURE; AND TRANSMIT THE PAYMENT INFORMATION OF THE USER FOR PROCESSING UPON DETECTING THAT THE PERSONAL SIGNATURE MATCHES THE VERIFIED PERSONAL SIGNATURE

TO FIG. 11E

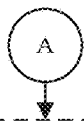

FIG. 13B

The first credential of the user is stored on the electronic device, and after detecting the first user input, enter the first credential in the user credential user interface when a predetermined condition is met
1318

After the user credential user interface is displayed, detect, via the one or more input devices, a second user input of the one or more user inputs to enter a biometric measurement of the user via the user credential user interface
1320

The biometric measurement of the user is a facial identification of the user, and where detecting the second user input of the one or more user inputs includes detecting the facial identification of the user
1322

After detecting the one or more user inputs to authenticate with the user account, obtain a first encrypted token based on the one or more user inputs; and
provide the first encrypted token to the respective participant via the messaging user interface
1324

After the first encrypted token has been provided to the respective participant, display, in the messaging user interface, a notification that the first encrypted token has been provided to the respective participant
1326

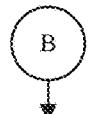

After providing the indication that the user was successfully authenticated with the user account to the respective participant, receive privileged content from the respective participant; and
after receiving the privileged content, display the privileged content in the messaging user interface
1330

FIG. 13C

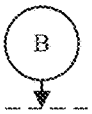

In accordance with the determination that the authentication with the user account was successful, displaying a verified credential indicator in the messaging user interface
1332

The verified credential indicator is displayed in a background of the messaging user interface
1334

After the determination that the authentication with the user account was successful, maintain display of the verified credential indicator in the messaging user interface for a period of time, during which, the authentication of the user account is accepted by an organization that is associated with the respective participant; and remove the verified credential indicator from being displayed in the messaging user interface after the period of time has elapsed
1336

During the period of time after the determination that the authentication with the user account was successful, display a second messaging session between the user and the respective participant in the messaging user interface; and
automatically provide the indication that the user was successfully authenticated with the user account to the respective participant via the messaging user interface
1338

During the period of time after the determination that the authentication with the user account was successful, display a second verified credential indicator in the messaging user interface
1340

After the period of time has elapsed, display a second credential verification affordance in the messaging user interface, where the second credential verification affordance is from the respective participant and is used to re-authenticate with the user account;
detect, via the one or more input devices, one or more user inputs to re-authenticate the user account; and
after detecting the one or more user inputs to re-authenticate with the user account, provide a second indication that the user has successfully re-authenticated with the user account to the respective participant via the messaging user interface
1342

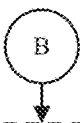

After detecting the one or more user inputs to authenticate with the user account, provide with a credential of the user account to a remote service that is associated with the user account and the respective participant, where the credential is based on the one or more inputs, and where the credential is used by the remote service to determine the authentication with the user account
1344

BUSINESS MESSAGING INTERFACE

CLAIM OF PRIORITY

This application claims benefit of U.S. Provisional Patent Application No. 62/507,107, entitled "BUSINESS MESSAGING INTERFACE," filed on May 16, 2017, and U.S. Provisional Patent Application No. 62/671,365, entitled "BUSINESS MESSAGING INTERFACE," filed on May 14, 2018, all of which, are hereby incorporated by reference in their entireties.

FIELD

The present disclosure relates generally to computer user interfaces, and more specifically to techniques for messaging business entities.

BACKGROUND

A user sometimes engages businesses through user interfaces that are displayed on the user's electronic device. More particularly, the user may submit requests to a representative of a business entity through a user interface that is displayed on the user's electronic device. The representative may sometimes require the user to verify the user's credential before the representative responds to the user.

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif.), an image management application (e.g., Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

BRIEF SUMMARY

Current methods for verifying the user's credential are outdated, time consuming, and inefficient. For example, some existing methods use complex and time-consuming user interfaces, which may include multiple key presses or keystrokes, and may include extraneous user interfaces to verify the user's credential. In addition, these methods take longer than necessary, thereby wasting energy. This latter consideration is particularly important in battery-operated devices.

Accordingly, the present technique provides electronic devices with faster, more efficient methods and interfaces for verifying the user's credential. Such methods and interfaces optionally complement or replace other methods for verifying the user's credential. Such methods and interfaces reduce the number, extent, and/or nature of the inputs from a user, reduce the cognitive burden on the user, and produce a more efficient human-machine interface. For battery-operated computing devices, such methods and interfaces conserve power and increase the time between battery charges.

The above deficiencies and other problems associated with user interfaces for electronic devices (e.g., with touch-sensitive surfaces) are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and one or more input devices. The method includes displaying a messaging session between a user of the device and a respective participant in the message session other than the user of the device in a messaging user interface, where the respective participant is associated with a user account of the user. While the messaging session is active, the method also includes displaying, on the display, a first credential verification affordance in the messaging user interface. The method further includes detecting, via the one or more input devices, one or more user inputs to authenticate with the user account. After detecting the one or more user inputs to authenticate with the user account, in accordance with a determination that the authentication with the user account was successful, the method further includes providing an indication that the user was successfully authenticated with the user account to the respective participant via the messaging user interface.

In accordance with some embodiments, a non-transitory computer-readable storage medium comprising one or more programs, the one or more programs including instructions which, when executed by an electronic device with a display and one or more input devices, causes the electronic device to display a messaging session between a user of the device and a respective participant in the message session other than the user of the device in a messaging user interface, wherein the respective participant is associated with a user account of the user. While the messaging session is active, the instructions also cause the electronic device to display, on the display, a first credential verification affordance in the messaging user interface. The instructions further cause the electronic device to detect, via the one or more input devices, one or more user inputs to authenticate with the user account. After detecting the one or more user inputs to authenticate with the user account, in accordance with a determination that the authentication with the user account was successful, the instructions further cause the electronic device to provide an indication that the user was successfully authenticated with the user account to the respective participant via the messaging user interface.

In accordance with some embodiments, an electronic device includes a display, one or more input devices, one or more processors, memory, and one or more programs; the one or more programs are stored in the memory and configured to be executed by the one or more processors, and the one or more programs include instructions for performing or causing performance of the operations of any of the methods described herein. In accordance with some embodiments, a non-transitory computer readable storage medium has stored therein one or more programs, the one or more programs including instructions which, when executed by one or more processors of an electronic device with a display and one or more input devices, cause the electronic device to perform or cause performance of the operations of any of the methods described herein. In accordance with some embodiments, a graphical user interface on an electronic device with a display and one or more input devices, memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, one or more input devices, and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for verifying the user's credential, thereby increasing the effectiveness, efficiency, and user satisfaction with such devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7D are flow diagrams of a process for performing a task through a messaging user interface in accordance with some embodiments.

FIGS. 9A-9C are flow diagrams of a process for providing business messaging user interfaces in accordance with some embodiments.

FIGS. 11A-11H are flow diagrams of a process for performing tasks in a messaging user interface in accordance with some embodiments.

FIGS. 13A-13C are flow diagrams of a process for performing tasks in a messaging user interface in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for conducting messaging sessions with businesses. Such methods and interfaces can reduce the cognitive burden on a user when interacting with a business using an electronic device, thereby enhancing productivity and reducing errors and the potential for miscommunication. Such methods and interfaces can also reduce the battery power and bandwidth requirements of a device as compared to current methods and interfaces.

Below, FIGS. 1A-1B, 2, 3, 4A-4B, and 5A-5B provide a description of exemplary devices for performing the techniques for performing tasks through a messaging user interface. FIGS. 6A-6M illustrate exemplary user interfaces for initiating messaging sessions with business entities. FIGS.

Figure 9A:
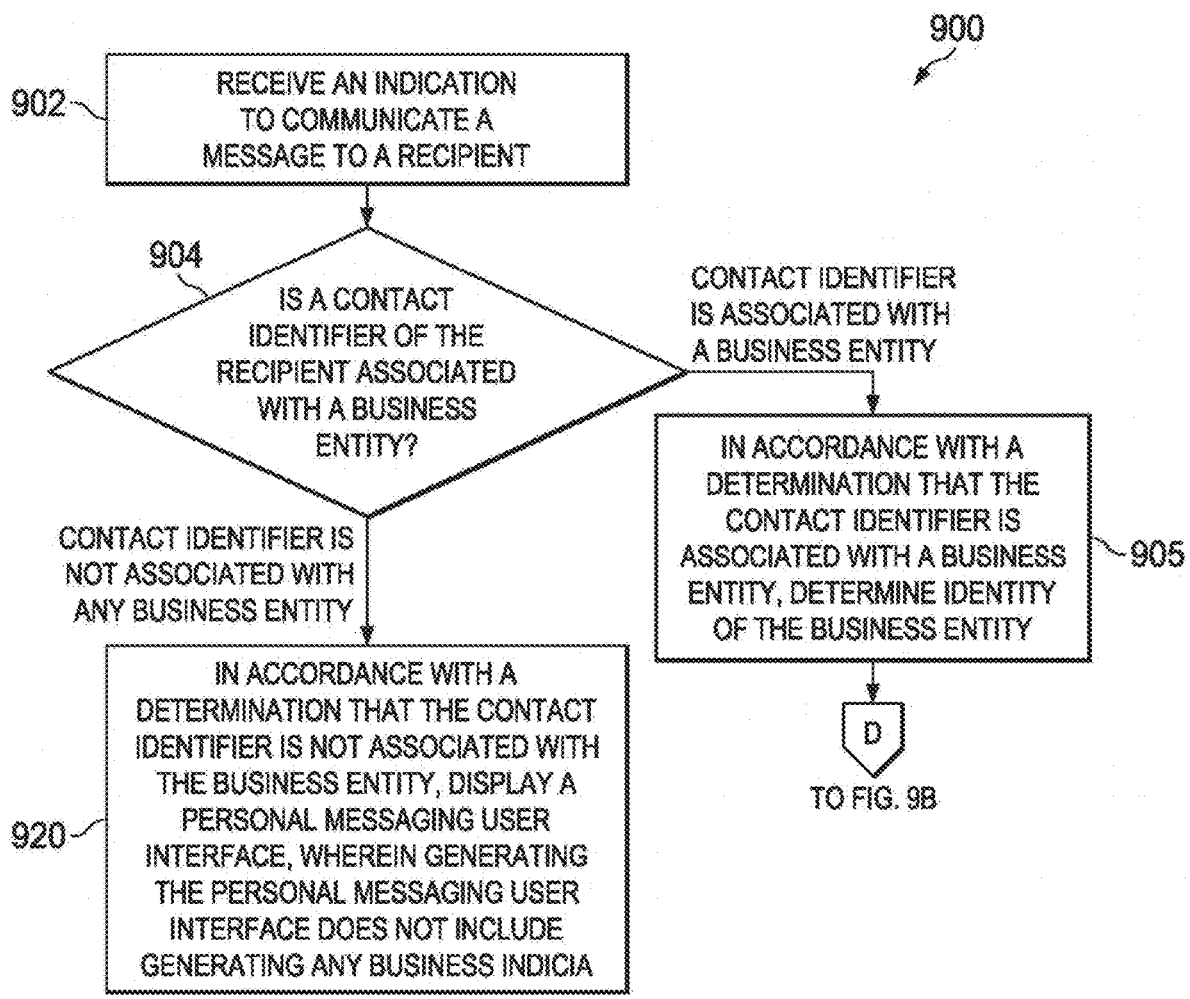
Figure 9B:
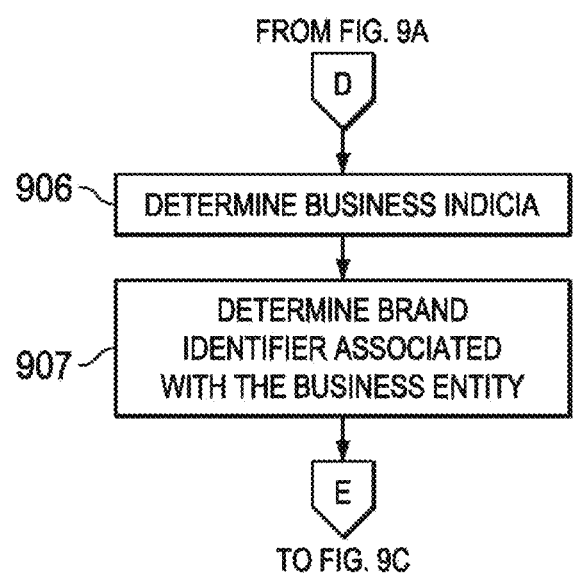
Figure 10A:
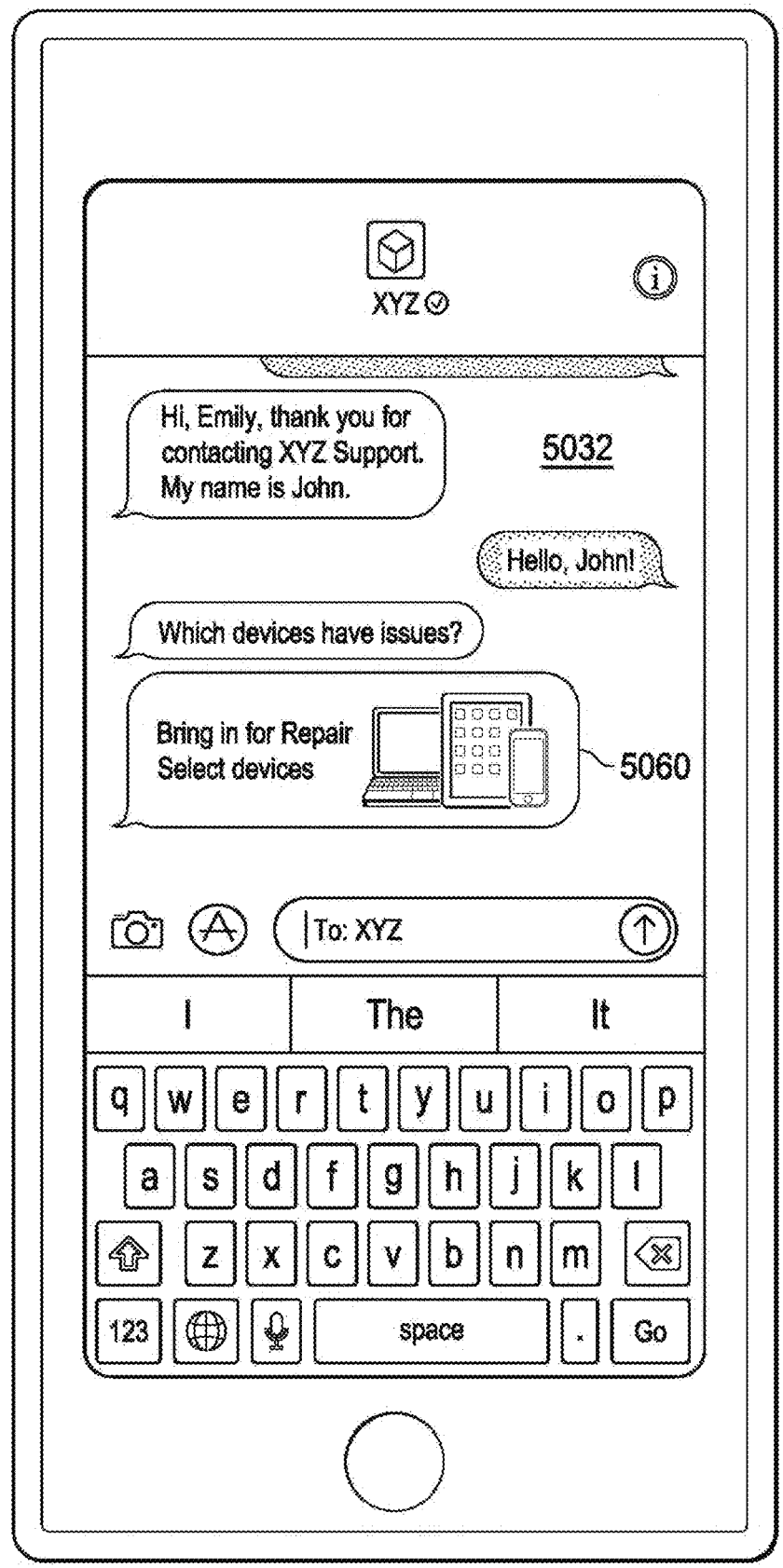
FIGS. 10A-Z and 10AA-10AH illustrate example user interfaces for performing tasks in a messaging user interface in accordance with some embodiments.
Figure 12A:
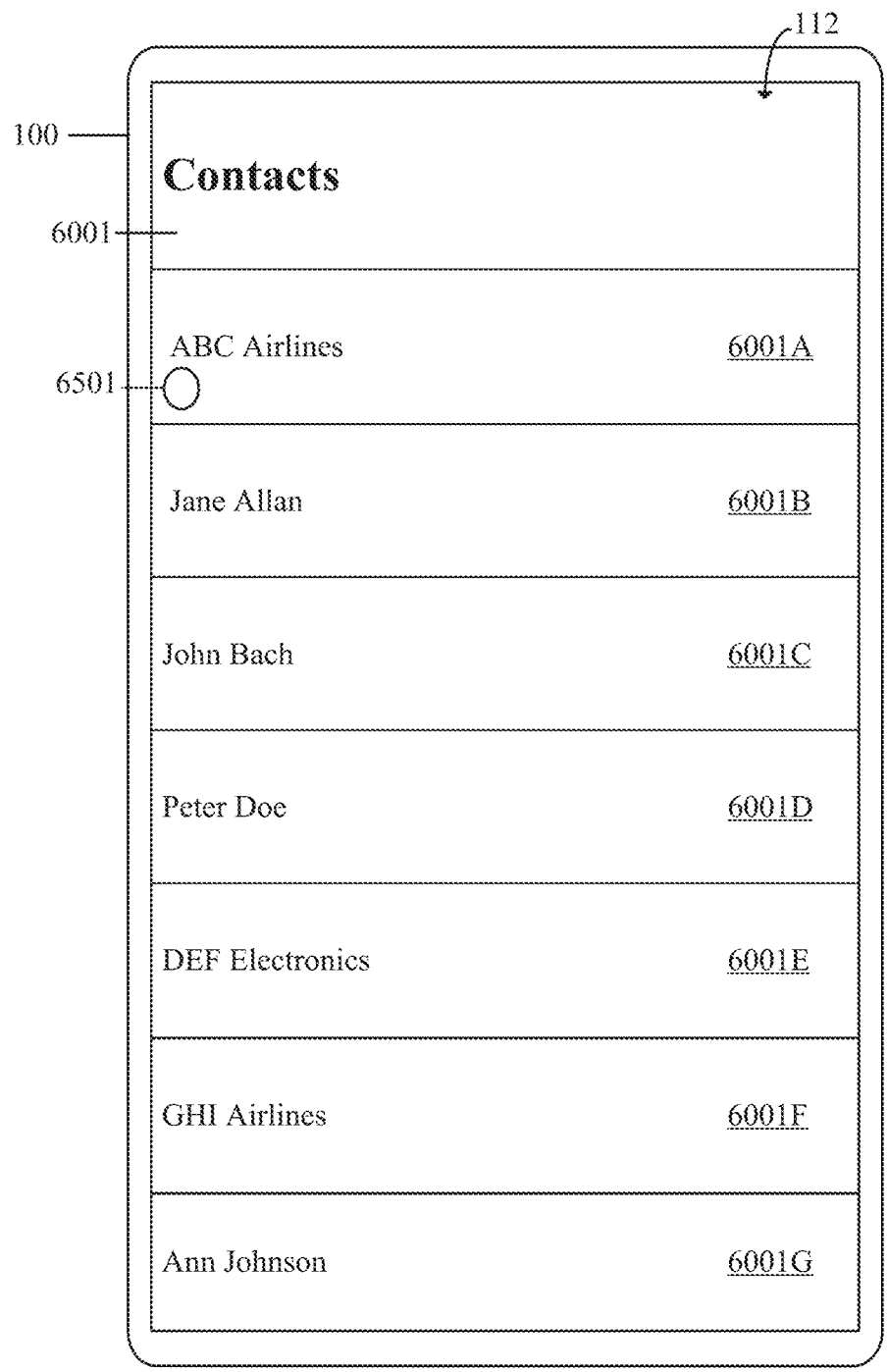
FIGS. 12A-12U illustrate example user interfaces for verifying user credential through a messaging user interface in accordance with some embodiments.
Figure 12U:
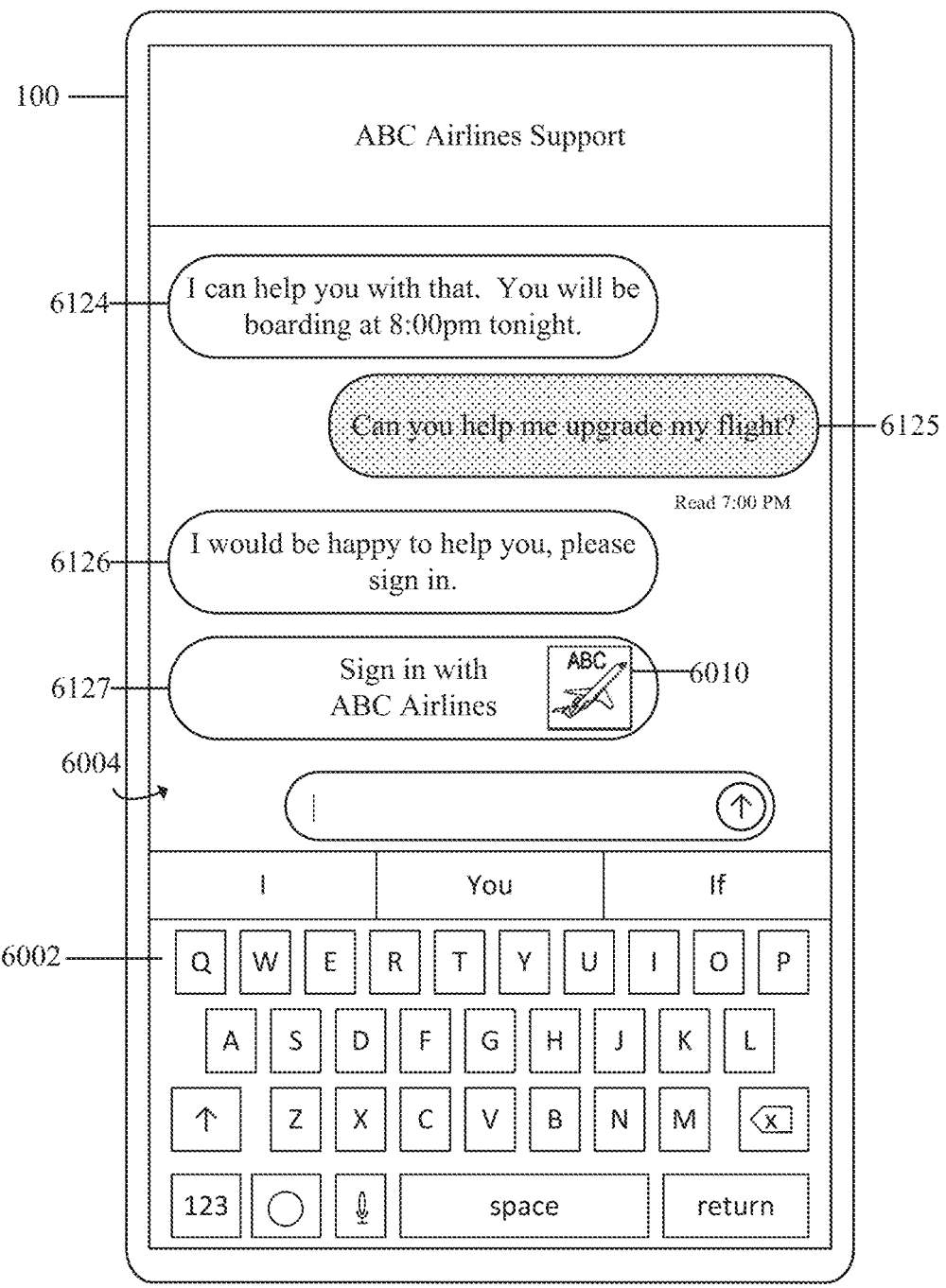
Figure 13A:
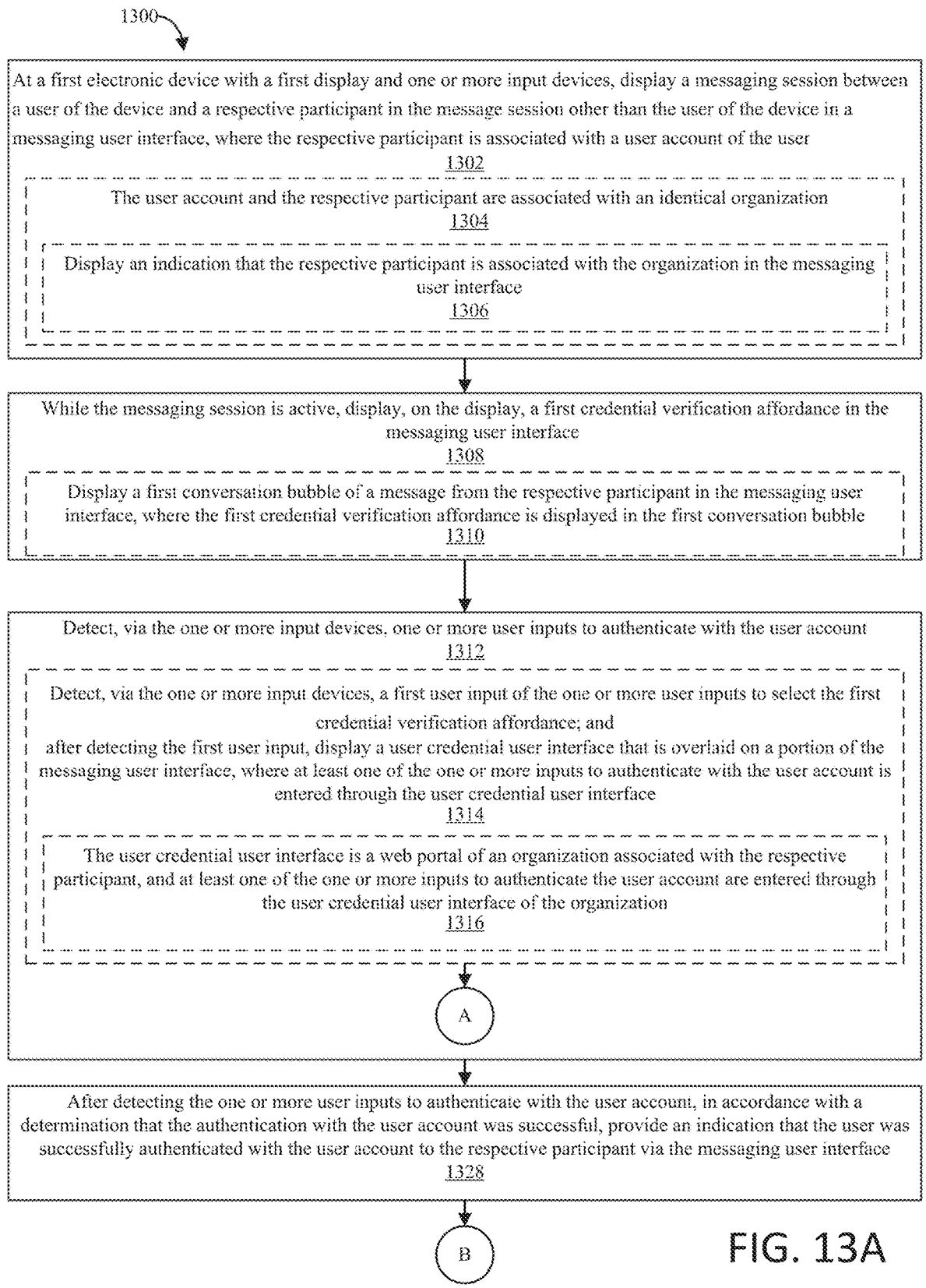

7A-7D are flow diagrams illustrating methods of initiating messaging sessions with business entities in accordance with some embodiments. The user interfaces in FIGS. 6A-6M are used to illustrate the processes described below, including the processes in FIGS. 7A-7D. FIGS. 8A-8I illustrate exemplary business messaging user interfaces. FIGS. 9A-9C are flow diagrams illustrating methods of providing business messaging user interfaces in accordance with some embodiments. The user interfaces in FIGS. 8A-8I are used to illustrate the processes described below, including the processes in FIGS. 9A-9C. FIGS. 10A-10AH illustrate exemplary user interfaces for performing tasks. FIGS. 11A-11H are flow diagrams illustrating methods of performing tasks. The user interfaces in FIGS. 10A-10AH are used to illustrate the processes described below, including the processes in FIGS. 11A-11H. FIGS. 12A-12U illustrate exemplary user interfaces for verifying user credential through a messaging user interface. FIGS. 13A-13C are flow diagrams illustrating methods of verifying user credential through a messaging user interface.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
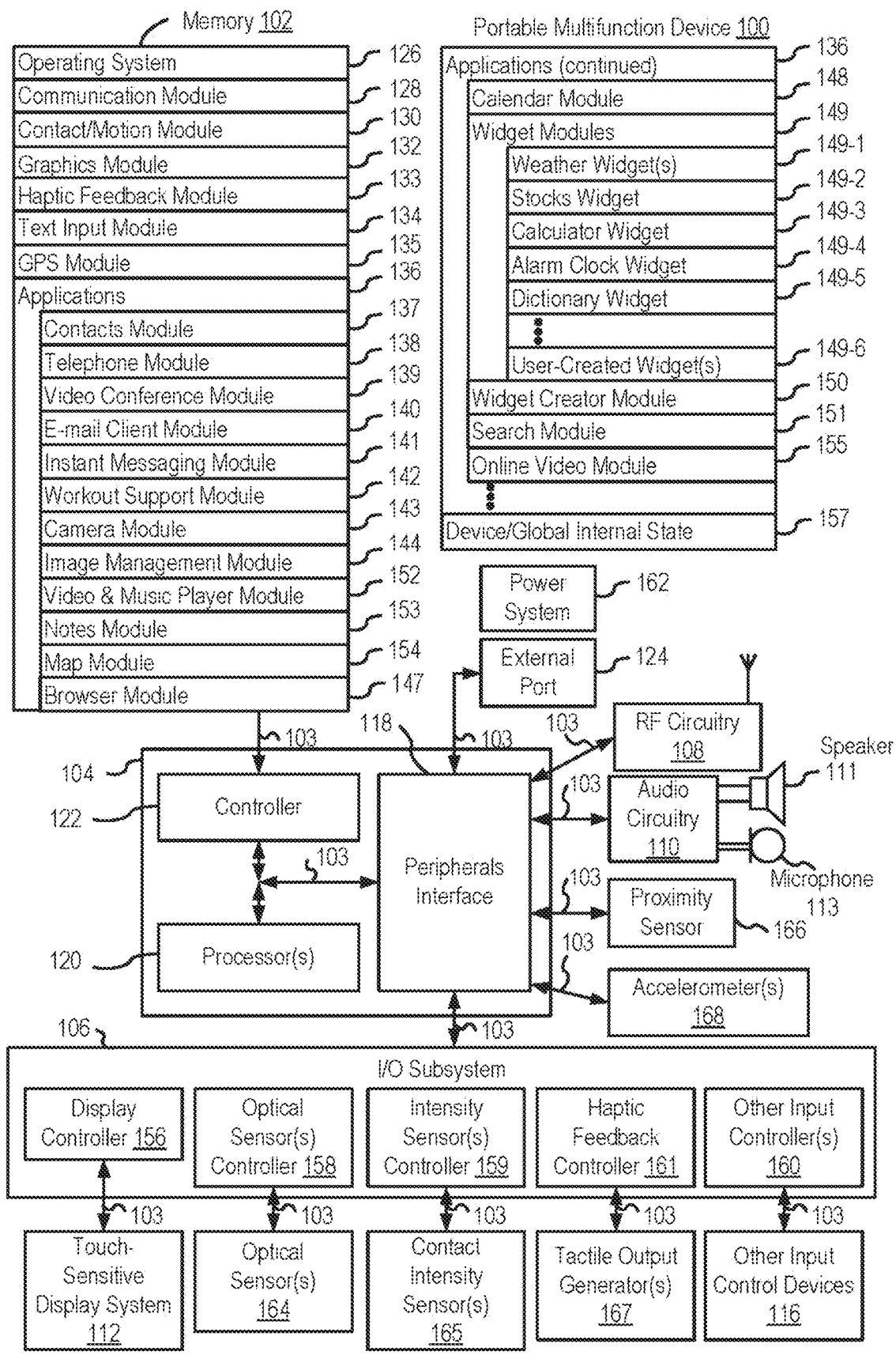
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
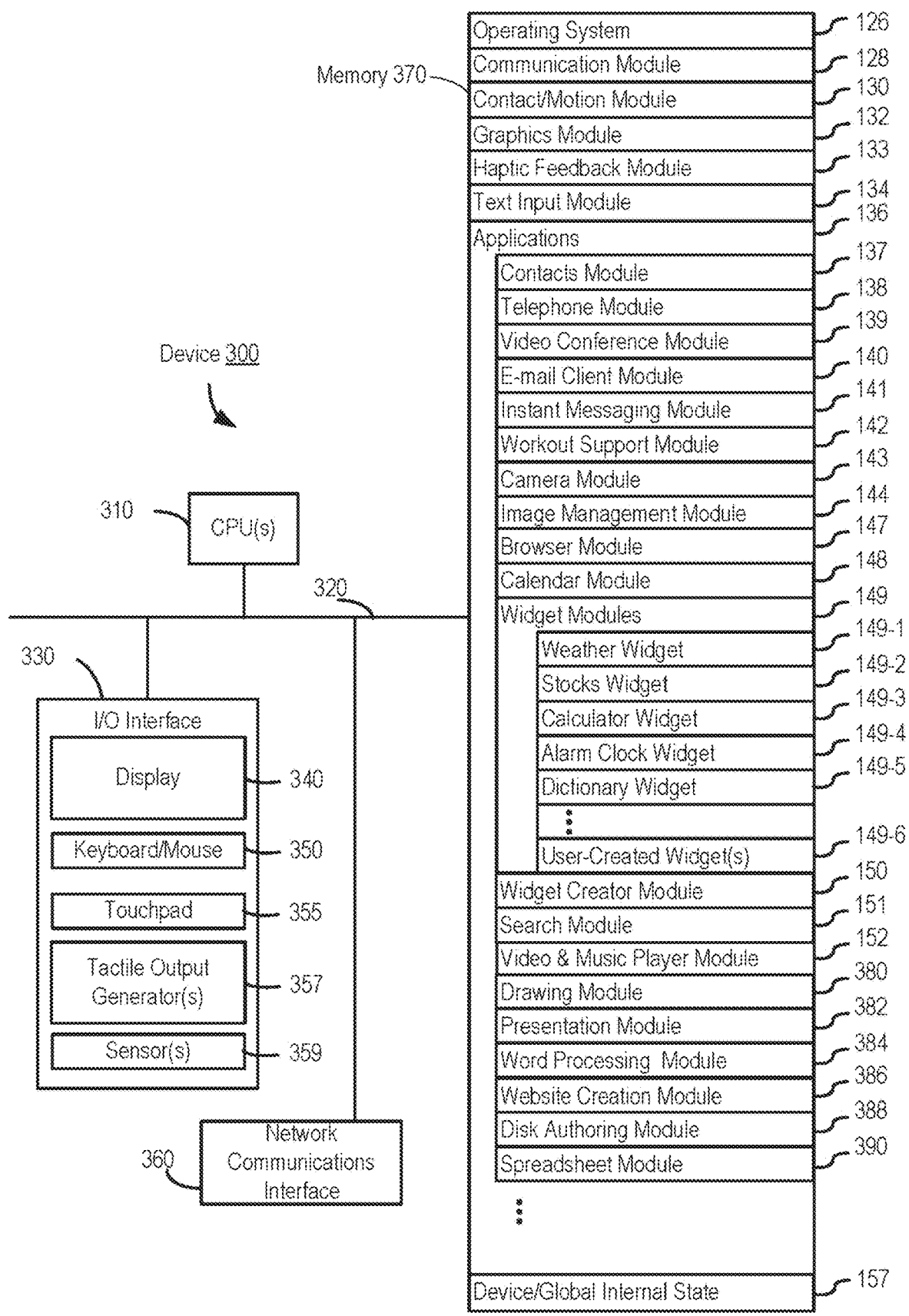
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
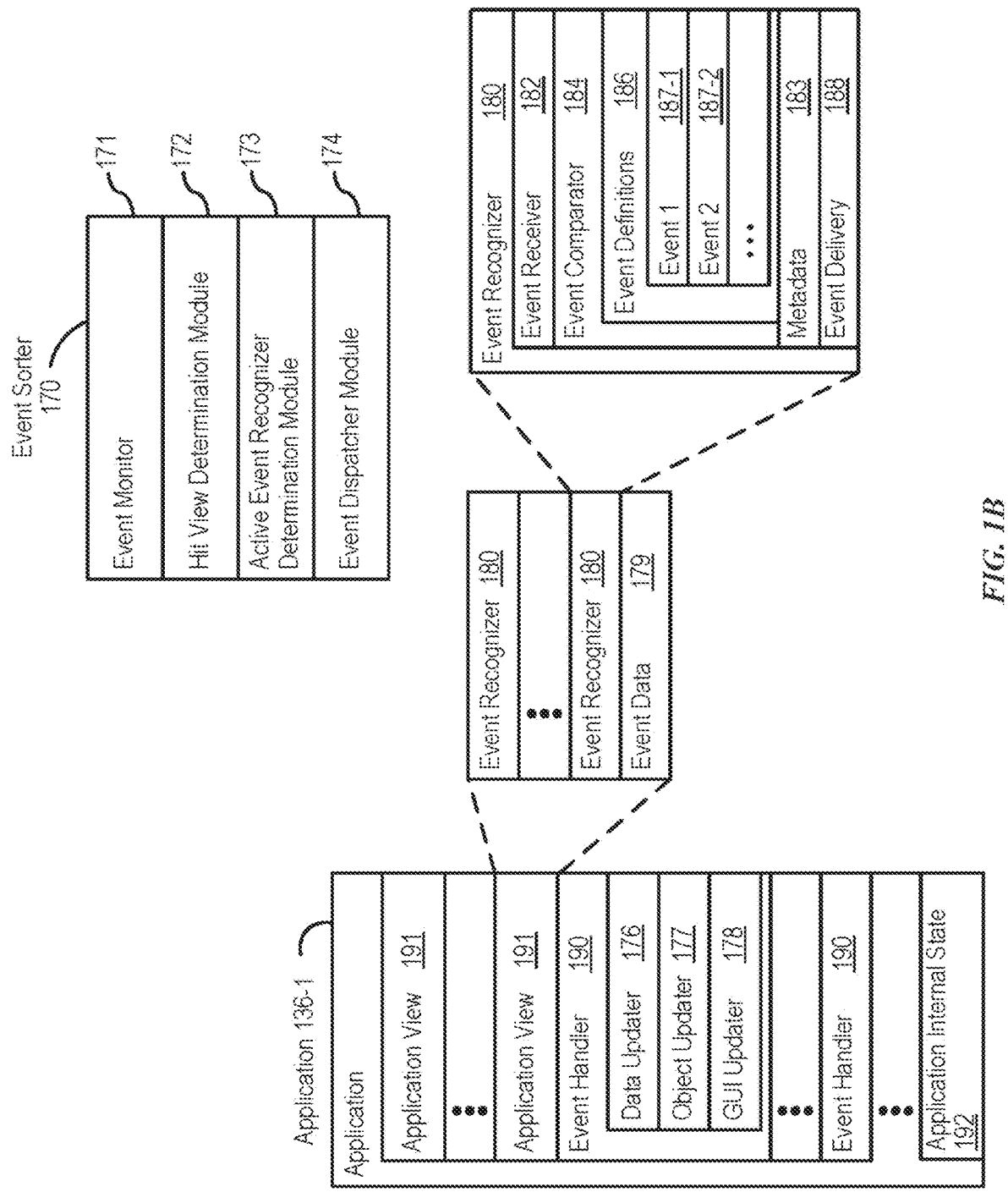
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
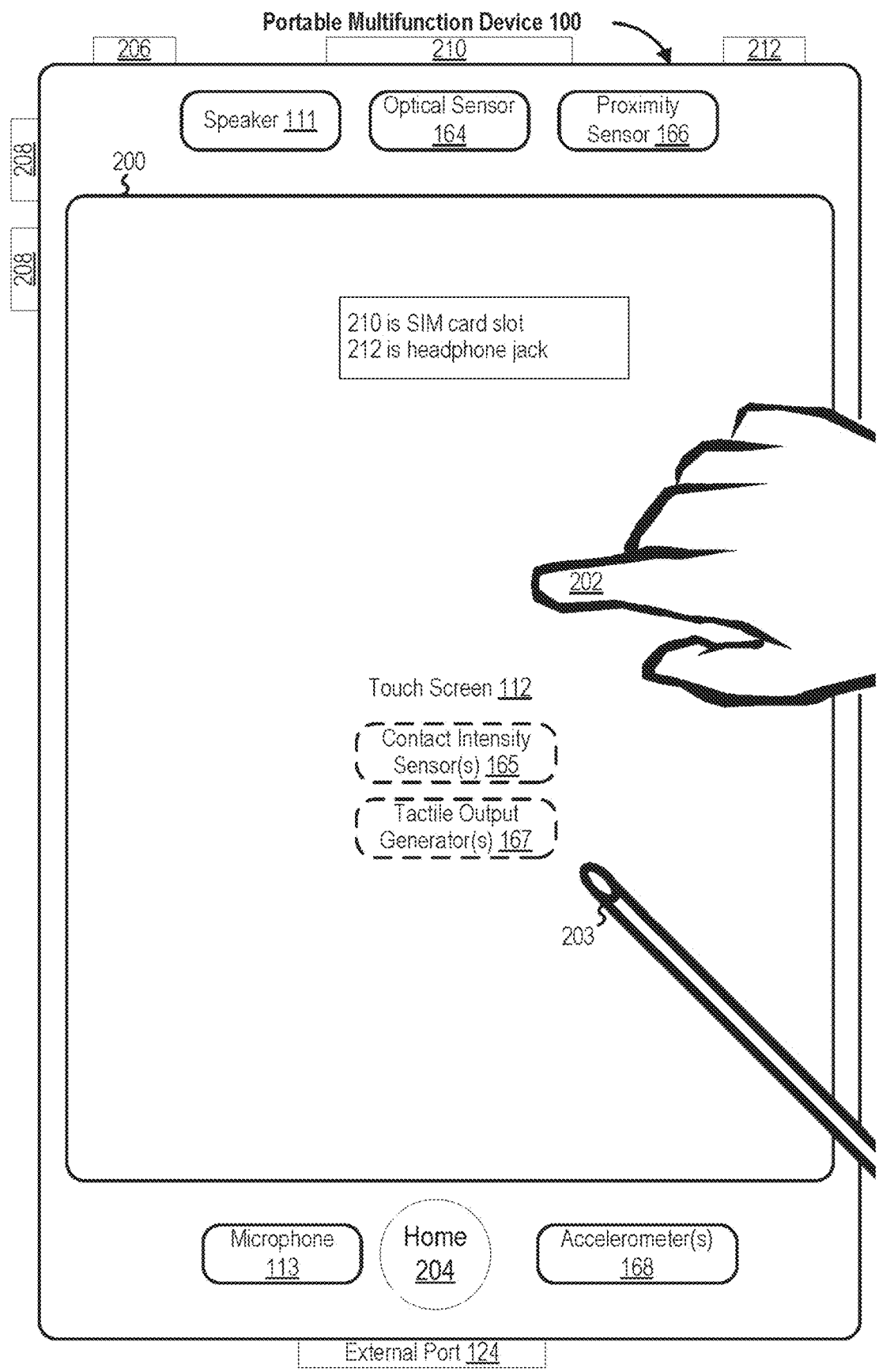
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
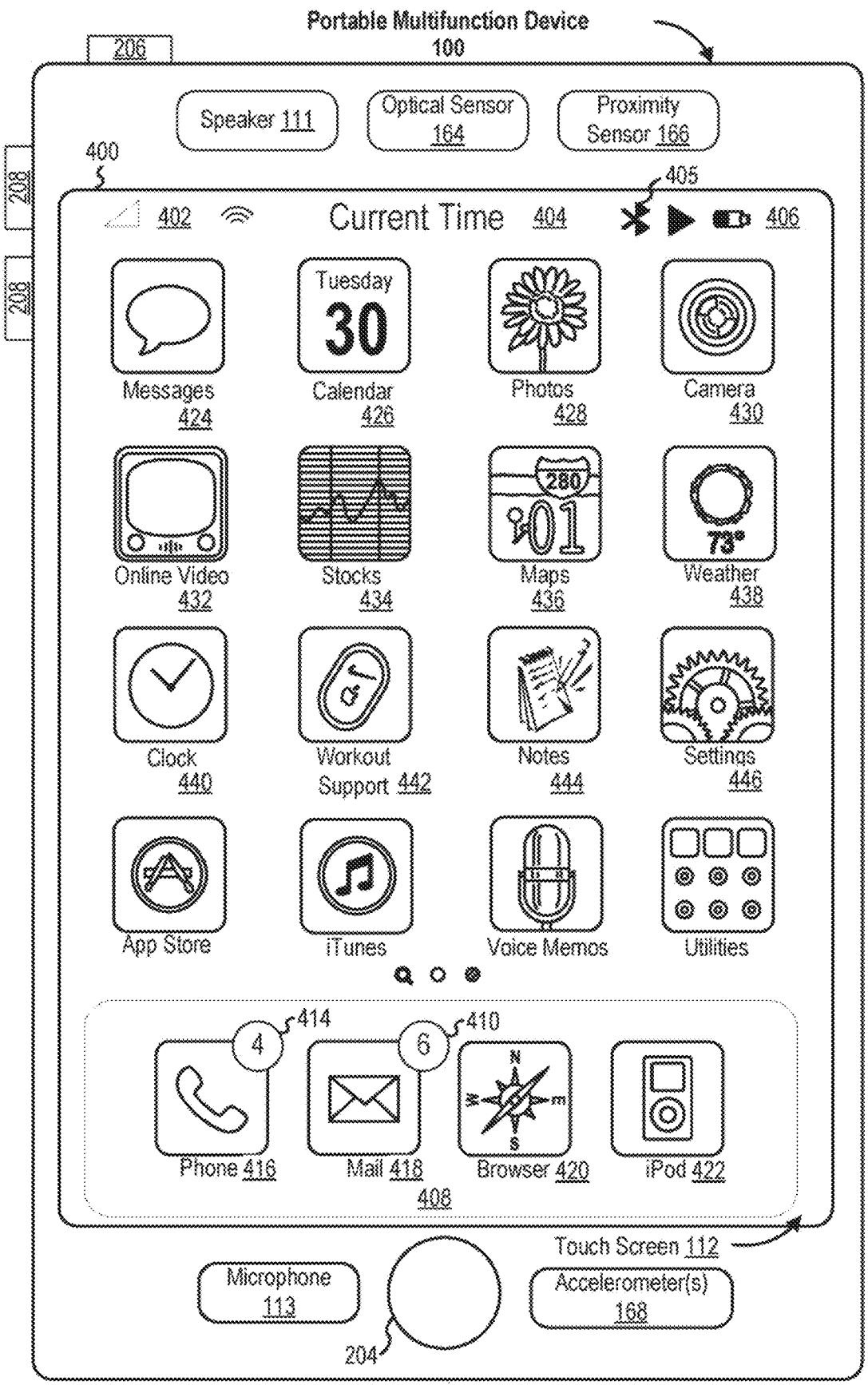
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
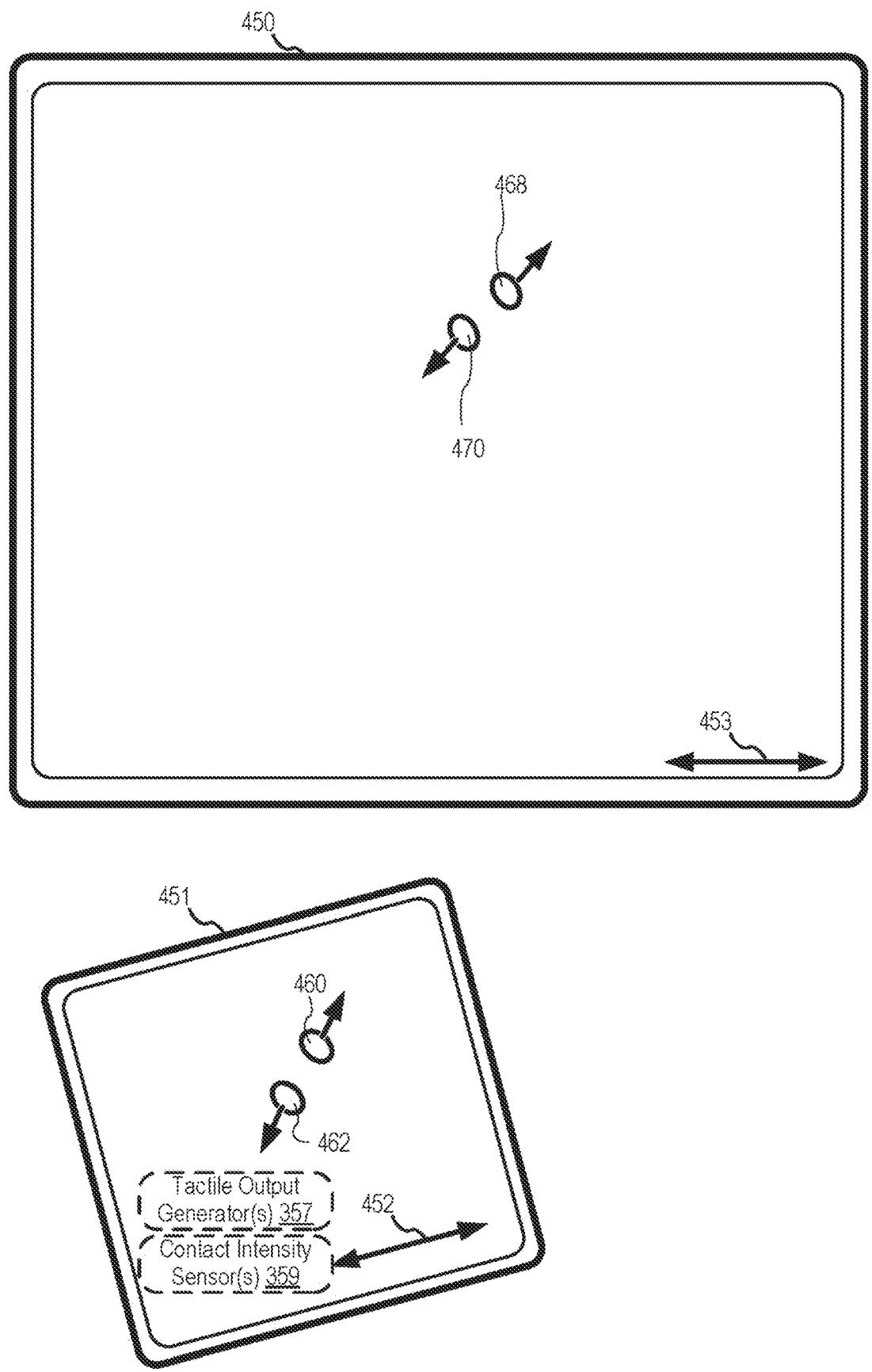
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
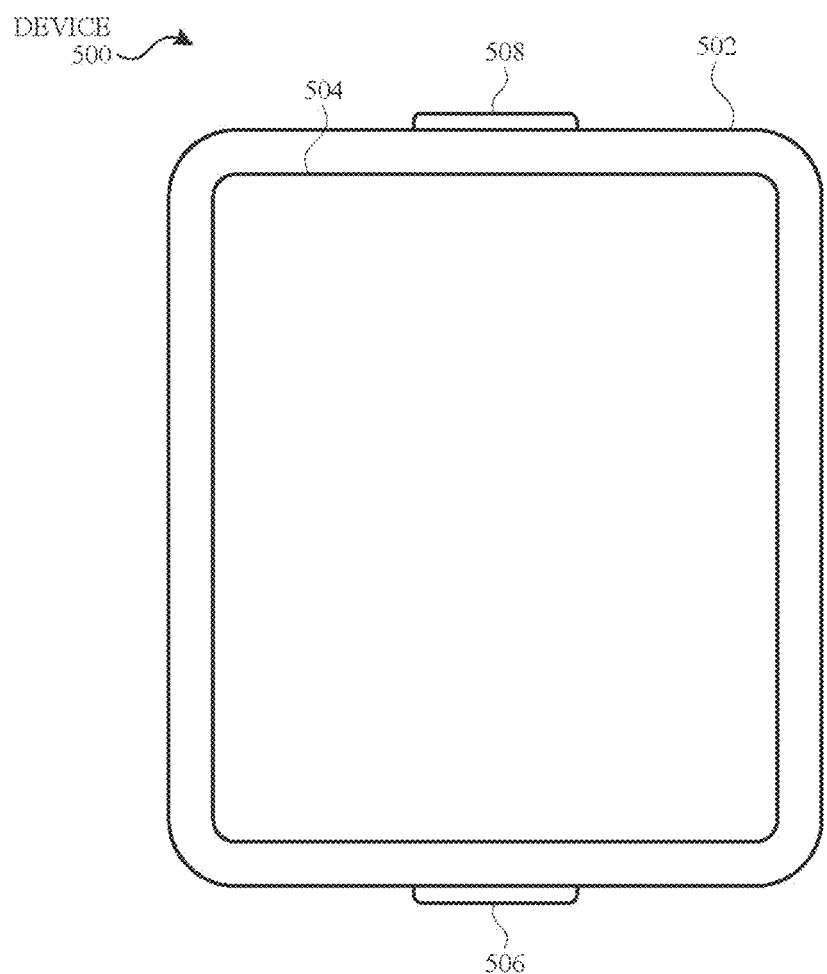
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
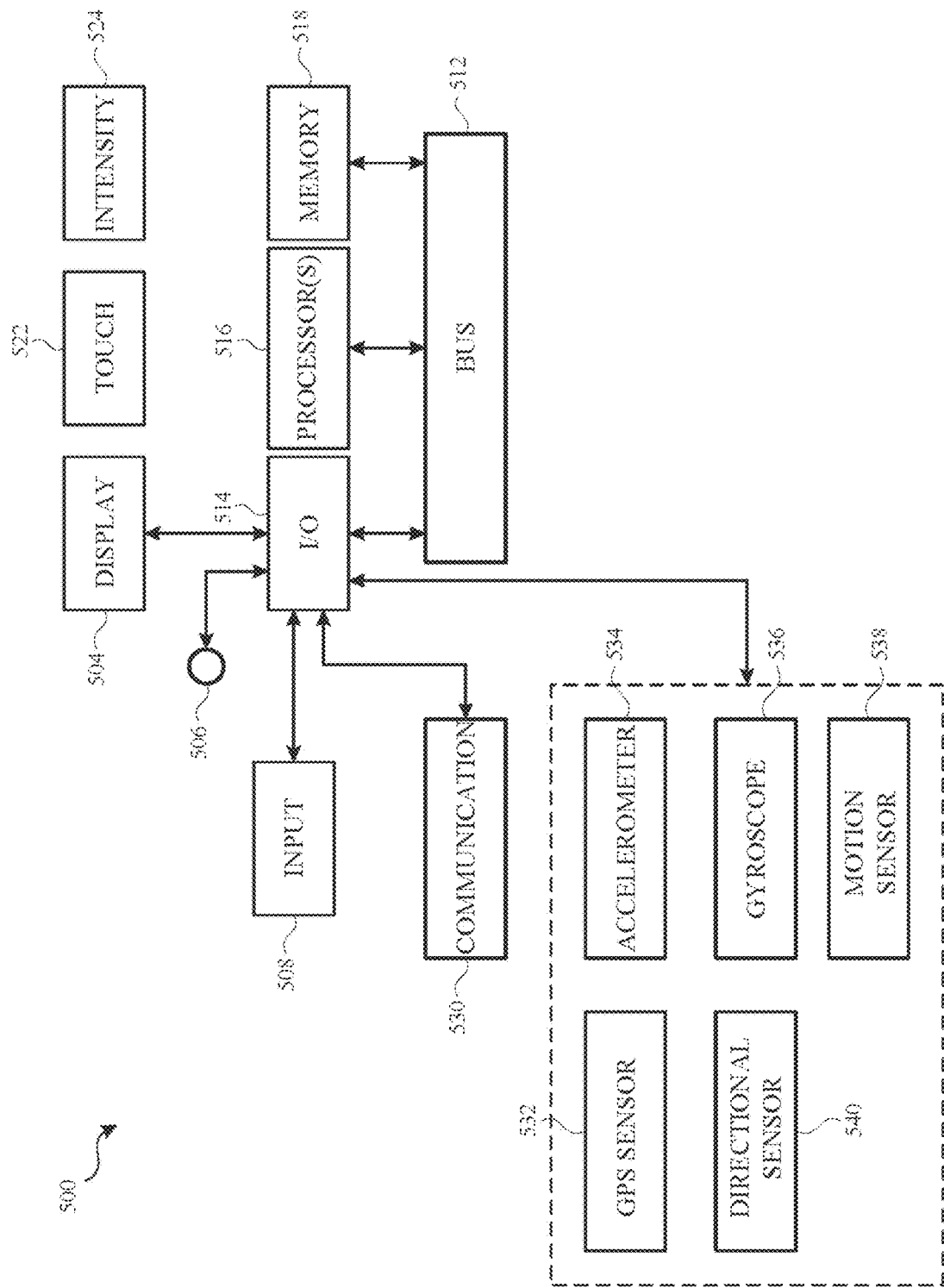
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for initiating a messaging session with a business entity, in accordance with some embodiments. For purposes of this application, a business entity is any person or entity that markets or sells goods or services. Messaging sessions are sessions in which a user and a business entity communicate text, images, and other content. In one embodiment, such communication may be near instantaneous for users and representatives of business entities who are both online and active at the time of a messaging session. Messaging sessions may be used by business entities to fulfill customer service capabilities such as answering inquiries, receiving customer feedback, account management functions, providing technical support, scheduling appointments, selling products, repairing products, conducting product sales, handling warranty programs, or any other suitable purpose requiring communications from a customer to such business entities. In such a manner, messaging sessions may be utilized in the same manner as voice telephone services as a customer service platform.

The user interfaces in FIGS. 6A-6M are used to illustrate the processes described below, including the processes in FIGS. 7A-7D. Although some of the examples that follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

Figure 6A:
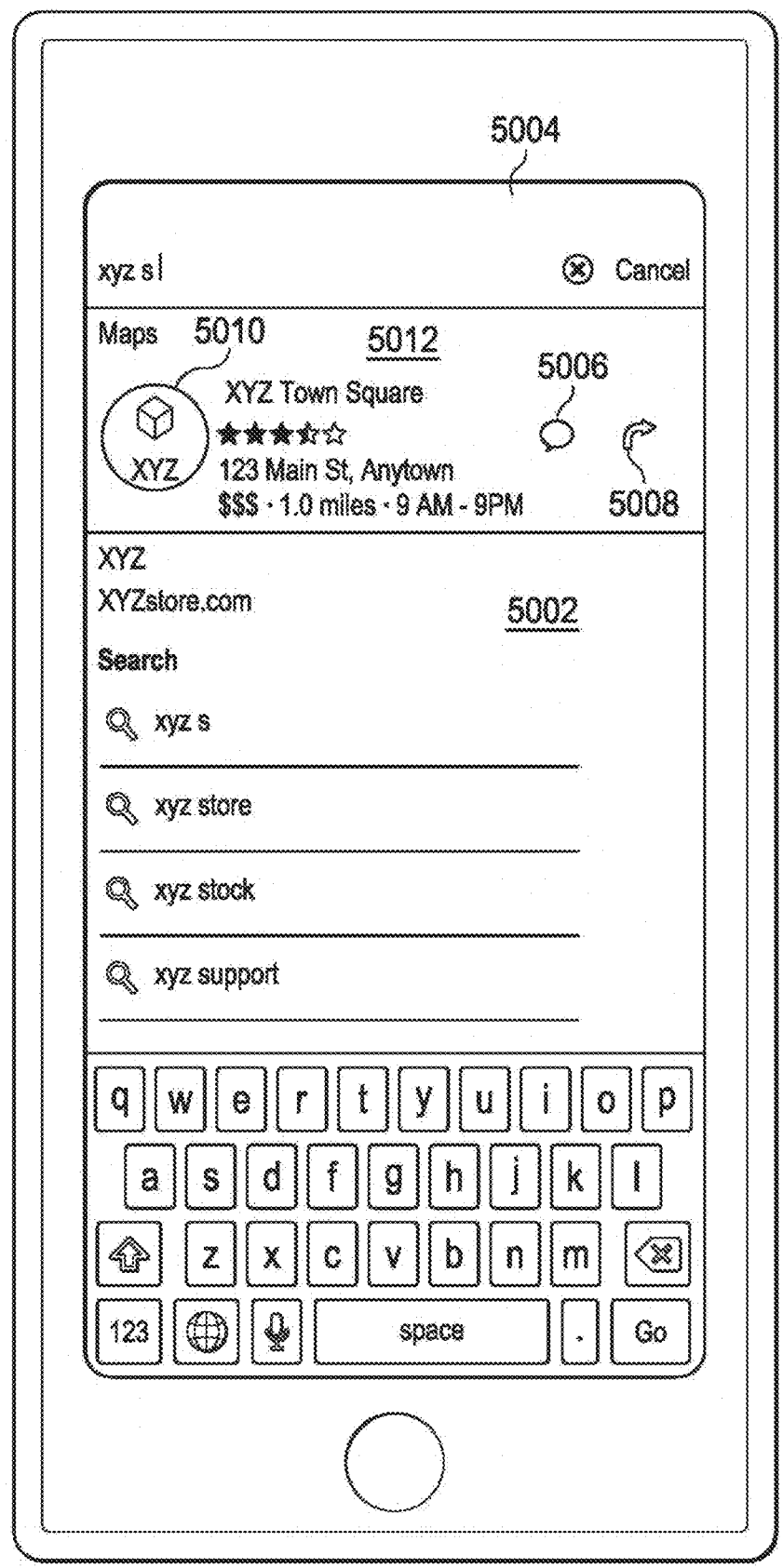
FIGS. 6A-6M illustrate example user interfaces for initiating a messaging session with a business entity in accordance with some embodiments.

FIG. 6A illustrates a user interface 5002 having a search affordance displayed within user interface 5002. As defined herein, a search affordance is an affordance that a user of a device (such as the device 100, 300, 500) interacts with to initiate a search. In the example of FIG. 6A, the search affordance is a search input area 5004. In the illustrative embodiment, the user interacts with search input area 5004 by inputting text into search input area 5004. As shown in FIG. 6A, a user has entered text into search input area 5004 to search for an electronics company (XYZ). The device detects an interaction to enter a search for XYZ's storefront and, in response to detecting the interaction, initiates a search based on the inputted text. In some embodiments, the device is operable to access a local storage device to perform the search. In other embodiments, the device provides the inputted text to a remote device, such as a search engine, and instructs the search engine to perform the search. Optionally, the device searches a local storage device and remote devices at the same time and presents search results from all searched locations. For example, the device searches a contact database stored on a local storage device, a contact database stored on a remote storage device on a corporate intranet, and websites stored on remote storage devices accessible via a public network such as the Internet. Additional details of systems and methods to perform searches and to transmit search results are described in U.S. Provisional Patent No. 62/507,163, "Messaging System for Corporations," filed on May 16, 2017, which is hereby incorporated by reference in its entirety.

The device receives the search result of the search for "XYZ s" and displays the search result for "XYZ s" in user interface 5002. Optionally, as illustrated in FIG. 6A, the device also displays suggested searches that are similar to the search based on the user's inputted text. In some embodiments, user interface 5002 is an interface of a browser application. In other embodiments, user interface 5002 is an interface of a search application. In further embodiments, user interface 5002 is the interface of a maps application. In further embodiments, user interface 5002 is the interface of another type of application that is operable to display the search result. As shown in FIG. 6A, a messaging affordance 5006 to initiate a messaging session with XYZ is displayed in user interface 5002 as part of the search result for "XYZ s." As shown in FIG. 6A, messaging affordance 5006 is represented by a conversation icon. Messaging affordance 5006 is an affordance that the user interacts with to initiate a messaging session. The user interacts with messaging affordance 5006 through a variety of ways, including by clicking on the messaging affordance, by swiping at the messaging affordance, or by inputting a voice command to select messaging affordance 5006. In response to detecting the interaction with the messaging affordance 5006, the device initiates a messaging session with a representative of XYZ in a messaging user interface. Additional descriptions of the messaging session and the messaging user interface are provided in the paragraphs below.

In some embodiments, additional information related to "XYZ" are also displayed in user interface 5002. As shown in FIG. 6A, a brand identifier 5010 of XYZ, an address of XYZ, and XYZ's hours of operation are also displayed in the user interface 5002. For purposes of this application, a brand identifier is any text, symbol, graphic, audiovisual material, or other content that is associated with the name, trademarks, products, services, or business of a particular business entity. In the illustrated embodiment, brand identifier 5010 is a logo of XYZ. In other embodiments described herein, a brand identifier of a business entity is a trademark, an avatar, a background color, a shape of a product (of the business entity), or other content that identifies a business entity. Moreover, a rating of XYZ and an indication of the cost of XYZ's products are also displayed in user interface 5002. In the illustrated embodiment, the rating of XYZ is represented by the number of filled stars, and indicates an approval level of XYZ. In some embodiments, the rating is based on an average of other users' ratings of XYZ, the user's personal rating of XYZ, a professional rating agency's rating, or any combination of the foregoing. The indication of cost is an actual or approximate indication of the cost of products or services of XYZ. In the illustrated embodiment, the indication of cost is represented by the number of "$." The additional information not only provide the user with helpful information about XYZ, but can also assist the user to determine whether the user should initiate a messaging session with XYZ.

In some embodiments, a business profile affordance 5012 is also displayed in user interface 5002. A business profile affordance is an affordance that the user interacts with to obtain additional information about the business entity. As shown in FIG. 6A, business profile affordance 5012 is displayed in user interface 5002 and is represented by a region around the additional information related to XYZ. In response to detecting the interaction with business profile affordance 5012, the device generates a business profile user interface for display on a display of the device. As defined herein, the business profile user interface of a business entity is a user interface that includes additional information about the business entity, such as the location of the business entity, the hours of operation of the business entity, directions to the business entity, a map of a geographic area around the business entity, or any other suitable information about the business entity. In some embodiments, a messaging affordance such as messaging affordance 5006 is displayed in the business profile user interface to allow the user to initiate the messaging session with XYZ through the business profile user interface. Additional descriptions of the business profile user interface are provided in the paragraphs below.

As shown in FIG. 6A, a maps affordance 5008 is also displayed in user interface 5002. As defined herein, a maps affordance is an affordance that the user interacts with to access a user interface containing one or more maps, referred to hereafter as a maps user interface. In some embodiments, the device, in response to detecting a user interaction with maps affordance 5008, generates the maps user interface for display on a display of the device. Optionally, the device also generates a messaging affordance similar to messaging affordance 5006 in the maps user interface to allow the user to initiate a messaging session with the business entity through the maps user interface.

Figure 6B:
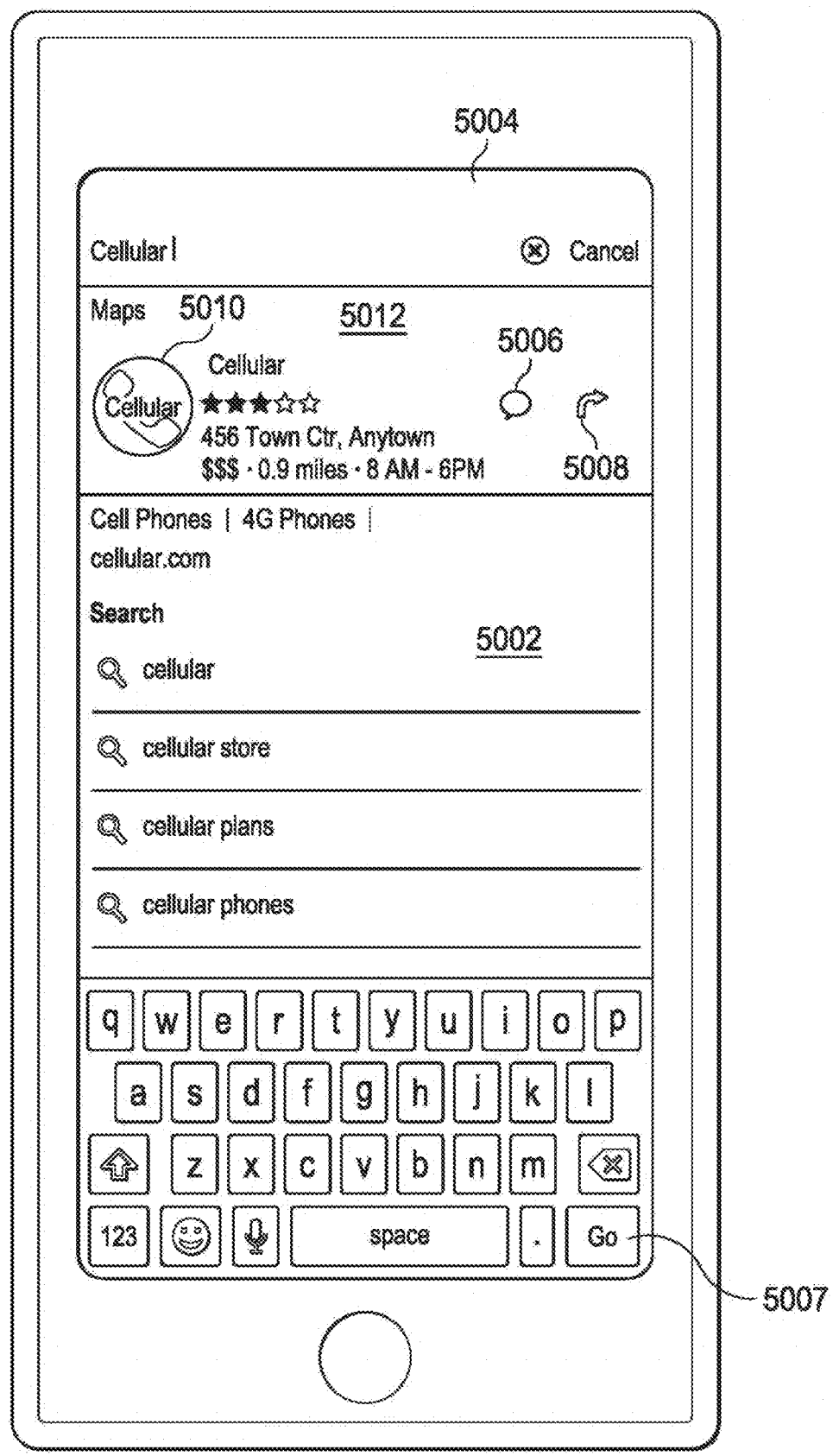

In some embodiments, the device does not initiate an incremental search. In the embodiment of FIG. 6B, a search affordance 5007 is represented by an area around the "Go" key. In the illustrated embodiment, the user interacts with the "Go" key by performing a variety of gestures described herein or through a variety of voice commands. The device, in response to detecting the user's interaction with the "Go" key, initiates a search for a telephone company ("Cellular"). The device subsequently receives a search result for Cellular and provides the search result for display in user interface 5002. Messaging affordance 5006 is displayed in user interface 5002 together with brand identifier 5010 of Cellular, business profile affordance 5012 of Cellular, and maps affordance 5008. In the illustrated embodiment, the user interacts with messaging affordance 5006 to initiate a messaging session with Cellular, interacts with business profile affordance 5012 to obtain additional information about Cellular, or interacts with maps affordance 5008 to obtain directions or map-related information about Cellular. In some embodiments, additional types of affordances are displayed in the search result for Cellular or other business entities.

Figure 6C:
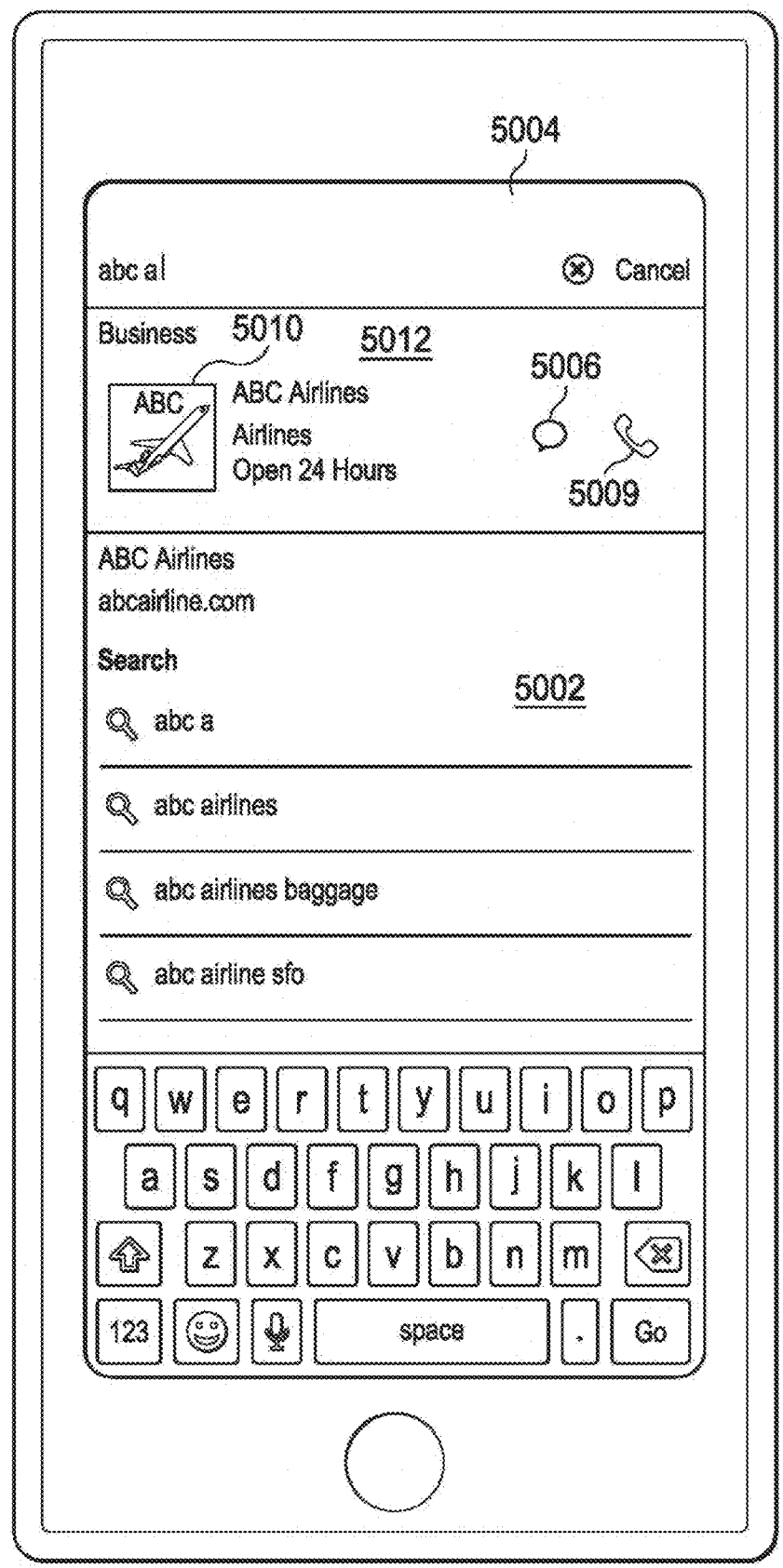

As shown in FIG. 6C, the search affordance is search input area 5004. The device detects an interaction resulting in an input of "abc a" into search input area 5004. In response to detecting the input of "abc a", the device initiates a search for "abc a", and subsequently receives a search result for an airlines company ("ABC Airlines"). Information about ABC Airlines is displayed together with brand identifier 5010 of ABC Airlines, and business profile affordance 5012 of ABC Airlines. The device determines that ABC Airlines, unlike Cellular, does not have a physical location within a proximity of the device, and replaces maps affordance 5008 with a call affordance 5009, where call affordance 5009 is an affordance the user interacts with to initiate a telephonic session with a representative of ABC Airlines.

Figure 6D:
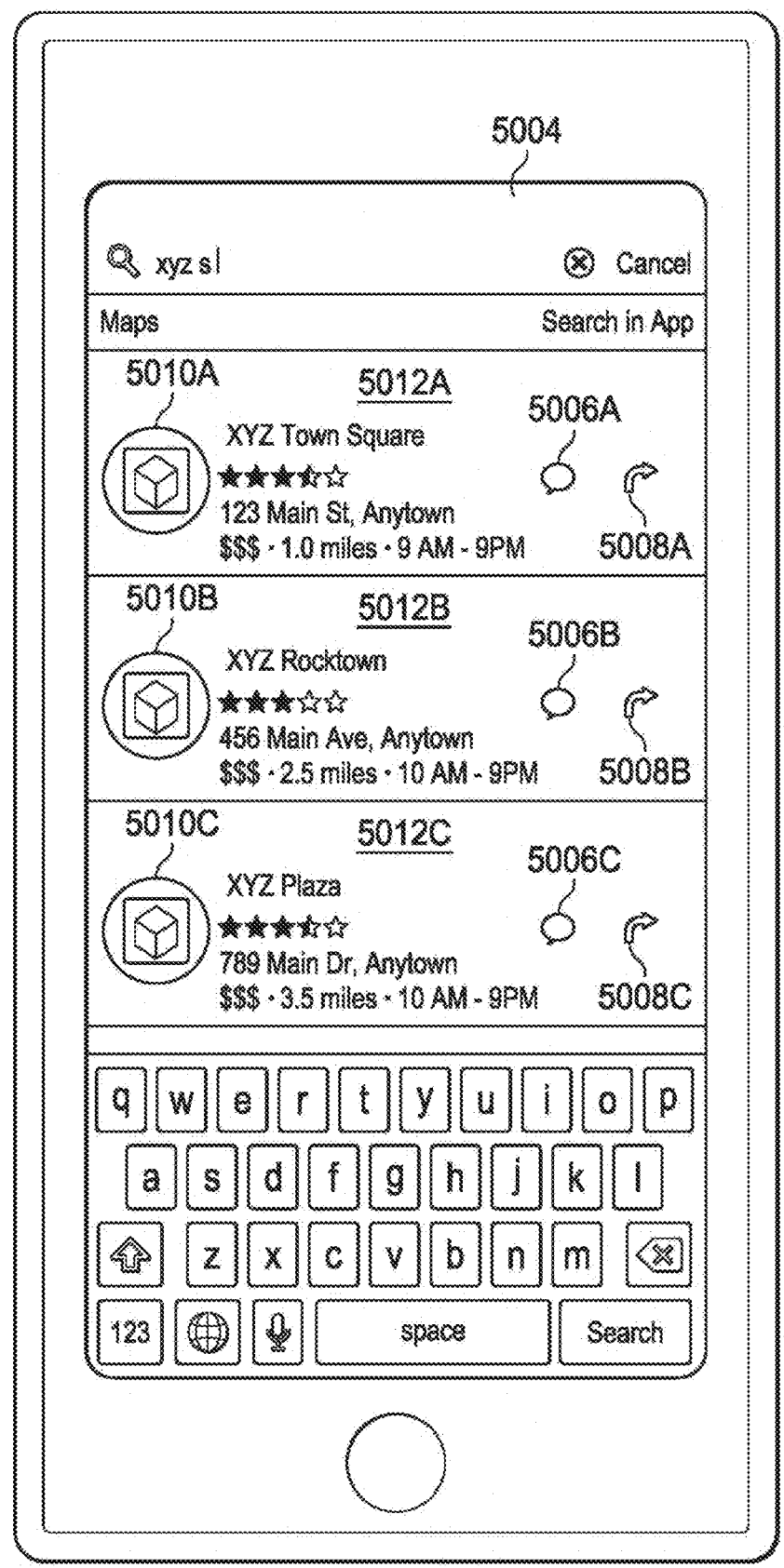

In some embodiments, the search result for a search for a business entity includes multiple locations of the business entity. FIG. 6D, similar to FIG. 6A, illustrates a search for "xyz s." In the illustrated embodiment, the device receives a search result containing three locations of XYZ and provides information about each of the three companies for display in user interface 5002. As shown in FIG. 6D, separate messaging affordances 5006A, 5006B, and 5006C are provided for each location of XYZ. Moreover, each of maps affordances 5008A, 5008B, and 5008C and brand identifiers 5010A, 5010B, and 5010C are displayed next to a respective location of XYZ, together with additional information about the respective location. Further, three business profile affordances 5012A-5012C are provided for the three locations of XYZ. In some embodiments, the additional information also specifies specific products or services offered by each location. As shown in FIG. 6D, first messaging affordance 5006A is associated with XYZ Town Square, second messaging affordance 5006B is associated with XYZ Rocktown, and third messaging affordance 5006C is associated with XYZ Plaza.

In some embodiments, the device, in response to detecting a user interaction with any of the three messaging affordances 5006A, 5006B, and 5006C, initiates a messaging session with a representative of XYZ located at a central location of XYZ, such as at a call center. Optionally, the device, in response to the user interaction with first messaging affordance 5006A, initiates a messaging session with a representative at XYZ Town Square or with a representative that specializes in the operations performed at the location. For example, in one embodiment, if XYZ Town Square specializes in repairing mobile phones, a user interaction with first messaging affordance 5006A initiates a messaging session with a representative at XYZ Town Square or with a representative elsewhere that specializes in repairing mobile phones. Further, if XYZ Rocktown is a retail store front of XYZ, a user interaction with second messaging affordance 5006B initiates a messaging session with a representative at XYZ Rocktown or with a representative with retail related training. Further, if XYZ Plaza hosts XYZ's billing department, a user interaction with third messaging affordance 5006C initiates a messaging session with a representative at XYZ Plaza or another billing specialist. As shown in FIG. 6D, XYZ Town Square, XYZ Rocktown, and XYZ Plaza are each associated with first, second, and third maps affordances 5008A, 5008B, and 5008C, respectively. The user may interact with any of three maps affordance is 5008A-5008C to obtain information about the location of the respective location.

In some embodiments, the device arranges different locations of XYZ based on one or more predetermined settings or user selected settings. As shown in FIG. 6D, the device arranges XYZ Town Square, XYZ Rocktown, and XYZ Plaza based on their relative distance with respect to the location of the device. In some embodiments, as the device changes location, the device's relative distances to the locations of XYZ also change. In one of such embodiments, the device dynamically updates the device's distance to each of the locations and re-arranges the locations based on the up-to-date relative distances of the locations.

In some embodiments, the device arranges different locations of a business entity based on their respective response times to an initial message from the user. A response time is a length of time that a business entity estimates will elapse before it is able to respond to an initial message sent by the user. In one embodiment, the response time is set by the business entity or entered manually. In other embodiments, the response time is automatically calculated. Optionally, such calculation is based on one or more of the number of representatives handling message responses, the time of day, the number of current messages being handled by the business entity, the number of messages that are currently queued for such handling, the average response time over a preceding period of time, or any other metric or data suitable for calculating such response time. A response time may be expressed as a number of minutes, such as thirty minutes, or by a predicted time of day, such as 12:32 p.m.

Figure 6E:
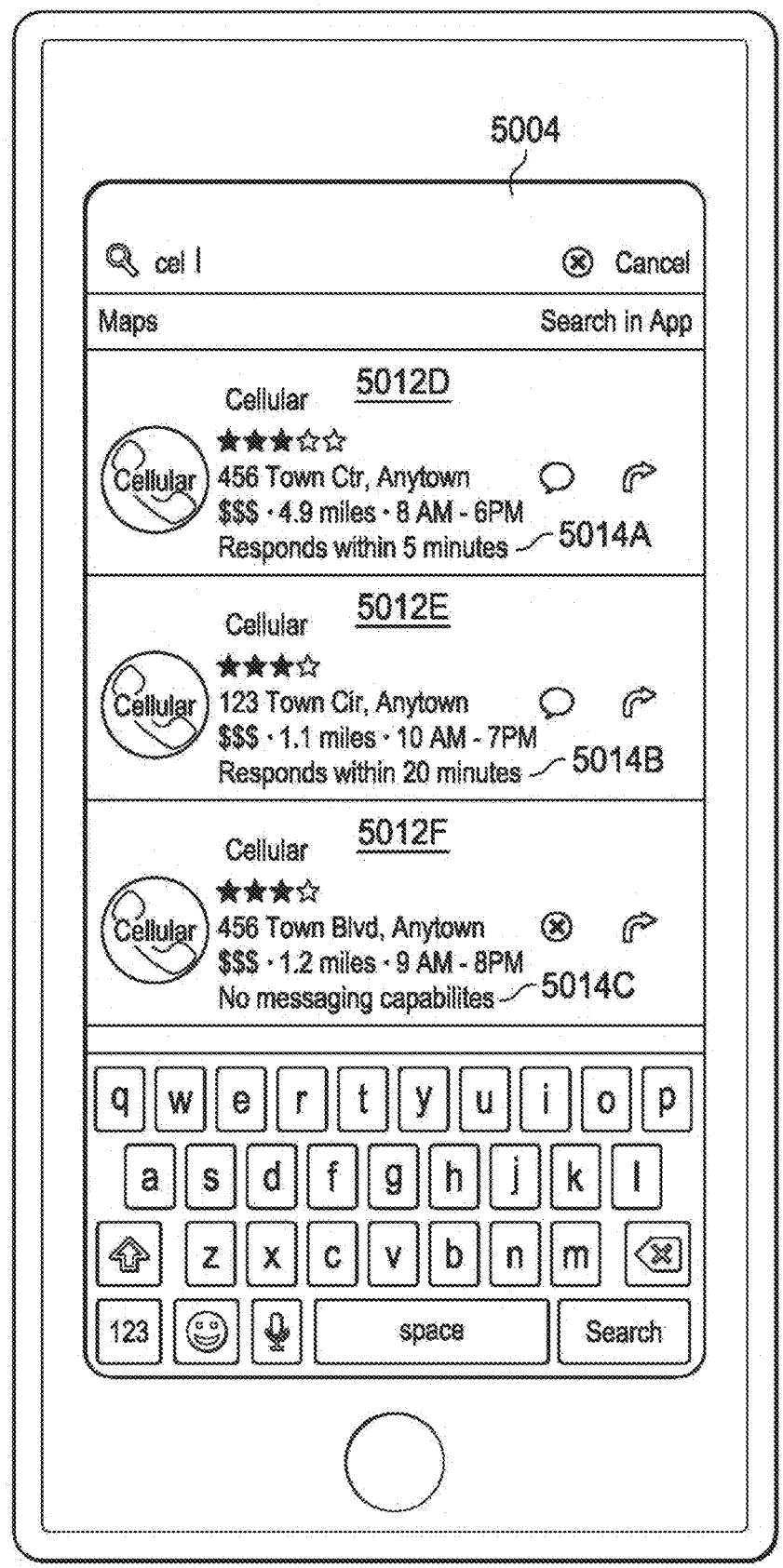

As shown in FIG. 6E, three locations of Cellular are displayed together with first, second, and third business profile affordances 5012D-5012F, respectively, and with first, second, and third message response time notifications 5014A-5014C, respectively. Cellular at 456 Town Ctr has an estimated response time of 5 minutes, whereas Cellular at 123 Town Cir has an estimated response time of 20 minutes. In the illustrated embodiment, the device displays the location of Cellular at 456 Town Ctr before the location of Cellular at 123 Town Ctr, even though the distance from device to Cellular at 456 Town Ctr is greater than the distance from the device to Cellular at 123 Town Cir. As shown in FIG. 6E, Cellular at 456 Town Blvd does not have messaging capabilities. As such, a third message response time notification 5014C indicates that Cellular at 456 Town Blvd lacks messaging capabilities and is incapable of responding. In further embodiments, the device is operable to arrange the locations of Cellular based on their respective rating.

Figure 6F:
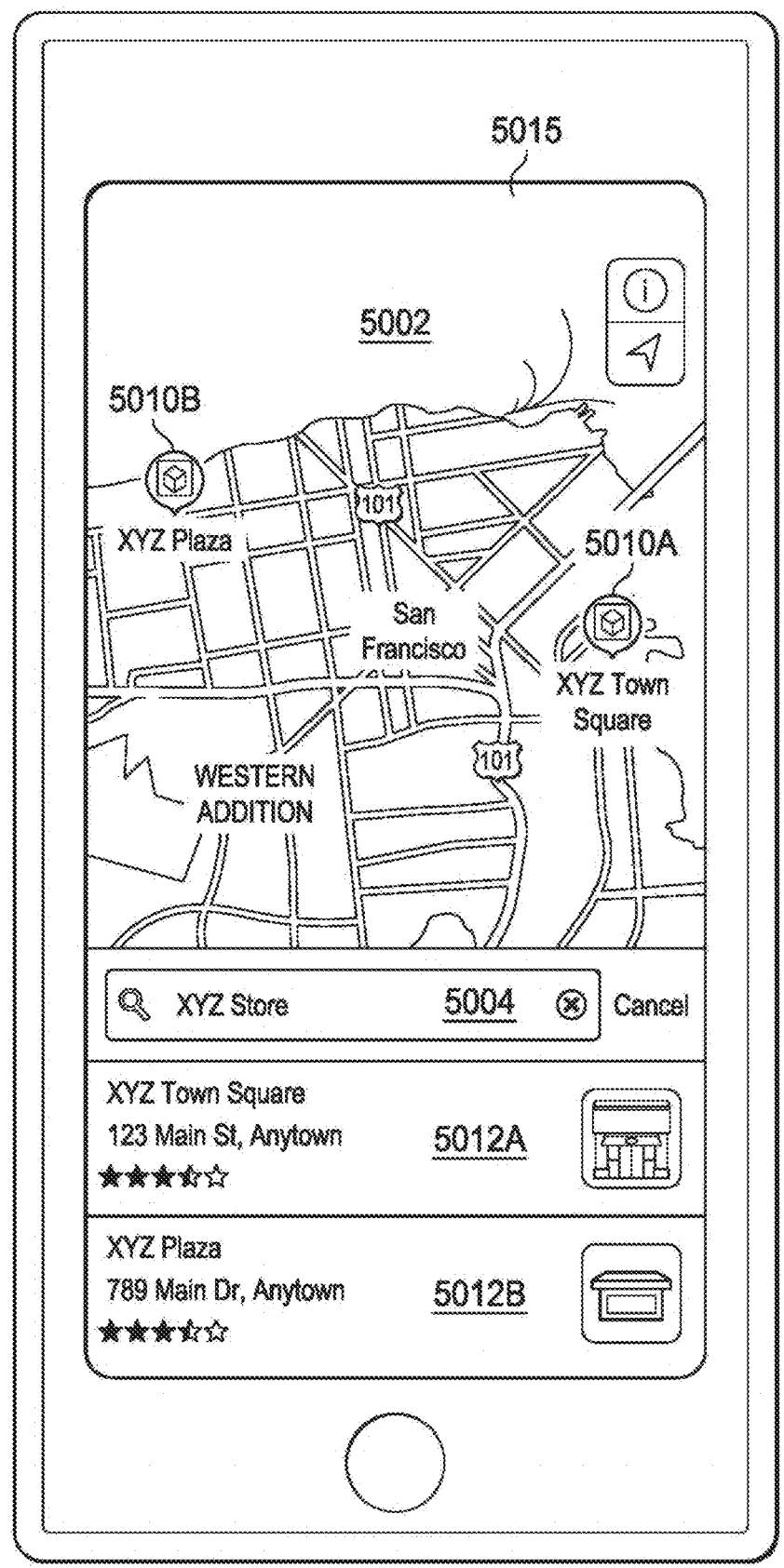

As described herein, the user may search for a business entity through different interfaces of a variety of applications. As shown in FIG. 6F, user interface 5002 is a user interface of a map application. A search affordance represented by search input area 5004 is displayed in user interface 5002. As shown in FIG. 6F, the user interacts with the search affordance by inputting "XYZ Store." The device, in response to detecting "XYZ Store" in search input area 5004, initiates a search for XYZ Store, receives two locations of XYZ Store, and indicates the two locations of XYZ Store on map 5015. Moreover, the device displays a first and a second brand identifier 5010A and 5010B of XYZ on map 5015 to identify the positions of the two stores on map 5015. In some embodiments, the user's respective location is also displayed on map 5015.

In some embodiments, the device displays a business profile affordance or a messaging affordance to identify the location of the business entity. In one of such embodiments, the device indicates the locations of XYZ Town Square and XYZ Plaza with a first messaging affordance and a second messaging affordance, respectively. The user initiates a messaging session with a representative of XYZ Town Square or a representative of XYZ Plaza by interacting with the first messaging affordance or the second messaging profile affordance at locations on map 5015 proximate to the locations of XYZ Town Square and XYZ Plaza. In another embodiment, the device indicates the locations of XYZ Town Square and XYZ Plaza with a first business profile affordance and a second business profile affordance, respectively. The user interacts with the first business profile affordance to obtain additional information about XYZ Town Square or interacts with the second business profile affordance to obtain additional information about XYZ Plaza. In one of such embodiments, the message affordance or the business profile affordance includes an identifier associated with the business entity (such as a brand identifier). For example, the device is operable to determine a logo of XYZ and generate a message affordance or business profile affordance having the logo as the visual representation of the message affordance or the business profile affordance. The device then indicates the location of XYZ Town Square and XYZ Plaza with the logo. The user has an option to interact with the logo to initiate a messaging session or to access the business profile user interface. In the foregoing embodiments, each of the messaging affordances and business profile affordances provides the user with multiple benefits.

Figure 6G:
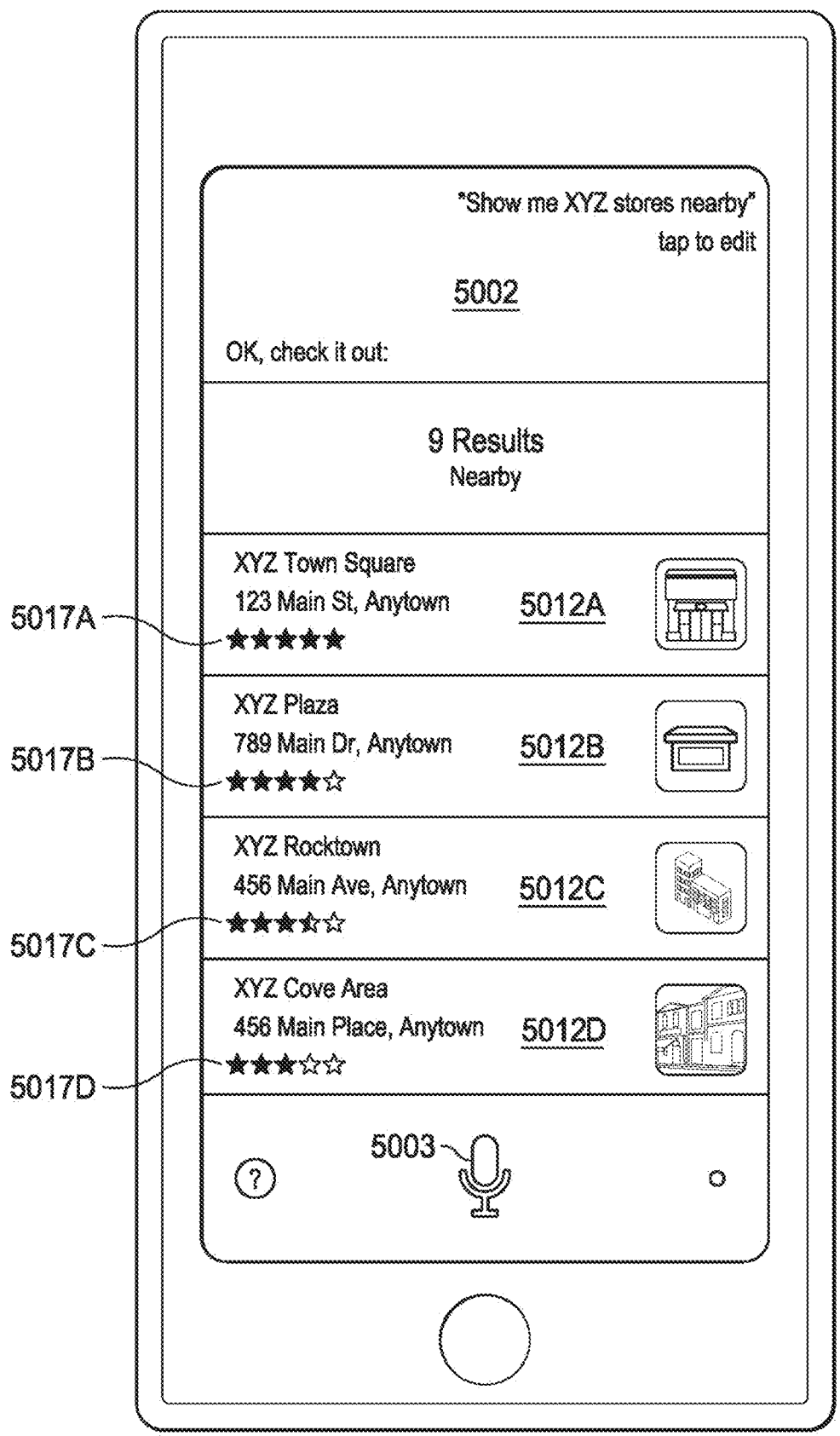

The user interface of FIG. 6G is a user interface of a voice command search application. A search affordance 5003 represented by an area around a microphone icon is displayed in user interface 5002. In the embodiment of FIG. 6G, the user interacts with the search affordance 5003 by selecting the microphone icon. The device detects the user's interaction with the microphone icon and listens for a voice command of the user. As shown in FIG. 6G, the device receives a voice command to display XYZ stores nearby the location of the device. The device, upon receipt of the voice command from the user, analyzes the voice command and initiates a search for XYZ stores within a proximity of the device. The device, upon receipt of a search result, displays four nearby locations of XYZ. The device also determines each location's rating 5017A-5017D and arranges the locations based on their respective rating 5017A-5017D. As shown in FIG. 6G, the device displays the ratings 5017A-5017D of the four locations of XYZ. The user interacts with any of the four business profile affordances 5012A-5012D to obtain additional information about a corresponding location of XYZ.

In some embodiments, such as FIGS. 6F and 6G, messaging affordance 5006 is not displayed with the user's initial search. In such embodiments, the user interacts with business profile affordance 5012, which is displayed with the search result to obtain access to a messaging affordance. More particularly, the device, in response to detecting an interaction to select a business profile affordance, provides a business profile user interface for display on the display of the device, where the business profile user interface includes a messaging affordance. Additional descriptions and illustrations of various business profile user interfaces are described below and are illustrated in at least FIGS. 6H-6L.

Figure 6H:
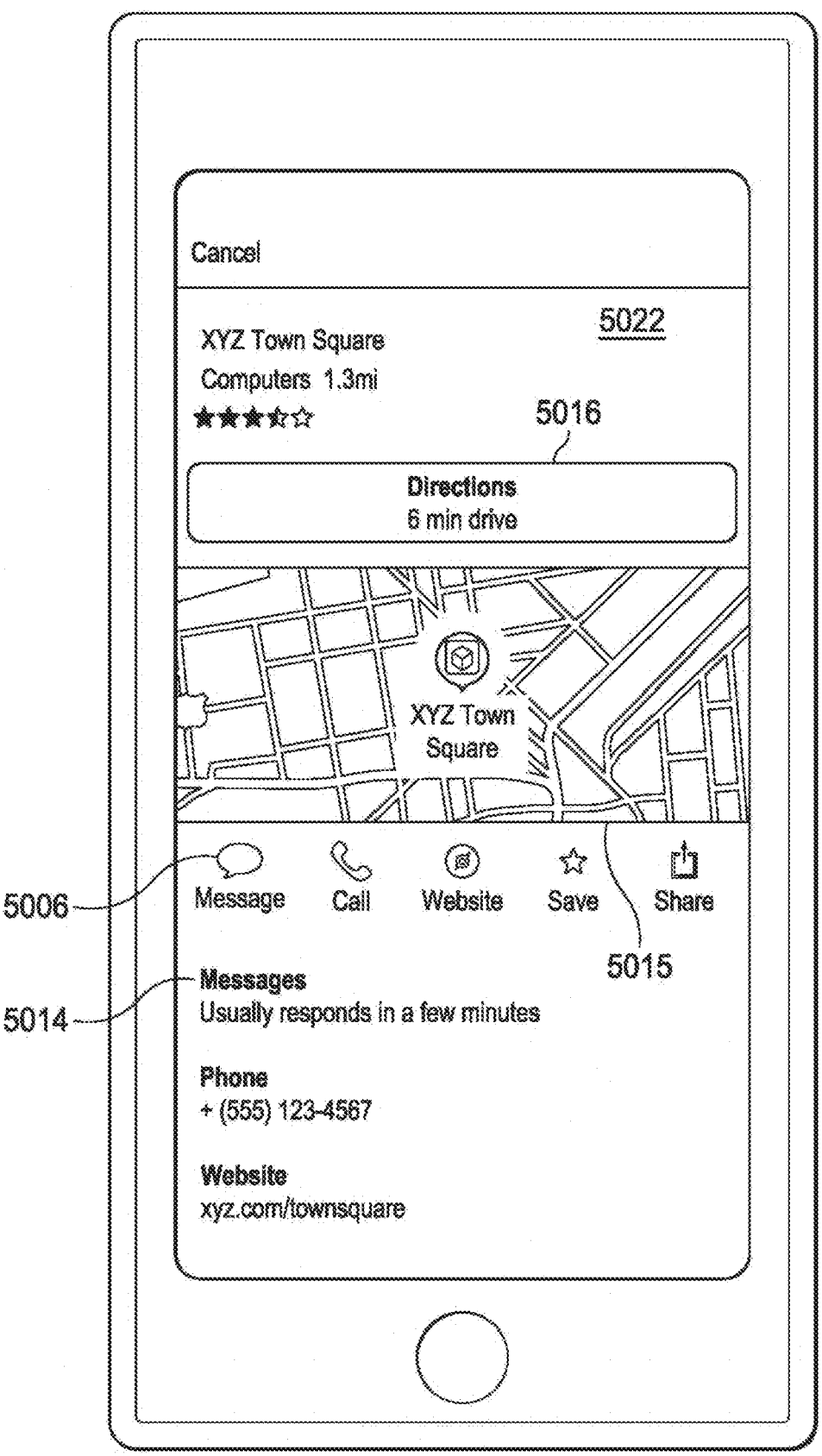

As shown in FIG. 6H, a business profile user interface 5022 is displayed in response to a user interaction with a message profile affordance, such as any of the message profile affordances of FIGS. 6A-6G. In the depicted embodiment, business profile user interface 5022 includes messaging affordance 5006 and response time notification 5014. Business profile user interface 5022 also includes additional information about the business entity that is not displayed along with the initial search result. As shown in FIG. 6H, map 5015 of a geographic area around XYZ Town Square is displayed in business profile user interface 5022.

A directions affordance 5016 is also provided in business profile user interface 5022. As defined herein, a directions affordance of a business entity is an affordance that the user interacts with to obtain directions to the business entity. In the illustrated embodiment, the user interacts with directions affordance 5016 to obtain directions to XYZ Town Square. As shown in FIG. 6H, a call affordance, a website affordance, a save affordance, and a share affordance are also displayed in business profile user interface 5022. The user interacts with any of these affordances to interact with XYZ. For example, the user has an option to interact with call affordance to initiate a telephonic session with a representative of XYZ, interact with the website affordance to access XYZ's website, interact with the save affordance to save XYZ's profile as new contact, or interact with the share affordance to share XYZ's profile with another user. Additional affordances are displayed in the business profile user interface 5022 to provide the user with additional options to interact with XYZ.

Figure 6I:
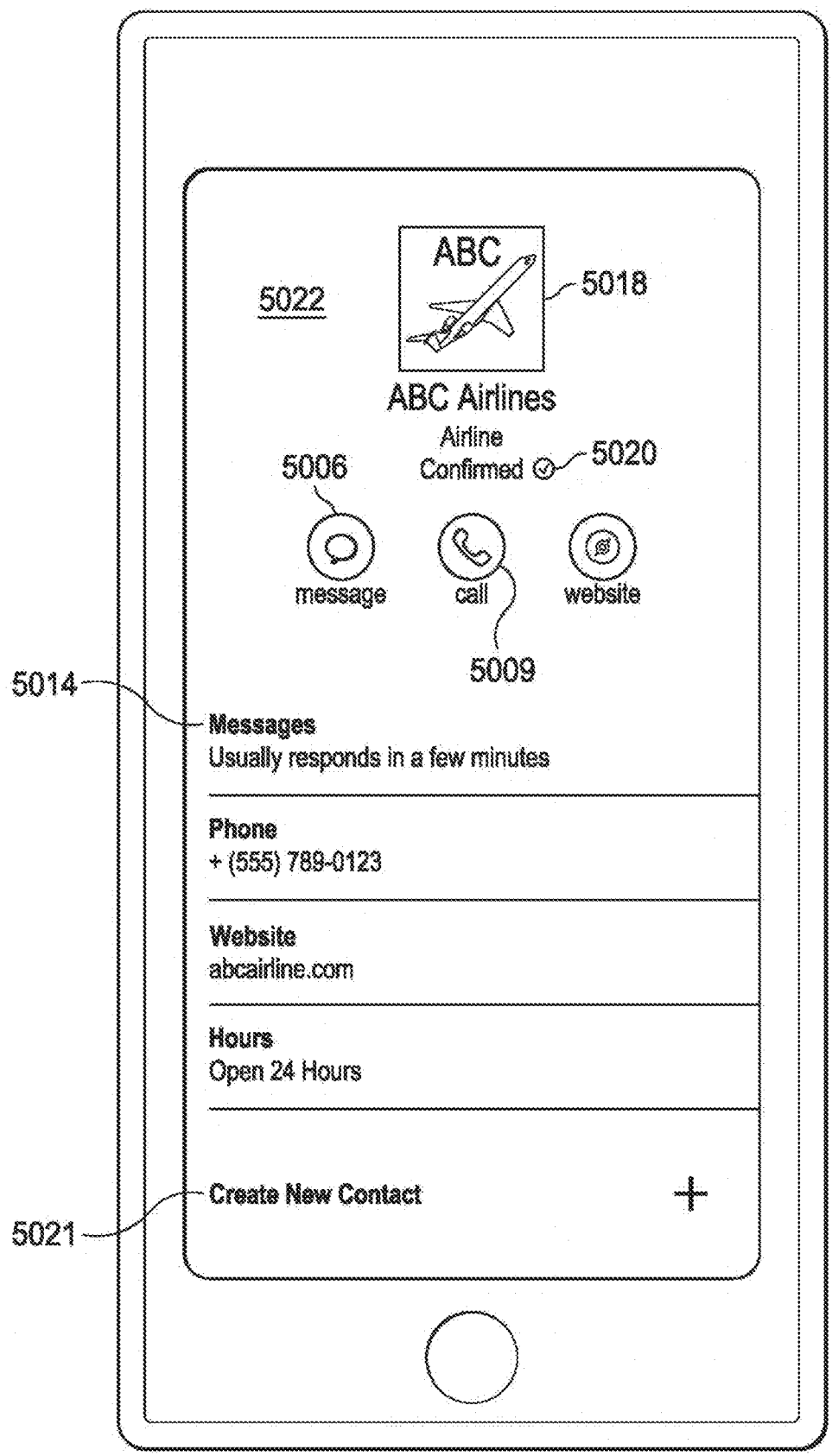

FIG. 6I illustrates another example of business profile user interface 5022. As shown in FIG. 6I, business profile user interface 5022 of ABC Airlines described in FIG. 6C is displayed. The business profile user interface 5022 contains additional information about ABC Airlines that is not displayed in the initial search result. For example, in addition to messaging affordance 5006 and the call affordance 5009, business profile user interface 5022 of ABC Airlines also includes a business avatar 5018 that is associated with ABC Airlines. The business avatar 5018 may be any text or graphical illustration representing or otherwise associated with the Airline. In some embodiments, the business avatar 5018 is a logo of ABC Airlines. In other embodiments, the business avatar 5018 is a trademark of ABC Airlines. In further embodiments, the business avatar 5018 is a profile image of ABC Airlines. Additional descriptions and illustrations of different avatars are provided in the paragraphs below.

Message response time notification 5014, which provides a response time to an initial message from the user, is also displayed in business profile user interface 5022. The response time allows the user to gauge the length of the wait time before engaging in a messaging session with ABC Airlines. Further, additional contact information including a phone number of ABC Airlines and a URL of a website of ABC Airlines are also displayed in business profile user interface 5022. The user may interact with any of the foregoing affordances to interact with ABC Airlines. Business profile user interface 5022 also includes a verification identifier 5020 confirming a verification status of the Airline. As defined herein, a verification identifier may include any text, graphical item, or other content that is indicative of whether a contact identifier has been properly authenticated as belonging to a particular company. Alternatively or additionally, the verification identifier is also indicative of whether the company itself has been verified as meeting particular standards or minimum requirements. Such standards or requirements may be standards or requirements related to identification, reputation, legal status, industry certification, or other criteria specified by a manufacturer of the device, a search engine, a vendor of the software application on which the verification identifier is generated, a government body, an industry organization, a consumer rights organization, or any other entity responsible for promulgating standards or requirements or monitoring compliance therewith. As such, a verification identifier provides an indication that is easily visible to the user to help the user determine the trustworthiness of a company. FIG. 6I illustrates the verification identifier as a checkmark accompanied by the word "Confirmed."

As shown in FIG. 6I, a "Create New Contact" affordance 5021 is also displayed in business profile user interface 5022. Create New Contact affordance 5021 is an affordance the user interacts with to save ABC Airlines as a contact of the user. In some embodiments, the user accesses ABC Airline's business profile user interface by searching through the user's contact list. In some embodiments, the business profile user interface 5022 is dynamically customized based on the location of the device. For example, if the device is moved to a location proximate to a physical location of ABC Airlines, a maps affordance would be displayed in the business profile user interface of ABC Airlines.

Figure 6J:
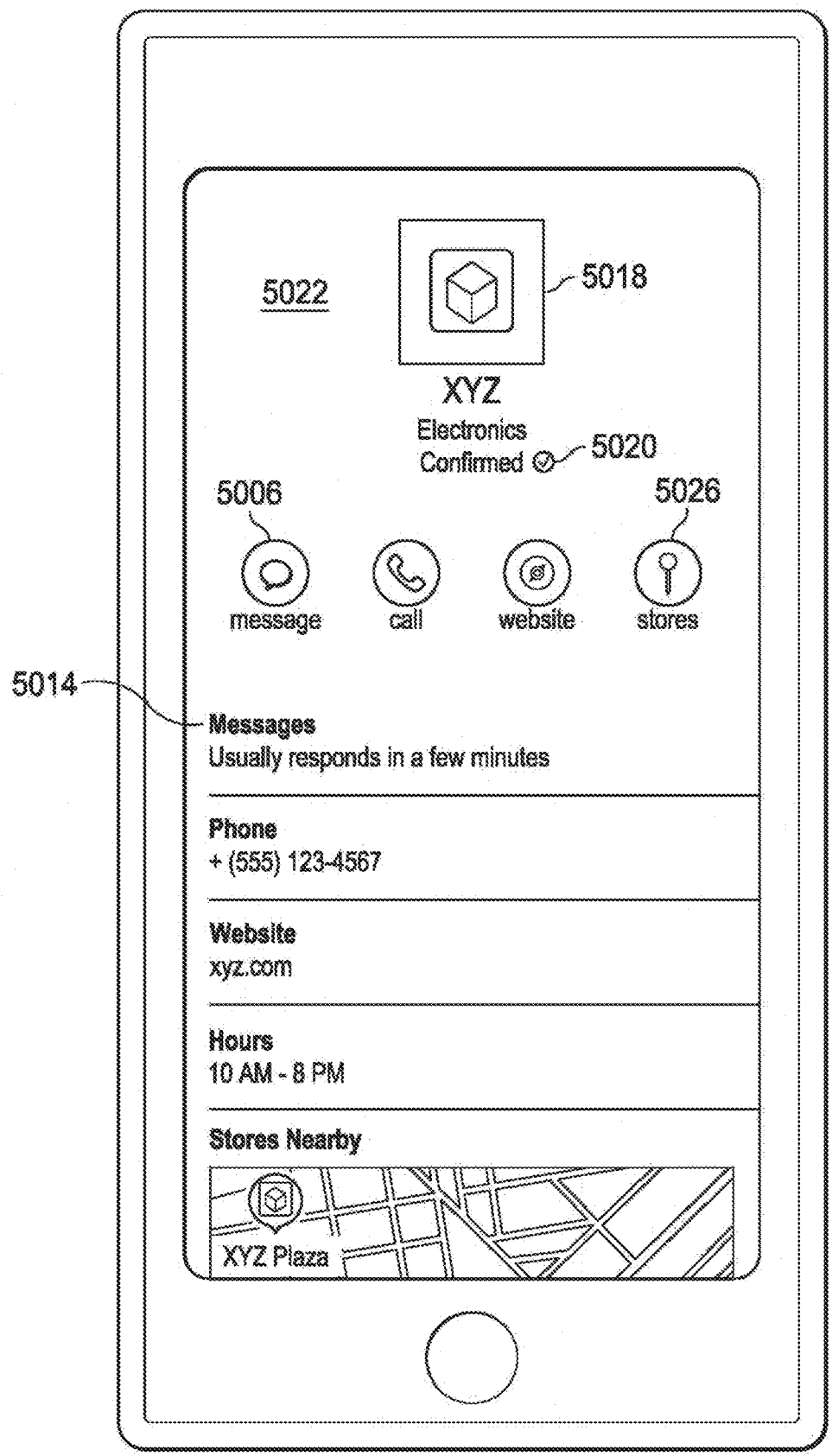

FIG. 6J illustrates another business profile user interface 5022. As shown in FIG. 6J, messaging affordance 5006, message response time notification 5014, business avatar 5018, and verification identifier 5020 are displayed in business profile user interface 5022. A stores affordance 5026 is also displayed in business profile user interface 5022. The user may interact with the stores affordance 5026 to obtain additional information about one or more locations of XYZ in a geographic proximity of the device. In some embodiments, the device, in response to determining a user interaction with stores affordance 5026, generates another business profile user interface having a list of locations of the business entity in geographic proximity to the device. In further embodiments, the device, in response to determining a user interaction with stores affordance 5026, generates a business profile user interface to display information related to a single location of the business entity that is located in a geographic proximity to the device.

Figure 6K:
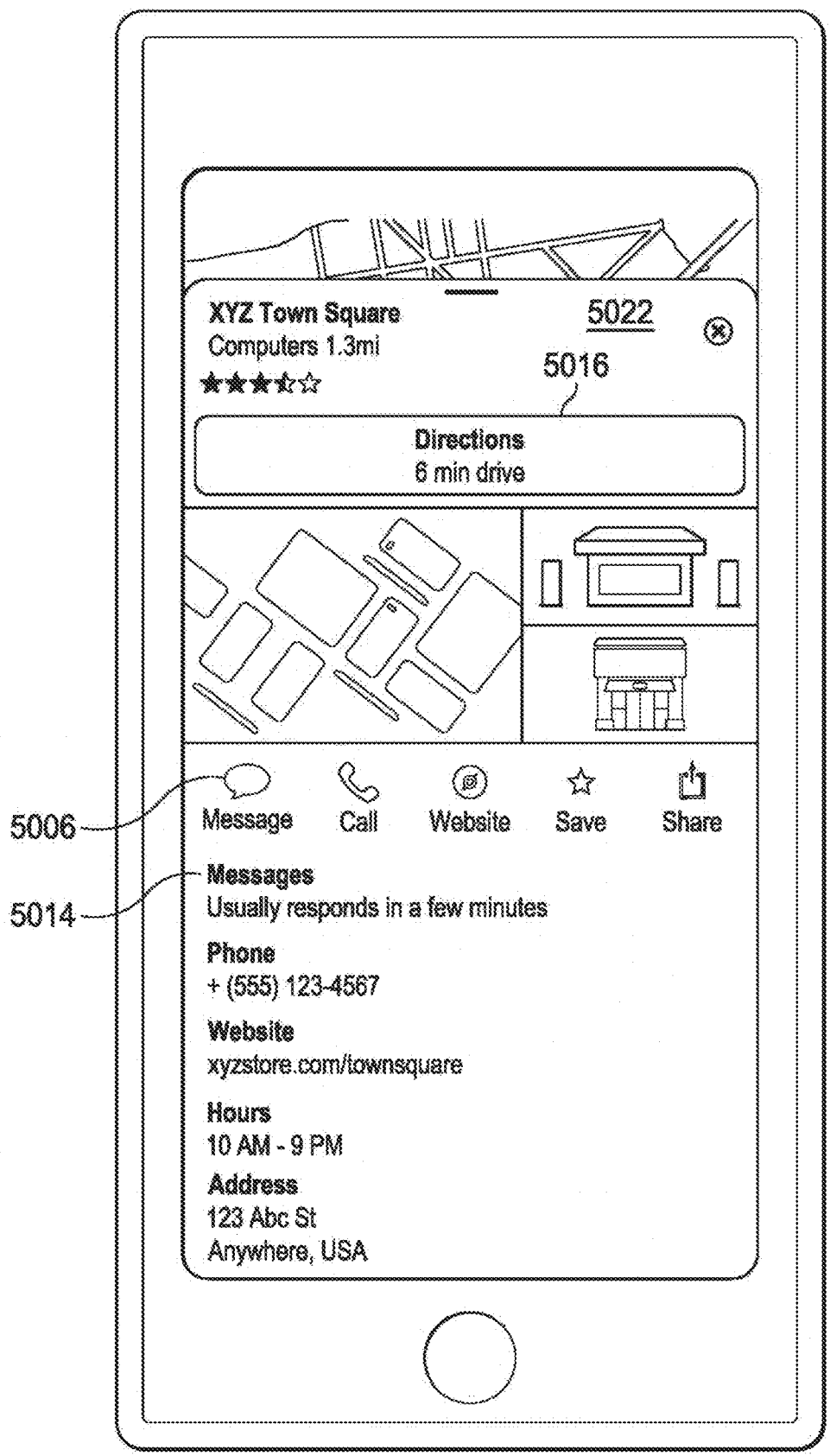

FIG. 6K illustrates another example of business profile user interface 5022. In some embodiments, the device generates business profile user interface 5022 in response to detecting a user interaction to select a user profile affordance displayed in an interface of a map application, such as the map application of FIG. 6F. As shown in FIG. 6K, business profile user interface 5022 overlays a portion of an interface of the map application. In some embodiments, the user adjusts the amount of overlay to simultaneously access the map application and business profile user interface 5022 of FIG. 6K. As shown in FIG. 6K, messaging affordance 5006, message response time notification 5014, and directions affordance 5016 are displayed in business profile user interface 5022. Moreover, contact information such as the telephone number, website, hours of operation, and address are displayed in business profile user interface 5022. Additional affordances, such as the call affordance, the website affordance, the save affordance, and the share affordance, are also displayed in the business profile user interface to provide the user with additional information about XYZ.

Figure 6L:
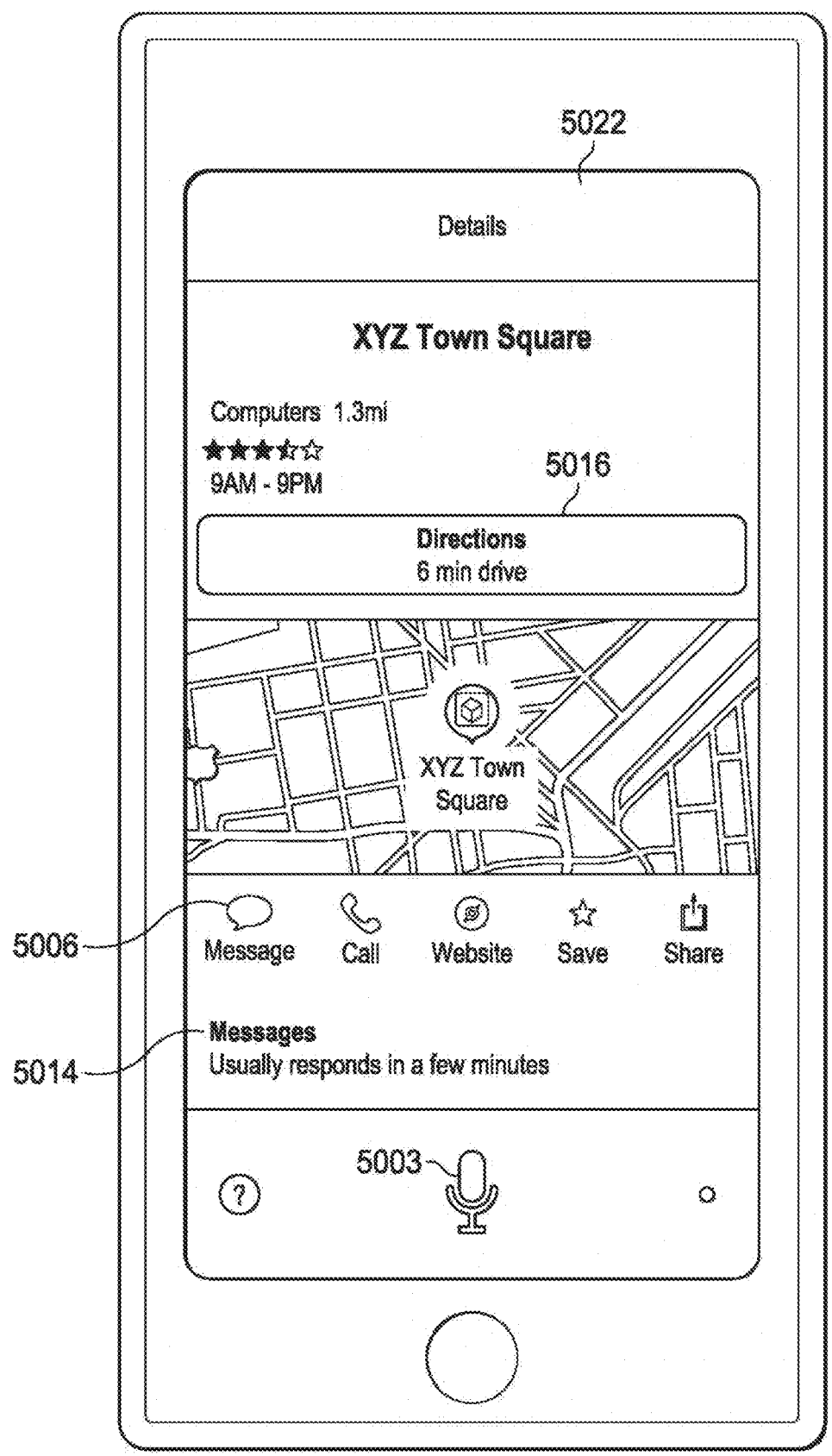

FIG. 6L illustrates a further example of business profile user interface 5022. In some embodiments, the device generates business profile user interface 5022 in response to detecting a user interaction to select a user profile affordance displayed in an interface of a voice command search application, such as the interface illustrated in FIG. 6G. As shown in FIG. 6L, messaging affordance 5006, message response time notification 5014, and directions affordance 5016 are displayed in business profile user interface 5022. In some embodiments, the user interacts with each of the foregoing affordances by selecting search affordance 5003.

Each of the foregoing FIGS. 6A-6L provides the user with direct or indirect access to messaging affordance 5006. The device, upon detecting an interaction with messaging affordance 5006, initiates the messaging session through a messaging user interface. As defined herein, the messaging user interface is a user interface to transmit messages in a message session. The device is operable to initiate, perform, or complete a variety of tasks described herein through the messaging user interface. Additional descriptions of the messaging user interface are provided in the paragraphs below.

Figure 6M:
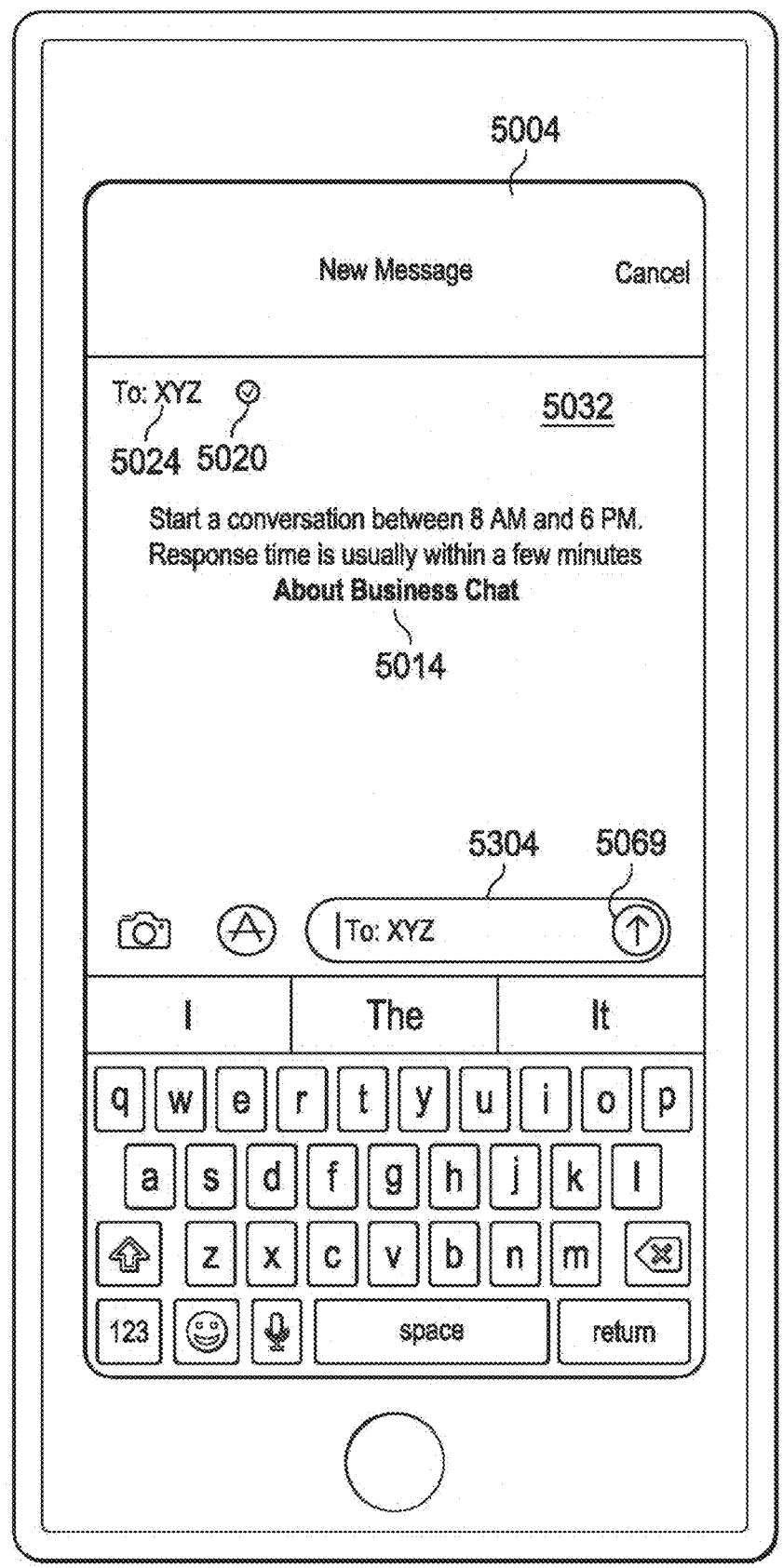
Figure 7B:
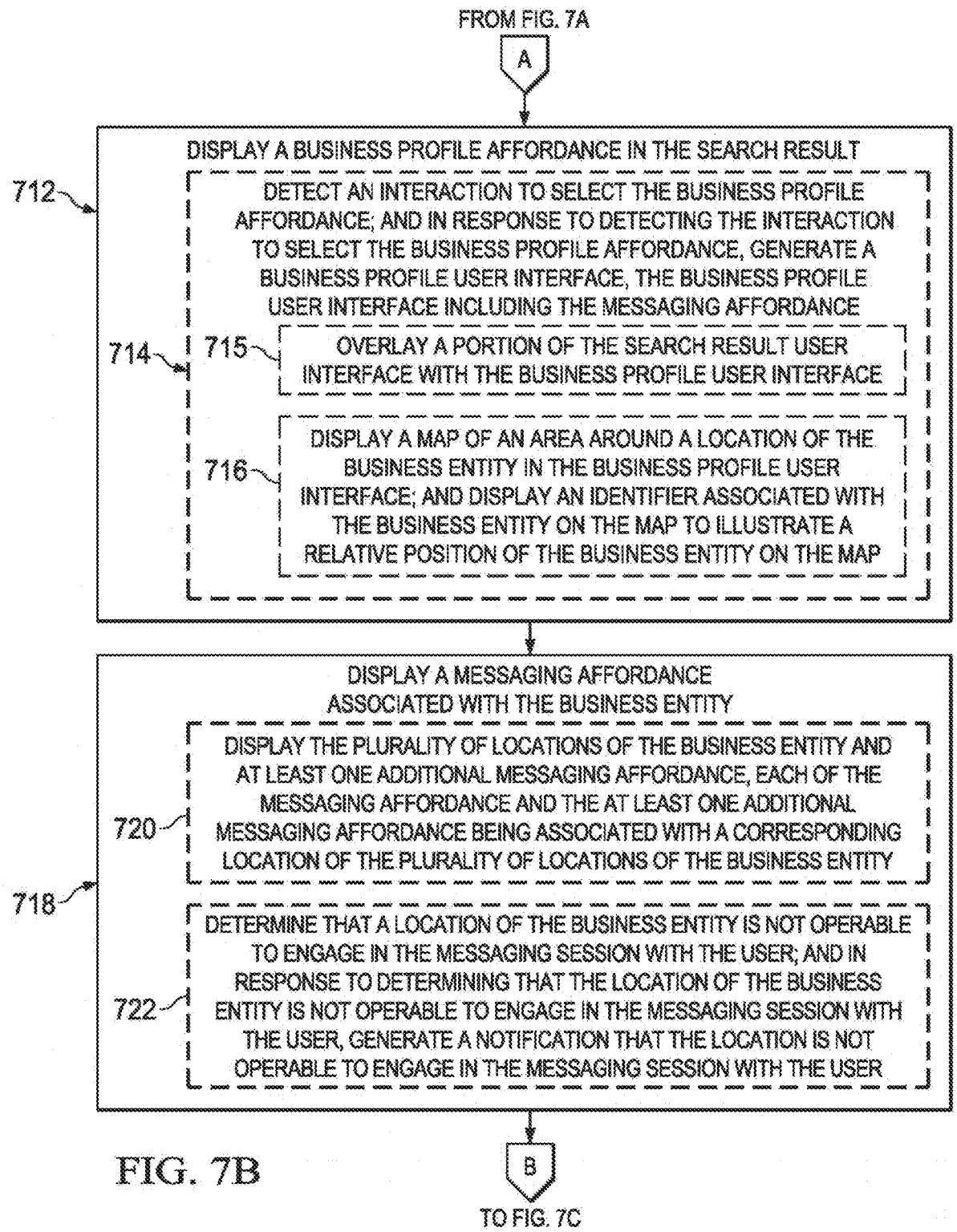
Figure 7D:
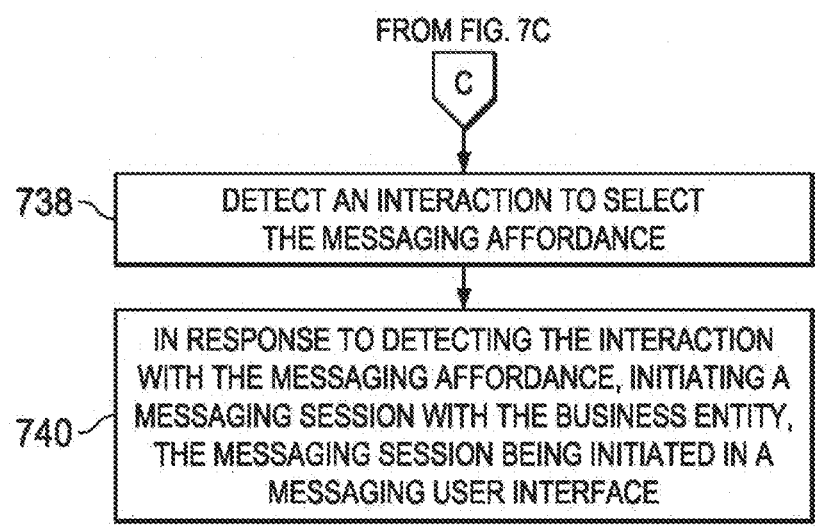

FIG. 6M is an illustration of an example of a messaging user interface. As shown in FIG. 6M, an identity 5024 of the recipient of the user's message together with verification identifier 5020 of XYZ are displayed in a "To" field to provide the user with an indication of the intended recipient of message. Further, message response time notification 5014 is also displayed in the messaging user interface to provide the user with an estimate of the approximate response time from the initial message. The messaging user interface may also display the hours of operation of XYZ and any other suitable information that assists the user to determine whether the user should continue to engage in the messaging session with XYZ.

In the illustrated embodiment, the user enters one or more messages into message input area 5304 and subsequently interacts with a send affordance 5069 to transmit the message to the business entity. As defined herein, send affordance 5069 is an affordance that the user interacts with to transmit a message to the business entity. In the depicted embodiment, the send affordance is represented by "↑". The device, in response to detecting the interaction, displays the message in a message region and transmits the message to XYZ. A message region is a portion of a messaging user interface surrounding the location where a message that is sent or received is displayed. A message region may be an enclosed portion of the messaging user interface surrounded by a border or may not be enclosed or have a border. For example, in one embodiment, a message region is enclosed by a graphic of a conversation bubble surrounding a message. In another embodiment, a message region is the background of a messaging user interface displayed behind a message.

FIGS. 7A-7D are flow diagrams illustrating a method 700 for initiating a messaging session with a business entity using, for example, the user interfaces of FIGS. 6A-6M. As described in reference to FIGS. 6A-6M, method 700 can be utilized to initiate a messaging session used by a business entity to perform customer service capabilities. Method 700 is performed at a device, (e.g., device 100, 300, 500). In one of such embodiments, the display is a touch screen display and the touch sensitive surface is on or integrated with the display. In some embodiments, the display is separate from the touch sensitive surface. In other embodiments, the processes described herein may be implemented with devices having physical user-interfaces, voice interfaces, or other suitable interfaces. Some operations in the method 700 are, optionally, combined. Additionally, the order of some operations is, optionally, changed.

As shown in FIG. 7A, the device, at block 702, displays a search affordance, such as search input area 5004 of FIG. 6A, on a display of the device. At block 704, the device detects an interaction with the search affordance. In some embodiments, where the search affordance is a search input area, the device detects the text of a partial name of the business or the text of the entire name of the business entity. In other embodiments, where the search affordance is a graphical/interactive item, the device is operable to detect a user interaction with the graphical/interactive item. In one of such embodiments, the interaction with the graphical/interactive content item includes a tap, a swipe, a deep touch or a voice command to select the button. In further embodiments, where the search affordance is associated with a voice command to initiate the search, the device, at block 706, detects a voice command to perform the search, and in response to detecting the voice command, analyzes the voice command to determine whether the voice command includes an instruction to perform the search of the business entity.

At block 708, the device, in response to detecting an interaction with the search affordance, initiates a search. In some embodiments, the device transmits instructions to a remote search engine to perform the search. In other embodiments, the device performs a search locally on a storage medium that is local to the device. In further embodiments, the device is connected to a local area network and initiates the search by requesting another device communicatively connected to the device via the local area network to perform the search. In one embodiment, more than one of the foregoing searches is conducted in combination.

At block 710, the device receives a search result in response to the initiated search, where the search result includes a business entity determined in response to the search. FIGS. 6A-6G illustrate several examples of displaying search results in different user interfaces. In some embodiments, the search result includes not only the business entity but additional information about the business entity, such as a location of the business entity, a rating of the business entity, an address of the business entity, hours of operation of the business entity, as well as other information relevant to the business entity. In some embodiments, the business entity has multiple locations within a proximity of the device. In such embodiments, the device, at block 711, receives information about one or more of the locations are also received and provided for display in the user interface.

In some embodiments, the search result not only includes the business entity determined in response to the search, but also includes suggestions of similar business entities that are related to the business entity determined in response to the search. For example, if the search is for XYZ, where XYZ is an electronics company, the search results also include ABC Company, where ABC Company is also an electronics company. For partial searches, or searches based on a part of a text, the search result includes not only the business entity having the exact name as the text inputted but also similarly spelled business entities. Continuing with the foregoing example, if the search includes a result for XYZ, the search result also includes a result for a company that has a similar name to the name of XYZ, such as a company named XYZT.

The search result is displayed in a user interface. FIGS. 6A-6G illustrate several examples of user interfaces in which the search result may be displayed. In one example, the user interface displaying the search result is a browser based user interface. In another example, such user interface is a map based user interface, such as the user interface illustrated in FIG. 6F. In a further example, the user interface displaying the search result is the user interface of a voice command based search application, such as the voice command search application illustrated in FIG. 6G.

The method optionally proceeds to block 712. In some embodiments, a business profile affordance is displayed in the search results, together with the business entity and information about the business. In one of such embodiments, the device, at block 714, detects an interaction from the user to select the business profile affordance. In response to detecting the interaction to select the business profile affordance, the device generates and displays a business profile user interface on the device. FIGS. 6H-6L illustrate several examples of business profile user interfaces. In some embodiments, the business profile user interface includes additional information about the business entity, such as the address of the business entity, a map of the business entity, contact information about the business entity, hours of operation of the business entity, a website of the business entity, as well as other information related to the business entity. In the embodiment depicted in FIG. 6H, the user can further interact with the business entity using the call affordance, the website affordance, the save affordance, or the share affordance.

In some embodiments, the device, at block 715, overlays a portion of the search result with the business profile user interface. As shown in FIG. 6K, business profile user interface 5022 overlays a portion of the maps user interface. At block 716, the device displays a map of an area around the location of the business entity in the search results. In one of such embodiments, the device determines an identifier that is associated with the business entity, determines a relative position of the business entity on the map, and displays the identifier on the map to illustrate the relative position of the business entity on the map. For example, if a result of a search for XYZ is displayed in the search result, then the logo of XYZ is pinpointed at a location proximate to the actual location of XYZ to illustrate the location of XYZ on the map.

At block 718, a messaging affordance that is associated with the business entity is displayed. In some embodiments, such as the embodiments depicted in FIGS. 6A-6E, the messaging affordance associated with the business entity is displayed directly as a result of the search. Additional details relevant to the company described herein are optionally displayed as part of the search result in the user interface together with the messaging affordance. In other embodiments, the messaging affordance is not displayed in the search result. Instead, the search result includes a business profile affordance. The device, in response to detecting an interaction with the business profile affordance, generates a business profile user interface and displays the messaging affordance in the business profile user interface.

In some embodiments, the business entity has multiple locations in geographic proximity to the device. In such embodiments, the method proceeds to block 720, and the device displays the locations of the business entity in the user interface. As shown in FIG. 6D, for example, three locations of the respective business entity are displayed. In one of such embodiments, the device, at block 720, displays at least one additional messaging affordance, which is associated with a corresponding location of the multiple locations of the business entity. For example, a retail store front of the business entity (first location), a product repair center of the business entity (second location), and a product return facility of the business entity (third location) are displayed in the search result, together with three different messaging affordances. The user interacts with one of the three different messaging affordances to initiate a messaging session with the respective location of the business entity.

In the above example, the user may interact with a first messaging affordance to initiate a messaging session with a representative associated with the retail store front of the business entity. Alternatively, the user may interact with the second messaging affordance to initiate a messaging session with a representative associated with the product repair center of the business entity. Finally, the user may interact with the third messaging affordance to initiate a messaging session with a representative associated with the product return center of the business entity. In one of such embodiments, a representative is associated with a location of the business entity if the representative has authority to represent the location of the business entity during a messaging session with the user. In one embodiment, the representative is associated with a particular location of the business entity regardless of the physical location of the representative. In another embodiment, three different representatives located at a call center remote to all three locations are each associated with a different location of the three locations.

The method optionally proceeds to block 722 if the device determines that a location of the business entity is not able to engage in a messaging session with the user. In such embodiment, the device is operable to generate and display a notification that the location is not able to engage in the messaging session with the user. For example, as shown in FIG. 6E, message response time notification 5014C includes a notification that Cellular at 456 Town Blvd does not have messaging capabilities.

In some embodiments, the device, at block 724, determines a response time of the business entity and displays the response time in a user interface. For example, several different notifications of messaging response time are provided in the business profile user interfaces shown in FIGS. 6H-6L. In some embodiments, where multiple locations are displayed on the user interface, the method proceeds to block 726, and the device determines a response time for each location. In response to determining the respective response time of each location of the multiple locations of the business entity, the device arranges each of the locations of the business entity. In one of such embodiments, the device also displays the respective response time of each of the locations of the business entity. For example, if three locations of the business entity are displayed in the user interface, and each location has a different response time to an initial message, then the location that has the quickest response time is displayed as the most relevant search result. As shown in FIG. 6E, Cellular at 456 Town Ctr has the shortest estimated response time and is displayed at the top of the search results. In one of such embodiments, the device, at block 728, periodically determines an updated response time of at least one of the locations of the business entity, rearranges the display of the locations of the business entities based on the updated response time, and displays the updated response time. As such, the user is able to obtain up-to-date response times for each of the locations and to choose one of the locations with which to best communicate accordingly.

In some embodiments, where multiple locations are displayed, the device also arranges the locations based on the respective rating of each location. For example, a location with the highest user rating is displayed first and a location with the lowest user based rating is displayed last, or is optionally hidden from the search result altogether. As such, the user has an option to initiate a messaging conversation with a representative at a location based on the rating of the location.

At block 738, the device detects an interaction to select a messaging affordance. As described herein, the interaction to select a messaging affordance, such as one of the messages affordances 5006 displayed in FIGS. 6A-6E or 6H-6L, includes a touch action, a swipe action, a deep touch action, a voice command action, as well as other actions described herein. At block 740, the device, in response to detecting the interaction with the messaging affordance, initiates a messaging session with the business entity in a messaging user interface.

It should be understood that the particular order in which the operations in FIGS. 7A-7D have been described is merely one example and is not intended to indicate that the described order is the only order in which the operations could be performed. One of ordinary skill in the art would recognize various ways to reorder the operations described herein. Additionally, details of the processes described below with respect to method 700 (e.g., FIGS. 7A-7D) are also applicable in an analogous manner to the methods described above. For example, method 700 optionally includes one or more of the characteristics of the various methods described above with reference to method 900. As an additional example, the business messaging user interface throughout method 1100 may be initiated by any of the methods included in method 700. For purposes of brevity, these details are not repeated below.

Certain embodiments of the user interfaces illustrated by FIGS. 6A-6M and processes illustrated by FIGS. 7A-7D allow a user to search for business entities that have established messaging platforms to conduct customer service capabilities using messaging sessions. Such embodiments significantly reduce the technical burden of more traditional customer service platforms such as voice platforms. For example, conducting a search that retrieves a messaging icon to directly initiate a customer service session with a business entity reduces the burden of looking for the correct customer service extension on multiple pages of a website. The result is a reduction of the search time required to contact customer service and in the cognitive burden experienced by the user, which in turn reduces the strain on network bandwidth and device battery life. Responding to customer service inquiries with a messaging platform rather than a voice platform extends those same benefits exponentially. Data communication in a messaging application uses significantly less bandwidth and power than voice communications for the same customer service inquiry, measurably extending the battery life of a user's device. The reduced strain on telecommunications network infrastructure is even more significant. Even outside of requiring significantly higher bandwidth, network quality of service (QoS) requirements are also higher for voice calls than they are for messaging sessions, resulting in a disproportionately higher network burden for voice calls than for messaging. When taken in aggregate and considering not only conversation time for customer service voice calls but also hold time and the time to navigate lengthy interactive voice response systems, replacing voice customer service platforms with messaging platforms alleviates strains on telecommunication networks and realizes energy savings throughout network infrastructures.

As disclosed in certain embodiments of the present invention, the use of a business messaging user interface allows a user of a device to conduct messaging sessions with a business entity in a manner that traditional personal messaging interfaces do not allow. For example, a business messaging user interface includes various forms of business indicia generated by a device that are intended to reduce potential fraud. When a user desires to message a particular business entity, a user can easily recognize that a telephone number, IP address, or other contact identifier belongs to such business entity by viewing a brand identifier associated with such business entity. When contacting such business entity, a user can easily confirm that the contact identifier they are messaging has been verified as an authorized contact identifier of such business by the display of a particular business indicia of such verification. Both the brand identifier and the business indicia of a verified status of a business entity may reduce instances of fraud, miscommunication, cyberattacks and identity theft, as well as serve as a warning when the contact identifier of business entities change, such as with the reassignment of telephone numbers. For example, if a customer of a business entity is instructed to message a particular telephone number to conduct a transaction with a business entity, by using a business messaging user interface, such customer may immediately recognize that the telephone number does not belong to a particular business entity or that the business entity has not been verified. Thus, just like encryption, user authentication, or account security, a business messaging user interface and various business indicia may be used as an important technical weapon in protecting users and their devices.

Additionally, in certain embodiments the use of a business messaging user interface includes various business indicia that are intended to improve the efficiency of communications between a user of a device and a business entity they are attempting to message. For example, in certain embodiments a message response time notification is included to notify a user of the business messaging user interface when they can expect to begin a messaging session with a business entity. Instead of spending a lengthy period of time on hold while waiting to begin a voice call with a representative of a business entity, the user may pick up their device, message the business entity, and be informed by the message response time notification when they can expect the session to begin. In the meantime, the user can be engaged on other tasks on their device or elsewhere. Importantly, in such embodiments, the use of a business messaging user interface of a device realizes a significant reduction in network bandwidth and battery consumption as compared to the use of the same device to accomplish the same communications with a business entity in a voice call, even in the time prior to when such communications actually begin.

FIGS. 8A-8I illustrate exemplary user interfaces for conducting messaging sessions with business entities, in accordance with some embodiments. The user interfaces in FIGS. 8A-8I are used to illustrate the processes described below, including the processes in FIG. 9. Although some of the examples that follow will be given with reference to inputs on a touch-screen display (where the touch-sensitive surface and the display are combined), in some embodiments, a device detects inputs on a touch-sensitive surface 451 that is separate from the display 450, as shown in FIG. 4B. In other embodiments, the interfaces described herein may be implemented with devices having physical user-interfaces, voice interfaces, or other suitable interfaces. For convenience of explanation, the embodiments described below will be discussed with reference to operations performed on a device with a touch-sensitive display system 112.

Figure 8A:
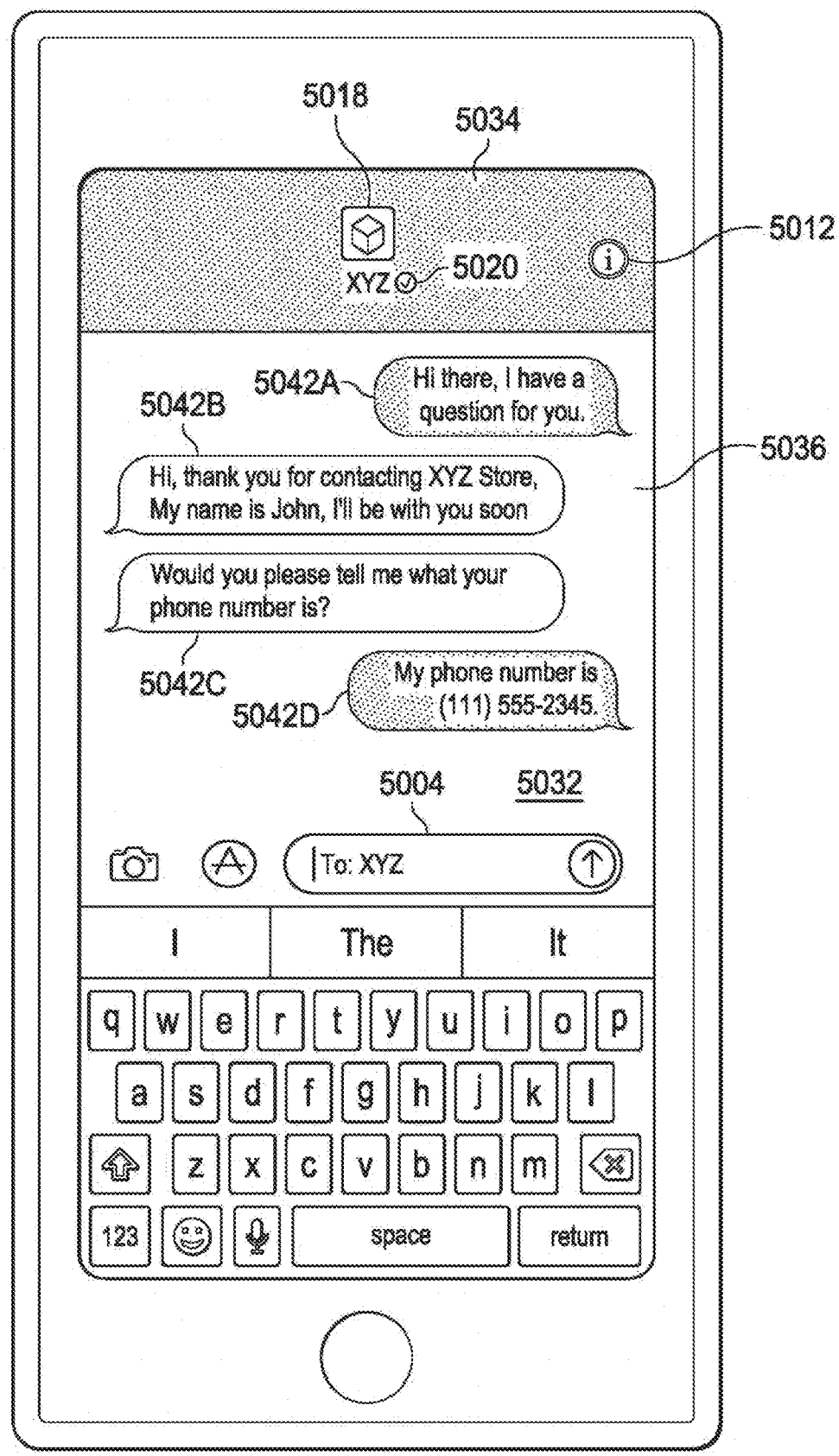
FIGS. 8A-8I illustrate example business messaging user interfaces in accordance with some embodiments.

FIG. 8A illustrates a business messaging user interface 5032 of a device. For purposes of this application, a business messaging user interface is a specialized messaging user interface designed to engage in a messaging session with a business entity, such as one of the business entities described herein. Business messaging user interface 5032 includes a business indicia and optionally includes additional customizations described herein. For purposes of this application, business indicia is any text, symbol, graphic, affordance, information, characteristic, feature, or functionality that is associated with the identification, messaging, or conduct of a task with business entities. Business indicia may be general and have application to all business entities or may be specific to a particular business entity, including, for examples, business indicia that are brand identifiers.

As previously described, FIG. 6M is an illustration of a messaging user interface that is generated in response to a user interaction with messaging affordance 5006. In such embodiment, the user transmits a message to the business entity by inputting the name of the business entity in the "To" field, inputting a message into a message input field, and by interacting with the send affordance 5069. In some embodiments, the user's interaction with send affordance 5069 is an indication to communicate the message to a recipient listed in the "To" field. In such embodiments, the device, in response to receiving the indication to communicate the message, determines whether a contact identifier of the recipient is associated with a business entity or a non-business entity. As defined herein, a contact identifier is an identifier used to initiate a messaging session with a particular person, entity, or device. A contact identifier may be a telephone number, a short code, a network address, a user name, or any other identifier, route, or address that identifies or locates a path or destination of a message intended for a particular person, entity, network, or device. Further, as defined herein, a non-business entity includes any party that is not classified as a business entity.

In some embodiments, the device is operable to determine whether the user is seeking to contact a business entity or a non-business entity before the messaging user interface is generated by the device. In some embodiments, the user's interaction with a messaging affordance, such as one of the messaging affordances of FIGS. 6A-6E and 6H-6L, corresponds to an indication to communicate a message to a recipient. The device, in response to detecting the user's interaction with the messaging affordance, obtains a contact identifier of a party associated with the messaging affordance and determines if the party is a business entity. For example, the device, upon detecting a user interaction with messaging affordance 5006 of FIG. 6A, obtains a contact identifier associated with XYZ, and determines whether XYZ is a business entity.

In other embodiments, the device does not determine whether the user is seeking to contact a business entity or a non-business entity until after the messaging user interface is generated by the device. In such embodiments, the user's interactions with a messaging application (such as clicking the application, hovering over the application, inputting a voice command to run the application, as well as performing other interactions with the messaging application) correspond to an indication to communicate a message to a recipient. In such embodiments, the device determines whether a contact identifier of a recipient of a message the user seeks to send through the messaging application is a business entity based on the contact identifier of such recipient.

In still other embodiments, the user's interaction with a contact user interface, such as a digital directory, corresponds to an indication to communicate a message to a recipient. As defined herein, the contact user interface is a user interface that displays one or more of the user's contacts. In one of such embodiments, the device, in response to detecting a user interaction with a contact stored in the digital directory, determines whether the contact identifier of the contact is associated with a business entity.

The device, upon determining that the contact identifier is associated with a business entity, determines a business indicia associated with the business entity. In some embodiments, the business indicia of the business entity is represented by a trademark of the business entity, a logo of the business entity, a background color associated with the business entity, an avatar associated with the business, or any other suitable business indicia. The device then generates a business messaging user interface that includes the business indicia and displays the business messaging user interface on the user's display. As used herein, generating a business messaging user interface shall mean selecting a stored business messaging user interface over a stored personal messaging user interface, replacing a displayed personal messaging user interface with a business messaging user interface, modifying or customizing a personal messaging user interface to include business indicia or other characteristics of a business messaging user interface, creating a business messaging user interface in response to identifying a particular business entity using business indicia associated with the particular business entity and modular software components associated with business messaging user interfaces, or loading a particular business messaging business interface distributed by a particular business entity.

As shown in FIG. 8A, a header section 5034 of business messaging user interface 5032 is customized to include business indicia associated with XYZ. As defined herein, a header section is a section of a business messaging user interface that is not covered by any content transmitted between the user and the business entity during the business messaging session. As shown in FIG. 8A, business avatar 5018 of XYZ is displayed in the header section. In the depicted embodiment, business avatar 5018 is a square portrait of a cube. Verification identifier 5020 identifying that XYZ is a verified company is also displayed in header section 5034 of business messaging user interface 5032. In the depicted embodiment, verification identifier 5020 is identified by a checkmark. Business profile affordance 5012 is also displayed in header section 5034 of business messaging user interface 5032. In the depicted embodiment, business profile affordance 5012 is represented by an "i" within a circle. The background of header section 5034 has a color that is associated with XYZ (such as XYZ's company color). Optionally, additional business indicia, such as but not limited to, a trademark of XYZ, a logo of XYZ, an animation associated with a product or service of XYZ (such as an animation of an electronic device or an animation of a service performed on the electronic device), a profile picture of XYZ, an advertisement content associated with XYZ, and other suitable business indicia are also displayed in header section 5034 of business messaging user interface 5032.

In some embodiments, the business indicia are also displayed in a background of a body section 5036 of business messaging user interface 5032. As defined herein, a body section of business messaging user interface is a section where content communicated between the user and the business entity (such as the conversation transcript) are displayed. In one of such embodiments, the device is operable to generate a brand identifier, such as a trademark of XYZ, a logo of XYZ, an avatar of XYZ, a background color of XYZ, and other suitable brand identifiers in body section 5036 of business messaging user interface 5032. In another one of such embodiments, the device is operable to generate a business profile affordance and a verification identifier in the body section 5036 of business messaging user interface 5032. Moreover, the device is operable to customize body section 5036 of the business messaging user interface 5032 to display an animation associated with a product or service of XYZ, display an advertisement content associated with XYZ, and display other content associated with XYZ. In a case where the user is a first-time customer of XYZ, the previously described business indicia provide assurance that XYZ is a vetted company.

As shown in FIG. 8A, there are four message regions displayed in a conversation transcript between the user and XYZ. The conversation transcript is a transcript of messages sent between the user and a representative of a business entity, such as XYZ. In some embodiments, the conversation transcript includes messages transmitted between the user and the representative of the business entity during a messaging session. In other embodiments, the conversation transcript includes messages transmitted during a previous messaging session with a representative of the business entity.

In the depicted embodiment, the conversation transcript includes a first user message region 5042A and a fourth user message region 5042D, each containing a message from the user to XYZ. Further, the conversation transcript also includes a second message region 5042B and a third message region 5042C in between first and fourth message regions 5042A and 5042D. In some embodiments, the characteristics of one or more messages in the conversation transcript of a business messaging user interface are customized to vary from corresponding characteristics of messages in a conversation transcript of a non-business messaging user interface (such as a personal messaging user interface). For example, as shown in FIG. 8A, the color of first and fourth message regions 5042A and 5042D are different from the color of second and third message regions 5042B and 5042C. More particularly, the colors of first and fourth message regions 5042A and 5042D are greyed out. In one embodiment, the device, upon determining that XYZ is a verified business entity, customizes the color of message regions of messages from the user while maintaining the default color of message regions of messages from the business entity.

In another embodiment, the device, upon determining that XYZ is a verified business entity, adds an impact effect to new messages when the new messages are first displayed in the conversation transcript. As defined herein, an impact effect is an effect applied to an individual message region ("regions effect") or applied across the conversation transcript when a message is initially displayed ("full screen effect"). Examples of regions effect include temporarily adjusting the font size of a new message, temporarily adjusting the color of a message region of the new message, temporarily adjusting the dimensions of the message region of the new message, temporarily hiding the content of the new message, as well as other effects that are applied to the new message or the new message region of the new message. Moreover, examples of full screen effect include sending balloons, setting off fireworks, displaying confetti, displaying a brand identifier of the business entity, displaying an animation of the business entity, as well as other effects that are applied across the conversation transcript when the new message is displayed.

In another embodiment, the device provides the user with a selection of regions effects for display in the business messaging user interface. As defined herein, a regions effect affordance is an affordance that the user interacts with to apply a regions effect to a message region of the conversation transcript. Moreover, the device, upon detecting a user interaction with a regions effect affordance, applies a regions effect associated with the regions effect affordance to a message region of the conversation transcript. In another embodiment, the device provides the user with a selection of full screen effects for display in the business messaging user interface. As defined herein, a full screen effect affordance is an affordance that the user interacts with to apply a full screen effect to a message region of the conversation transcript or across the conversation transcript. Moreover, the device, upon detecting a user interaction with a full screen effect affordance, applies a full screen effect associated with the full screen effect affordance to the message region or to the conversation transcript. In further embodiments, the device, upon determining that XYZ is a verified business entity, adjusts the shapes of message regions containing messages from the business entity. In one embodiment, the device adjusts message regions of messages transmitted from XYZ to have a shape similar to a product of XYZ (such as the shape of a smartphone). In another embodiment, the device customizes the shape of second and third message regions 5042B and 5042C to appear like a logo of XYZ.

Figure 8B:
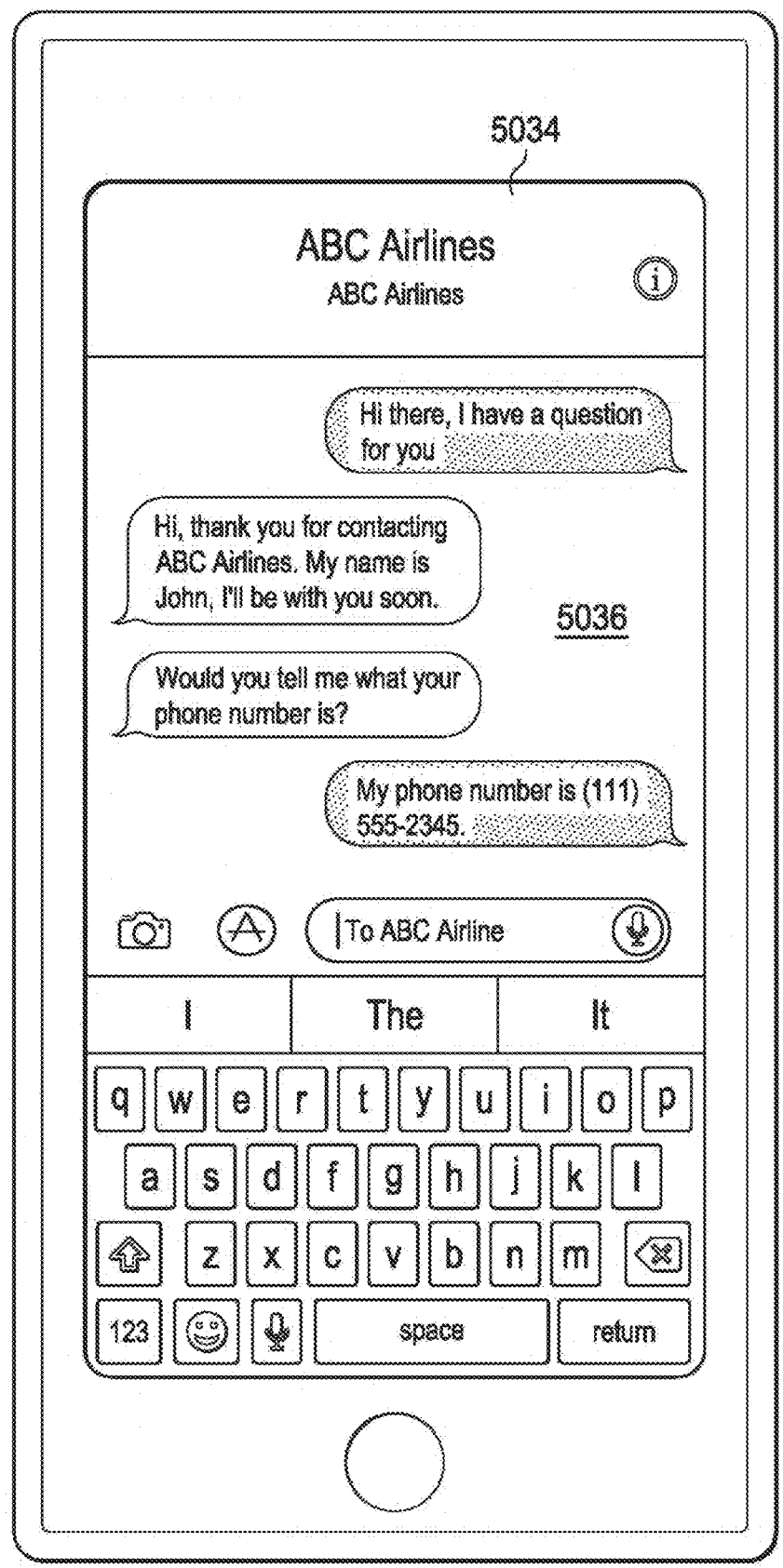
Figure 8C:
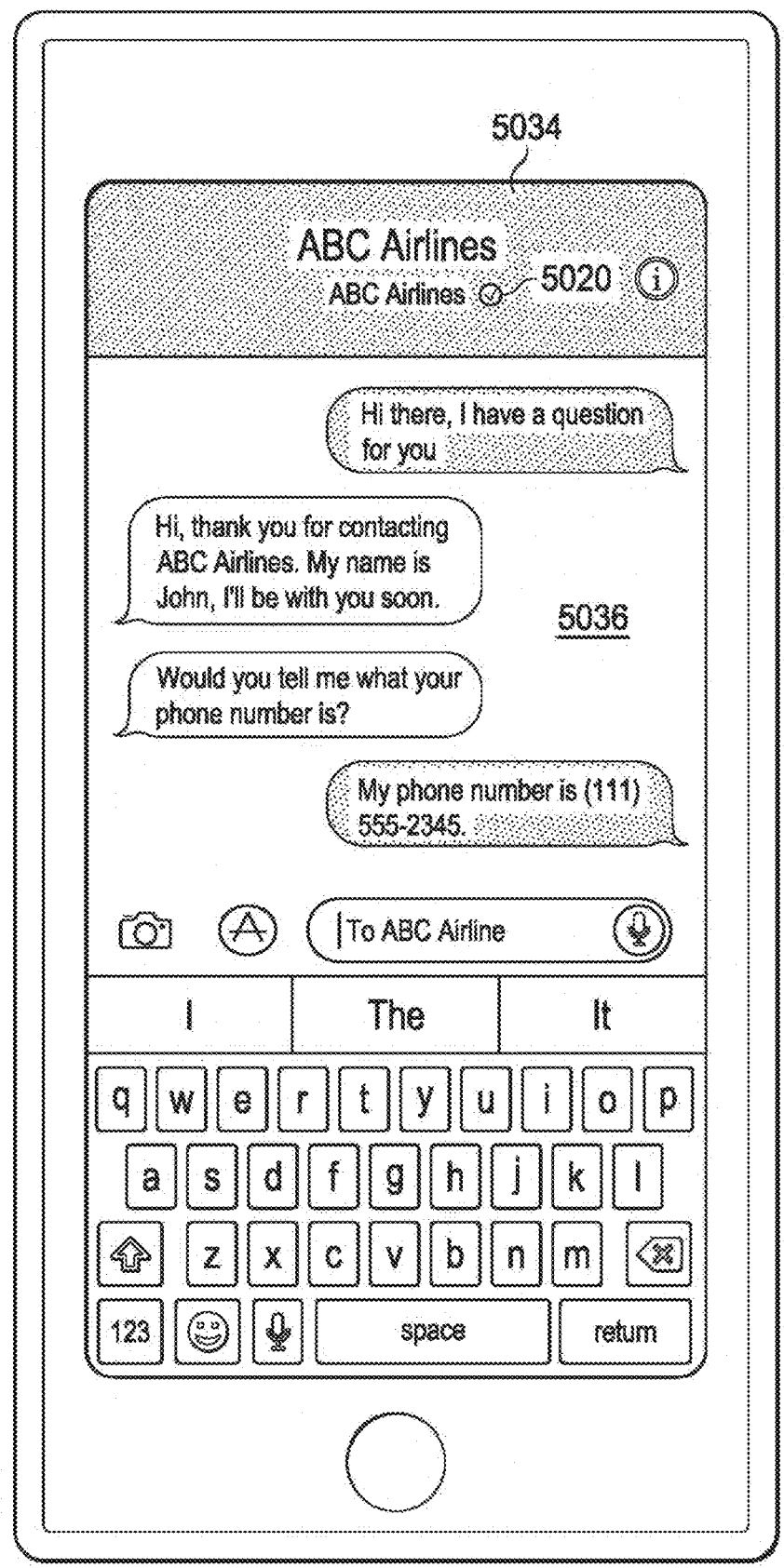

In some embodiments, the business messaging user interface for a verified business entity and the business messaging user interface for an unverified business entity are different. FIGS. 8B and 8C provide a contrast between the business messaging user interface of a business entity that is not verified and the business messaging user interface of the same business entity if the business entity is verified. As shown in FIG. 8B, header section 5034 in a business messaging user interface for a business entity that is not verified lacks a background color. Contrary to header section 5034 depicted in FIG. 8B, header section 5034 of FIG. 8C in a business messaging user interface for a business entity that is verified has a background color that is associated with the business entity. In one of such embodiments, the background color is a brand color of the business entity. In some embodiments, the header section in a business messaging user interface for a business entity that is not verified does not include any brand identifier of the business entity. In other embodiments, impact effects are not added to messages displayed in a business messaging user interface for a business entity that is not verified. In further embodiments, a logo of an unverified business entity is not displayed in header section 5034. In further embodiments, none of the customizations described herein are applied to a messaging user interface for a business entity that is not verified. Additional types of customization described with respect to FIG. 8A are also optionally applied to business messaging user interfaces of verified business entities.

Figure 8D:
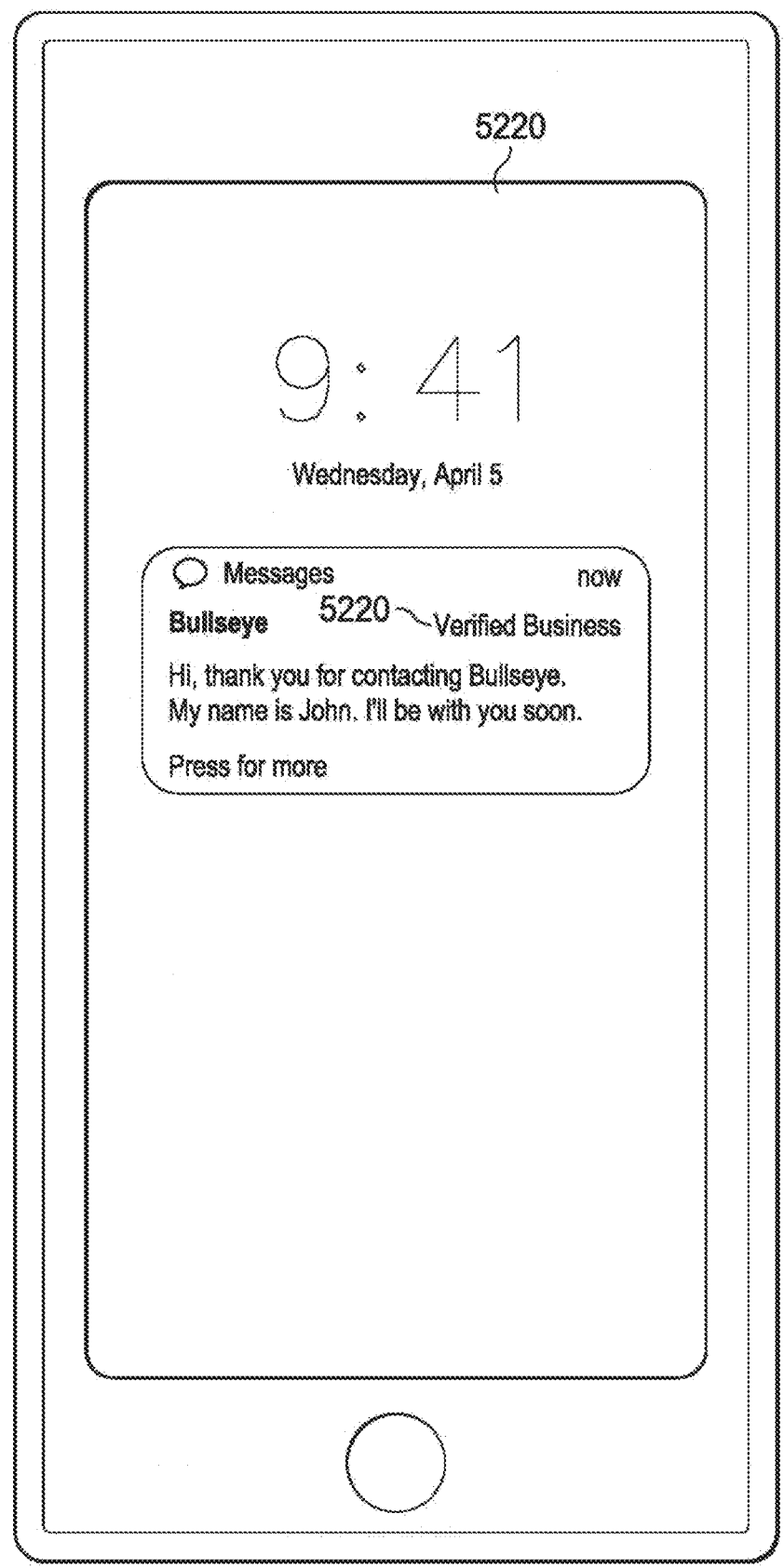

In some embodiments, the device is in a lock screen mode at the time the device receives a response from the business entity. In some embodiments, the device enters into lock screen mode if the device has not detected any user interaction with the device for a threshold period of time. FIG. 8D illustrates a device that is in lock screen mode. As shown in FIG. 8D, a notification 5220 that the message originates from a verified business entity is provided in a message region of the message. In some embodiments, the device, in response to determining that the message originates from a verified business entity, displays notification 5220 in the message region. In other embodiments, the device displays verification identifier 5020 of FIG. 8A in the message region. As such, notification 5220 and verification identifier 5020 assist the user to determine whether the source of the message is a verified business entity, and to determine whether to respond to the message or ignore the message without exiting lock screen mode.

Figure 8E:
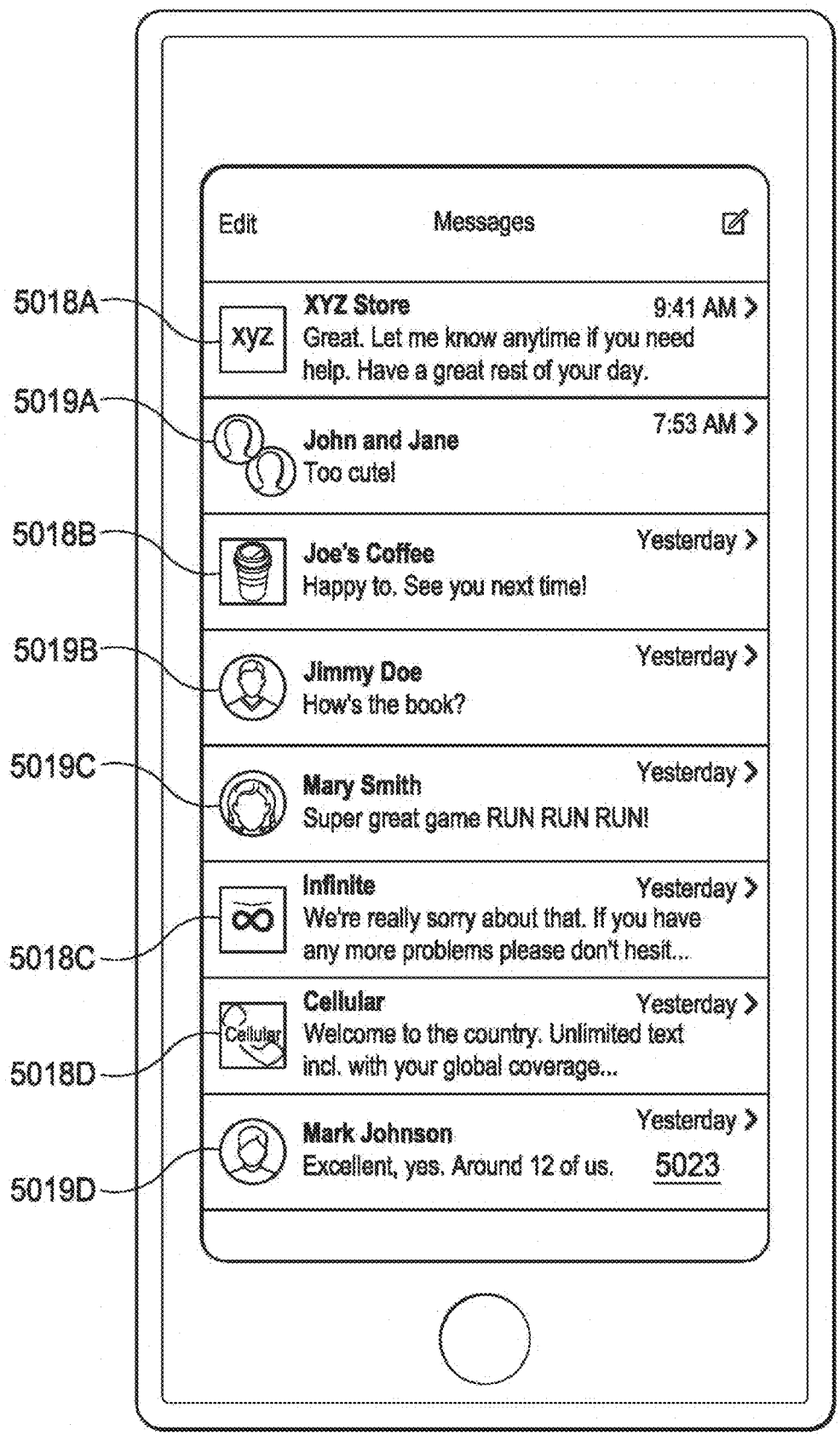

In some embodiments, the device is operable to provide a contact user interface affordance for display in the display of the device. As defined herein, the contact user interface affordance is an affordance that the user interacts with to access a contact user interface, such as contact user interface 5023 of FIG. 8E. The device, in response to detecting the user's interaction with the contact user interface affordance, generates a contact user interface having both business entity contacts and non-business entity contacts. As shown in FIG. 8E, prior messages between the user and four business entities and four non-business entities are displayed in a contact user interface 5023. Moreover, four business avatars 5018A-5018D are displayed proximate to the names of four business entities (XYZ Store, Joe's Coffee, Infinite, and Cellular) and four personal avatars 5019A-5019D are displayed proximate to the names of four personal/group contacts (John and Jane, Jimmy Doe, Mary Smith, Mark Johnson). A personal avatar is a text based, graphical, or interactive depiction of a personal contact of the user.

In one embodiment, as shown in FIG. 8E, the shape of the boundaries of business avatars 5018A-5018D of the four business entities are rectangular, whereas the shape of the boundaries of personal avatars 5019A-5019D of the four non-business entities are elliptical. As such, the shape (or the shape of the boundaries) of a contact's avatar is indicative of whether the contact is a personal contact or a business entity. In some embodiments, the contacts that are business entities and the contacts that are personal contacts are optionally rearranged or grouped so that contacts with business entities are grouped together and that personal contacts are grouped together. In one of such embodiments, the user interacts with a contact arrangement affordance, which is an affordance the user interacts with to arrange contacts in a contact user interface to rearrange the contacts. The device, in response to detecting the user's interaction, rearranges the contacts into a group of business entities and a group of non-business entities. For example, John and Jane, Jimmy Doe, Mary Smith, and Mark Johnson are grouped together and XYZ Store, Joe's Coffee, Infinite, and Cellular are grouped together. Alternatively, in one embodiment, a directory of contact user interface 5023 is configured to only display the contacts of business entities or to only display the contacts of personal contacts.

Figure 8F:
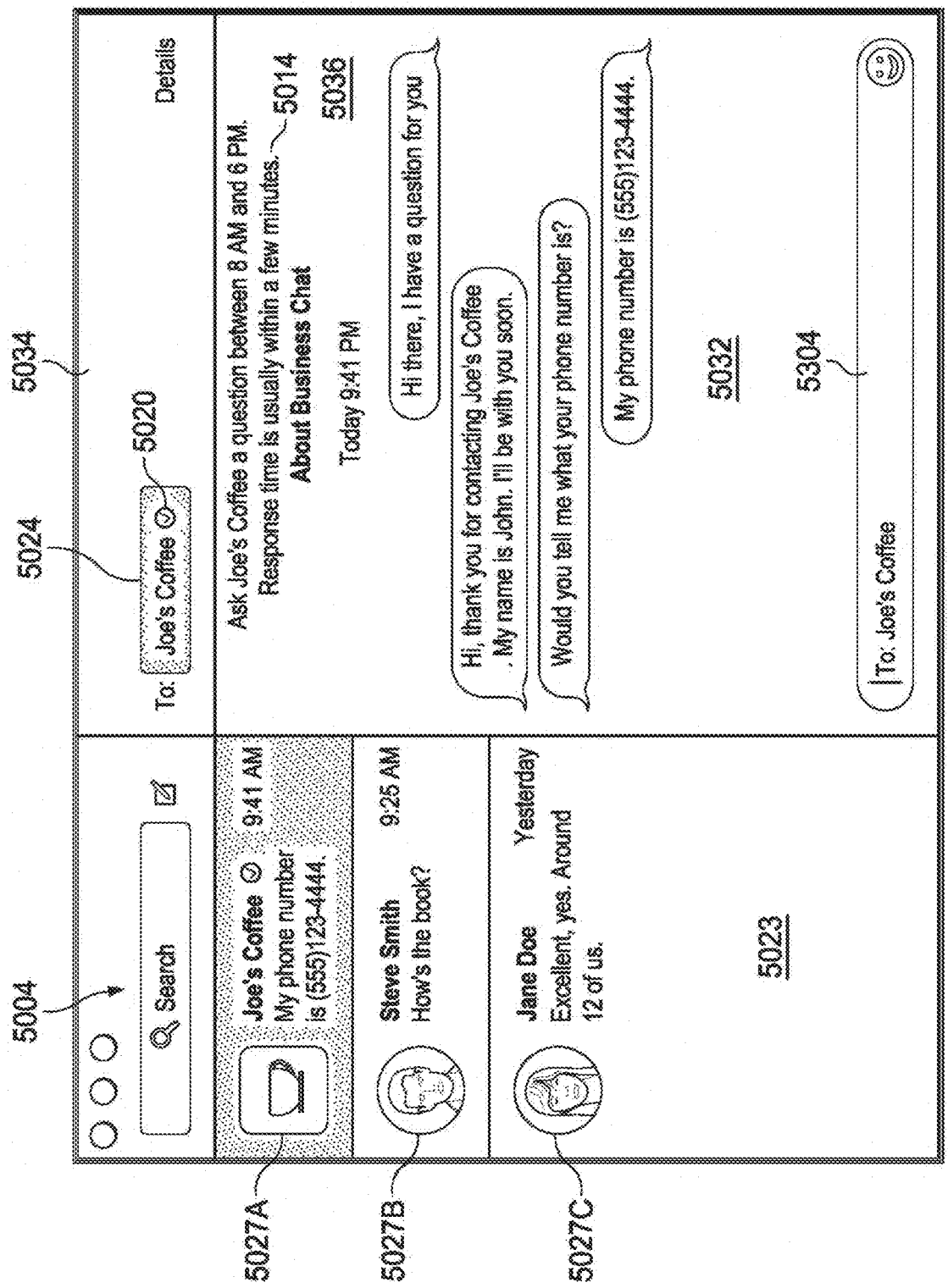

In some embodiments, contact user interface 5023 and business messaging user interface 5032 are displayed in a contiguous manner or are otherwise simultaneously displayed on the display of the device. For example, as shown in FIG. 8F, contact user interface 5023 is displayed beside business messaging user interface 5032. In the depicted embodiment, contact user interface 5023 contains one business entity contact (Joe's Coffee) and two non-business entity contacts (Steve Smith and Jane Doe). Further, each of the three contacts are associated with a contact affordance 5027A-5027C. As defined herein, a contact affordance is a messaging affordance that the user interacts with to engage in a messaging session with a specific and corresponding contact. In the depicted embodiment, first contact affordance 5027A is associated with Joe's Coffee, second contact affordance 5027B is associated with Steve Smith, and third contact affordance 5027C is associated with Jane Doe.

In the depicted embodiment, a background color of a region surrounding first contact affordance 5027A is a color that is associated with Joe's Coffee. In such embodiment, the device determines the color associated with Joe's Coffee and applies the color to the portion of the contact user interface surrounding first contact affordance 5027A to further customize contact user interface 5023. In the depicted embodiment, the user is engaged in a messaging session with Joe's Coffee. Moreover, business messaging user interface 5032 containing a conversation transcript between the user and Joe's Coffee is displayed on the display of the device. As shown in FIG. 8F, the business entity's identity 5024 and verification identifier 5020 are displayed in header section 5034 of business messaging user interface 5032. Further, message response time notification 5014 is also displayed in body section 5036 of business messaging user interface 5032. In some embodiments, business messaging user interface 5032 is further customized by additional business indicia described herein.

In the depicted embodiment, the user has an option to interact with one of three contact affordances 5027A-5027C to engage in a messaging session with a corresponding contact, or to view a conversation transcript between the user and the corresponding contact. For example, the user has an option to continue the business messaging session with Joe's Coffee by interacting with the first contact affordance 5027A, engage in a messaging session with Steve Smith by interacting with second contact affordance 5027B, or engage in a messaging session with Jane Doe by interacting with third contact affordance 5027C. The user's interaction with second contact affordance 5027B corresponds to an indication to communicate a message to a recipient. The device, in response to receiving the indication to communicate the message with Steve Smith, determines whether a contact identifier associated with Steve Smith is also associated with a business entity or a non-business entity. The device, upon determining that the contact identifier associated with Steve Smith is not associated with a business entity, generates a personal messaging user interface, and initiates a messaging session with Steve Smith through the generated personal messaging user interface. Alternatively, if the user interacts with third contact affordance 5027C, then the foregoing process is also performed, and a personal messaging user interface would also be displayed on the display of the device.

In some embodiments, the device is a laptop or a desktop device. In one of such embodiments, display dimensions of the device are sufficient to allow the entirety of both contact user interface 5023 and business messaging user interface 5032 to be simultaneously displayed on the display of the device. In other embodiments, the dimensions and customizations described herein of business messaging user interface 5032 vary based on the type of device as well as the display dimensions of the device. In one of such embodiments, where the device is a smartphone, contact user interface 5023 and business messaging user interface 5032 are not simultaneously displayed due to size limitation of the display of the device.

Figure 8G:
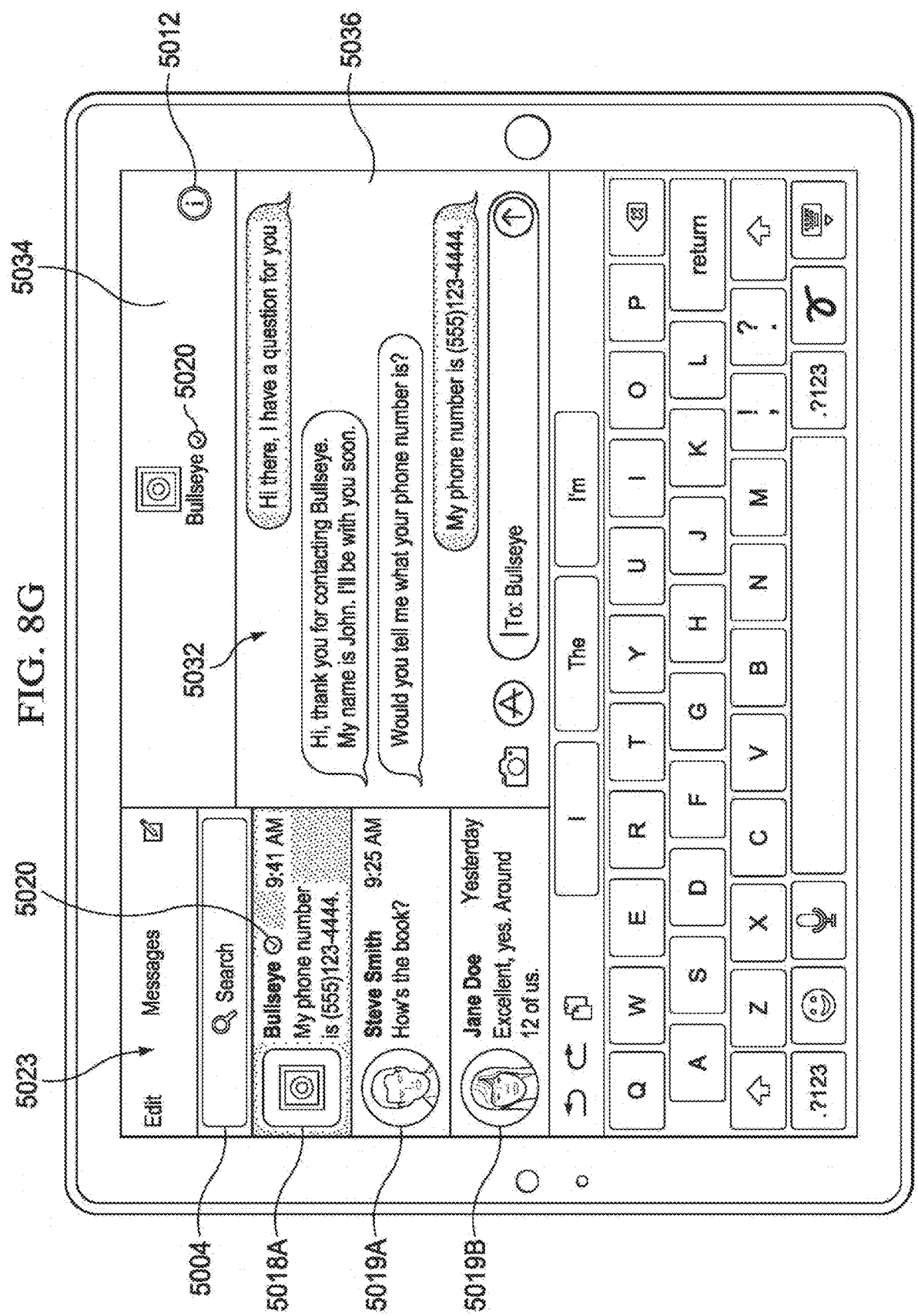

FIG. 8G is another illustration similar to the illustration of FIG. 8F where contact user interface 5023 is displayed together with business messaging user interface 5032. As shown in FIG. 8G, verification identifier 5020 and business avatar 5018A are both associated with a business entity contact (Bullseye). A search affordance 5004 is also displayed in contact user interface 5023 to allow the user to easily search through different contacts of the contact user interface 5023. The user also has an option to select business profile affordance 5012 to obtain additional information about Bullseye. In some embodiments, device 100, upon receipt of an indication to provide additional information about Bullseye, generates a business profile user interface similar to the business profile user interfaces displayed in FIGS. 6H-6L, and provides the additional information about Bullseye for display on the display of the device.

Figure 8I:
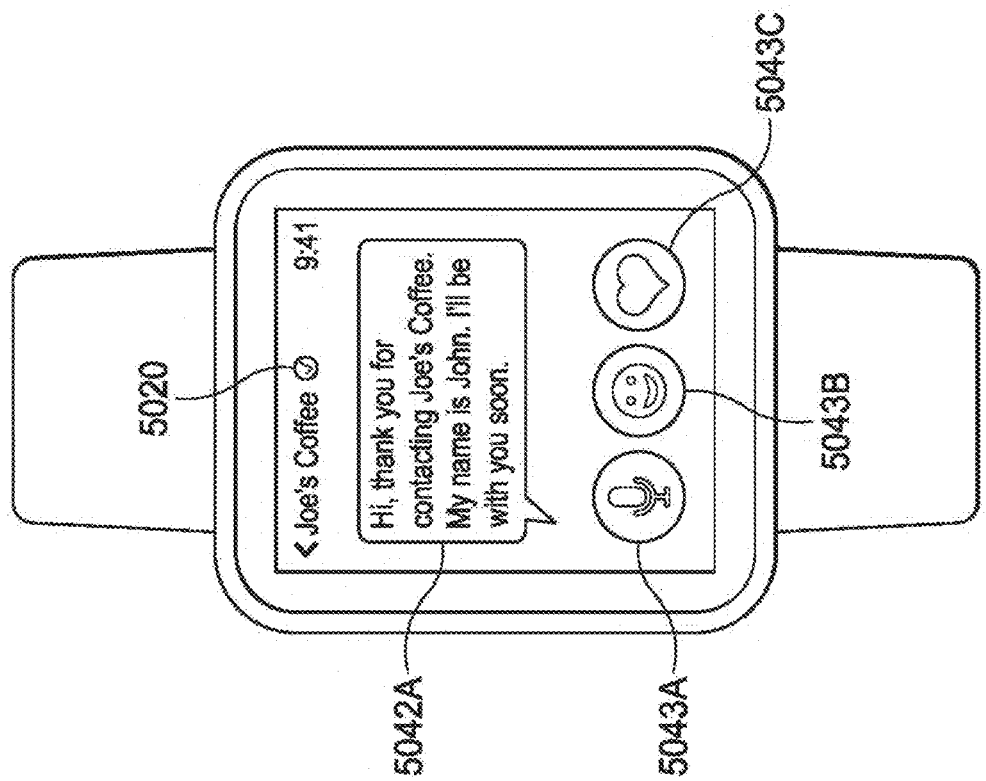
Figure 8H:
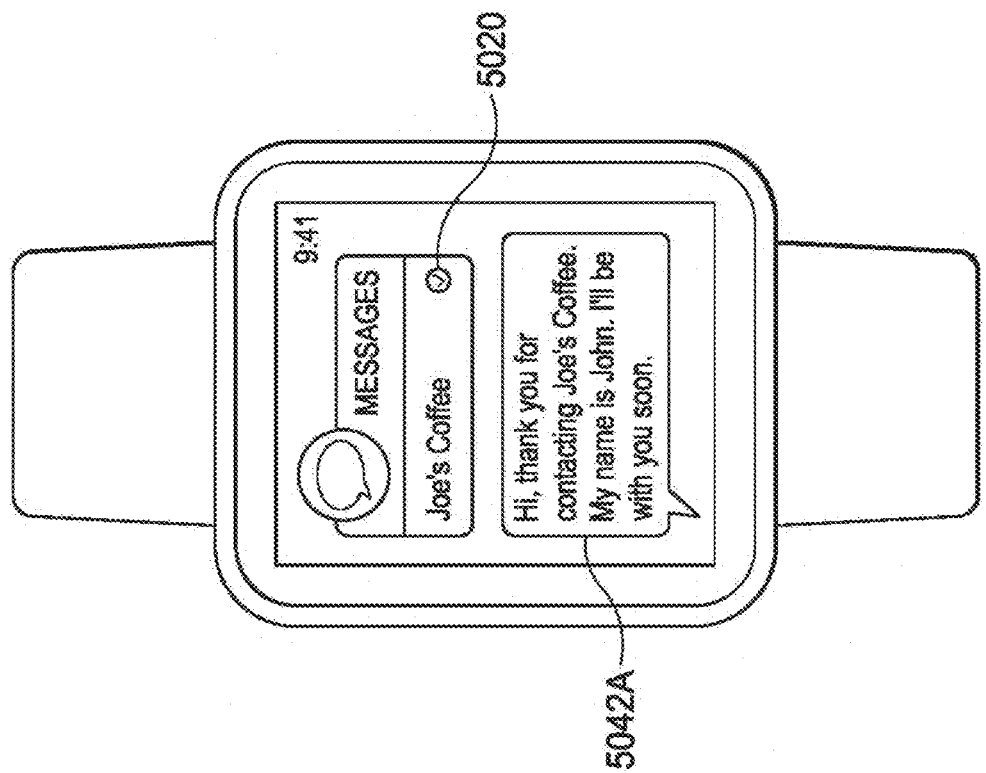

FIGS. 8H and 8I illustrate additional business messaging user interfaces that are displayed on a smartwatch. As discussed in FIGS. 8F and 8G, the amount of business indicia displayed in a business messaging user interface varies due to the display dimensions of the device. As shown in FIGS. 8H and 8I, only verification identifier 5020 is displayed as a business indicia. Moreover, only one message region 5042A, which contains the most recent message is displayed. In the depicted embodiment of FIG. 8I, the user has an option to interact with one of three affordances 5043A-5043C to respond to the message in message region 5042A.

FIGS. 9A-9C are flow diagrams illustrating a method 900 for generating a business messaging user interface. As described in reference to FIGS. 8A-8I, method 900 can be utilized to generate a business messaging user interface that is customized to facilitate initiating and conducting messaging sessions with business entities. Method 900 is performed at a device, (e.g., device 100, 300, 500). In one of such embodiments, the display is a touch screen display and the touch sensitive surface is on or integrated with the display. In some embodiments, the display is separate from the touch sensitive surface. In other embodiments, the processes described herein may be implemented with devices having physical user-interfaces, voice interfaces, or other suitable interfaces. Some operations in method 900 are, optionally, combined. Additionally, the order of some operations is, optionally, changed.

As shown in FIG. 9A, the device receives, at block 902, an indication to communicate a message to a recipient. In various embodiments, the indication corresponds to an indication to transmit a message to the recipient, an indication to select a search affordance, the indication to interact with a contact user interface, the indication to run a messaging application, or other similar indications described herein. At block 904, the device determines whether a contact identifier of the recipient is associated with a business entity. If the device determines that the contact identifier of the recipient is associated with a business entity, then the method proceeds to block 905. At block 905, in one embodiment, the device, in accordance with the determination that a contact identifier is associated with a business entity, determines an identity of the business entity. The method then proceeds to block 906. At block 906, the device determines business indicia to include in a generated business messaging user interface. The method then proceeds to block 907. In one embodiment, at block 907, the device determines a brand identifier associated with the business entity. The method then proceeds to block 908. At block 908, the device generates a business messaging user interface where the business messaging user interface includes the business indicia generated in block 906 and, optionally, the brand identifier generated in block 907. In some embodiments, the device generates the business messaging user interface to include the business indicia upon determining that the recipient is a business entity. For example, the device greys out message regions of messages from the user upon determining that the recipient is a business entity. The device, upon determining the identity of recipient (e.g., the recipient is XYZ), further customizes the business messaging user interface to include brand identifiers associated with the business entity (XYZ), advertisements associated with the business entity, as well as business indicia associated with the business entity XYZ. Additional descriptions of these types of customization are described in the paragraphs below.

In some embodiments, the device generates a header section of the business messaging user interface where the header section includes the business indicia. For example, as depicted in FIGS. 8A and 8C, in some embodiments a verification identifier is displayed in the header section. Moreover, in some embodiments the background color of the header section is customized to match a background color of the particular business entity being messaged, as depicted with respect to XYZ and ABC Airlines in FIGS. 8A and 8C. Moreover, in some embodiments the header section is further customized to include a business avatar, such as business avatar 5018 of XYZ illustrated in FIG. 8A. In further embodiments, the header section is further customized to include business profile affordance 5012, a logo, a trademark, an advertisement, or an animation of XYZ. In some embodiments, the device generates a body section of the business messaging user interface that includes a business indicia. In such embodiments, the body section and such business indicia are overlaid with a conversation transcript. In one embodiment, a logo of the business entity is displayed in the background of the body section of the business messaging user interface. In another one of such embodiments, where the device has determined the identity of a business entity, brand identifiers of the business entity, advertisements of the business entity, and animations associated with the business entity are displayed in the background of the body section of the business messaging user interface.

In some embodiments, the device generates a conversation transcript that includes business indicia. In one of such embodiments, the device generates a message region around the message and customizes a color of the message region. As shown in FIG. 8A, first and fourth message regions 5042A and 5042D are greyed out. In another one of such embodiments, the device generates a first message region around the message where the first message region is a default color. The device then determines a color associated with the business entity, generates a second message region around a second message that is received from the business entity, and customizes the color of the second message region based on a color associated with the business entity. In further embodiments, the business indicia corresponds to an effect a message has on other messages of the conversation transcript. In some embodiments, the device applies a regions effect to a message when the message is initially displayed. In further embodiments, the device applies a full screen effect when the message is initially displayed. Examples of regions effect and full screen effect are provided in more detail in the preceding paragraphs. In other embodiments, where the device has determined the identity of a business entity, the shape of message regions is customized to represent the shape associated with a brand identifier of the business entity. In further embodiments, where the device has determined the identity of a business entity, the device inserts brand identifiers, advertisements, and animations associated with the business entity into message regions of the conversation transcript.

The device, optionally, proceeds to block 916 and displays a contact user interface affordance. The device, in response to detecting an interaction with the contact user interface affordance, generates a contact user interface, such as contact user interface 5023 of FIGS. 8E-8G. For example, as depicted in FIGS. 8E-8G, contact user interface 5023 has at least one contact associated with a business entity and at least one contact not associated with any business entity. As depicted in FIGS. 8E-8G, in some embodiments business avatars are displayed with business entities and personal avatars are displayed with non-business entities. In one of such embodiments, business avatars have rectangular boundaries whereas personal avatars have elliptical boundaries. In another one of such embodiments, business entities are displayed with their brand identifiers, such as trademarks, logos, animations, as well as other brand identifiers.

In a further embodiment, the background color of a region of the contact user interface around a business entity is customized to match a color associated with the business entity, whereas the background color of a region of the contact user interface around a non-business entity is a default color. In one of such embodiments, the device, upon detecting a user interaction to access the contact user interface (such as a user action with the contact user interface affordance), applies the color associated with the business entity to the region of the contact user interface surrounding a contact affordance of the business entity. Differences in the dimensions and shapes of the business avatars and personal avatars, the inclusion of brand identifiers, and variances in background color of regions of the contact user interface around business entity contacts and non-business entity contacts facilitate the user to distinguish contacts that are business entities from other contacts.

The contact user interface has contacts that are associated with business entities and contacts that are not associated with business entities. In some embodiments, as shown in FIGS. 8F and 8G, both business entity contacts and non-business entity contacts are displayed in contact user interface 5023. In one embodiment, business avatars that are associated with business entities and personal avatars that are associated with non-business entities have different shapes or dimensions. For example, in the depicted embodiment of FIG. 8G, the business avatar associated with Bullseye has a rectangular shape, whereas the personal avatar associated with Steve Smith has an elliptical shape.

In some embodiments, the device, at block 918, simultaneously displays the business messaging user interface on a first portion of the display and the contact user interface on a second portion of the display. In such embodiments, the display size of the device is sufficient to simultaneously display the business messaging user interface and the contact user interface. In other embodiments, where the dimensions of the display are not sufficient to simultaneously display both user interfaces, the device overlays the contact user interface with the business messaging user interface. In some embodiments, the device, at block 921, displays a contact arrangement affordance in the contact user interface. The contact arrangement affordance is an affordance that the user interacts with to customize the arrangement of the user's contacts. In such embodiments, the device, in response to detecting the user's interaction with the contact arrangement affordance, arranges the at least one contact associated with the business entity into a first group, and arranges the at least one contact not associated with any business entity into a second group. The user interacts with the contact arrangement affordance to further customize the arrangement of the user's contacts.

At block 922, the device, in accordance with the determination that the message to be communicated is with a business entity, determines whether the business entity is a verified business entity or an unverified business entity. The device then generates the business messaging user interface to include a verification identifier, such as the check logo depicted in FIG. 8A. Verification identifier 5020, as well as other business indicia described herein, assist the user to determine whether the user is communicating with a business entity and whether the business entity is a verified business entity. In some embodiments, at block 924, the device determines a response time of the business entity and displays the approximate response time in the business messaging user interface.

Alternatively, if at block 904, the device determines that the contact identifier is not associated with a business entity, the device displays a personal messaging user interface, which does not include any business indicia. For example, as described in FIGS. 8F and 8G, if the device determines that the contact identifier of the recipient is associated with Steve Smith or Jane Doe, then the device generates a personal messaging user interface that does not include any business indicia.

It should be understood that the particular order in which the operations in FIGS. 9A-9C have been described is merely one example and is not intended to indicate that the described order is the only order in which the operations could be performed. One of ordinary skill in the art would recognize various ways to reorder the operations described herein. Additionally, details of the processes described above with respect to method 900 (e.g., FIGS. 9A-9C) are also applicable in an analogous manner to the methods described above. For example, method 900 optionally includes one or more of the characteristics of the various methods described above with reference to method 1100. For example, the user may initiate, perform, and/or complete one or more tasks described throughout method 1100 through the business messaging user interface described throughout method 900. For brevity, these details are not repeated below.

As disclosed in certain embodiments of the present invention, the use of a business messaging user interface allows a user of a device to conduct messaging sessions with a business entity in a manner that traditional personal messaging user interfaces do not allow. For example, a business messaging user interface includes various forms of business indicia generated by a device that are intended to reduce potential fraud. When a user desires to message a particular business entity, a user can easily recognize that a telephone number, IP address, or other contact identifier belongs to such business entity by viewing a brand identifier associated with such business entity. When contacting such business entity, a user can easily confirm that the contact identifier the user is messaging has been verified as an authorized contact identifier of such business by the display of a particular business indicia of such verification. Both the brand identifier and the business indicia of a verified status of a business entity may reduce instances of fraud, miscommunication, cyberattacks and identity theft, as well as serve as a warning when the contact identifier of business entities change, such as with the reassignment of telephone numbers. For example, if a customer of a business entity is instructed to message a particular telephone number to conduct a transaction with a business entity, by using a business messaging user interface, such customer may immediately recognize that the telephone number does not belong to a particular business entity or that the business entity has not been verified. Thus, just like encryption, user authentication, or account security, a business messaging user interface and various business indicia may be used as an important technical weapon in protecting users and their devices.

Additionally, in certain embodiments the use of a business messaging user interface includes various business indicia that are intended to improve the efficiency of communications between a user of a device and a business entity they are attempting to message. For example, in certain embodiments, a message response time notification is included to notify a user of the business messaging user interface when they can expect to begin a messaging session with a business entity. Instead of spending a lengthy period of time on hold while waiting to begin a voice call with a representative of a business entity, the user may pick up their device, message the business entity, and be informed by the message response time notification when they can expect the session to begin. In the meantime, the user can be engaged on other tasks on their device or elsewhere. Importantly, in such embodiments, the use of a business messaging user interface of a device realizes a significant reduction in network bandwidth and battery consumption as compared to the use of the same device to accomplish the same communications with a business entity in a voice call, even in the time prior to when such communications actually begin.

FIGS. 10A-10AH illustrate exemplary user interfaces for performing tasks through a business messaging user interface of a device, in accordance with some embodiments. The user interfaces in these figures are used to illustrate the processes described below, including the processes in FIGS. 11A-11H. Although some of the examples that follow will be given with reference to inputs on a touch-screen display (where the touch-sensitive surface and the display are combined), in some embodiments, the device detects inputs on a touch-sensitive surface 451 that is separate from the display 450, as shown in FIG. 4B. In other embodiments, the interfaces described herein may be implemented with devices having physical user-interfaces, voice interfaces, or other suitable interfaces. For convenience of explanation, the embodiments described below will be discussed with reference to operations performed on a device with a touch-sensitive display system 112.

The foregoing paragraphs describe embodiments of a variety of operations that the device performs to initiate and conduct a messaging session between a user and a business entity and to generate and operate a business messaging user interface. During the messaging session, a variety of task affordances associated with different tasks are displayed in the business messaging user interface. A task affordance is an affordance that the user interacts with to initiate a task with a business entity. Additional details of systems and methods to access, to store, to modify, and to transmit, data indicative of various tasks described herein are described in U.S. Provisional Patent No. 62/507,163, "Messaging System for Corporations," filed on May 16, 2017, which is hereby incorporated by reference in its entirety.

FIG. 10A provides an illustration of a business messaging user interface 5032 having a product selection affordance 5060 displayed in a conversation transcript between the user and a representative of XYZ. A product selection affordance is a type of task affordance that the user interacts with to initiate a task to select a product. In some embodiments, product selection affordance 5060 contains a description of the product selection task. In the depicted embodiment of FIG. 10A, the description indicates that product selection affordance 5060 is related to product repair. As shown in FIG. 10A, the user is engaged in a messaging session with a representative of XYZ to schedule a task to repair a product. The user interacts with product selection affordance 5060 to initiate the task to repair the product. The device, in response to detecting the user's interaction with product selection affordance 5060, overlays a portion of the messaging user interface with a product selection user interface, which is a user interface that the user interacts with to select one or more products. An example of a product selection user interface is displayed in FIG. 10B.

Figure 10B:
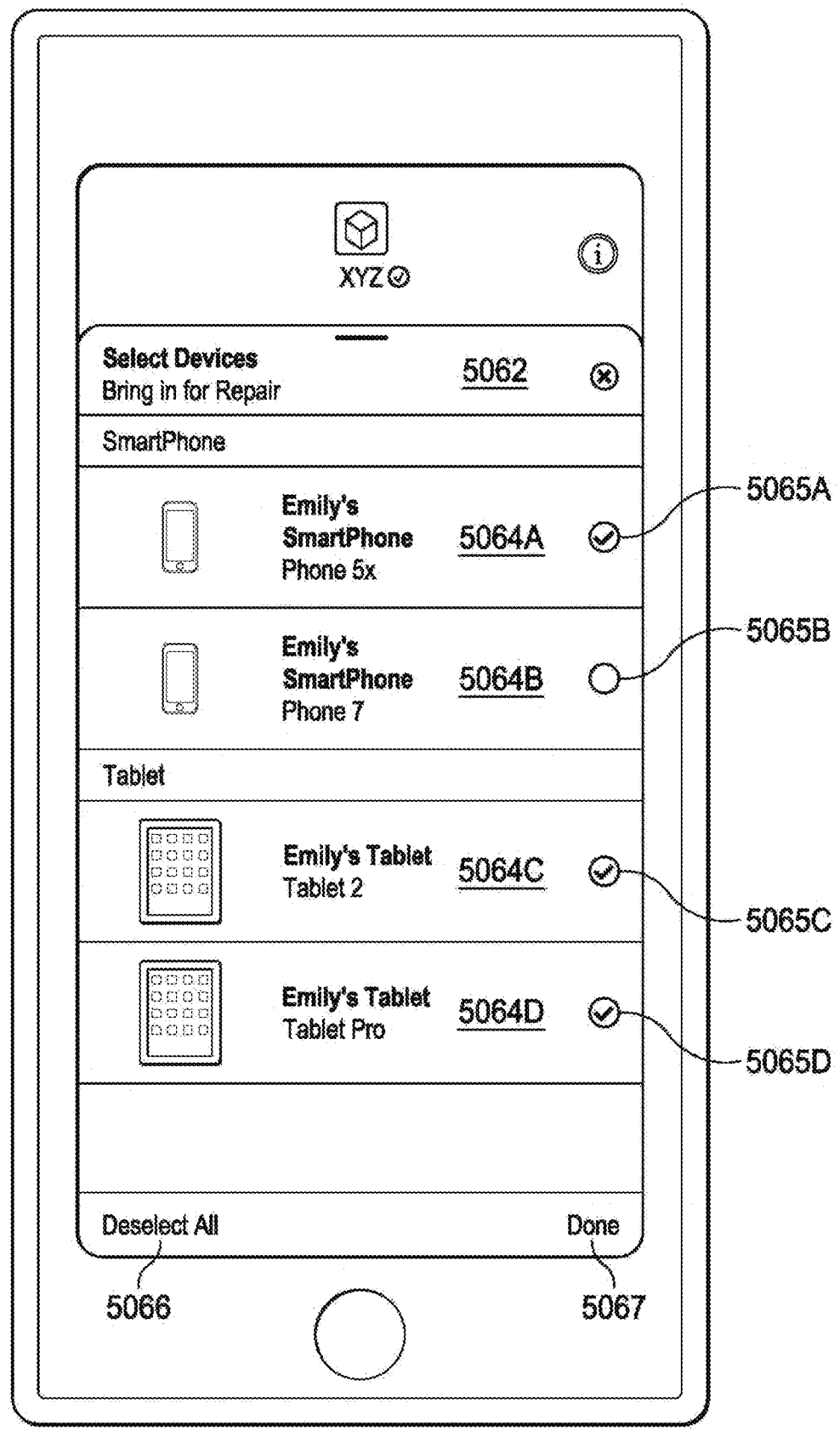

As shown in FIG. 10B, the device overlays a portion of business messaging user interface 5032 with a product selection user interface 5062. The product selection user interface 5062 includes one or more product affordances in product selection user interface 5062. As defined herein, a product affordance is an affordance to select a particular product. Optionally, a product affordance may select a category or other groups of products, which may then be further selected with further product affordances. In the depicted embodiment, first product affordance 5064A is associated with "Phone 5X," second product affordance 5064B is associated with "Phone 7," third product affordance 5064C is associated with "Tablet 2," and fourth product affordance 5064D is associated with "Tablet Pro." In some embodiments, the device generates a menu of one or more product affordances and displays the menu of the product affordances in product selection user interface 5062. As shown in FIG. 10B, the menu includes first, second, third, and fourth product affordances 5064A, 5064B, 5064C and 5064D, where each product affordance is associated with a product the user owns and possibly desires to bring in for repair. In some embodiments, the device automatically determines which products are owned by the user in response to account information of the user, generates product affordances associated with the determined products, and provides the generated product affordances for display in product selection user interface 5062. In one of such embodiments, a list of all of the products owned by the customer is displayed in the product selection user interface, and the user is provided an option to select among the listed products.

In other embodiments, the business entity provides the device with instructions on which relevant products should be included. The device then generates affordances associated with the relevant products, and provides the generated product affordances for display in product selection user interface 5062. The user interacts with a region of the messaging user interface around the respective product affordance to select the corresponding product. Product selection indicators 5065A, 5065B, 5065C, and 5065D are displayed in the messaging user interface to provide a visual indication of the product(s) selected by the user. As shown in FIG. 10B, a first, third, and fourth product selection indicators 5065A, 5065C, and 5065D indicate that a corresponding first product affordance 5064A, third product affordance 5064C, and fourth product affordance 5064D have been selected by the user, whereas second product selection indicator 5065B indicates that second product affordance 5064B has not been selected by the user.

The device also generates and displays other types of indicators to provide an indication of which product affordance among the product affordances displayed in a product selection user interface have been selected by the user. As shown in FIG. 10B, a deselect affordance 5066 and a confirm affordance 5067 are also displayed in product selection user interface 5062. Deselect affordance 5066 is an affordance that the user interacts with to cancel a previous selection and confirm affordance 5067 is an affordance that the user interacts with to confirm a previous selection. The user has an option to interact with deselect affordance 5066 to clear all of the previously selected product affordances. For example, if the user clicks on deselect product affordance 5066, then first, second, third and fourth product affordance selection indicators 5065A-5065D would indicate that none of the products has been selected. Alternatively, the user confirms the selected product affordances by interacting with confirm affordance 5067.

Figure 10C:
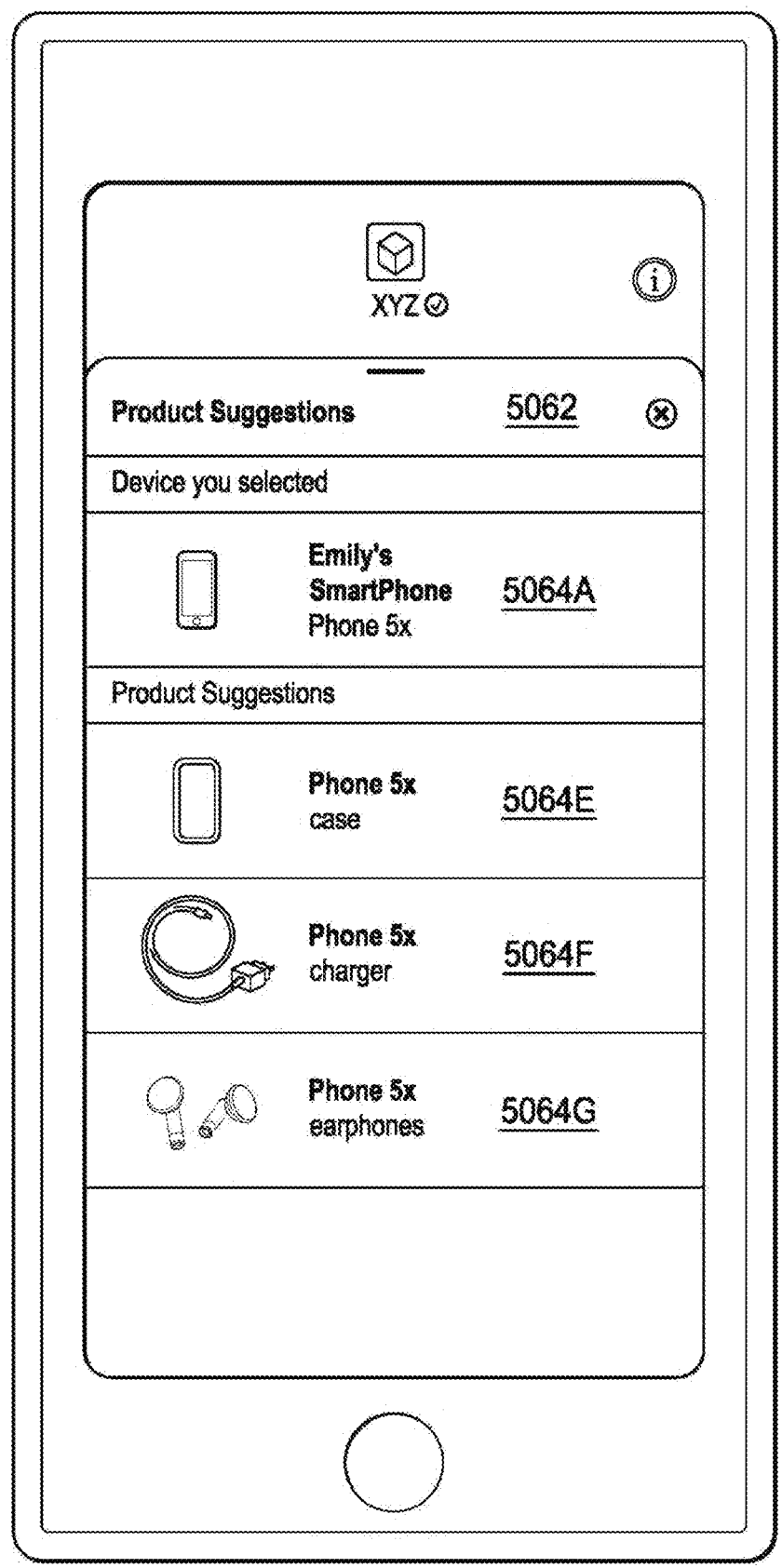

In some embodiments, the device, in response to detecting a user interaction to select a product affordance, determines one or more products that are associated with the selected product affordance. For example, the device, upon detecting that the user selected a product with first product affordance 5064A, determines other products that are related to the selected product. For example, in response to the selection of a particular model of a mobile device, suitable phone cases, chargers, and headphone cables may be selected to present to a user of the device for purchase. As shown in FIG. 10C, where first product affordance 5064A is selected, the device is further operable to generate and display a fifth affordance 5064E for a Phone 5X case, a sixth affordance 5064F for Phone 5X charger, and a seventh affordance 5064G for Phone 5X earphones, and provide the generated product affordances 5064E-5064G for display. In the illustrated embodiment, the device generates a new menu ("Product Suggestions") and populates the new menu with the newly generated product affordances 5064E-5064G of Phone 5X accessories. In other embodiments, the device displays the newly generated product affordances 5064E-5064G and the originally generated product affordances 5064A-5064D on the same menu. In some embodiments, the device, upon detecting a user interaction with the confirm affordance 5067, displays a product submission affordance in the search input area of business messaging user interface 5032. As defined herein, a product submission affordance is an affordance that the user interacts with to make edits to at least one selected product affordance.

In further embodiments, the device is operable to obtain user history stored locally or remotely. Examples of user history include, without limitation, a purchase history of the user, a repair history of the user, and a message history of the user. In such embodiments, the device is operable to analyze one or more of the user's purchase history, repair history, and message history to determine a product associated with the selected product. In another one of such embodiments, the device is operable to receive account information of the user and determine the product associated with the selected product based on the account information of the user. In some embodiments, the device is operable to analyze content of the conversation transcript and determine a relevant product based on any analysis of such content. In such embodiments, the device is further operable to generate a product affordance that is associated with the relevant product and provide the generated product affordance for display on the display of the device.

Figure 10D:
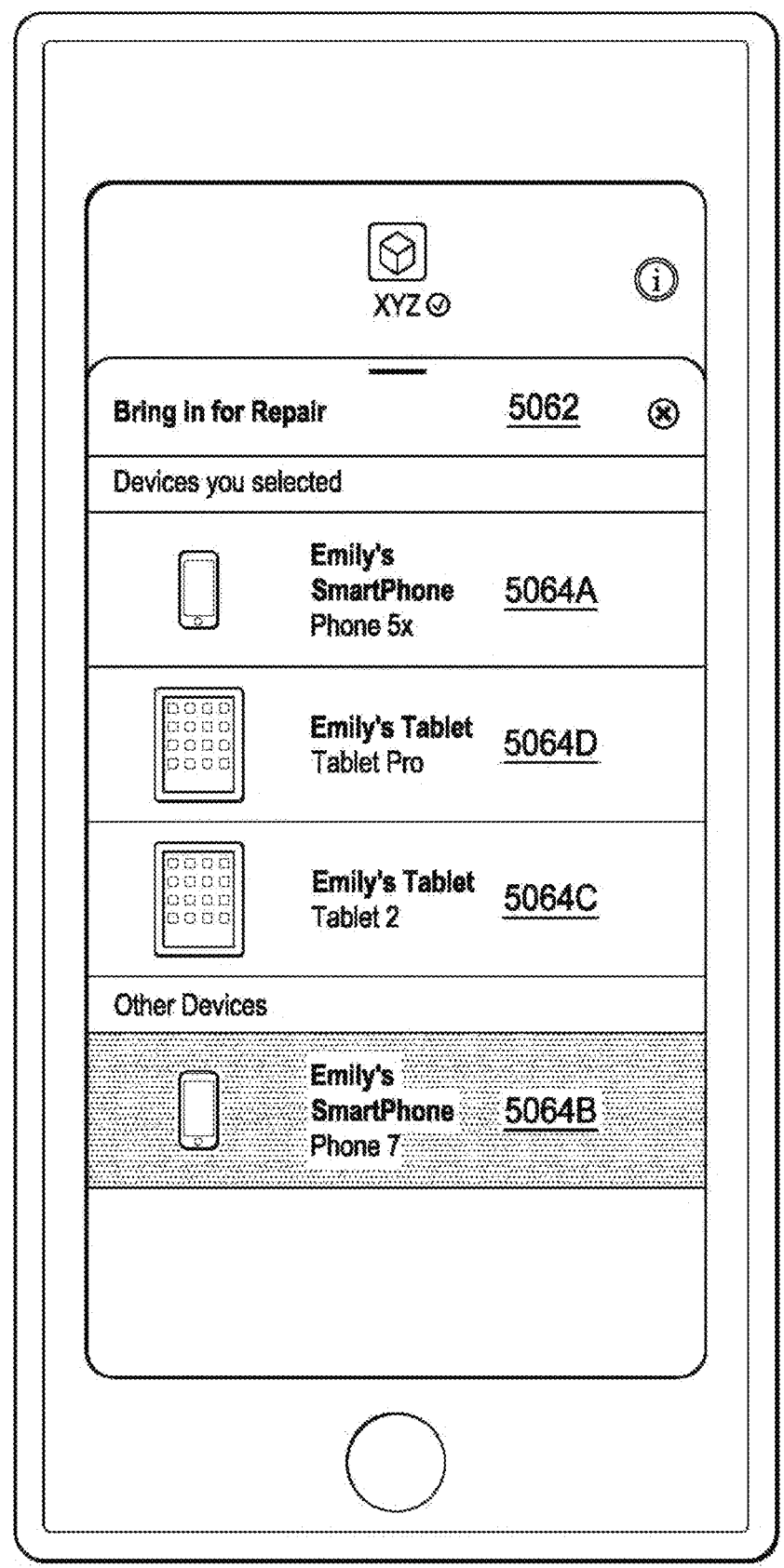
Figure 10E:
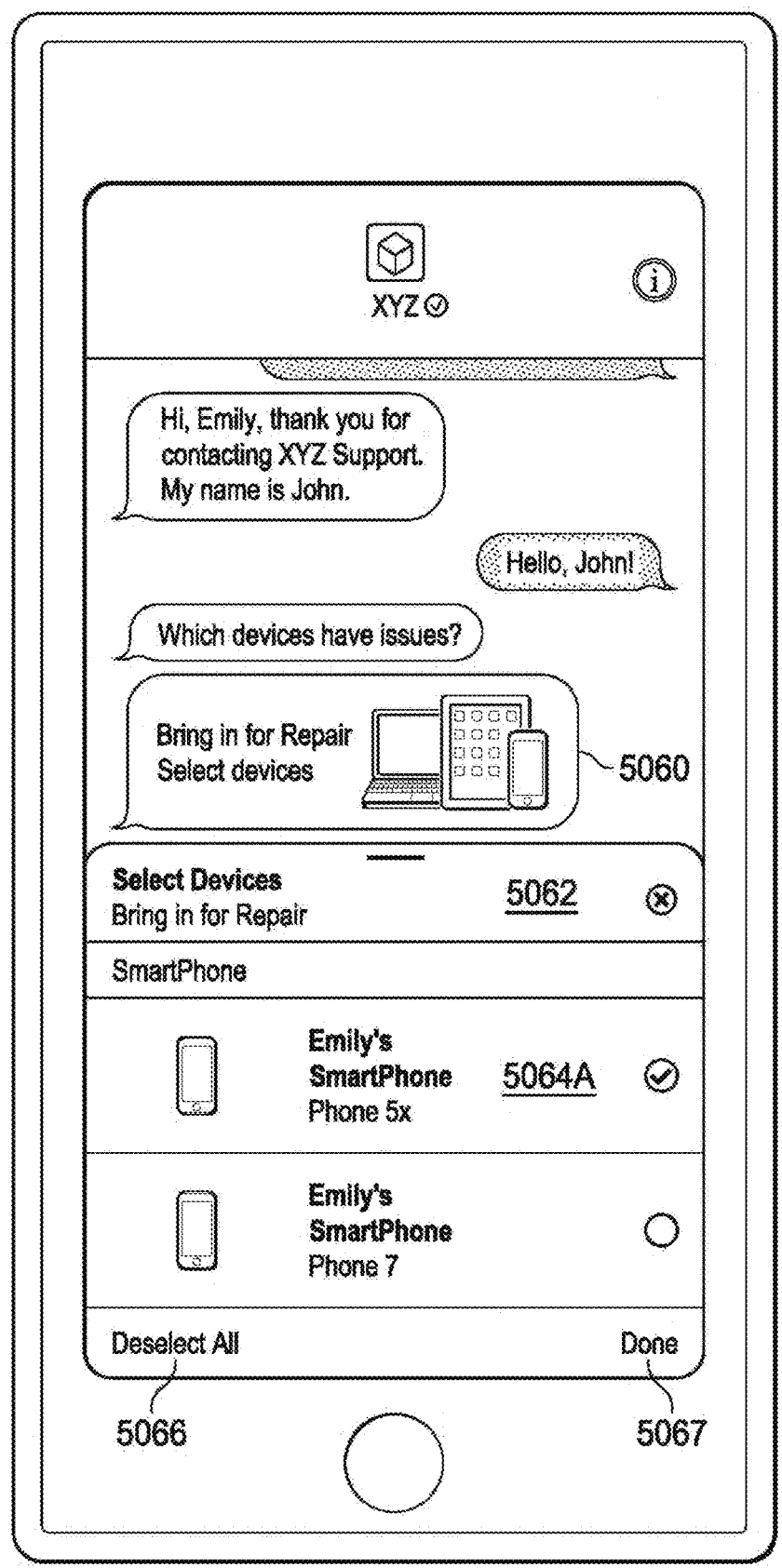

In some embodiments, the device groups the selected products together in a first group and groups the unselected products together in a second group. As shown in FIG. 10D, the selected first, third, and fourth product affordances 5064A, 5064C, and 5064D are grouped together and the unselected second product affordance 5064B is grouped by itself. As shown in FIG. 10E, product selection user interface 5062 overlays a portion of the messaging user interface, but does not cover the conversation transcript, thereby allowing the user to read the most recent messages from the business entity. In one of such embodiments, the amount of the overlay is adjustable.

Figure 10F:
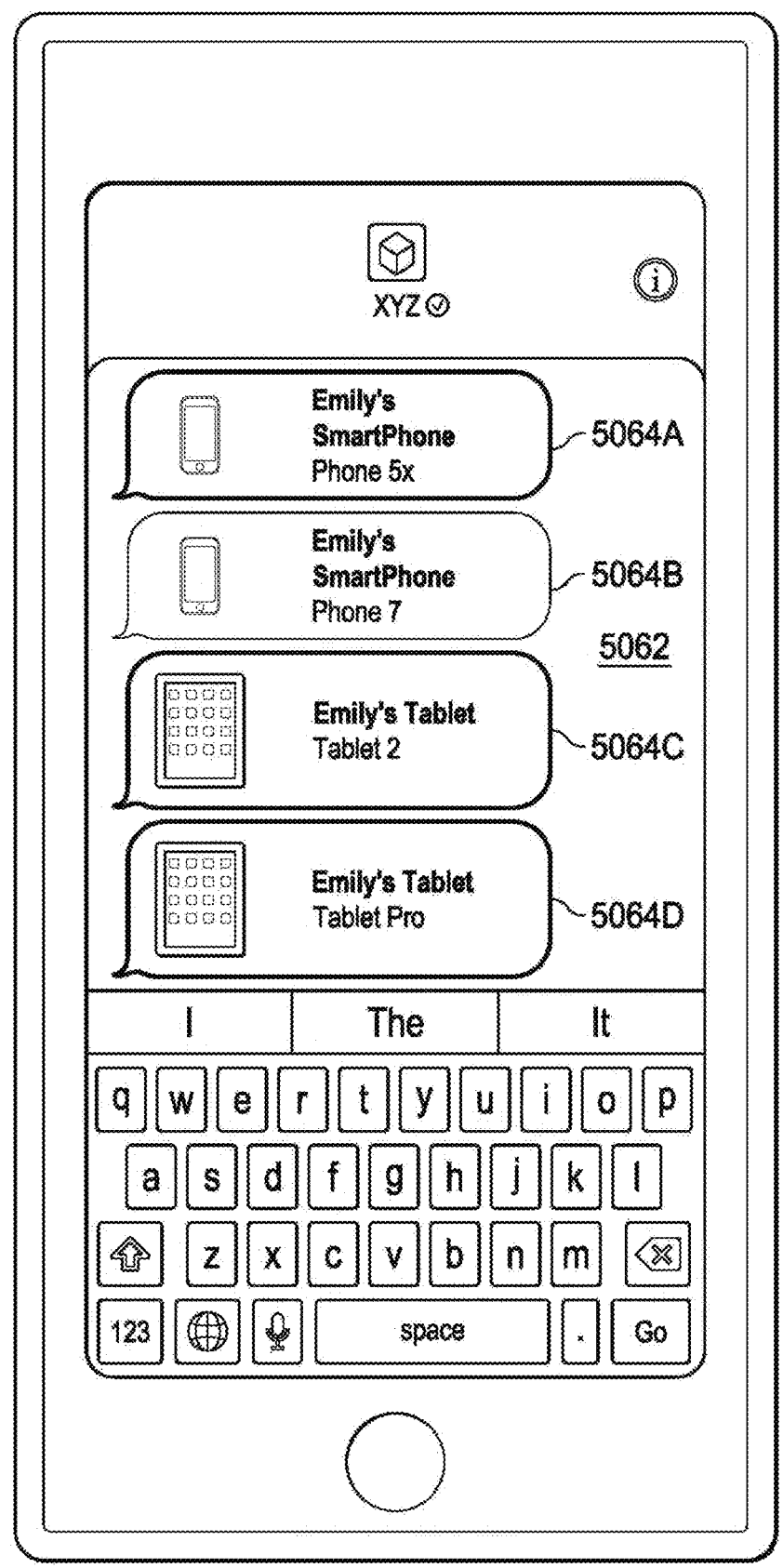

In some embodiments, the device, in response to detecting an interaction to select product affordance 5060 of FIG. 10A, displays each of four product affordances 5064A-5064D in the conversation transcript. As shown in FIG. 10F, four product affordances 5064A-5064D are displayed in message regions of the conversation transcript. In the depicted embodiment, a user interacts with message regions surrounding one of four product affordances 5064A-5064D to interact with the respective product affordance.

Figure 10G:
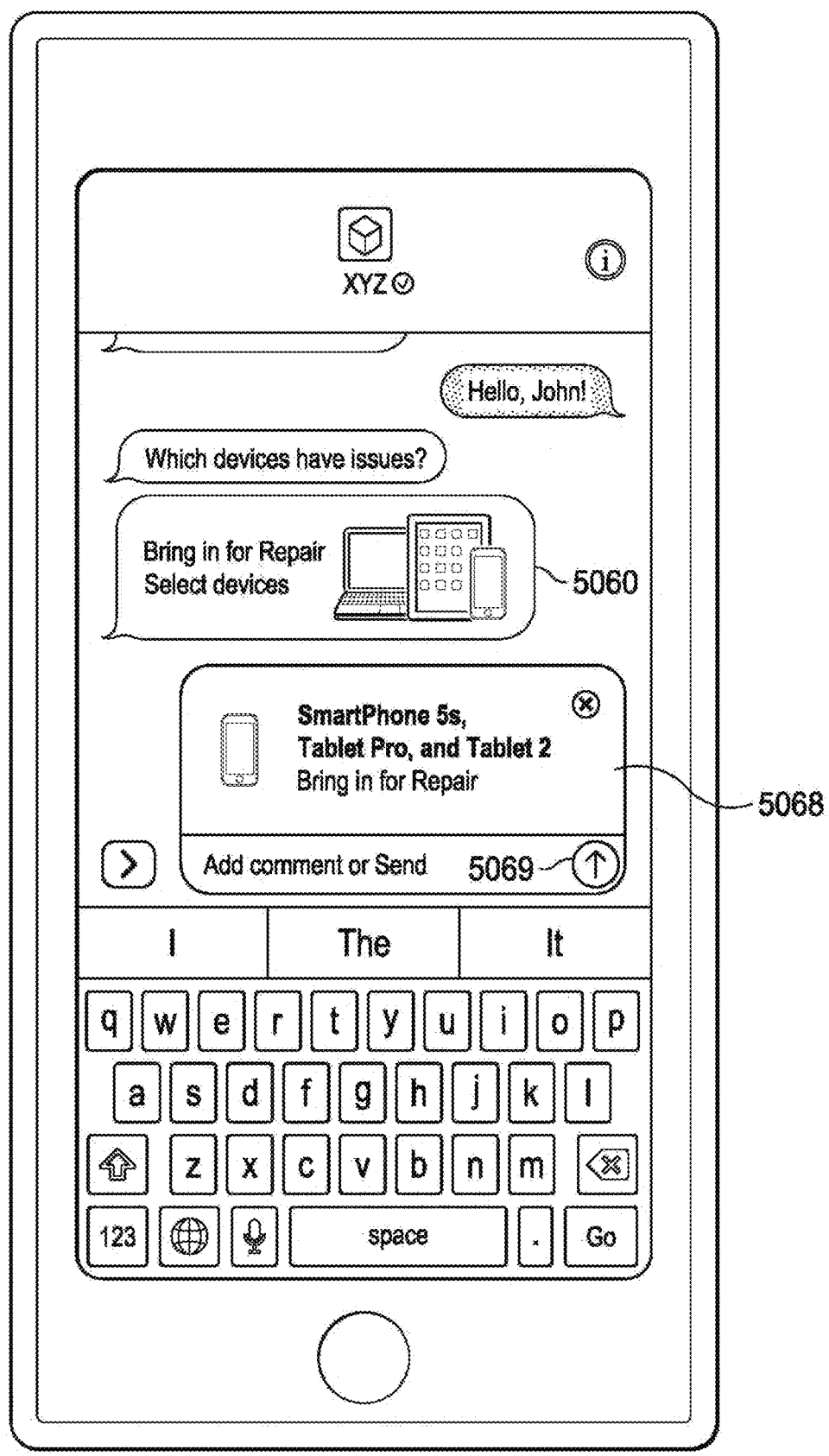

As shown in FIG. 10G, the product selection of a product submission affordance 5068 is displayed in search input area 5004. As shown in FIG. 10G, product submission affordance 5068 provides a description of all of the products selected by the user. The user interacts with product submission affordance 5068 to make changes to the previously selected product affordances. In one of such embodiments, the device, in response to detecting the user's interaction with product submission affordance 5068, re-overlays a portion of business messaging user interface 5032 with product selection user interface 5062. Alternatively, the user interacts with a send affordance 5069 to confirm the submission of product submission affordance 5068. The device, in response to detecting the user's interaction with the send affordance 5069, displays product submission affordance 5068 in the conversation transcript and transmits an indication of the selected product to the business entity. In some embodiments, the product submission affordance 5068 is also transmitted to the business entity.

Figure 10H:
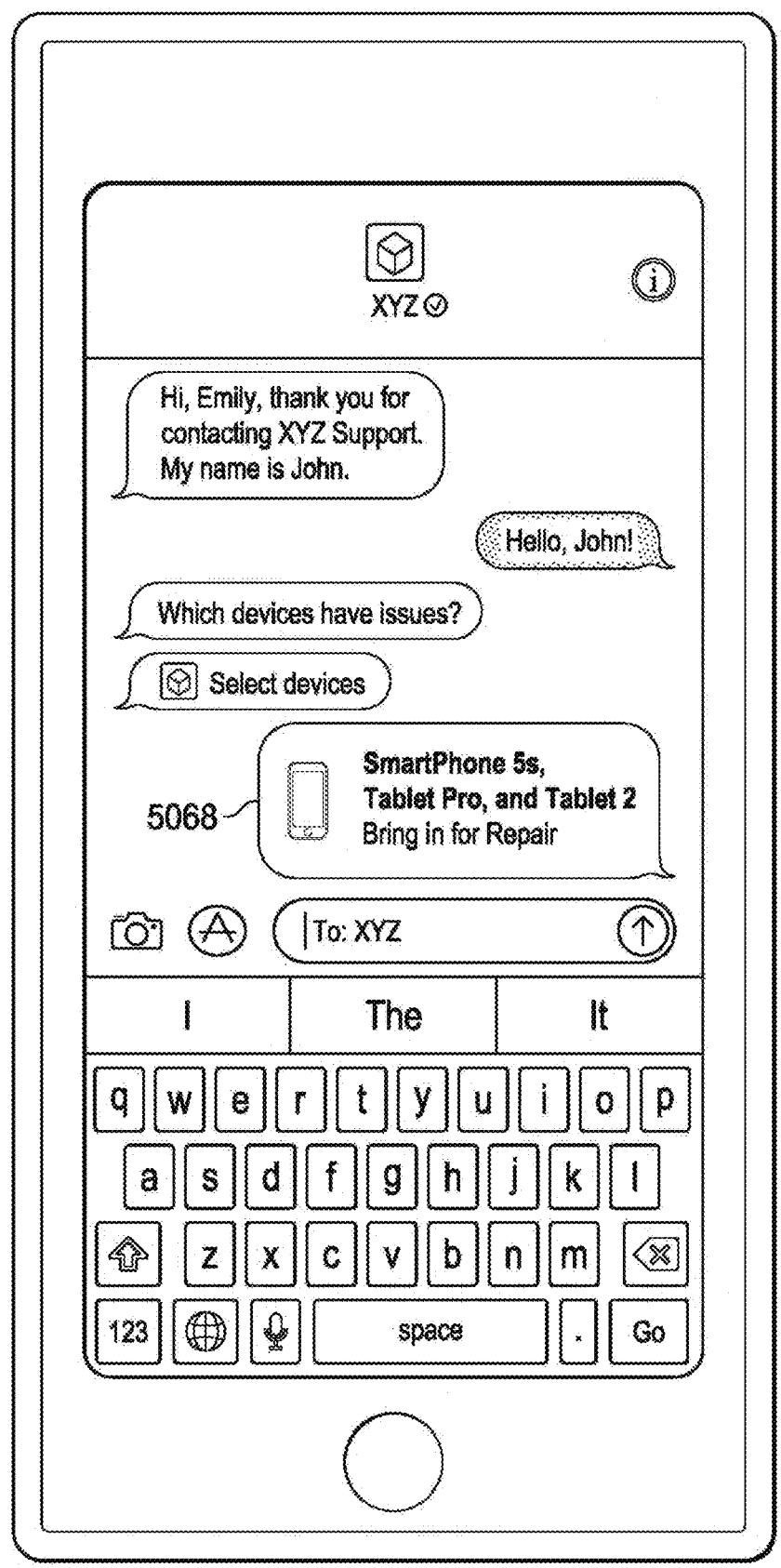

In some embodiments, the user has an option to make changes to a selected product affordance even after the product submission affordance 5068 has been transmitted to the business entity and send such changes to the business entity. As shown in FIG. 10H, product submission affordance 5068 is displayed in the conversation transcript. In one embodiment, the device, upon detecting a user interaction with product submission affordance 5068, re-overlays the messaging user interface with product selection user interface 5062. In one of such embodiments, the device generates at least one additional product affordance corresponding to at least one new product and displays the at least one new product affordance in product selection user interface 5062. The user interacts with product affordances displayed in product selection user interface 5062 to make new selections.

Although FIGS. 10A-10H illustrate performing a product selection task to select a product for repair, in some embodiments, one or more operations illustrated in FIGS. 10A-10H are performed to perform other tasks that involve selecting one or more items associated with the business entity. For example, FIGS. 10A-10H also illustrate similar processes to select one or more products for purchase, select one or more products for refurbishment, select one or more products for product return, as well as other tasks that involve selecting one or more products. In one embodiment, the illustrated product selection task may be used to select a particular product, determine whether the product is under warranty, obtain a return materials authorization, shipping information, and instructions for a product that is under warranty, and communicate to a business entity that the product is being returned.

Figure 10I:
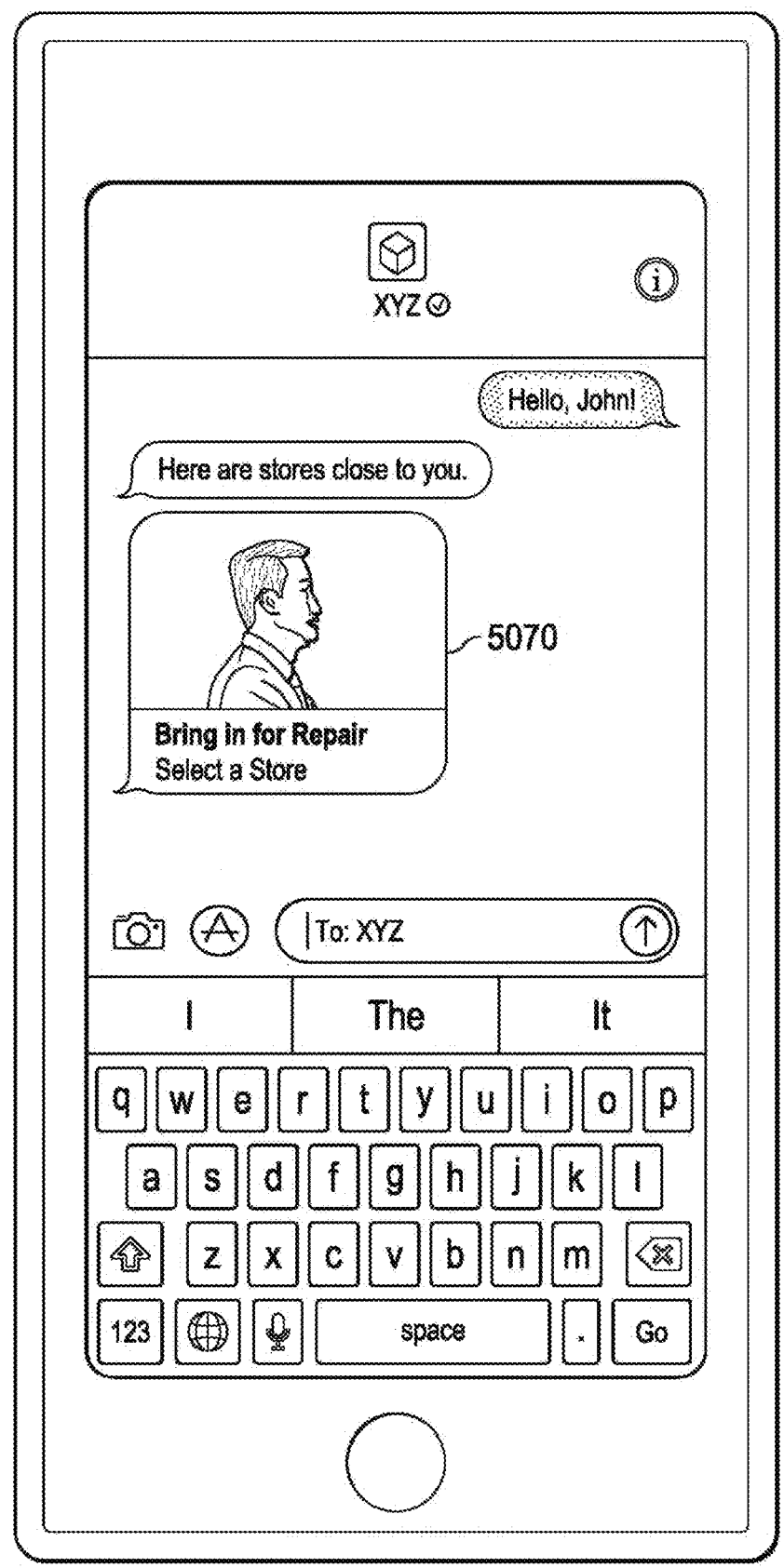

In some embodiments, the user selects a single item from a list of multiple items, such as a location from multiple locations of the business entity. In some embodiments, the device generates a location task affordance 5070 and displays location task affordance 5070 in the conversation transcript. Location task affordance 5070 is a type of task affordance that the user interacts with to initiate a task to select a location. As shown in FIG. 10I, a message region containing location task affordance 5070 is displayed in the conversation transcript.

In some embodiments, location task affordance 5070 is provided to the user in response to a user request to select a location of the business entity. In further embodiments, the device detects a request from the business entity to provide location task affordance 5070. In response to detecting the request, the device displays the location affordance in the conversation transcript. As defined herein, a location affordance is an affordance that is associated with a location of the business entity. The user interacts with the location affordance to select the location of the business entity. In further embodiments, the device analyzes content of the conversation transcript to determine whether location task affordance 5070 should be displayed.

Figure 10J:
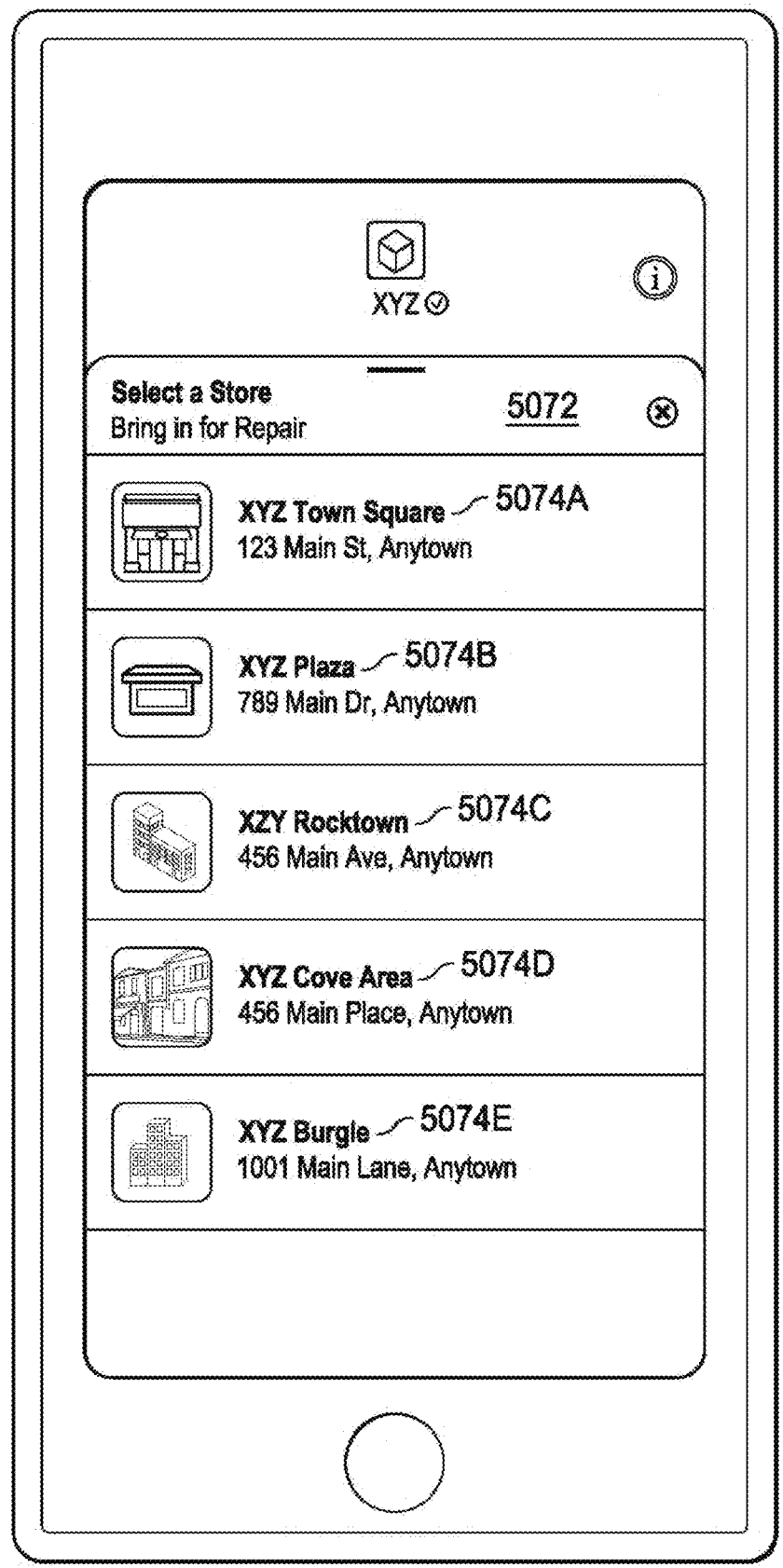

The user interacts with location task affordance 5070 by selecting location task affordance 5070, by tapping location task affordance 5070, by entering a command to select location task affordance 5070, or by performing a variety of other actions to indicate to the device that the user would like to select location task affordance 5070. As shown in FIG. 10J, the device, in response to detecting an interaction to select location task affordance 5070, overlays a portion of business messaging user interface 5032 with a business location user interface 5072. Business location user interface 5072 is a user interface with which the user interacts with to select a location from one or more available locations of the business entity. In some embodiments, the device generates location affordances corresponding to locations of the business entity within a geographic proximity of the device, and displays a list of the generated location affordances in business location user interface 5072.

Figure 10K:
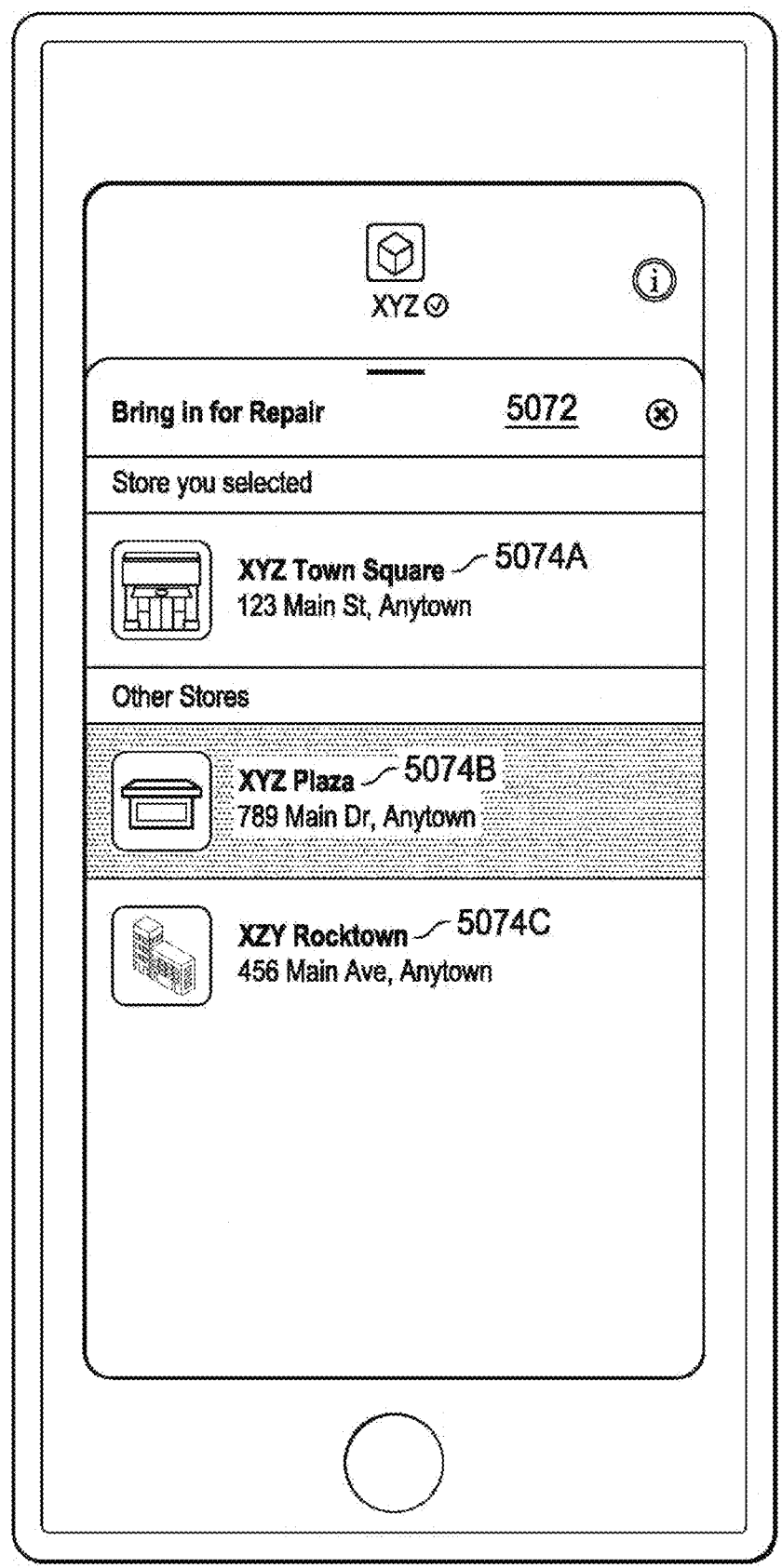
Figure 10L:
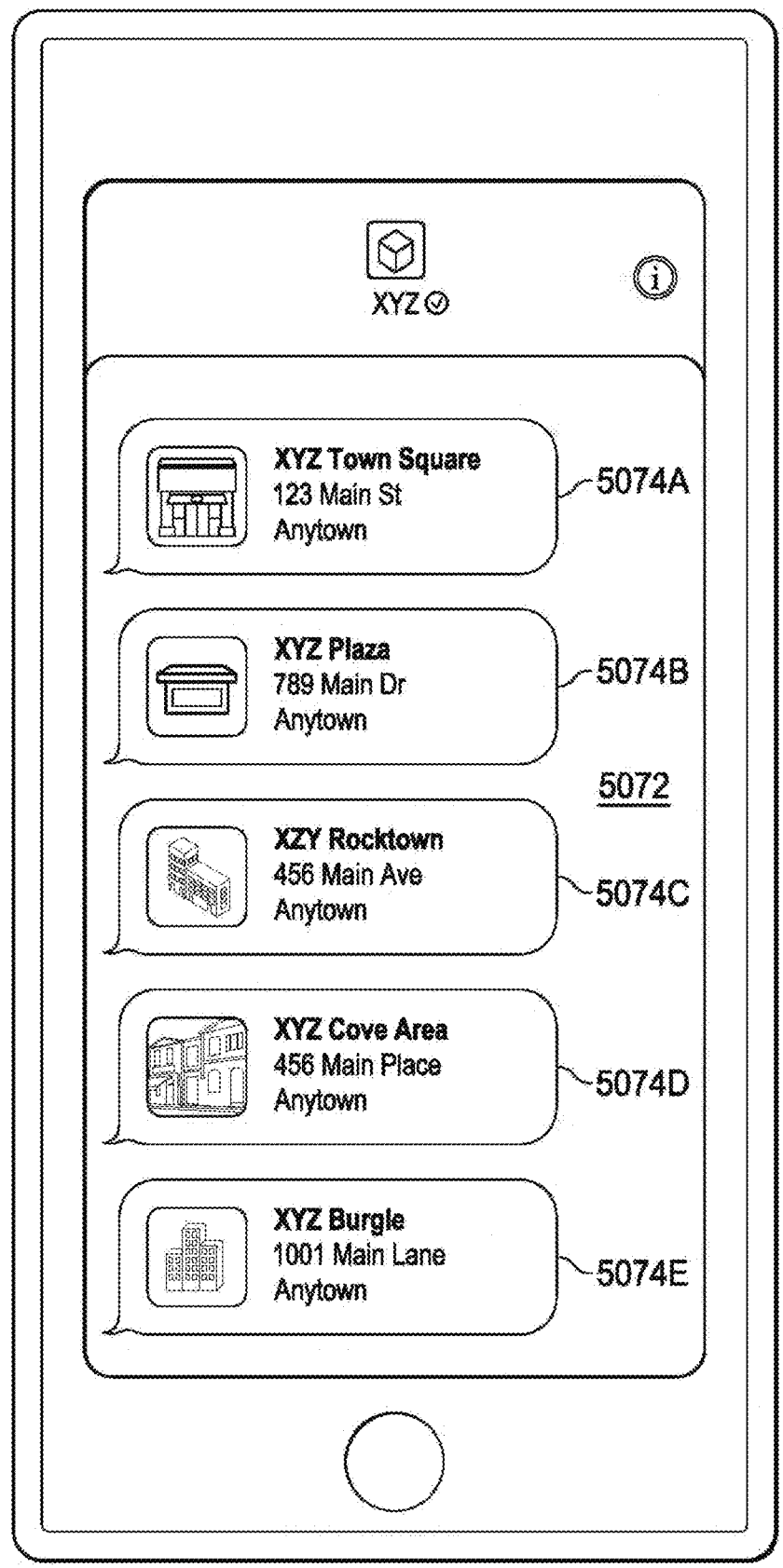

In the embodiment depicted in FIG. 10J, business location user interface 5072 overlays a portion of business messaging user interface 5032. In other embodiments, the amount of overlay is adjustable to allow the user to gain access to business messaging user interface 5032 to simultaneously read the conversation transcript between the user and the business entity and interact with business location user interface 5072. As shown in FIG. 10J, multiple locations of XYZ are displayed in business location user interface 5072. More particularly, five location affordances 5074A-5074E, each associated with a different location of XYZ, are displayed in the business location user interface 5072. In some embodiments, such as the embodiment shown in FIG. 10L, the device does not generate business location user interface 5072. As shown in FIG. 10L, the device displays five location affordances 5074A-5074E in message regions of the conversation transcript. The user interacts with any of the five location affordances 5074A-5074E displayed in business location user interface 5072, as shown in FIG. 10J, or displayed in the conversation transcript, as shown in FIG. 10L, to select a corresponding location associated with the respective location affordance. For example, if the user would like to select XYZ Town Square, then the users selects the location by selecting first location affordance 5074A.

In some embodiments, the device is operable to determine an approximate response time (to an initial message) of each location of the five locations and arrange (and periodically rearrange) the list of location affordances 5074A-5074E based on the approximate response times of the corresponding locations. In one of such embodiments, the approximate response times are also displayed in business location user interface 5072. In some embodiments, the device is operable to determine an approximate distance from the device to each of the five locations and arrange (and periodically rearrange) the list of location affordances 5074A-5074E based on the approximate distance from the device to the corresponding locations. In one of such embodiments, the approximate distances are also displayed in business location user interface 5072. In further embodiments, the device is operable to determine a rating associated with each of the five locations and arrange the list of location affordances 5074A-5074E based on a rating associated with the five locations. In one of such embodiments, an indication of the rating associated with the locations are also displayed in business location user interface 5072.

In the embodiment of FIG. 10J, the user interacts with any location affordance 5074A-5074E displayed in business location user interface 5072 to select a location. In some embodiments, as shown in FIG. 10K, location affordances 5074B and 5074C, which correspond to locations not selected by the user, are displayed in different colors to assist the user to identify the selected location affordance. In some embodiments, the user interacts with a confirmation affordance (not shown in FIG. 10K) to confirm the location selection.

In some embodiments, the device is operable to detect a user interaction to select a location affordance, such as first location affordance 5074A of FIGS. 10J-10L. In response to detecting the user interaction to select the location affordance, the device displays a location submission affordance, such as location submission affordance 5078 of FIG. 10M, to confirm the selection of first location affordance 5074A. The location submission affordance is an affordance that the user interacts with to make edits to at least one selected location affordance.

Figure 10M:
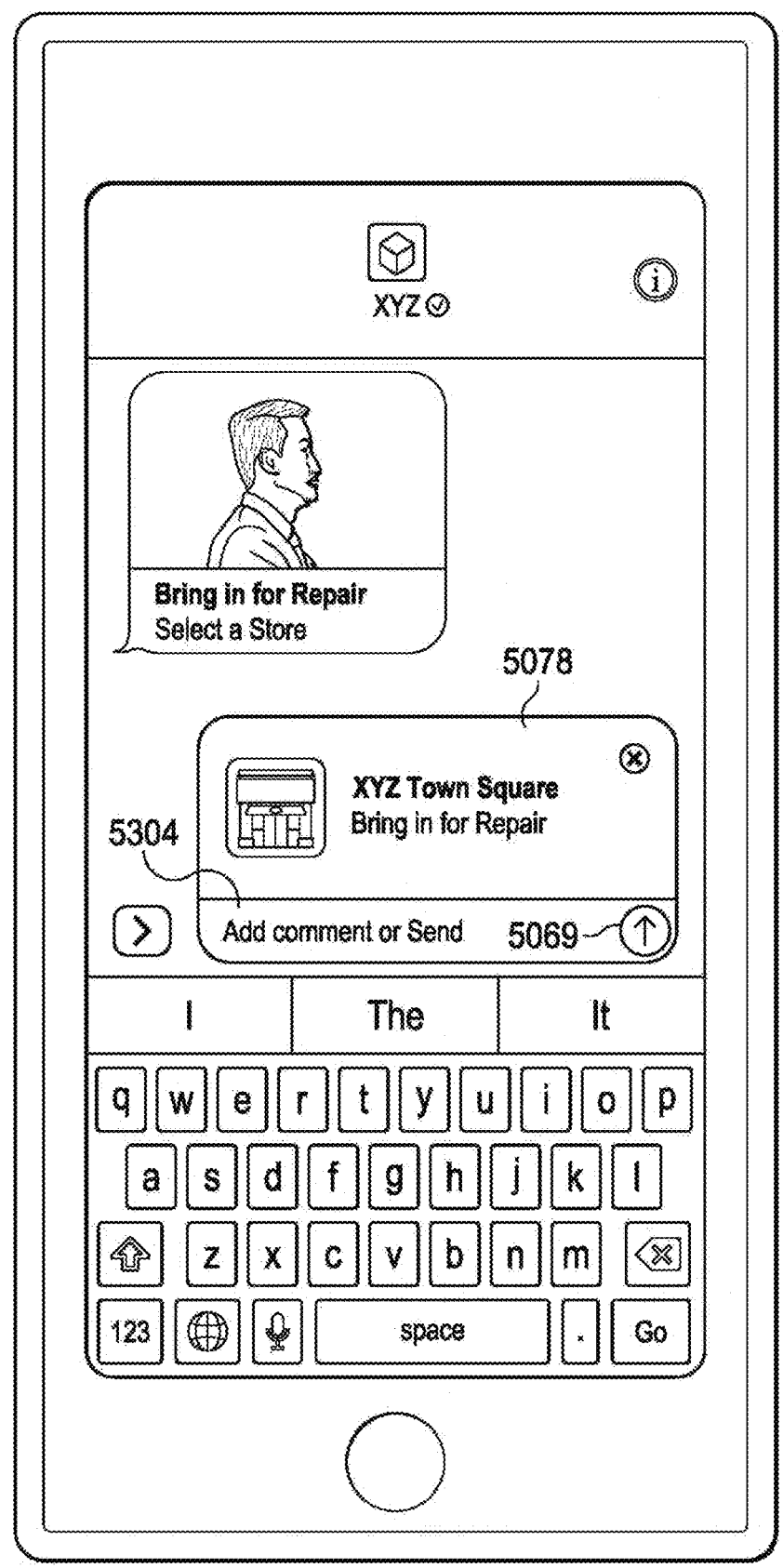

As shown in FIG. 10M, location submission affordance 5078 is displayed in a message input area 5304 of business messaging user interface 5032. The user makes changes to the previously selected location by interacting with location submission affordance 5078 displayed in message input area 5304 of business messaging user interface 5032. Alternatively, if the user is content with location submission affordance 5078, then the user interacts with send affordance 5069. The device, upon determining the user's interaction with send affordance 5069, displays location submission affordance 5078 in a message region of the conversation transcript and transmits an indication of the selected location to the business entity.

Figure 10N:
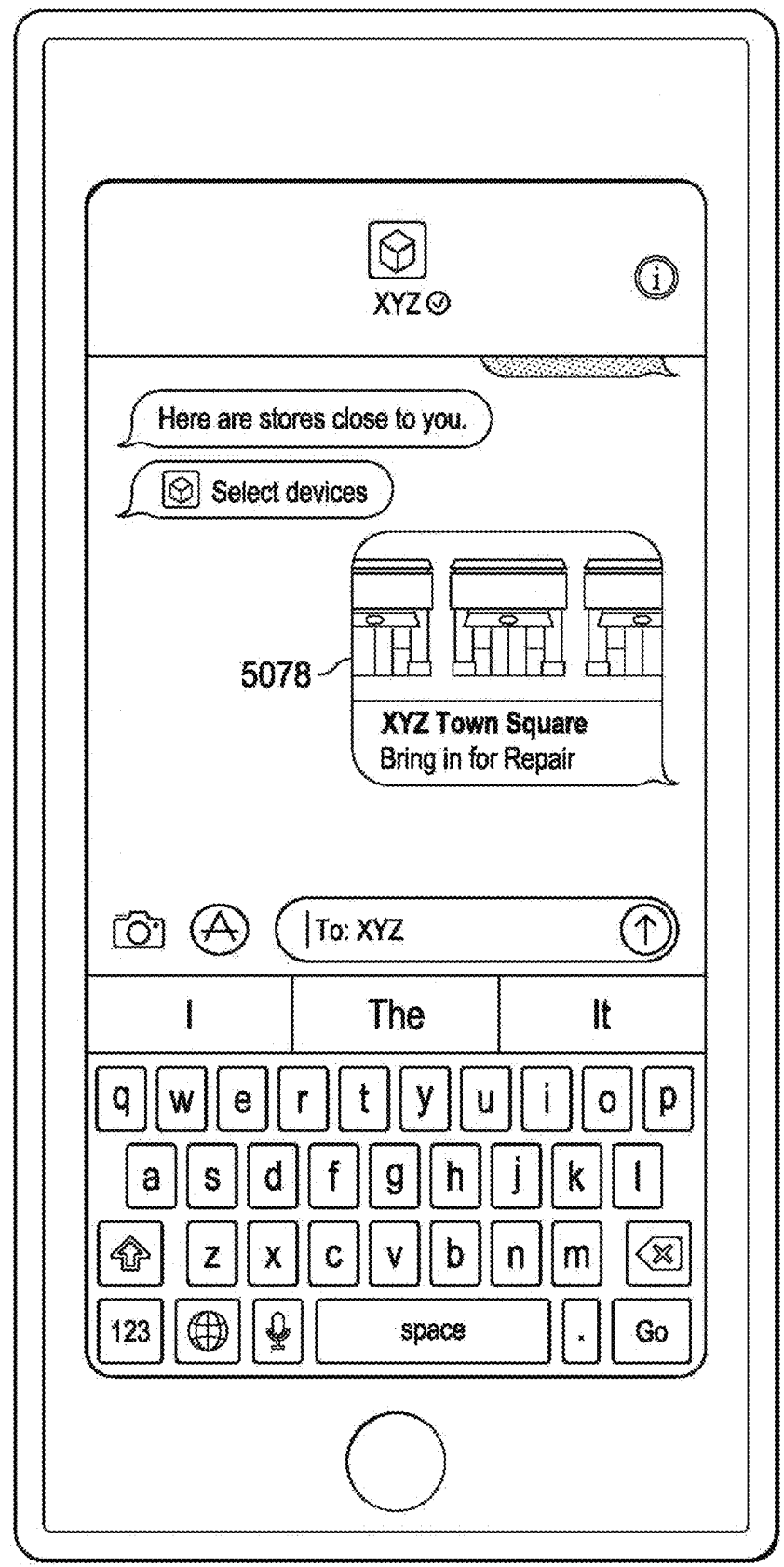

As shown in FIG. 10N, location submission affordance 5078 is displayed in the conversation transcript of business messaging user interface 5032. The user makes subsequent changes to the previously selected location by interacting with location submission affordance 5078. In some embodiments, the device, upon detecting the user's interaction with location submission affordance 5078, re-overlays business location user interface 5072 on business messaging user interface 5032. In other embodiments, where business location user interface 5072 does not overlay a portion of business messaging user interface 5032 (such as in FIG. 10L), the device, upon detecting the user's interaction to change the previously selected location, redisplays one or more message regions containing location affordances associated with the locations of the business entity. The user interacts with the location affordances displayed in business location user interface 5072 or in the conversation transcript to re-select a location of the business entity and to confirm the new selection. Location submission affordance 5078 is updated upon confirmation of the user's new selection and the updated location submission affordance 5078 is displayed in the conversation transcript. In some embodiments, the device is further operable to transmit an indication that the location selected by the user has been updated and also transmit an indication of the updated location to the business entity. In further embodiments, the device is further operable to transmit location submission affordance 5078 to the business entity. Although FIGS. 10I-10N illustrate performing a location selection task to select a location of the business entity, the device is operable to perform one or more operations illustrated in FIGS. 10I-10N to make other selections.

Figure 10O:
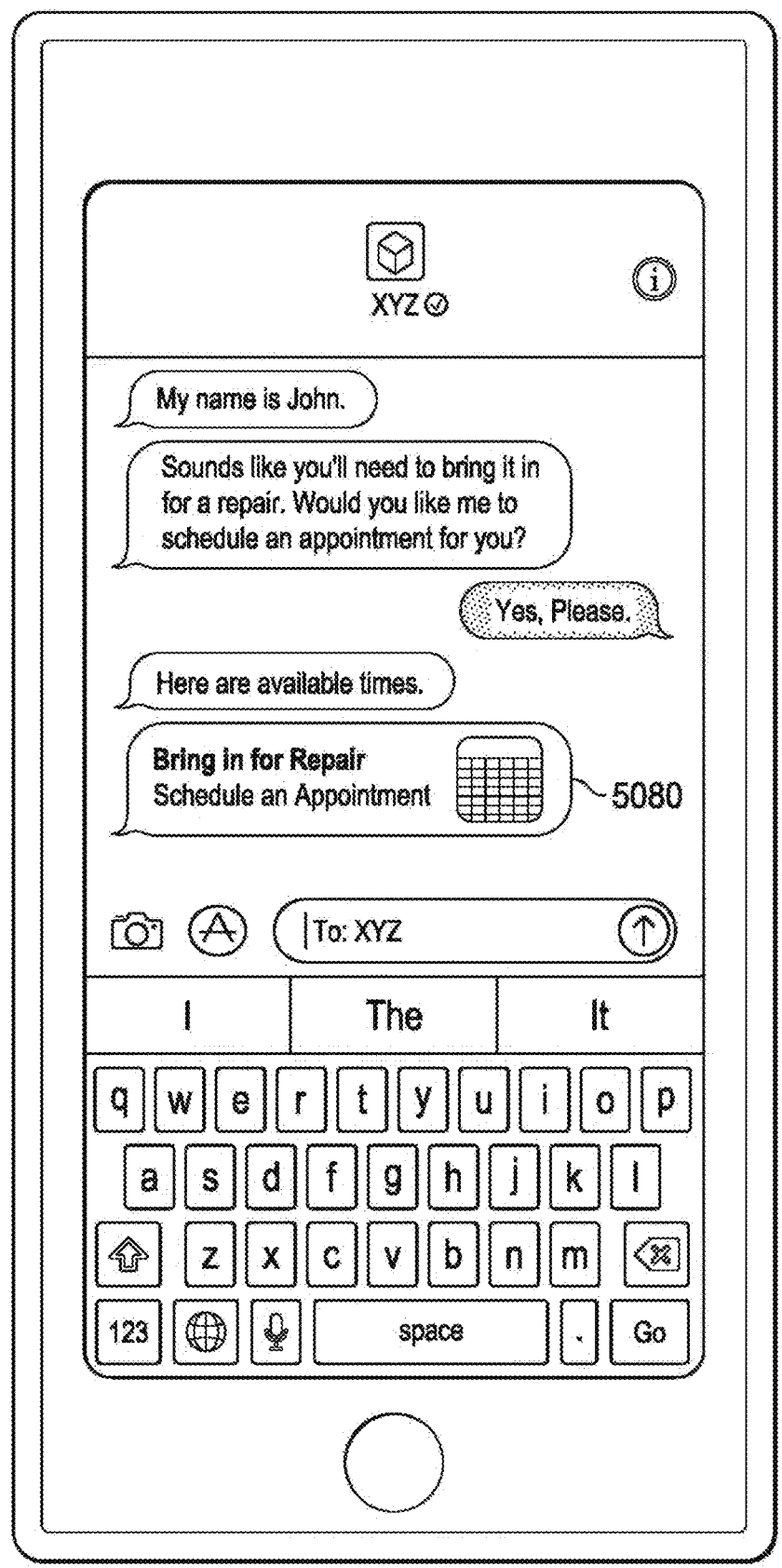
Figure 10P:
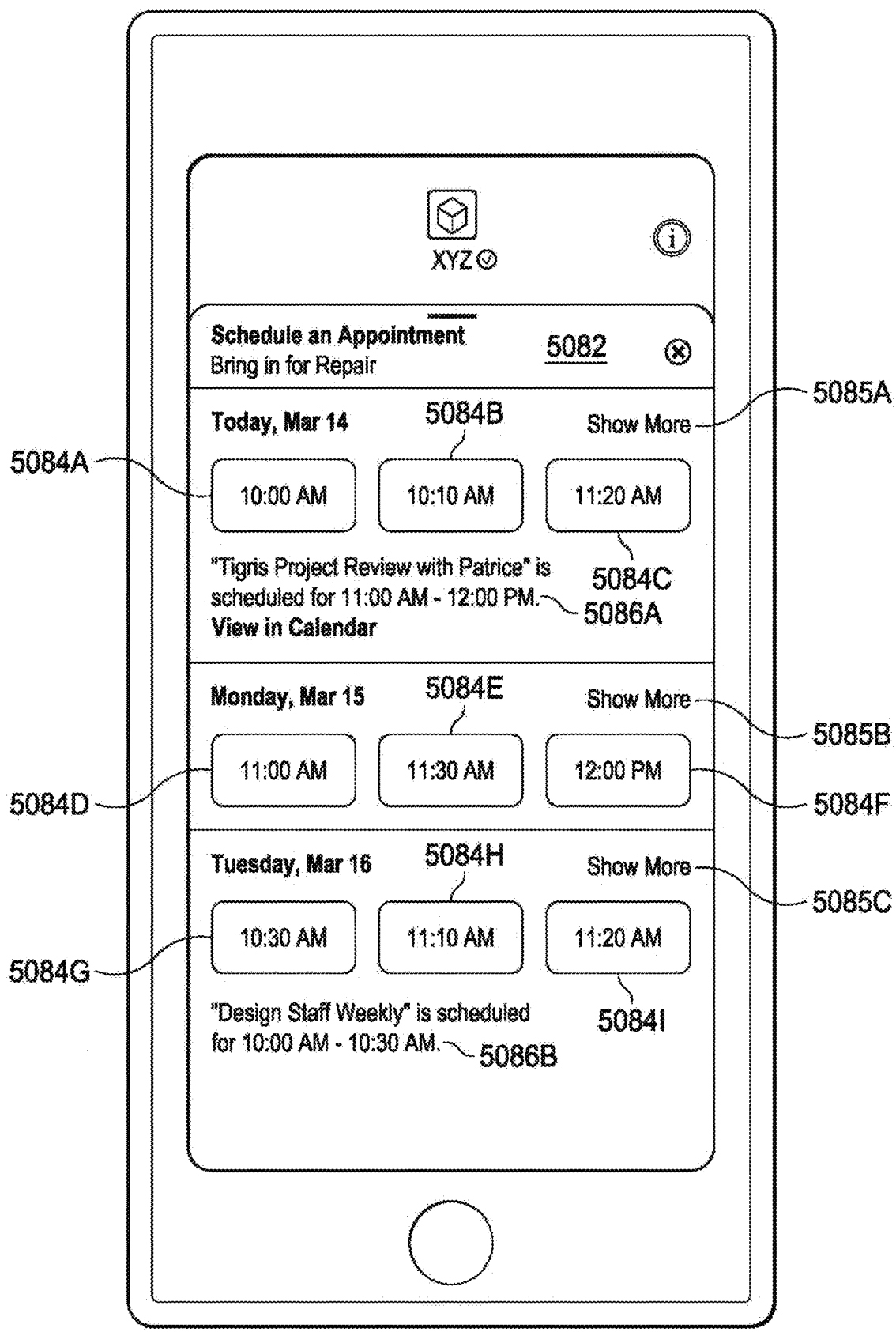

In some embodiments, the user schedules an appointment with a business entity, such as XYZ through business messaging user interface 5032. As shown in FIG. 10O, a calendar affordance 5080 is displayed in business messaging user interface 5032. A calendar affordance is a type of task affordance that the user interacts with to initiate a task to select an appointment time with the business entity. The user interacts with calendar affordance 5080 to schedule an appointment with XYZ. The device, in response to detecting the interaction, overlays a portion of business messaging user interface 5032 with a calendar user interface. A calendar user interface is a user interface that the user interacts with to select one or more appointment times. As shown in FIG. 10P, calendar user interface 5082 includes multiple appointment time affordances 5084A-5084I, each corresponding to an available time that the user selects to make an appointment with XYZ. As defined herein, an appointment time affordance is an affordance that is associated with an available appointment time. The user interacts with the appointment time affordance to select the available appointment time. Calendar user interface 5082 optionally also includes a show more appointment time affordance, such as show more time affordance 5085A. A show more appointment time affordance is an affordance that the user interacts with to obtain additional appointment time affordances. Additional details of show more appointment time affordances are provided in the paragraphs below and are illustrated in at least FIGS. 10Q and 10R.

In some embodiments, the device is operable to determine a schedule of the user and provide an indication of the user's schedule in calendar user interface 5082. As shown in FIG. 10P, descriptions of the user's events 5086A-5086B are provided in calendar user interface 5082 along with appointment time affordances 5084A-5084I. In one of such embodiments, the device is operable to access the user's information stored on the device, such as the user's calendar, to determine the user's schedule and to provide descriptions of the user's schedule in calendar user interface 5082. In another one of such embodiments, the device is operable to determine the schedule of the user, determine a suggested time to schedule an appointment with the business entity, and display a description of the schedule of the user in calendar user interface 5082. In another one of such embodiments, the device is operable to determine a travel time (which varies based on distance, traffic, and travel conditions) to the business entity, and to suggest a time to schedule the appointment with the business entity based on the travel time.

Figure 10Q:
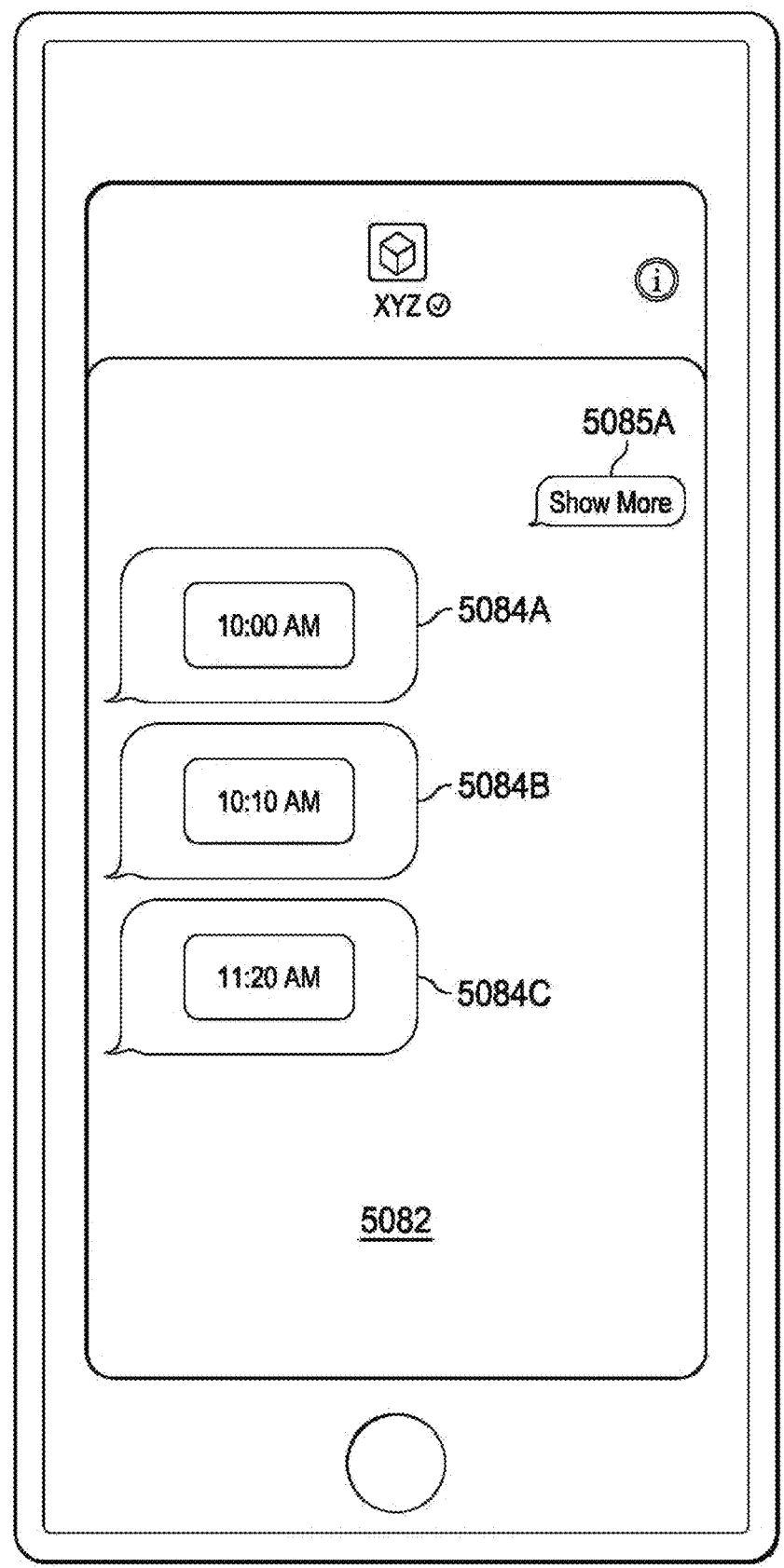
Figure 10R:
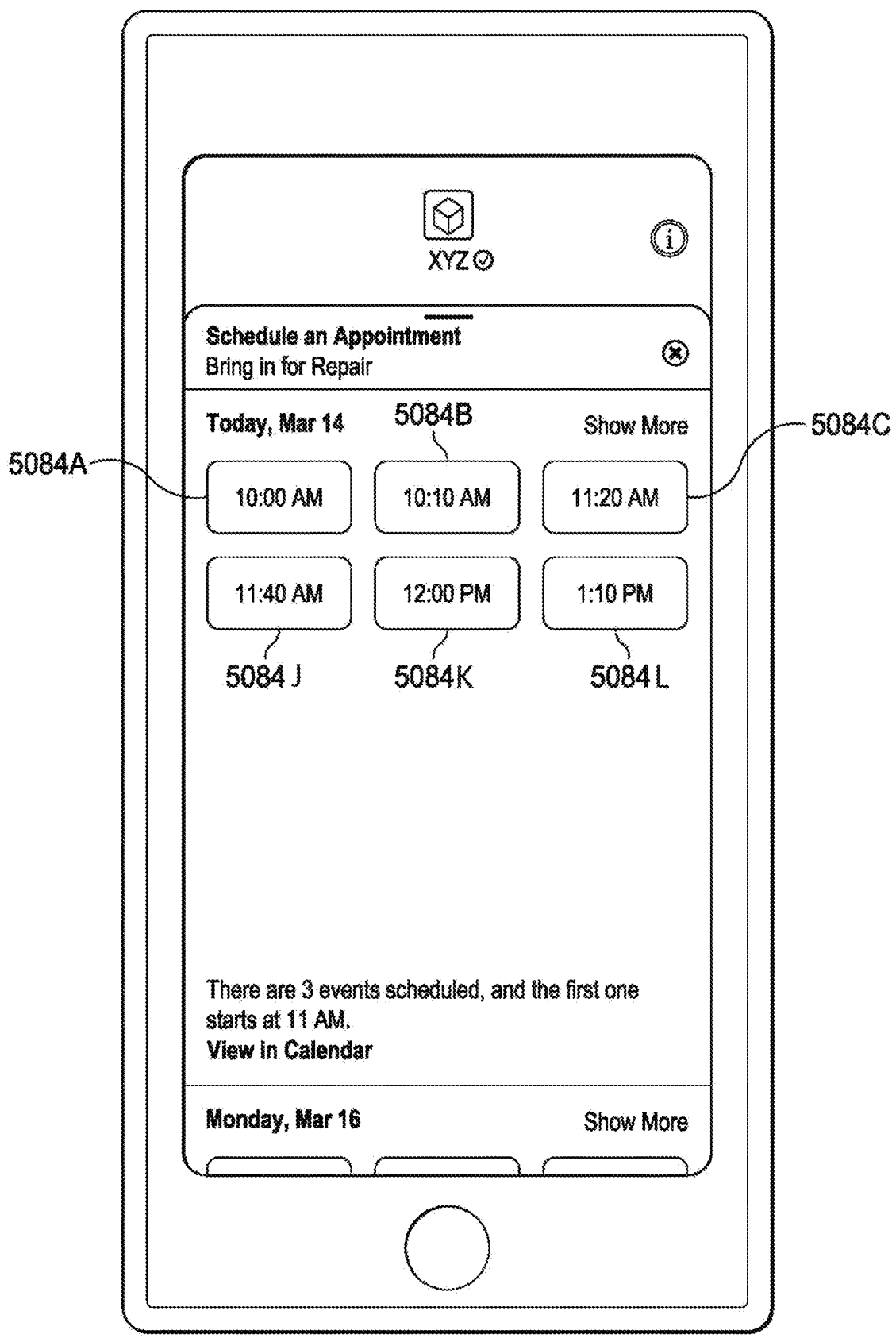

As shown in FIG. 10R, a show more appointment time user interface overlays a portion of calendar user interface 5082. The show more appointment time user interface provides additional appointment affordances associated with additional times that the user has an option to select to make an appointment with the business entity. In the depicted embodiments, appointment time affordances 5084J-5084L correspond to additional appointment times not displayed in calendar user interface 5082. In some embodiments, the show more appointment time user interface overlays a portion of calendar user interface 5082. In other embodiments, the show more appointment time user interface replaces calendar user interface 5082 temporarily while the user is selecting an additional time affordance. The user closes out the show more appointment time user interface to view calendar user interface 5082. In another embodiment, the selection of one of appointment time affordances 5084J-5084L automatically closes the show more appointment time user interface.

In some embodiments, the device, upon detecting the user's interaction with calendar affordance 5080, does not generate a calendar user interface 5082. Instead, as shown in FIG. 10Q, appointment time affordances 5084A-5084C and a first show more appointment time affordance 5085A are displayed in message regions of the conversation transcript. In such embodiments, the user interacts with the appointment time affordances displayed in the message regions of the conversation transcript to perform operations described herein to schedule an appointment.

In some embodiments, the device performs operations similar to the operations described in the above paragraphs and illustrated in FIGS. 10G and 10H to generate an appointment time submission affordance and to display the appointment time submission affordance in the message input area of business messaging user interface 5032. As defined herein, the appointment time submission affordance is an affordance that the user interacts with to make edits to a selected appointment time. The user has an option to change the appointment time while the appointment time submission affordance is displayed in the message input area of business messaging user interface 5032. In such embodiments, the user makes changes to the selected appointment time or accepts the selected appointment time. The device, upon determining that the user has accepted the selected appointment time, displays the appointment time submission affordance in the conversation transcript and transmits an indication of the selected appointment time to the business entity.

Figure 10S:
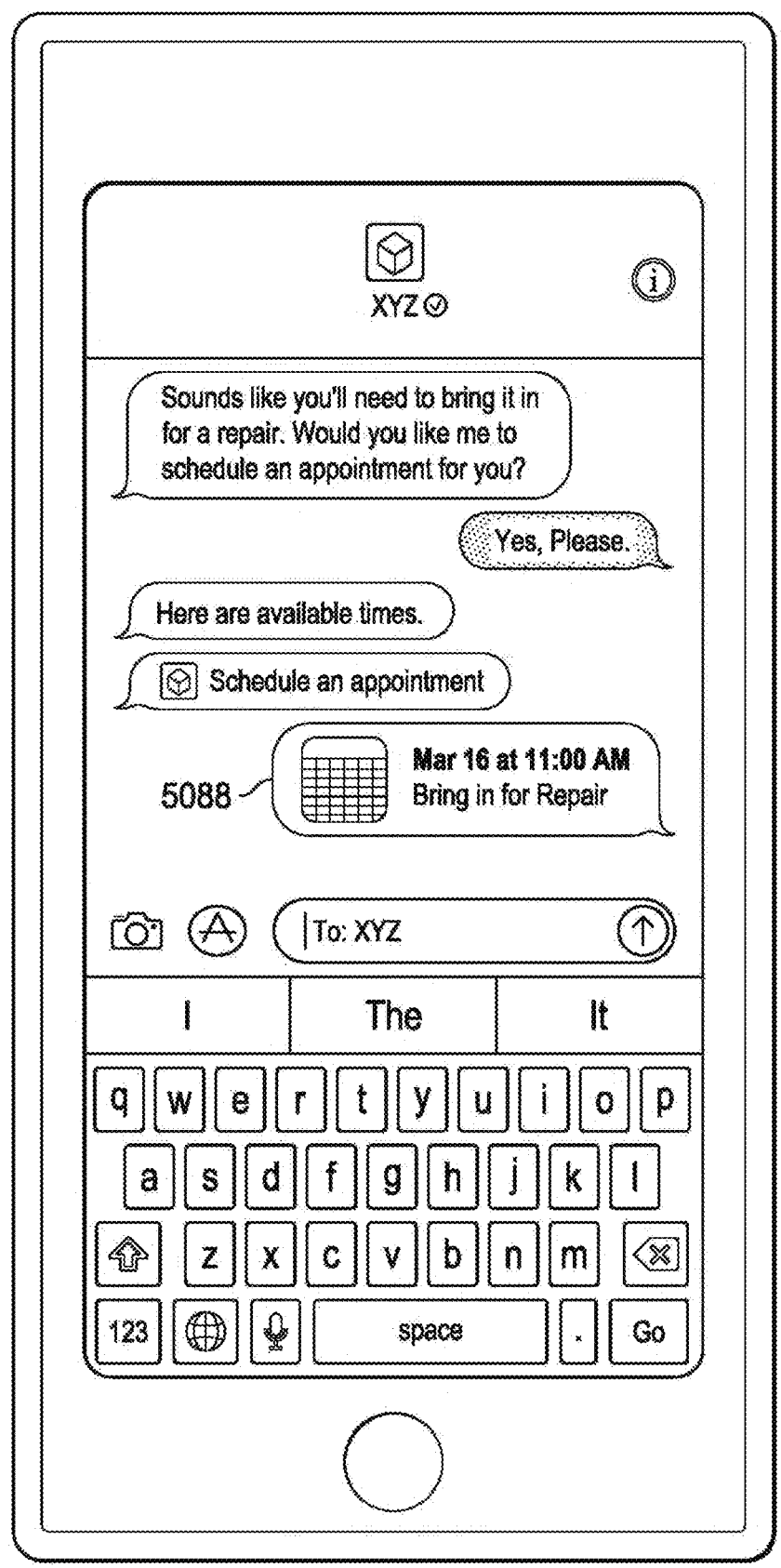

As shown in FIG. 10S, appointment time submission affordance 5088 is displayed in the conversation transcript. In some embodiments, the user has an option to make further changes to the appointment time even after an indication of the appointment time has been transmitted to the business entity. In one of such embodiments, the user interacts with appointment time submission affordance 5088 in the conversation transcript to change the previously scheduled appointment.

Figure 10T:
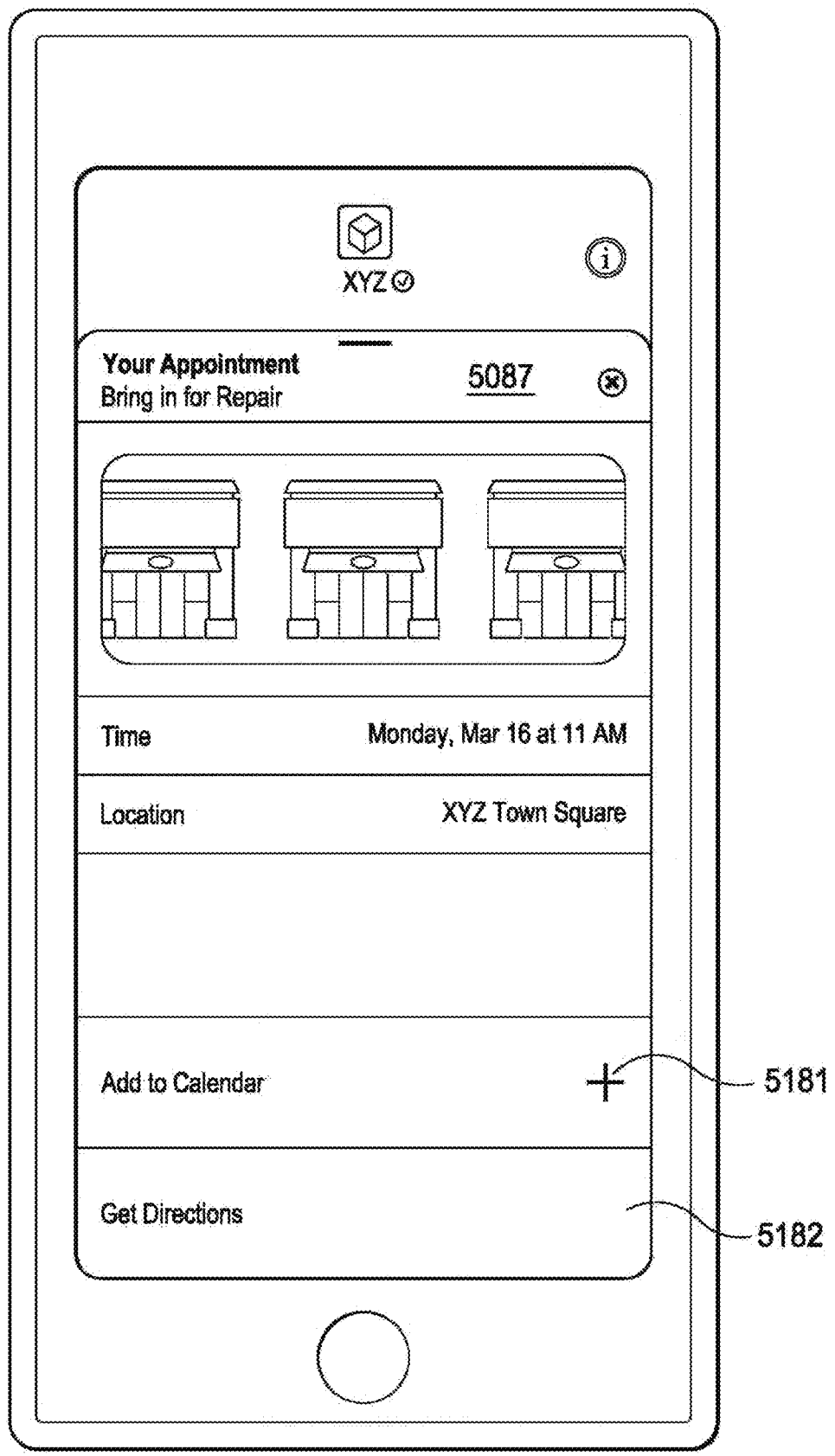

As shown in FIG. 10T, the device, upon detecting a user interaction with appointment time submission affordance 5088 displayed in the conversation transcript, generates an appointment time user interface 5087 and overlays the business messaging user interface with appointment time user interface 5087. Appointment time user interface 5087 is a user interface the user interacts with to make changes to a previously scheduled appointment. Appointment time user interface 5087 provides the previously selected appointment time, location, and affordances, which the user interacts with to make further edits to the user's appointment. Appointment time user interface 5087 includes an "add to calendar" affordance 5181, which is an affordance that the user interacts with to add the rescheduled appointment time to the user's calendar. Appointment time user interface 5087 also includes a directions affordance 5182, which is an affordance the user interacts with to obtain directions (such as in a maps user interface as described herein) to the business entity.

Figure 10U:
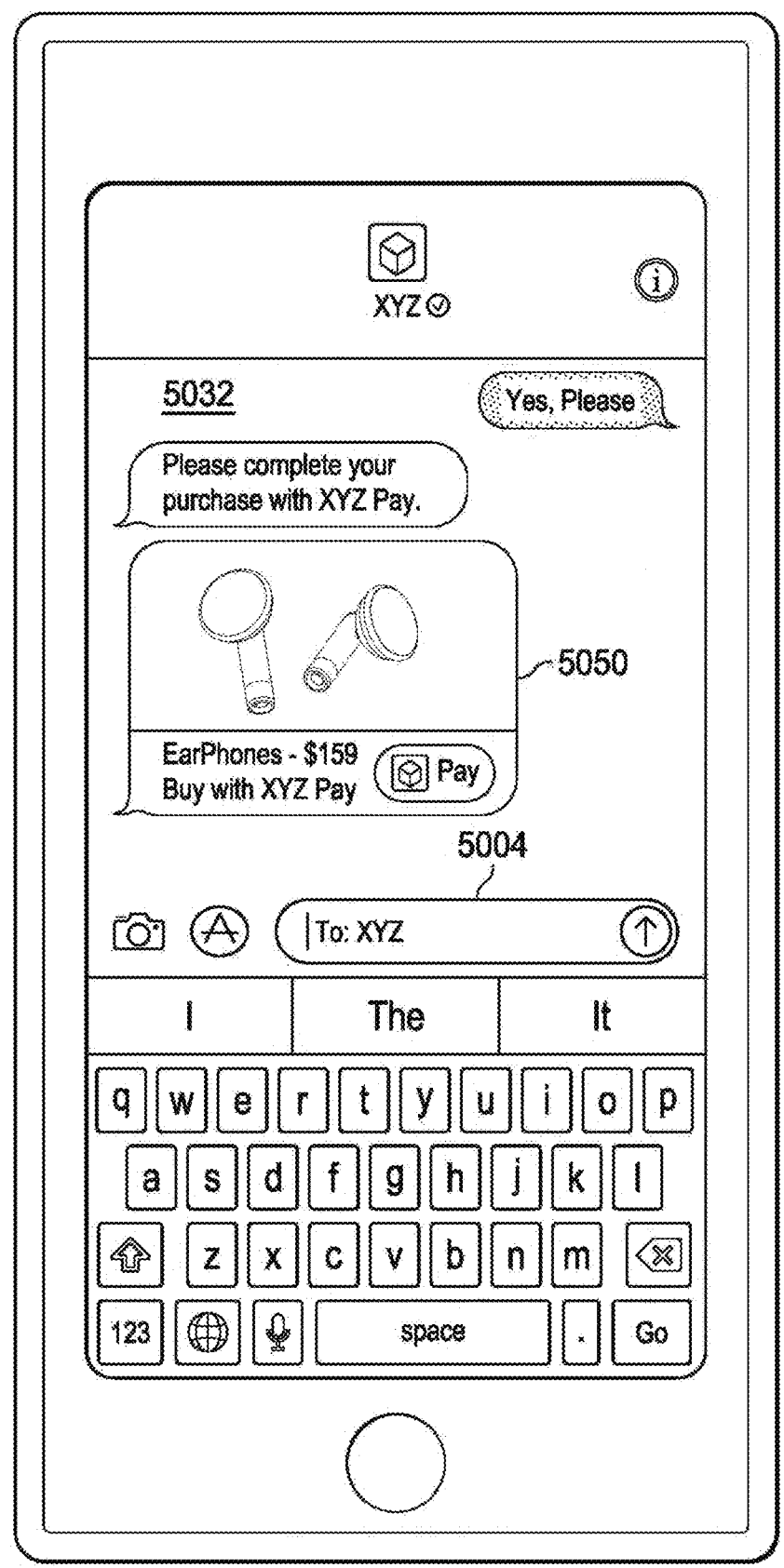

In some embodiments, the device has authorization from the user to make payments to the business entity. As shown in FIG. 10U, an account management affordance 5050 is displayed in business messaging user interface 5032. An account management affordance is a type of task affordance that the user interacts with to initiate account management and product payment tasks. The user interacts with account management affordance 5050 by performing a variety of actions described herein. The device, in response to the detecting a user interaction with account management affordance 5050, overlays a portion of business messaging user interface 5032 with an account management user interface 5052. An account management user interface is a user interface that the user interacts with to manage the user's account and to make payments for products.

Figure 10V:

FIG. 10V illustrates an example of an account management user interface 5052 containing the user's payment information. The user enters additional information related to the account management, such as making a payment through account management user interface 5052. In some embodiments, the device is operable to retrieve stored information and to auto-populate the payment information. In some embodiments, once the user confirms that the account information of the user has been successfully entered, the account management submission affordance is displayed in the conversation transcript. In some embodiments, the device is operable to perform facial recognition, speech recognition, personal signature recognition, as well as other operations to authenticate and confirm the identification of the user before the payment information is submitted to the business entity.

Figure 10W:
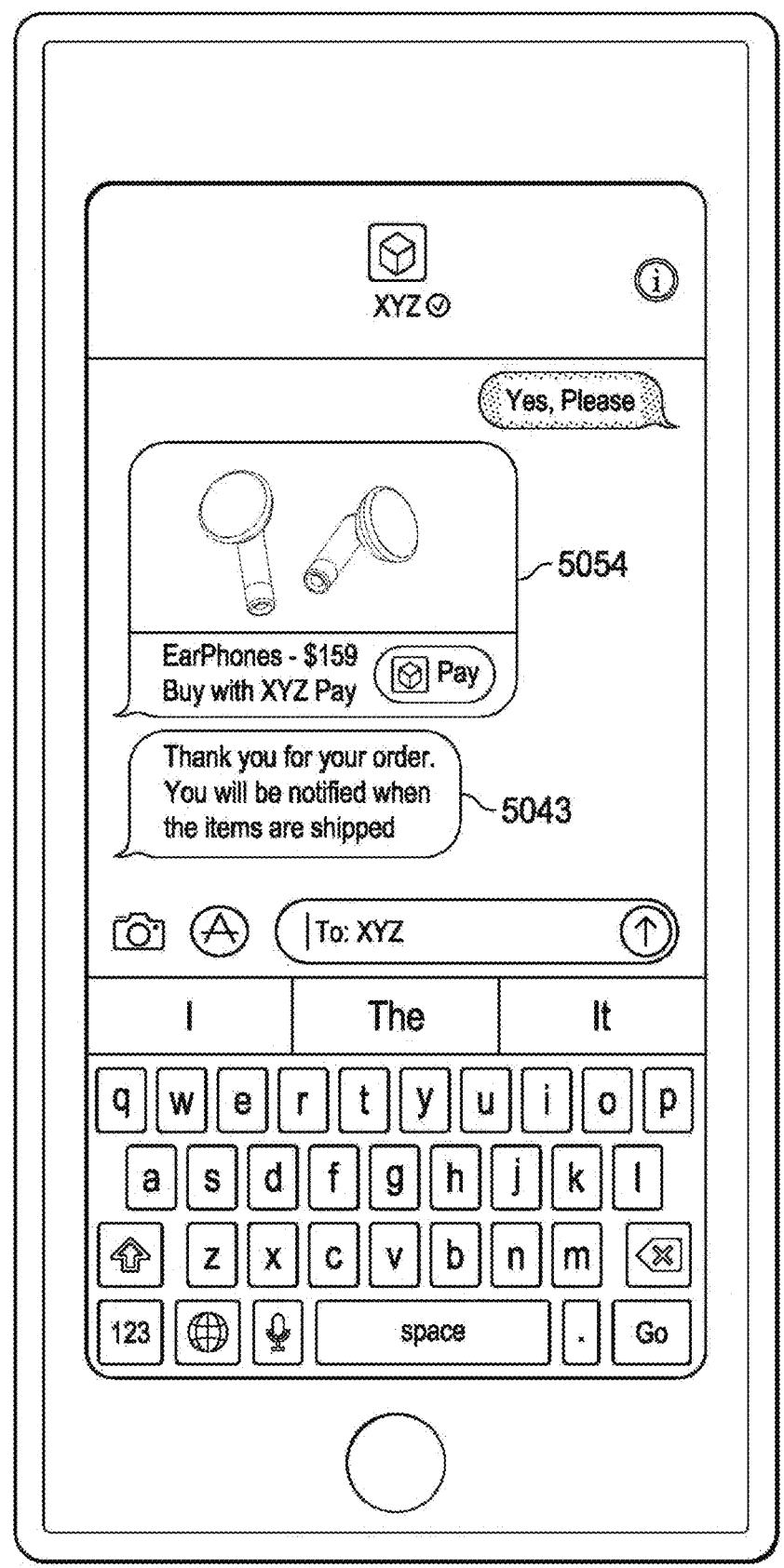

As shown in FIG. 10W, an account management submission affordance 5054 is displayed in a message region of the conversation transcript. As defined herein, an account management submission affordance is an affordance that the user interacts with to make edits to account management and payment information. In one embodiment, account management submission affordance 5054 provides a description of the payment made by the user. In some embodiments, the user accesses the user's account by selecting account management submission affordance 5054. Although FIG. 10A-10W describe performing product selection, location selection, appointment time selection, and account management operations, additional operations are performed through business messaging user interface 5032. Moreover, the device is operable to perform the operations described herein as well as the additional operations in any order.

In some embodiments, the device is operable to determine the content of the conversation transcript and to determine a proposed task based on the content of the conversation transcript. For example, in one embodiment the device analyzes a message transmitted from the user inquiring about the nearest repair center of the business entity, determines that the user wishes to select a location of the business entity, and displays a location task affordance in the conversation transcript. In other embodiments, the device is operable to propose a new task based on a completed task by providing a task affordance for the new task for display in the conversation transcript. In one of such embodiments, the device, upon detecting a product location submission affordance in the conversation transcript and determining that the user has not yet indicated a time to visit the business entity, generates a calendar affordance and displays the calendar affordance in business messaging user interface 5032.

Figure 10X:

In some embodiments, the device displays a task selection user interface 5111 in business messaging user interface 5032 in response to initiating a messaging session between the user and the business entity. As shown in FIG. 10X, task selection user interface 5111 includes several task affordances for the user to select from to initiate a task with the business entity. As shown in FIG. 10X, task affordances include an account management affordance 5102, a product billing affordance 5104, a product support affordance 5106, and an "Others" affordance 5108. As defined herein, an account management affordance is an affordance that the user interacts with to access account management information. Further, a product billing affordance is an affordance that the user interacts with to obtain billing related assistance. Further, a product support affordance is an affordance that the user interacts with to obtain product support. In other embodiments, additional task affordances are displayed in task selection user interface 5111 before the user engages with a representative of the business entity to narrow the scope of the user's assistance and to transfer the user to a representative capable of providing the user with specialized assistance.

Figure 10Y:
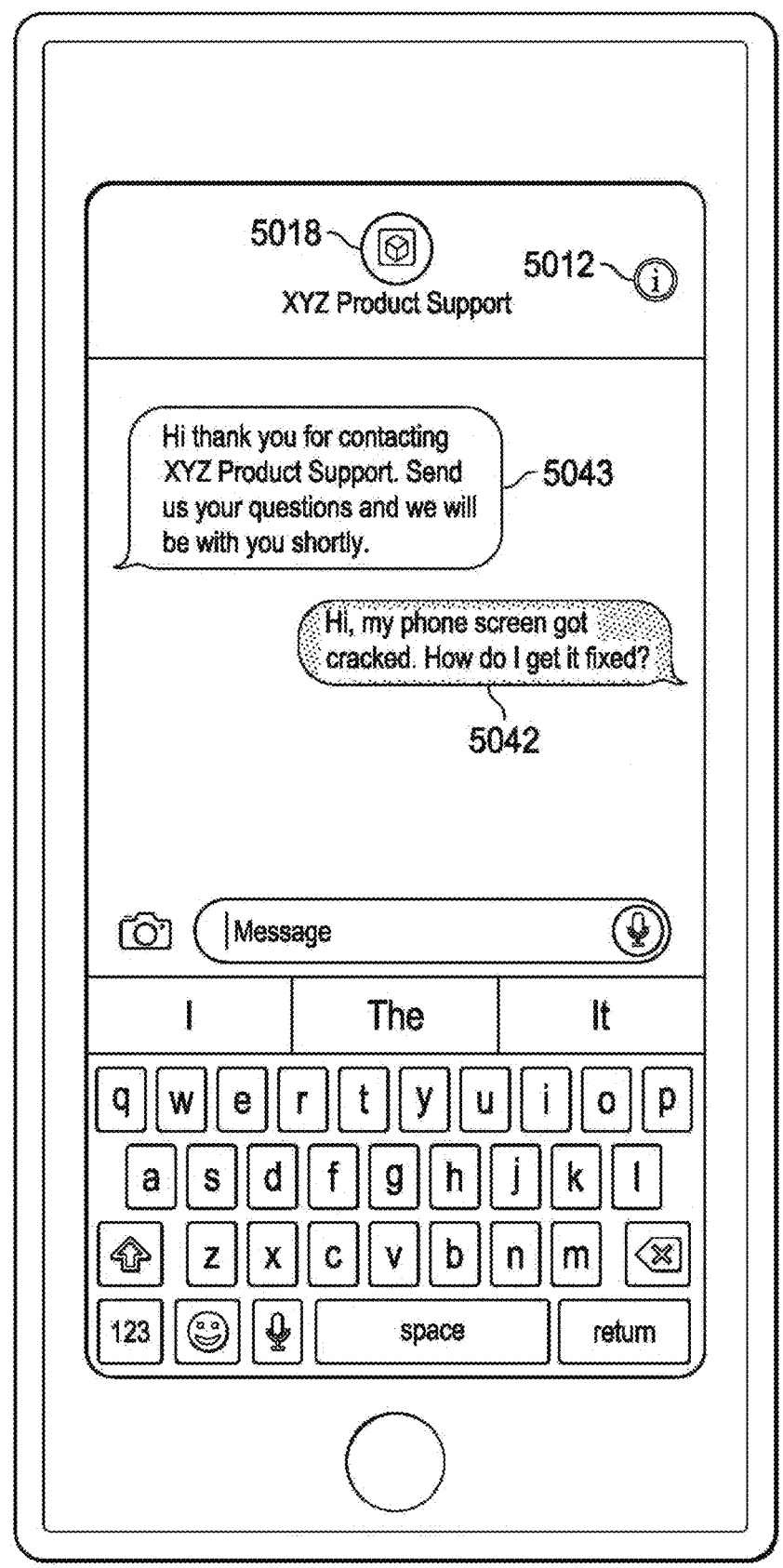
Figure 10Z:
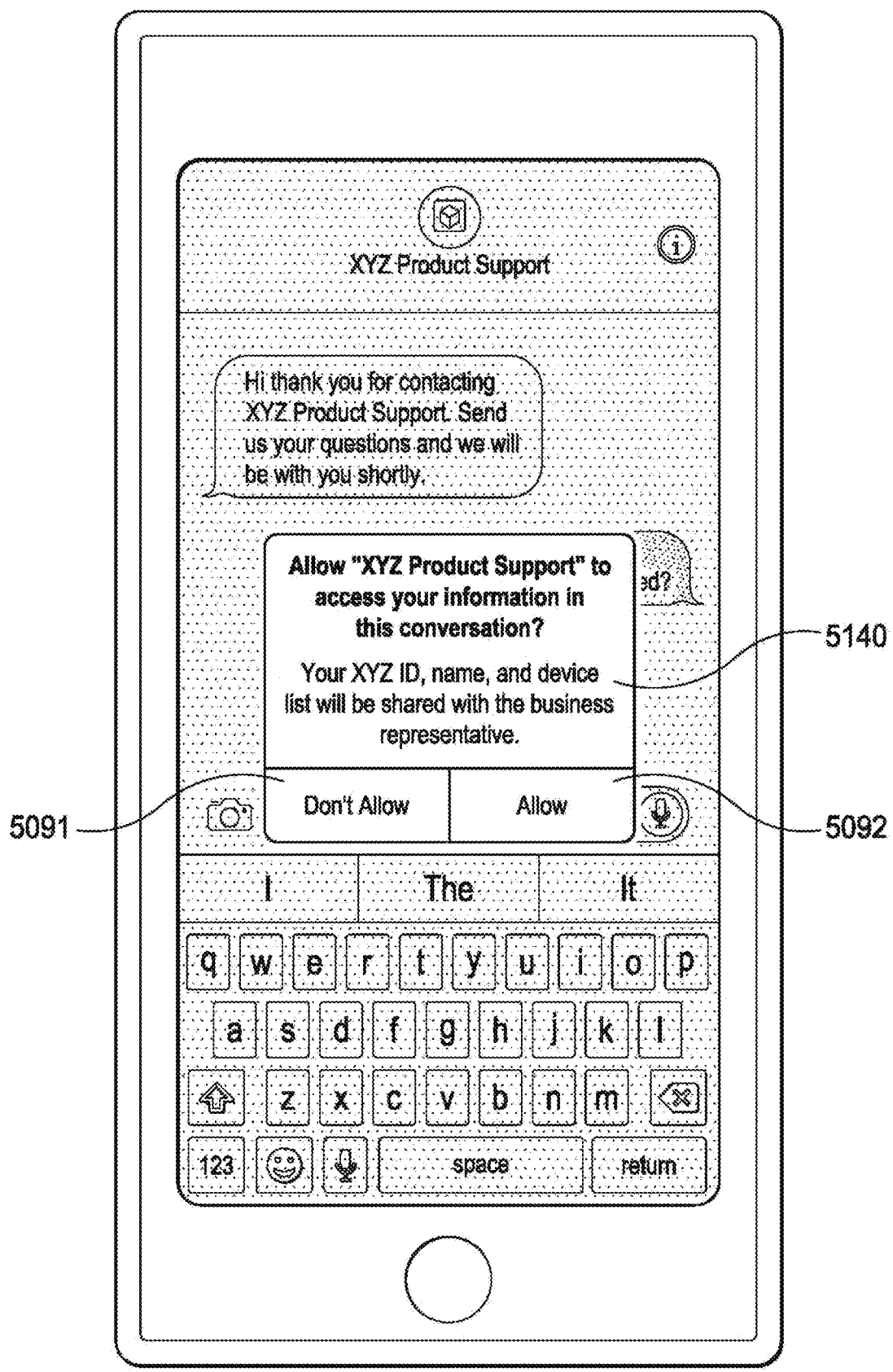
Figure 10A:
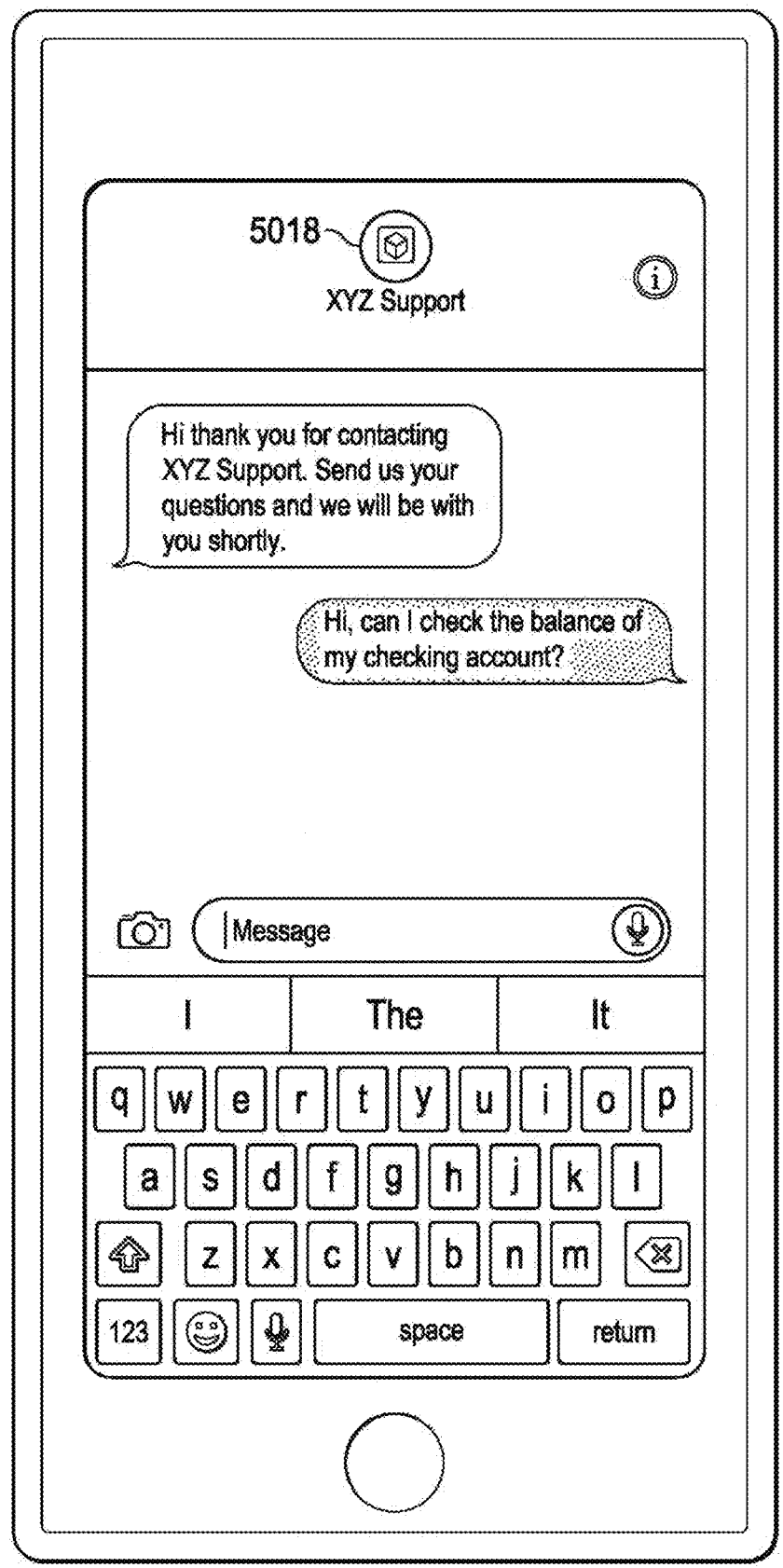
Figure 10A:
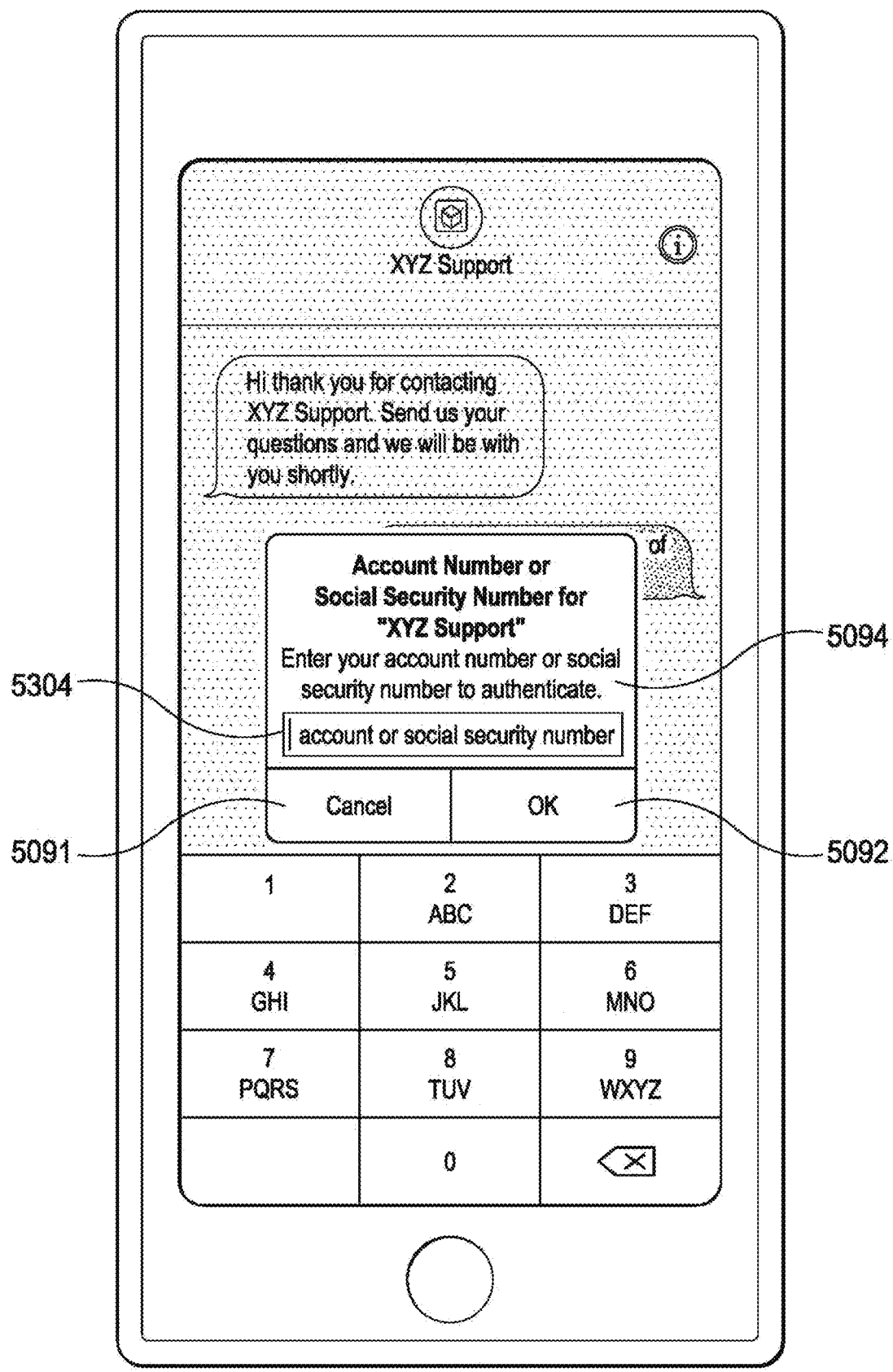
Figure 10A:
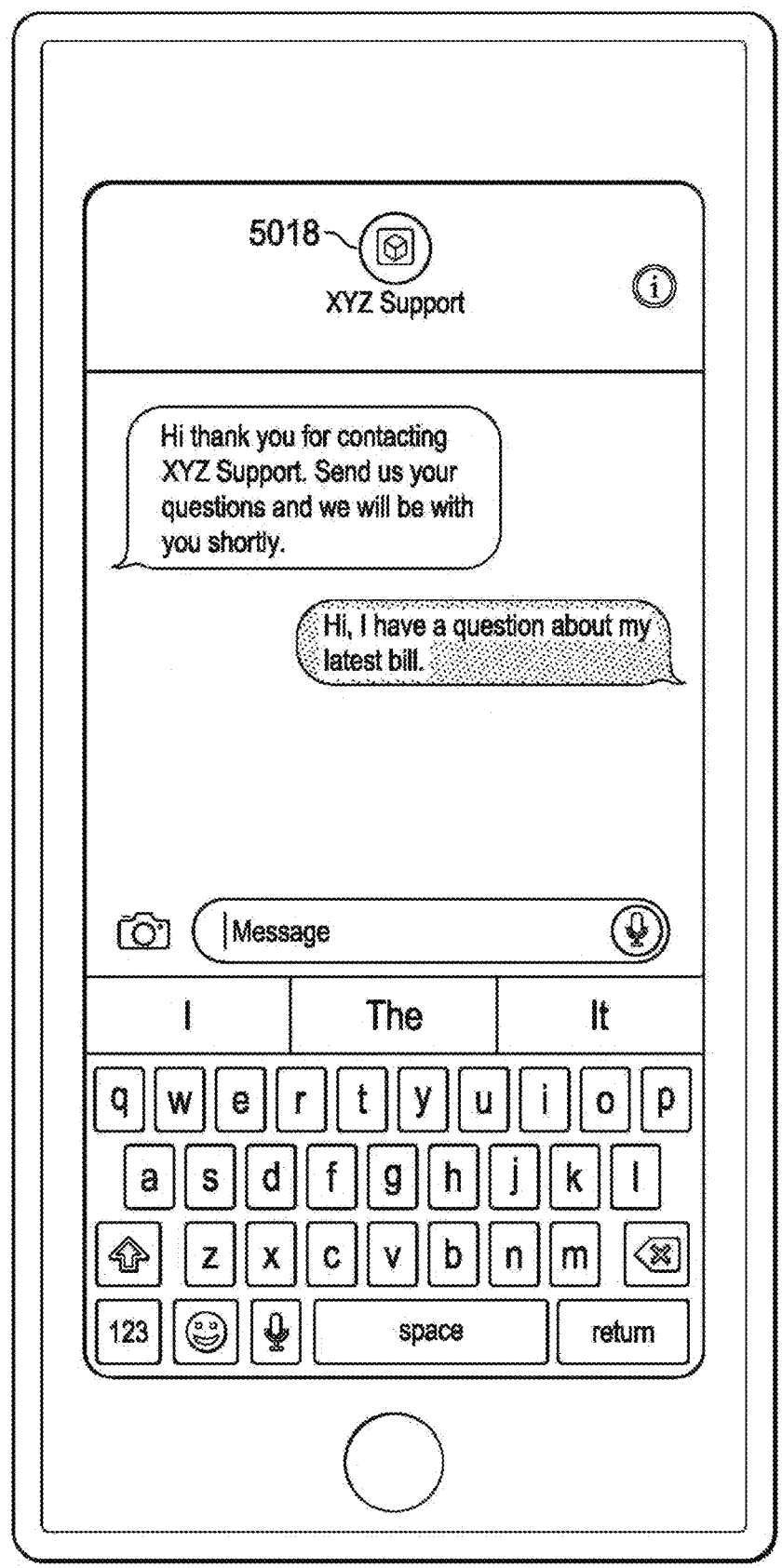
Figure 10A:
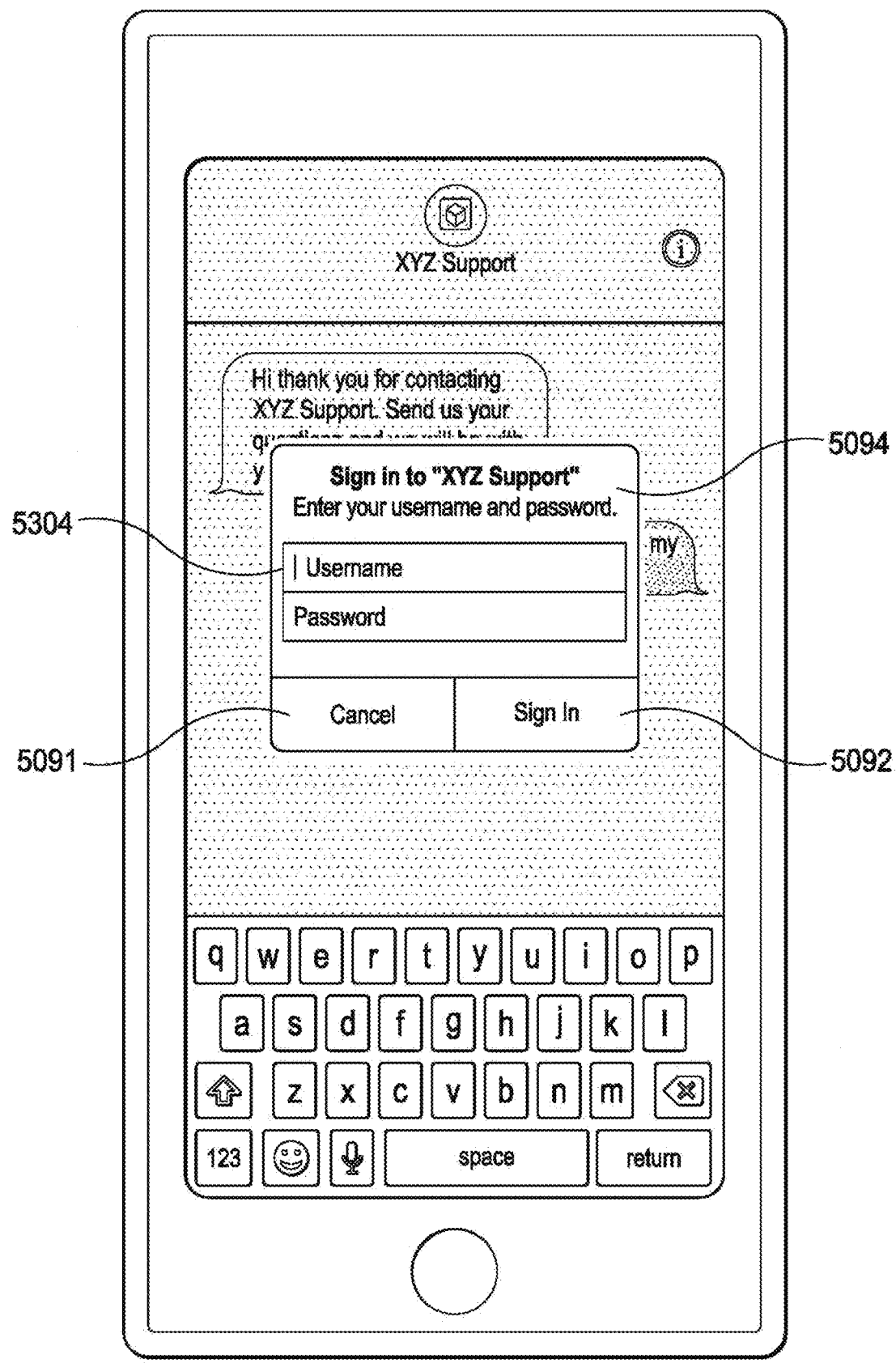
Figure 10A:
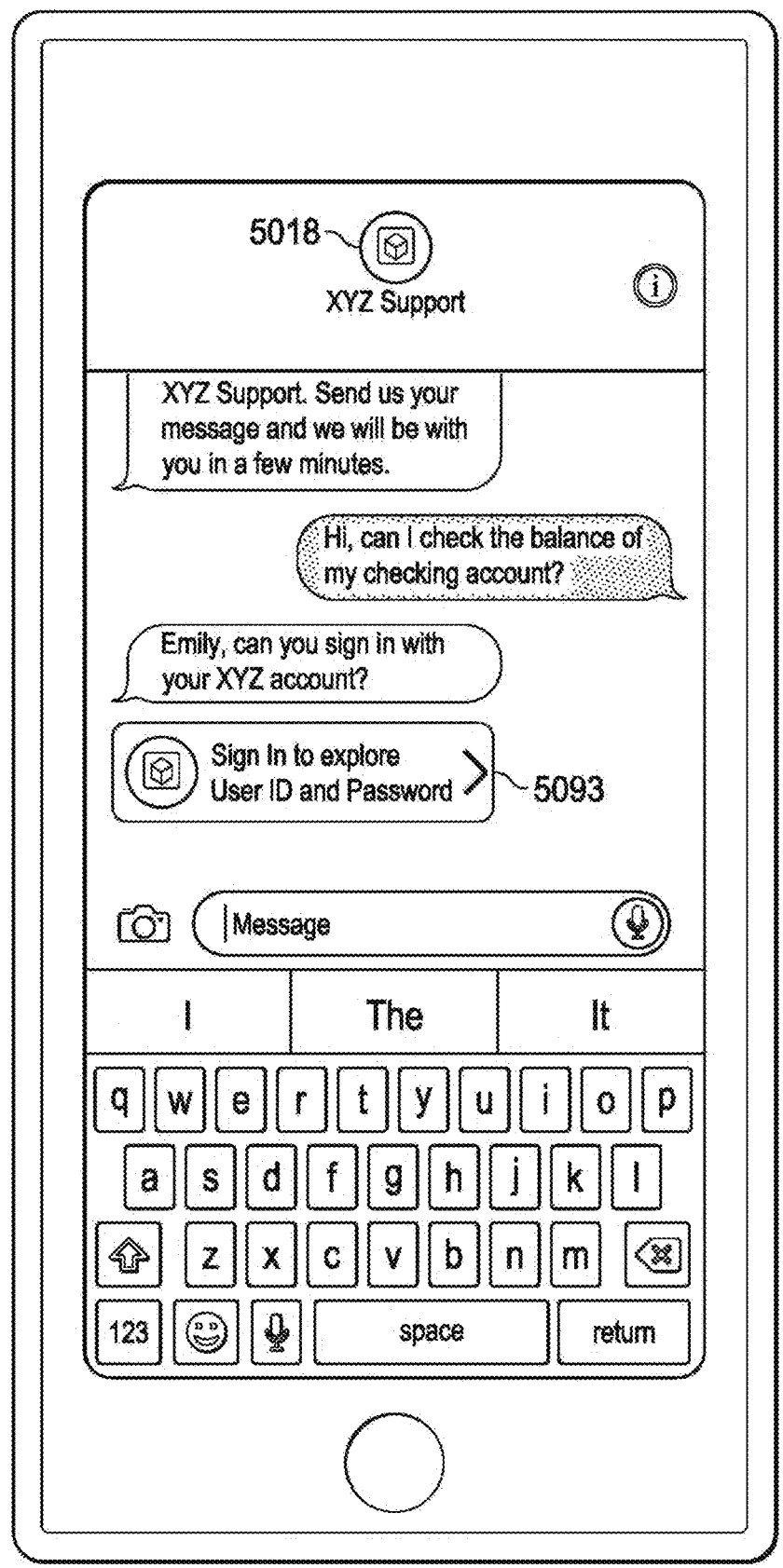
Figure 10A:
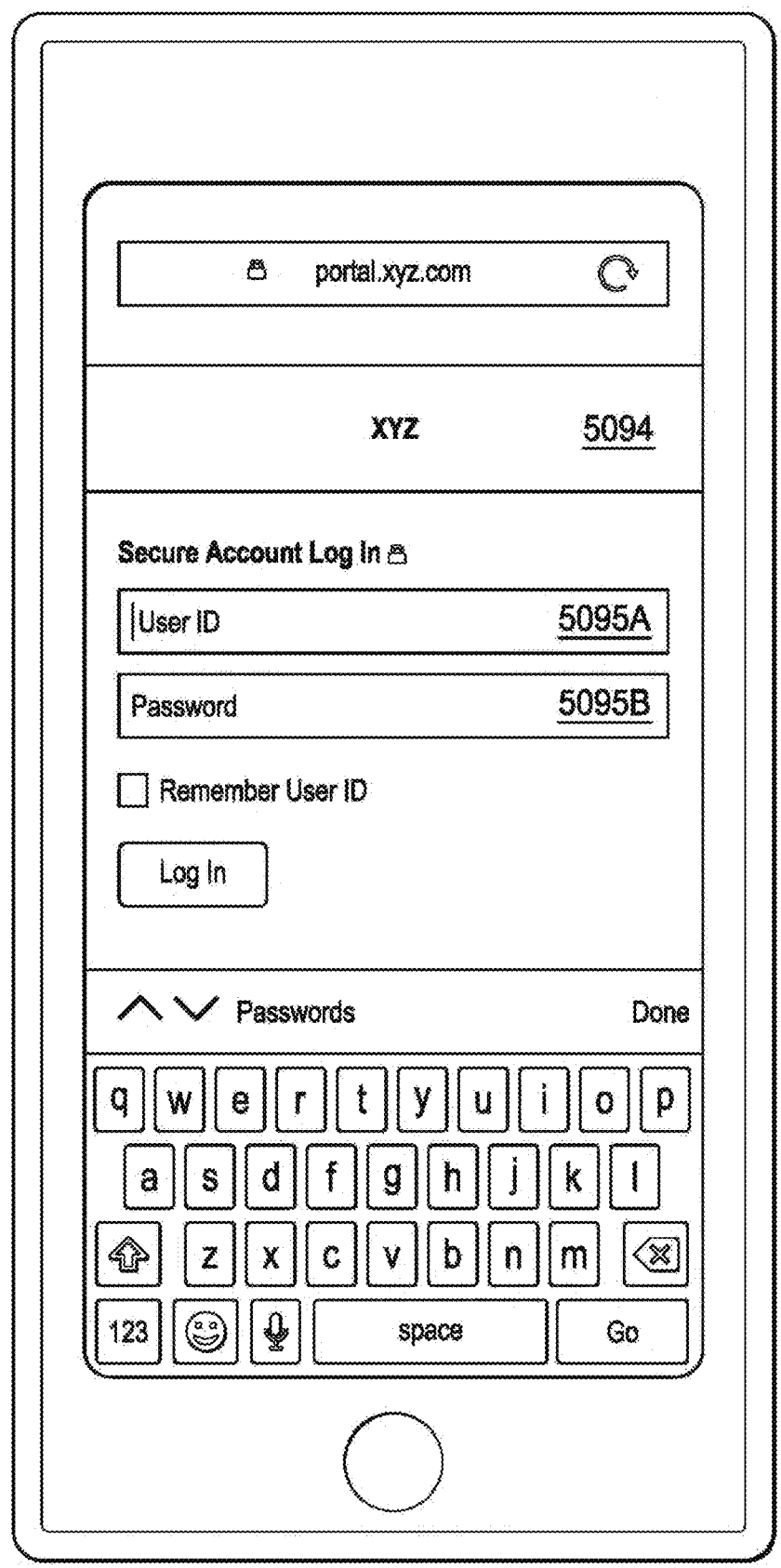
Figure 10A:
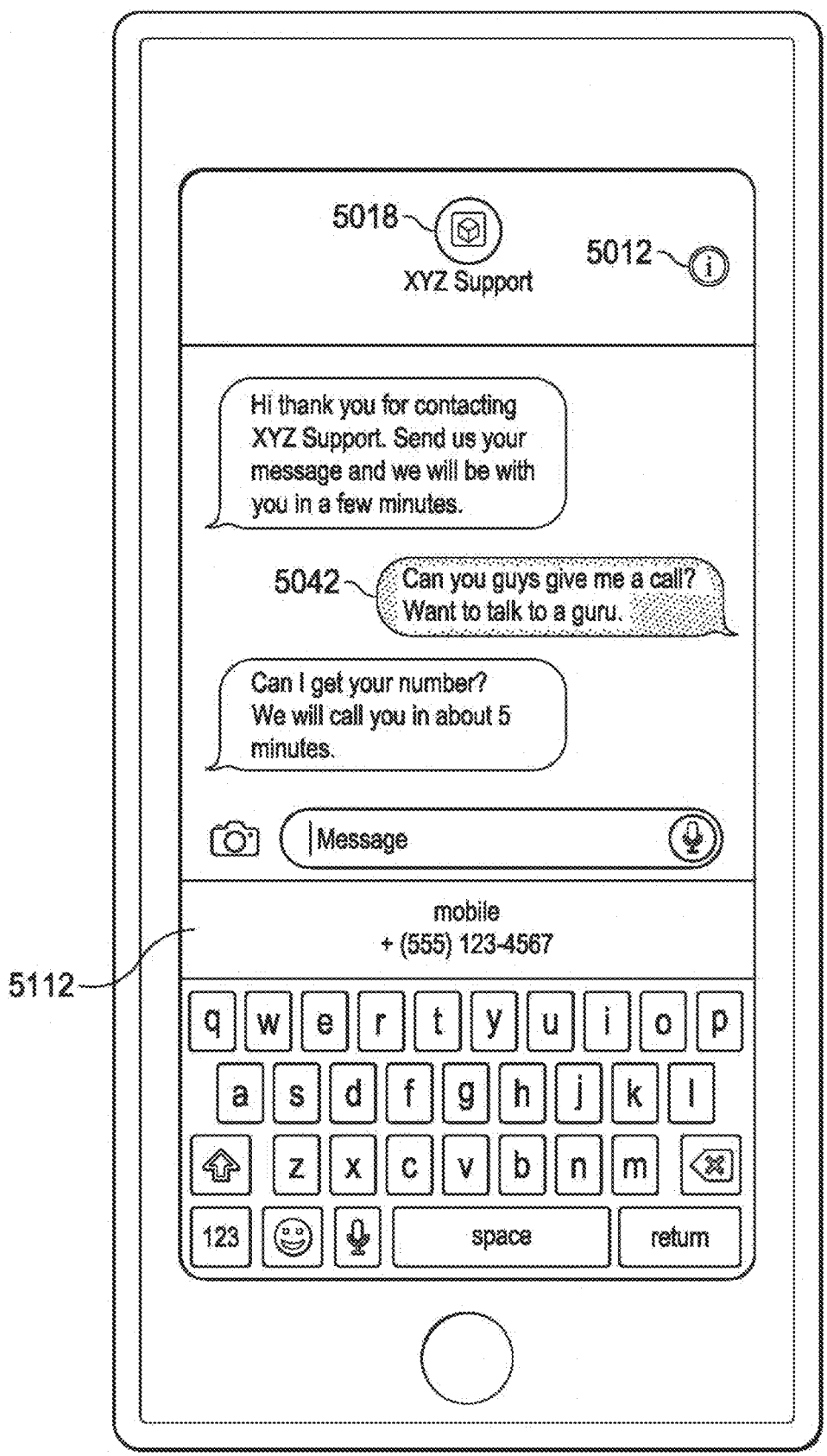
Figure 10A:
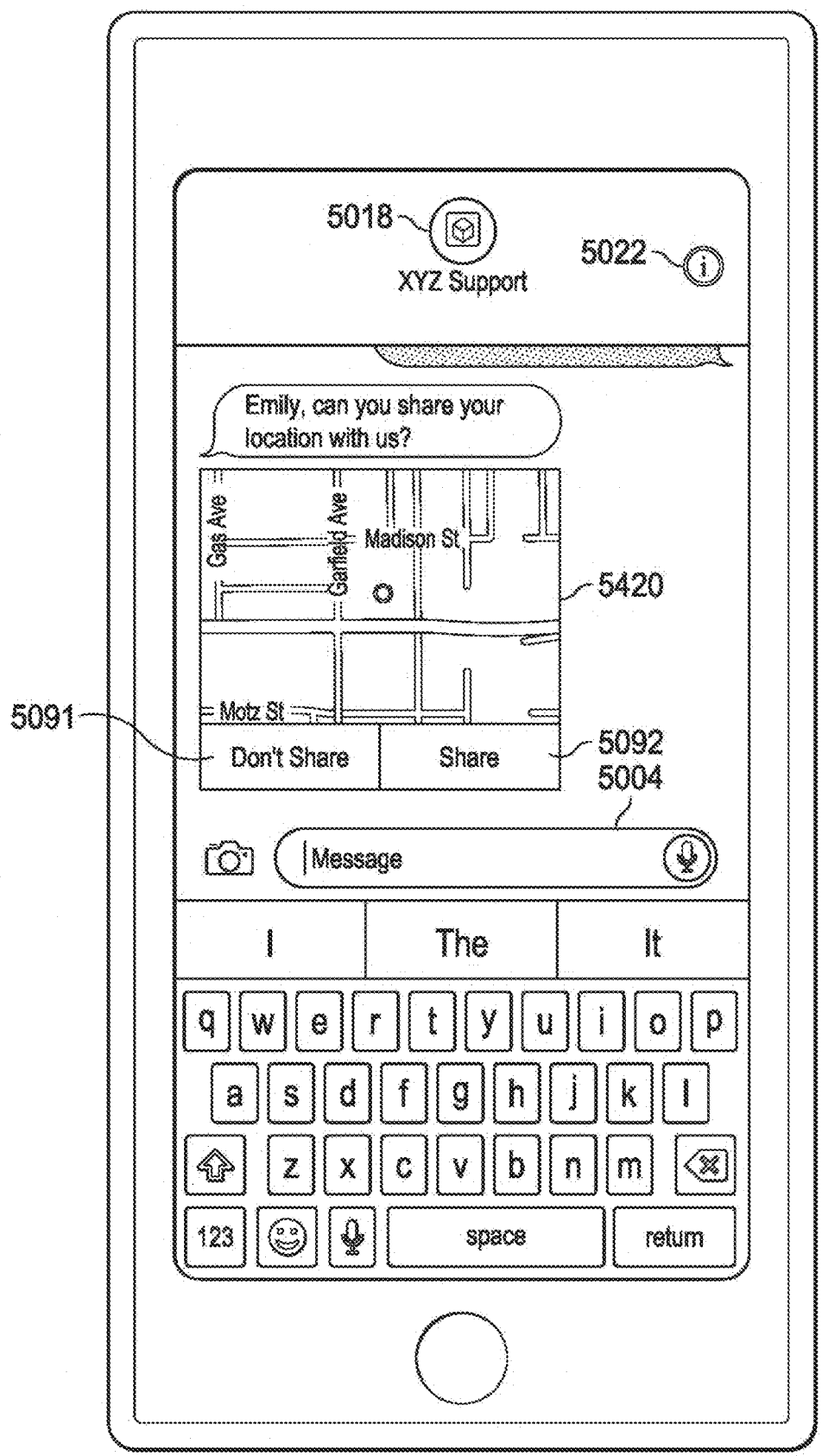
Figure 11A:
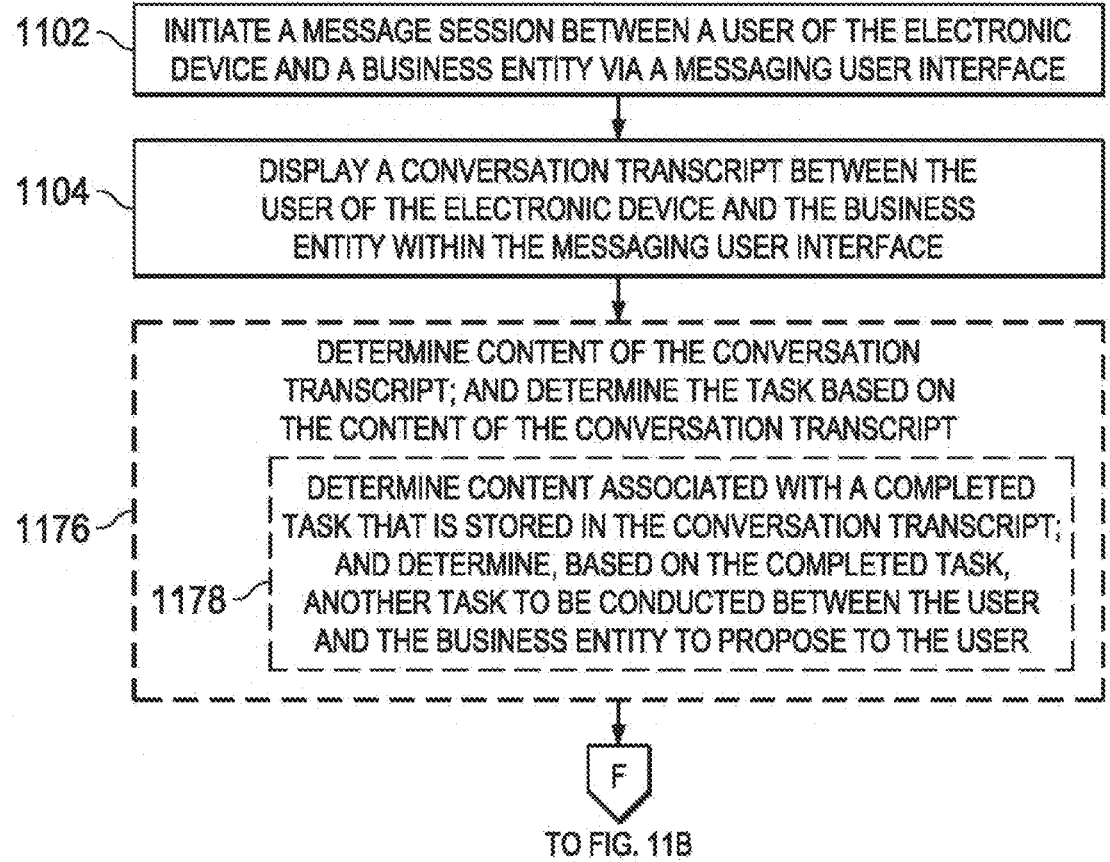
Figure 11B:
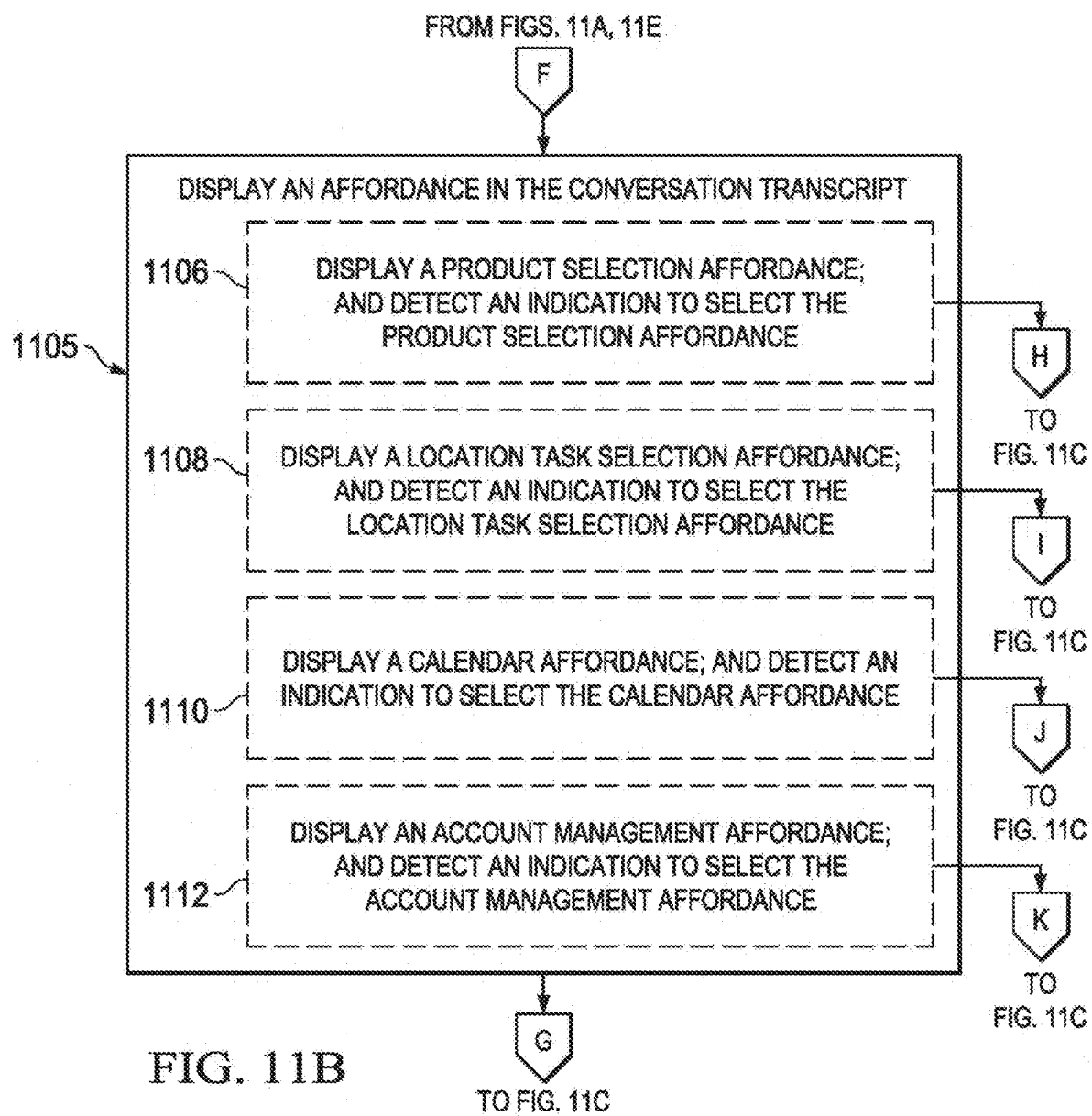
Figure 11C:
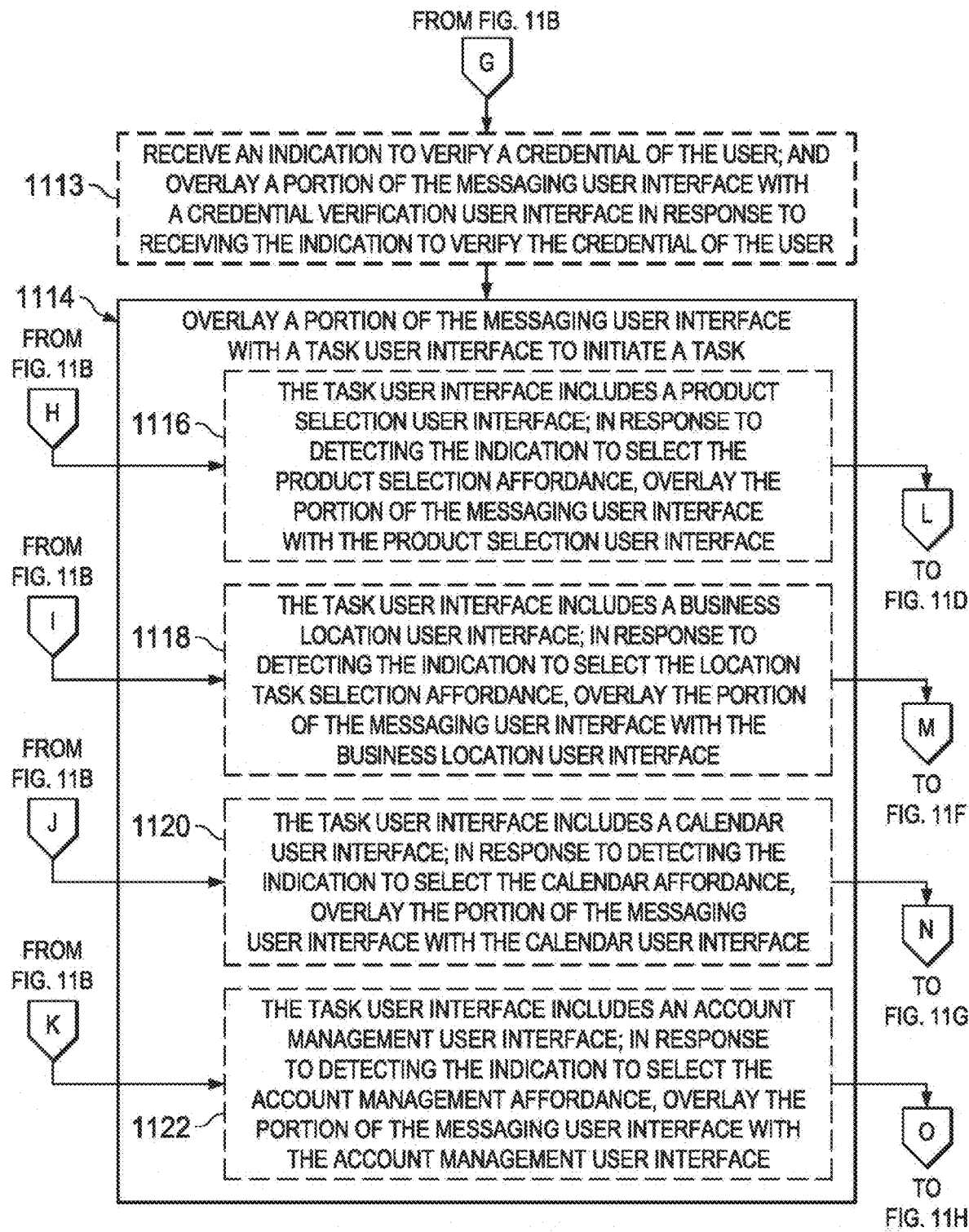
Figure 11D:
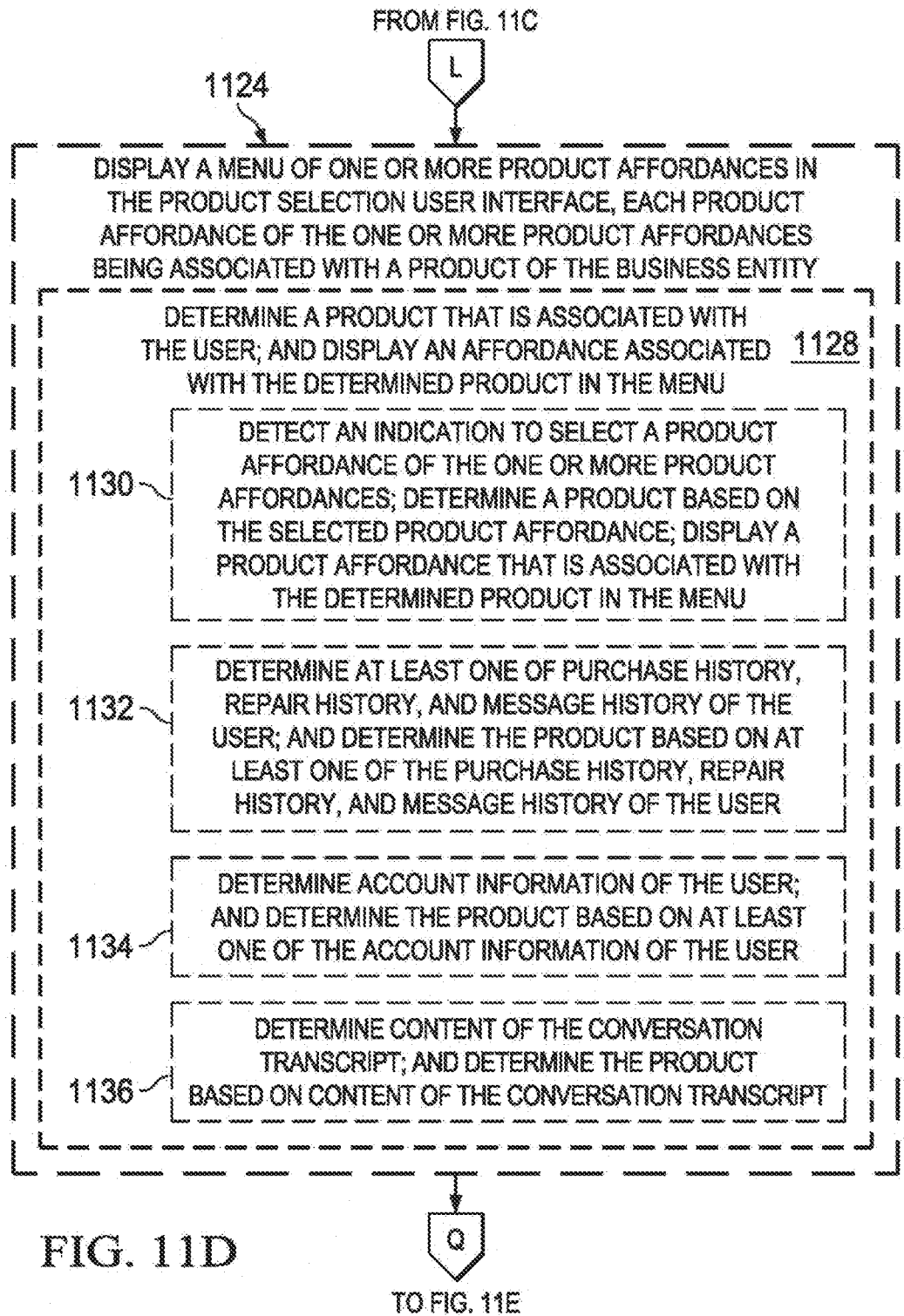
Figure 11E:
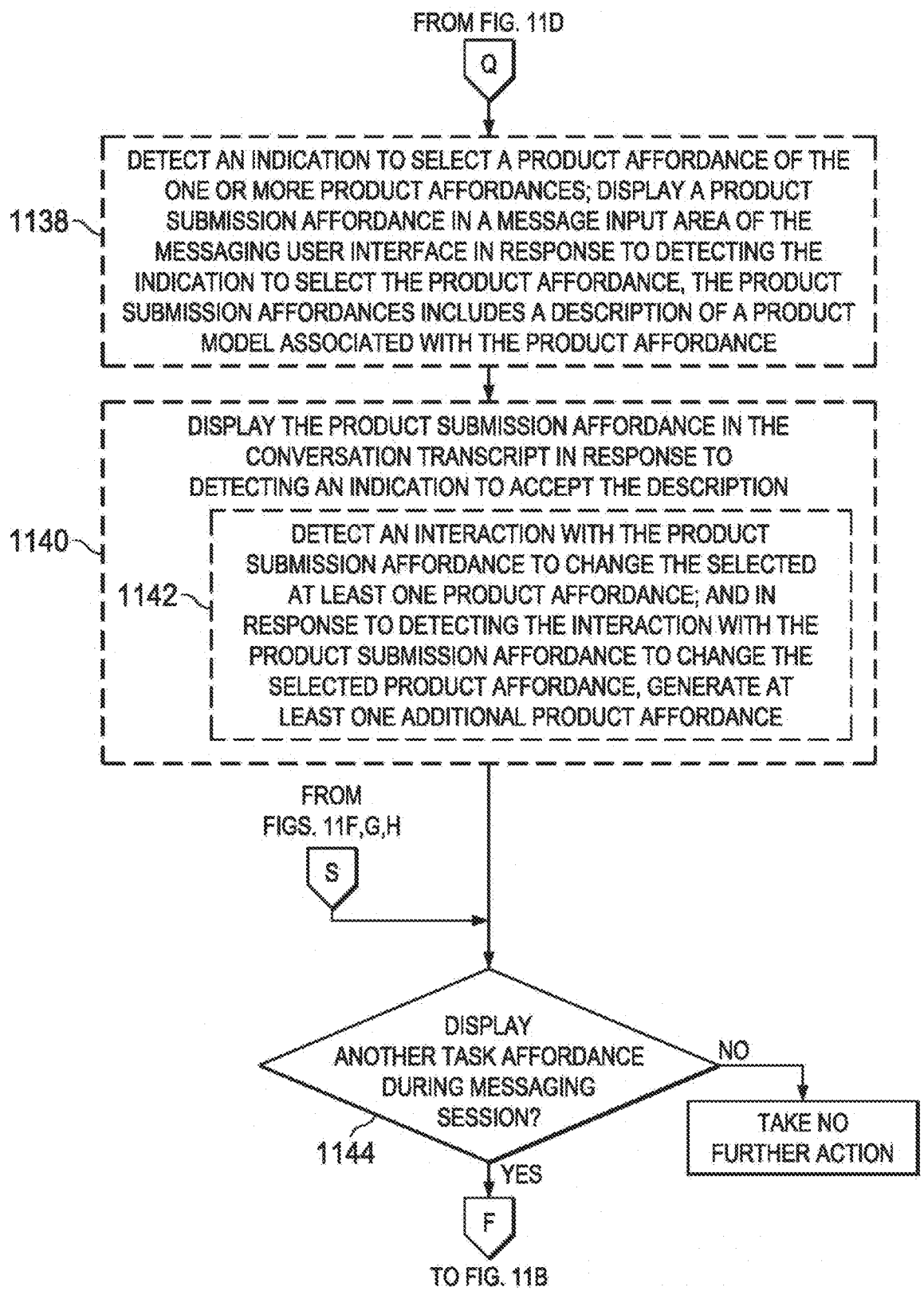

FIG. 10Y is an example illustration of business messaging user interface 5032 after the user selects product support affordance 5106 of FIG. 10X. As shown in FIG. 10Y, the user is connected to a representative of XYZ's product support team in response to selecting product support affordance 5106 of FIG. 10X. The user engages the representative of the product support team to perform one or more tasks described herein. In some embodiments, the user is required to grant authorization to the representative in order to initiate a task or in order for the representative to access information about the user. As shown in FIG. 10Z, the device, in response to detecting a request from the business entity to obtain authorization from the user, overlays a portion of business messaging user interface 5032 with a support authorization user interface 5140. Support authorization user interface 5140 is a user interface that the user interacts with to grant authorization to a third party. The user has an option to select deny affordance 5091 to deny the representative's request or to select accept affordance 5092 to accept the representative's request.

FIG. 10AA is an example illustration of business messaging user interface 5032 after the user selects the account management affordance 5102 of FIG. 10X. As shown in FIG. 10AA, the user is connected to a representative of XYZ's account management team in response to interacting with account management affordance 5102 of FIG. 10X. In some embodiments, the user is required to provide credential verification in order to access sensitive information about the user. As shown in FIG. 10AB, the device, in response to detecting a user request to obtain sensitive information about the user, overlays a portion business messaging user interface 5032 with a credential verification user interface 5094. Credential verification user interface 5094 is a user interface that the user interacts with to verify the user's credentials. As shown in FIG. 10AB, credential verification user interface 5094 includes message input area 5304, which allows the user to input the user's credentials. Credential verification user interface 5094 also includes deny affordance 5091 and accept affordance 5092, which allows the user to deny or accept the credential verification request. In some embodiments, where the credential verification user interface is displayed during the user's messaging session with the account management representative, the device prevents the user from proceeding with a particular task (or with the messaging session in general) until the user's credentials have been verified. In other embodiments, the credential verification user interface is displayed on business messaging user interface 5032 before the user is connected to a representative of the account management department of the business entity.

FIG. 10AC is an example illustration of business messaging user interface 5032 after the user selects product billing affordance 5104 of FIG. 10X. As shown in FIG. 10AC, the user is connected with a representative of XYZ's product billing team in response to selecting product billing affordance 5104 of FIG. 10X. In some embodiments, the user is required to provide credential verification in order to access sensitive information about the user. FIG. 10AD, similar to FIG. 10AB, illustrates another credential verification user interface 5094 overlaying a portion of business messaging user interface 5032. As shown in FIG. 10AD, credential verification user interface 5094 includes message input area 5304, which allows the user to input the user's credentials. Credential verification user interface 5094 also includes deny affordance 5091 and accept affordance 5092, which allow the user to deny or accept the credential verification request. The device, in response to determining that user's credentials are sufficient to access the billing information, displays billing related information onto the conversation transcript. Although credential verification user interface 5094 is illustrated as being displayed in response to a request for user information, the device is operable to display credential verification user interface 5094 at any time during the messaging session.

In some embodiments, a credential verification affordance is displayed in the messaging transcript to initiate a task. A credential verification affordance is an affordance that the user interacts with to initiate a process to verify the user's credential. As shown in FIG. 10AE, a credential verification affordance 5093 is displayed in the conversation transcript of a business messaging user interface. The device, upon determining that the user has selected credential verification affordance 5093, overlays a portion of business messaging user interface 5032 with credential verification user interface 5094. As shown in FIG. 10AF, a user ID input area 5095A and a password input area 5095B are displayed in credential verification user interface 5094. The device, upon receipt of the user's credentials, determines whether the user's credentials are sufficient to access the task. The device initiates the task between the user and the business entity upon determining that the user's credentials are sufficient to access the task. In some embodiments, the operations performed in this paragraph and illustrated in FIGS. 10AE and 10AF are requisites for initiating any of the other tasks described herein, including product selection, location selection, calendar tasks, account management and payment tasks, as well as other tasks that the user engages in during the messaging session.

In some embodiments, the device is operable to share additional information of the user with the business entity. As shown in FIG. 10AG, the device, upon detecting a request from the business entity to obtain the user's telephone number, determines the user's telephone number and displays the user's telephone number in a message suggestion area 5112 to enable the user to send the telephone number to the business entity if the user is comfortable doing so. In some embodiments, the device is operable to automatically provide the user's telephone number to the business entity.

In some embodiments, the user is further operable to share non-text based content with the business entity. As shown in FIG. 10AH, the device is operable to display a map 5420 of an area around a current location of the device, together with accept affordance 5092 and deny affordance 5091 on the conversation transcript. The device, in response to detecting a user interaction with accept affordance 5092, transmits indications of the user's current location and an area around the user's current location to the business entity. In one of such embodiments, an interactive item representing map 5420 is transmitted to the business entity. Alternatively, the device does not transmit an indication of the user's current location in response to detecting a user interaction with the deny affordance. The device is further operable to share other types of non-text based content items with the business entity, including audio content, video content, multimedia content, as well as other types of content that the device has access to.

FIG. 11A-11H are flow diagrams illustrating a method 1100 for generating a business messaging user interface. As described in reference to FIGS. 10A-10AH, method 1100 can be utilized to perform tasks using a business messaging user interface that is customized to facilitate initiating and conducting messaging sessions with business entities. The method is performed at a device, (e.g., device 100, 300, 500). In one of such embodiments, the display is a touch screen display and the touch sensitive surface is on or integrated with the display. In some embodiments, the display is separate from the touch sensitive surface. In other embodiments, the interfaces described herein may be implemented with devices having physical user-interfaces, voice interfaces, or other suitable interfaces. For convenience of explanation, the embodiments described below will be discussed with reference to operations performed on a device with a touch-sensitive display system 112.

At block 1102, the device initiates a messaging session between a user of the device and a business entity via a business messaging user interface as described herein. In some embodiments, the business messaging user interface is customized to include an indicia of the business entity. The method then proceeds to block 1104. At block 1104, the device displays a conversation transcript between the user of the device and the business entity in the business messaging user interface. In some embodiments, the device, at block 1176, determines content of the conversation transcript and determines a task to be conducted based on such content.

As described herein, in various embodiments, the user and the business entity engage in a variety of tasks, including, without limitation, tasks to select a product associated with the business entity, tasks to select a location of the business entity, tasks to schedule an appointment with the business entity, tasks to access user information stored by the business entity, tasks to share content with the business entity, as well as other suitable tasks available to the user. In one of such embodiments, the device analyzes content of the conversation transcript to determine whether a new task should be initiated. For example, in one embodiment the device determines, based on a message from the user inquiring about the nearest product return center, that the user would like to view a list of nearby product return locations. The device then displays a location task affordance, such as location task affordance 5070 of FIG. 10I in the conversation transcript. In another one of such embodiments, the device, at block 1178, determines, in response to analyzing content associated with a completed task that is stored in the conversation transcript, a task to be conducted between the user and the business entity to propose to the user. For example, if the device determines that the user has completed selecting a location to drop off a product, the device then determines that the user should schedule an appointment to drop off the product and displays a calendar selection affordance in the conversation transcript. The method then proceeds to block 1105.

At block 1105, the device displays a task affordance in the conversation transcript. In some embodiments, where the task affordance is a product selection affordance, the device displays a product selection affordance in the conversation transcript of the business messaging user interface. The user interacts with the product selection affordance to initiate a product selection user interface. In the example of FIG. 10A, the user interacts with the product selection affordance 5060 by selecting a messaging region around the product selection affordance, or by performing a variety of other actions to interact with product selection affordance 5060. The method then proceeds to block 1106.

At block 1106, the device detects the user interaction with a task selection affordance, such as product selection affordance 5060. In response to detecting the user interaction with the task selection affordance, the method proceeds to block 1114, and the device overlays a portion of the business messaging user interface with a task user interface to initiate a task. In the previous example, where the user interacts with product selection affordance 5060, the method proceeds to block 1116, and the device, in response to detecting the indication to select product selection affordance 5060, overlays a portion of the business messaging user interface with a product selection user interface, such as product selection user interface 5062 of FIG. 10B. In some embodiments, the device, at block 1124, displays a menu of one or more product affordances in the product selection user interface, where each product affordance of the one or more product affordances is associated with a product of the business entity. For example, as shown in FIG. 10B, a product selection menu having four product affordances 5064A-5064D is displayed in product selection user interface 5062. In the depicted embodiment, the four product affordances are product repair affordances, which are product affordances that correspond to models of product that need repair. FIG. 10C illustrates three product accessory affordances 5064E-5064G, which are product affordances that correspond to different accessories of the Phone 5x. In one of such embodiments, the method proceeds to block 1128.

At block 1128, the device further determines a product that is associated with the user, and displays an affordance associated with the determined product in the menu. In another one of such embodiments, the method proceeds to block 1130. At block 1130, the device detects an indication to select a product affordance of the one or more product affordances, determines a product based on the selected product affordance, and displays a product affordance that is associated with the determined product in the menu. In another one of such embodiments, the method proceeds to block 1132. At block 1132, the device determines at least one of a purchase history, a repair history, and a message history of the user and subsequently determines a product based on at least one of the purchase history, the repair history, and the message history of the user. In another one of such embodiments, the method proceeds to block 1134. At block 1134, the device determines an account information of the user, and determines the product based on the account information of the user. In another embodiment, the method proceeds to block 1136. At block 1136, the device determines the content of the conversation transcript and determines the product based on the content of the conversation transcript.

In some embodiments, the device does not generate a product selection user interface. In one of such embodiments, product affordances associated with the business entity are directly displayed in the conversation transcript. For example, as shown in FIG. 10F, four product affordances 5064A-5064D are displayed in message regions of the conversation transcript. The user interacts with any of the product affordances displayed in the product affordance user interface, such as product affordance user interface 5062 of FIG. 10B, to select a product affordance of the one or more product affordances. In some embodiments, where a product affordance is directly displayed in the conversation transcript, the user selects the product affordance by interacting with a message region around the product affordance. In some embodiments, the method proceeds to block 1138. At block 1138, the device determines an interaction to select a product affordance, and in response to the determination, displays a product submission affordance in a message input area of the business messaging user interface. As shown in FIG. 10G, the product submission affordance 5068 includes a description of a product model associated with a product of the selected product affordance. In some embodiments, the method proceeds to block 1140 and the device displays a product submission affordance in the conversation transcript in response to detecting an indication to accept the description, such as a user interaction with send affordance 5069 of FIG. 10G.

In some embodiments, the user has an option to make changes to a selected product affordance even after a product submission affordance has been transmitted to the business entity. In one embodiment, the method proceeds to block 1142, and the device, upon detecting a user interaction with the product submission affordance, re-overlays the business messaging user interface with a product selection user interface. Moreover, the device generates additional product affordances corresponding to products of the business entity and displays the additional product affordances in the product selection user interface. In one of such embodiments, some of the product affordances that are displayed in the product selection user interface correspond to previously displayed products. In another one of such embodiments, the product affordances displayed in the product selection user interface correspond to a combination of new and previously displayed products.

At block 1144, the device determines whether to display another task affordance during the messaging session. In some embodiments, no additional task affordance is displayed in the business messaging user interface unless the device receives an instruction to display another task affordance. Alternatively, if the device determines an indication to display a product affordance, then the method proceeds to block 1105.

At block 1105, the device displays the determined product affordance in the conversation transcript. In some embodiments, where the first performed task is a task to select a product, the user elects to perform a task to select a location of the business entity. For example, in the depicted embodiment of FIG. 10I, location task affordance 5070 is displayed in the conversation transcript. At block 1108, the device displays a location task affordance in the conversation transcript of the business messaging user interface and detects an indication to select the location task affordance. At block 1118, the device overlays a portion of the business messaging user interface with a business location user interface in response to detecting the indication to select the location task affordance. The method then proceeds to block 1146. At block 1146, the device displays a list of one or more location affordances in the business location user interface, each location affordance being associated with a location of the business entity. For example, as shown in FIG. 10J, the business location user interface includes five location affordances 5074A-5074E, each corresponding to a location of XYZ. In some embodiments, the method proceeds to block 1148.

At block 1148, the device determines a response time from each location of the business entity and arranges the locations based on the response time of the locations. Optionally, the device displays the response time from each of the locations of the business in the business location user interface, such as in business location user interface 5072 of FIG. 10J. In another one of such embodiments, the method proceeds to block 1150. At block 1150, the device determines a distance to each location of the business entity, arranges location affordances for the locations based on the distance to such locations, and displays the distance for each location in the business location user interface, such as in business location user interface 5072 of FIG. 10J, or in the conversation transcript. In some embodiments, the device does not generate a business location user interface. In one of such embodiments, location affordances associated with the business entity are directly displayed in the conversation transcript. For example, as shown in FIG. 10L, five location affordances 5074A-5074E are displayed in message regions of the conversation transcript.

At block 1152, the device detects an indication to select a location affordance of the one or more location affordances. In some embodiments, the device displays a location submission affordance in the messaging input area in response to detecting the indication to select the location affordance. In some embodiments, the location submission affordance includes a description of the selected location. The user interacts with the location submission affordance to confirm the selected location or to select a new location. In some embodiments, where a location affordance is directly displayed in the conversation transcript, the user selects the location affordance by interacting with a message region around the location affordance. At block 1154, the device, upon detecting the user interaction to select the location submission affordance (such as an interaction with a send affordance), displays the location submission affordance in the conversation transcript. In one of such embodiments, the method proceeds to block 1156 when the device further detects an indication to change the location submission affordance displayed in the conversation transcript and re-overlays a portion of the business messaging user interface with the business location user interface to allow the user to change a previously selected location. The method then proceeds the block 1144.

At block 1144, the device determines whether to display another task affordance during the messaging session. If the device determines that another task affordance should be displayed, then the method returns to block 1105. Continuing with the foregoing example where the user has selected a location of the business entity, the method optionally proceeds to block 1110, and the device displays a calendar affordance in the conversation transcript of the business messaging user interface. For example, as shown in FIG. 10N, the device displays a calendar affordance 5078 in the conversation transcript to schedule an appointment with a representative at XYZ Town Square. The user interacts with the calendar affordance to initiate a calendar task to schedule an appointment with the business entity. The method then proceeds to block 1120. At block 1120, the device detects the indication to select the calendar affordance and overlays a portion of the business messaging user interface with the calendar user interface. The method then proceeds to block 1158.

At block 1158, the device generates one or more appointment time affordances and displays one or more appointment time affordances in the calendar user interface. For example, as shown in FIG. 10P, a list of nine appointment time affordances 5084A-5084I, each representing an available appointment time slot, is displayed in calendar user interface 5082. In other embodiments, the one or more appointment time affordances are displayed in a menu. In some embodiments, the method proceeds to block 1160. At block 1160, the device determines a schedule of the user and displays a description of the schedule of the user in the calendar user interface. For example, as shown in FIG. 10P, descriptions of the user's events 5086A and 5086B are displayed in the calendar user interface. The method then optionally proceeds to block 1162. At block 1162, the device determines a suggested time to schedule the appointment with the business entity based on the schedule of the user and displays the suggested time in the calendar user interface. The method also optionally proceeds to block 1164. At block 1164, the device determines a suggested time to schedule the appointment with the business entity based on a travel time and displays the suggested time in the calendar user interface. In some embodiments, the device does not generate a calendar user interface. In one of such embodiments, appointment time affordances, descriptions of the schedule of the user, and the suggested time to schedule the appointment are directly displayed in the conversation transcript. For example, as shown in FIG. 10Q, three appointment time affordances 5084A-5084C are displayed in message regions of the conversation transcript. The method then proceeds to block 1168.

At block 1168, the device displays an appointment time submission affordance in the conversation transcript in response to detecting an indication to select an appointment affordance. The method then proceeds to block 1170. At block 1170, the device detects an indication to select the appointment time submission affordance in the conversation transcript. Upon detecting such indication, the device overlays the business messaging user interface with a calendar user interface, through which, the user makes edits to the preselected appointment time. As shown in FIG. 10T, the user interacts with one or more affordances displayed in calendar user interface 5087 to adjust the user's appointment, determine directions to the business entity, and add the appointment to the user's digital calendar. The method then proceeds to block 1144. At block 1144, the device determines whether to display another task affordance during the messaging session. The method returns to block 1105 if the device determines that another task affordance should be displayed.

Continuing with the foregoing example where the user has selected an appointment time with the business entity, an account management selection affordance 5050 is displayed in the conversation transcript of the business messaging user interface. The user interacts with the account management selection affordance to initiate an account management task or a product payment task with the business entity. Examples of various account management and product payment tasks include, but are not limited to accessing account information, making a payment, disputing a bill, cancelling an order, as well as other tasks related to the user's account with the business entity. At block 1112, the device detects an indication to select the account management task selection affordance and the method proceeds to block 1122. At block 1122, and in response to detecting the indication to select the account management affordance, the device overlays the portion of the business messaging user interface with the account management user interface. The method then proceeds to block 1172. At block 1172, the device detects an input indicative of payment information of the user, and in response to detecting input indicative of payment information, displays the payment information in the payment information input area of the account management user interface. The method optionally proceeds to block 1174.

At block 1174, the device detects an input indicative of a personal signature, and determines whether the personal signature matches a verified personal signature (such as by facial recognition, speech recognition, fingerprint recognition, or other type of personal signature recognition). The device, upon determining that the personal signature matches the verified personal signature, populates (or in some embodiments, auto-populates) the payment information input area with the payment information of the user and transmits the payment information of the user for processing. The method then proceeds to block 1144. At block 1144, the device determines whether to display another task affordance. If the device determines that another task should be displayed during the messaging session, then the method returns to block 1105. The method described in the foregoing paragraphs is performed continuously until the end of the messaging session. Moreover, although the foregoing paragraphs describe four tasks, the device is operable to perform operations associated with other tasks through the business messaging user interface. Moreover, although the foregoing paragraphs describe performing four tasks in a certain order, the device is operable to perform the tasks in any order.

In some embodiments, a credential verification affordance is displayed during the messaging session. The device, in response to detecting an interaction to select the credential verification affordance, overlays a portion of the business messaging user interface with a credential verification user interface. FIGS. 10AB, 10AD, and 10AF illustrate three examples of credential verification user interfaces. In some embodiments, the method, after displaying a task affordance in block 1105, proceeds to block 1113. At block 1113, the device overlays a portion of the messaging user interface with the credential verification user interface. Moreover, at block 1113, the device initiates a task only after determining that the credential of the user has been verified. In further embodiments, the device is operable to perform the operations described in block 1113 preceding or following any block that is illustrated in FIGS. 11A-11H. In further embodiments, the device, in response to determining that the credential of the user has been verified, receives or obtains user information of the user. In one of such embodiments, the device auto-populates user information in the task user interface of the initiated task. For example, in the embodiment of FIG. 10W, the device, upon determining that the credential of the user has been verified, obtains the user's contact information and auto-populates the user's contact information in the payment input field.

It should be understood that the particular order in which the operations in FIGS. 11A-11H have been described is merely one example and is not intended to indicate that the described order is the only order in which the operations could be performed. One of ordinary skill in the art would recognize various ways to reorder the operations described herein. Additionally, details of the processes described above with respect to method 1100 (e.g., FIGS. 11A-11H) are also applicable in an analogous manner to the methods described below and above. For example, method 1100 optionally includes one or more of the characteristics of the various methods described above with reference to method 900. For example, the business messaging user interface described throughout method 1100 may be customized to include a logo, trademark, verification status, or other business indicia. As disclosed in certain embodiments of the present invention, the use of task affordances in a business messaging user interface significantly reduces technical issues experienced when conducting tasks with a business entity. For example, one frequent complaint with the use of text messaging applications over voice communications is the opportunity for misunderstanding given the informal nature of composing text messages, particularly given the prevalent use of shortcut phrases and acronyms. While in most situations such misunderstanding is immaterial and outweighed by the other benefits of text messaging communications, conducting a task driven transaction with a business using only text messaging can result in errors in a transaction, the need to repeat certain tasks or return purchased products, and the miscommunication of information such as product details, repair costs, store locations, and appointment times. The use of additional task affordances allows a business entity to significantly reduce such risks because they allow the business entity to send user affordances in a conversation transcript to conduct discrete tasks related to the messaging session within a business messaging user interface. For example, rather than communicating via text a product model owned by a customer, in one embodiment a product selection affordance can be interacted with a user in order to initiate a product selection task in a user interface that is customized for that task. Once an accurate product model has been communicated, further tasks can be conducted with less potential for error, such as communicating to a user the proper peripheral component or accessory to purchase for that product model or correctly determining if the product is under warranty. Thus, the use of task affordances may reduce errors, shorten the duration of a potential task conducted with a business entity, and minimize the need to repeat tasks that were conducted incorrectly. The foregoing individually and collectively result in a more efficient customer service experience for a user, with the added benefit of increased battery longevity for a device of such user.

Additionally, in certain embodiments, task affordances may be utilized to link related tasks, allowing information selected by a user in a task user interface to trigger the presentation of an additional task affordance to the user in a conversation transcript. In such a manner, a traditionally unstructured business messaging user interface can be customized to allow a user to conduct a complex series of tasks in a very structured manner to ensure that all information to complete the task is fully and accurately conveyed. For example, in order to schedule a repair of a product, a complex series of tasks may be required to be conducted, including, for example, selecting a product model, selecting a particular repair or issue the user is having with the product model, selecting a particular storefront location to which to take the product for repair, and scheduling an appointment with the storefront at which time the product is to be repaired. Conveying all of the foregoing information in an unstructured and informal text messaging conversation would be both inefficient and prone to error and miscommunication. However, the use of task affordances provides a structured way to present, select, and communicate such information in a much more efficient manner that is less prone to error. Ultimately, the use of overlaid task affordances results in an improved man machine interface between a user and a device that reduces the cognitive burden on a user when using the device to conduct tasks with a business entity.

As disclosed in certain embodiments of the present invention, the use of additional overlaid task user interfaces significantly reduces such risks because they allow a user to see at a glance the exact details of a particular task and confirm such details before proceeding. For example, rather than communicating via text a product model owned by a customer, in one embodiment a product selection user interface may be overlaid on a portion of the messaging user interface that is selectable or confirmable by a user. Once an accurate product model has been communicated, further tasks can be conducted with less potential for error, such as communicating to a user the proper peripheral component or accessory to purchase for that product model or correctly determining if the product is under warranty. Thus, the use of overlaid task user interfaces may reduce errors, shorten the duration of a potential task conducted with a business entity, and minimize the need to repeat tasks that were conducted incorrectly. The foregoing individually and collectively result in more efficient customer service experience for a user, with the added benefit of increased battery longevity for a device of such user.

Additionally, in certain embodiments, the use of overlaid user interfaces reduces the need of a user to switch between different applications to complete a task, such as between a messaging user interface or voice call and a web page to complete a purchase or schedule an appointment, which can quickly lead to customer confusion and frustration. The use of overlaid task user interfaces therefore also results in an improved man machine interface between a user and a device.

FIGS. 12A-12U illustrate exemplary user interfaces for verifying user credential through a messaging user interface in accordance with some embodiments. The user interfaces in these figures are used to illustrate the processes described below, including the processes in FIGS. 13A-13C. Although some of the examples that follow will be given with reference to inputs on a touch-screen display (where the touch-sensitive surface and the display are combined) such as touch-sensitive display 112, in some embodiments, the device detects inputs on a touch-sensitive surface 451 that is separate from the display 450, as shown in FIG. 4B. In other embodiments, the processes described herein may be implemented with devices having physical user-interfaces, voice interfaces, or other suitable interfaces. For convenience of explanation, the embodiments described below will be discussed with reference to operations performed on a device with a touch-sensitive display system 112. In such embodiments, a focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces discussed below, along with a focus selector.

FIG. 12A illustrates displaying a contact user interface 6001 containing contacts of the user 6001A-6001G on display 112. As used herein, the term "contact user interface" is a user interface that displays the user's contacts. As illustrated in FIG. 12A, the user's contacts include contact 6001A (business contact for ABC Airlines), contact 6001B (personal contact for Jane Allan), contact 6001C (personal contact for John Bach), contact 6001D (personal contact for Peter Doe), contact 6001E (business contact for DEF Electronics), contact 6001F (business contact for GHI Airlines), and contact 6001G (personal contact for Ann Johnson). As illustrated in FIG. 12A, the user's contacts include personal contacts 6001B, 6001C, 6001D, and 6001G, as well as business contacts 6001A, 6001E, and 6001F. In some embodiments, the user's contacts are arranged alphabetically. In other embodiments, only personal contacts or business contacts are concurrently displayed in contact user interface 6001. In other embodiments, business contacts are grouped together and personal contacts are grouped together. In some embodiments, a business indicia, such as a trademark or a logo of a business entity is displayed next to the business contact of the business entity.

The user selects a business contact (6001A, 6001E, or 6001F) of a business entity (e.g., ABC Airlines, DEF Electronics, or GHI Airlines) to engage in a messaging session with another participant who is associated with an account of the user (e.g., the user's account with ABC Airlines, DEF Electronics, or GHI Airlines), and who participates in the messaging session on behalf of the business entity. In some embodiments, the participant and the account of the user are both associated with the same organization, such as the business entity the user is seeking to contact. In some embodiments, the participant is a representative of the business entity and is referred to as a representative when describing the embodiments illustrated in FIGS. 12A-12U.

Figure 12B:
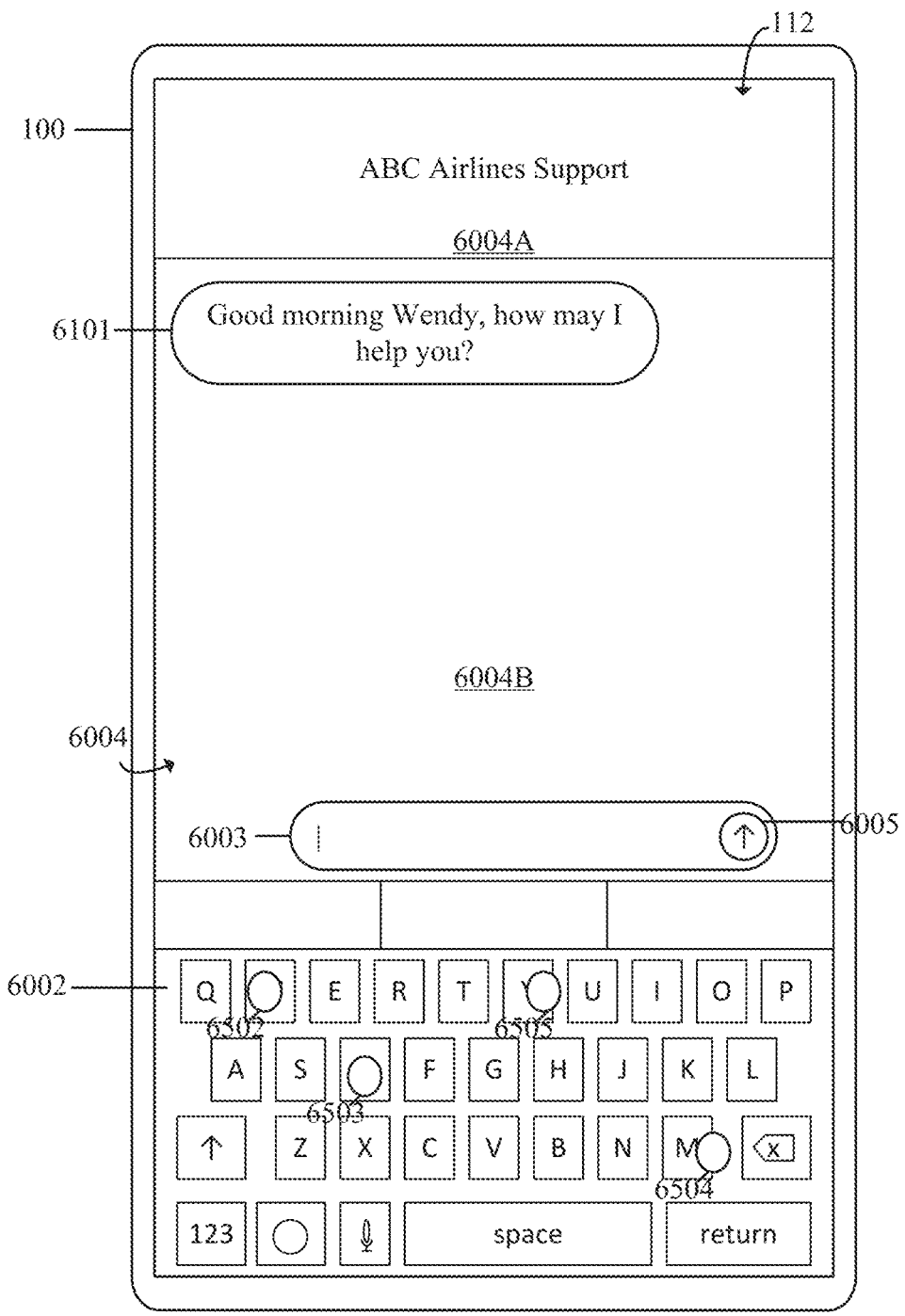

FIGS. 12A-12B illustrate detecting a tap gesture with contact 6501 over a region of display 112, on which contact 6001A for ABC Airlines is displayed, and in response to the tap gesture, displaying a messaging session between the user and a representative of ABC Airlines in a messaging user interface 6004. As illustrated in FIG. 12B, "ABC Airlines Support" is displayed in a header section 6004A of messaging user interface 6004 to assist the user to identify ABC Airlines as the business entity the user is contacting. In some embodiments, a business indicia, such as an avatar of ABC Airlines, a logo of ABC Airlines, a trademark of ABC Airlines, an animation associated with a product or service of ABC Airlines, a profile picture of ABC Airlines or another business indicia described in the foregoing paragraphs and illustrated in FIGS. 8A-8C is also displayed in header section 6004A to help the user identify ABC Airlines and associate the representative as a representative of ABC Airlines.

As illustrated in FIG. 12B, a message from the representative is displayed in a message bubble 6101 in a body section 6004B of messaging user interface 6004. In some embodiments, an indication that the representative is associated with ABC Airlines is also displayed in message bubble 6101, next to message bubble 6101, or another region of messaging user interface 6004 to help the user identify the identity of the representative as well as the representative's relationship with ABC Airlines. Examples of such indications include, but are not limited to, a description of the title of the representative, a logo of the organization with the name of the representative, a check mark next to the name of the representative, as well as other suitable indications that would help the user identify the representative's relationship with ABC Airlines. In some embodiments, the indication is a description of the representative's role (such as technical support analyst) with ABC Airlines. In other embodiment, the indication incorporates a business indicia of the ABC Airlines. In further embodiments, the indication identifies the representative as a representative of ABC Airlines who is authorized to engage in the current messaging session with the user. The message displayed in message bubble 6101 and other messages between the user and the representative (such as messages displayed in message bubbles 6102-6104 of FIG. 12E) form a conversation transcript between the user and the representative. In some embodiments, conversation transcripts from previous messaging sessions with ABC Airlines are also accessible. In some embodiments, the user may perform a scroll gesture over body section 6004B to scroll through the conversation transcript between the user and the representative as well as conversation transcripts of previous messaging sessions between the user and ABC Airlines. In some embodiments, a business indicia of ABC Airlines is also displayed in body section 6004B.

Figure 12C:
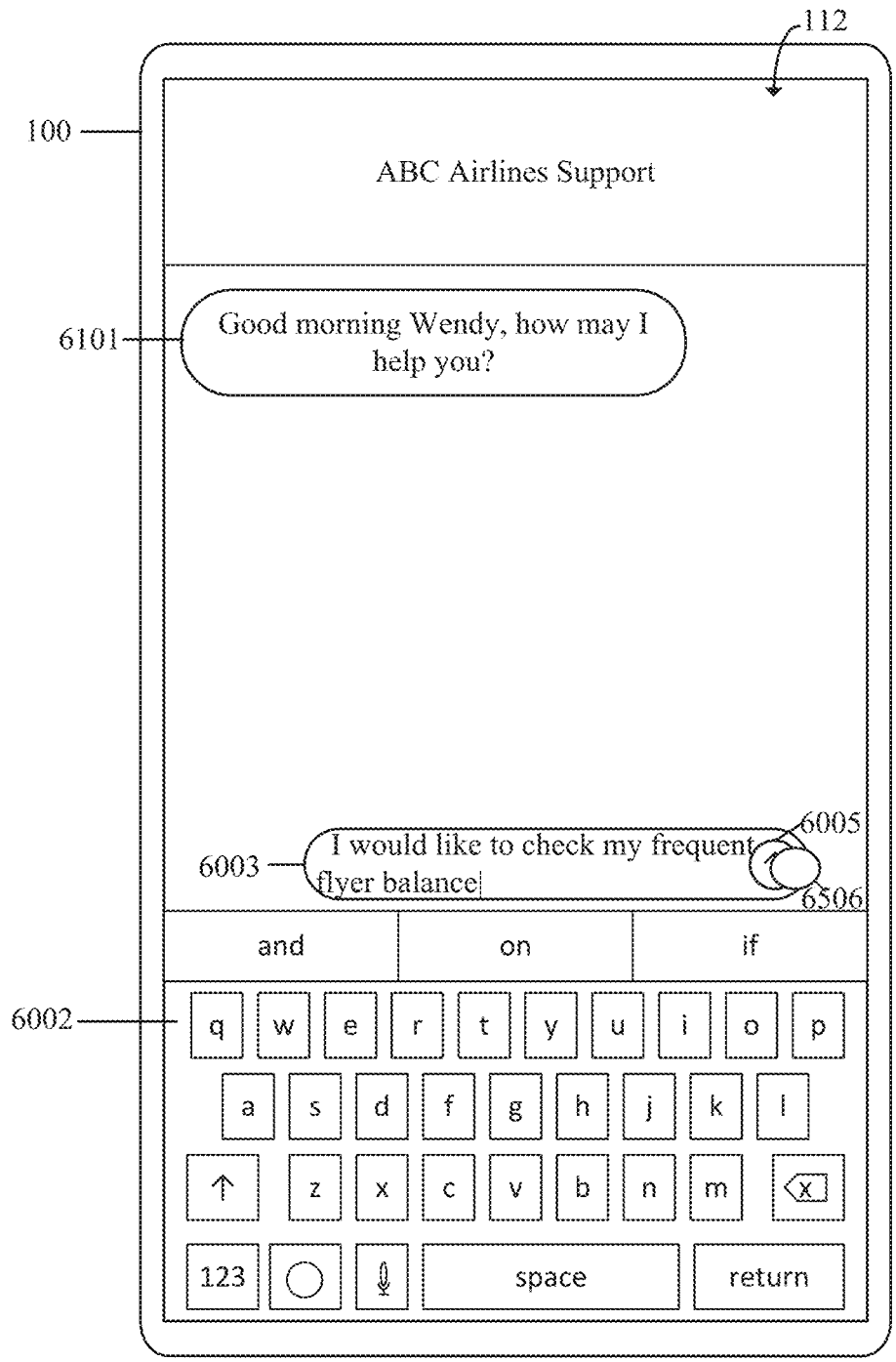
Figure 12D:
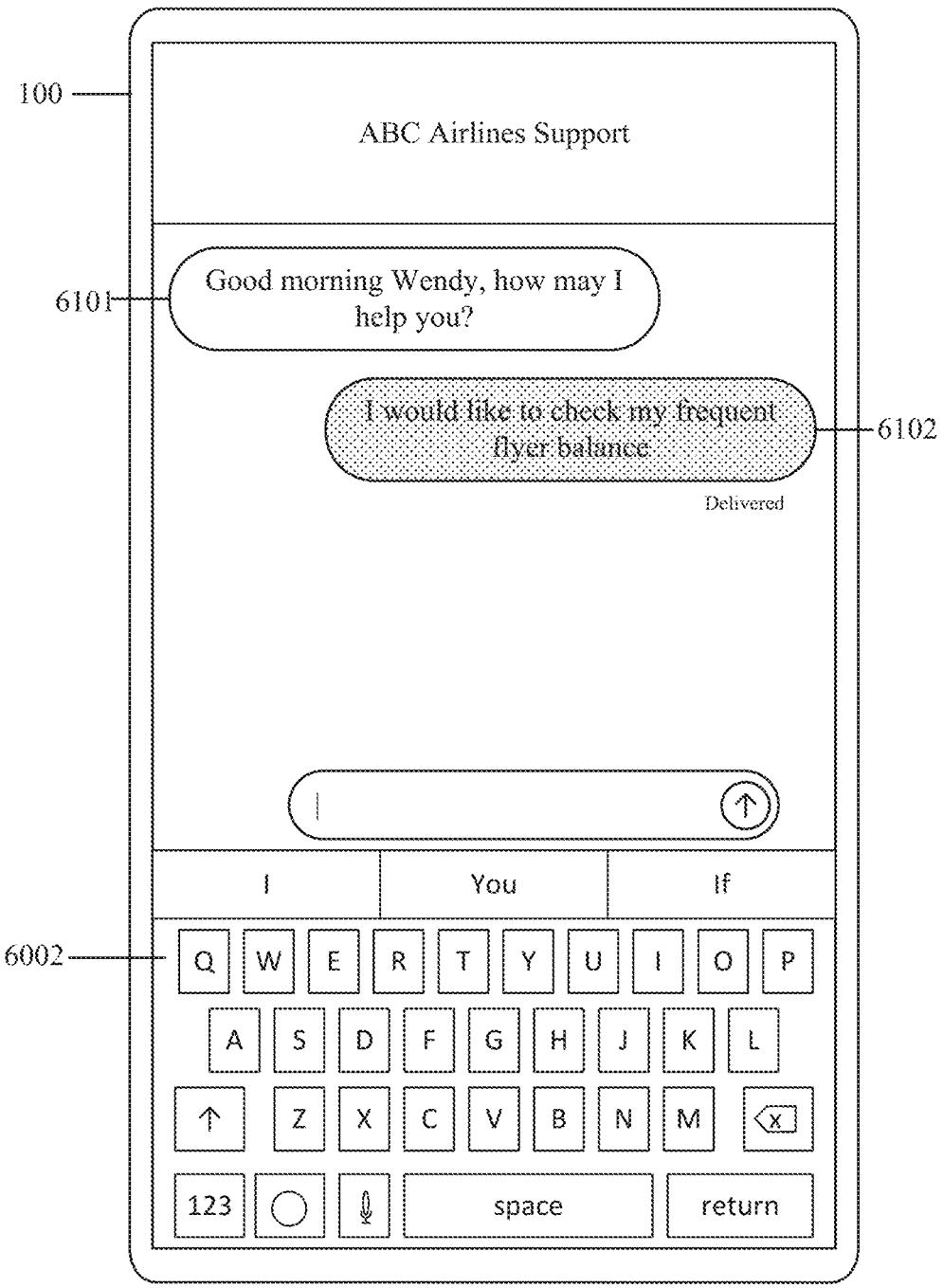

FIGS. 12B-12C illustrate detecting tap gestures with contacts 6502-6505 over a soft keyboard 6002 to type a question regarding the user's frequent flyer balance, and in response to the tap gestures, displaying the question in a message input box 6003. As illustrated in FIG. 12C, the question regarding the user's frequent flyer balance is displayed in message input box 6003. FIGS. 12C-12D illustrate detecting a tap gesture with contact 6506 over a message submission affordance 6005 to submit the question regarding the user's frequent flyer balance, and in response to the tap gesture, displaying the question in message bubble 6102. In the illustrated embodiment, the representative is not authorized to provide the user with privileged content, such as the user's frequent flyer balance, until the user has verified the user's credential. As used herein, "privileged content" refers to any content that requires successful verification of the user's credential before the content may be provided to the user. In the embodiments illustrated by FIGS. 12A-12U, the user's credential represents credential to log into the user's account with a business entity (such as the user's account with ABC Airlines and DEF Electronics). In other embodiments, where the user does not have a user account with a business entity, the user's credential is used to determine whether the representative is authorized to respond to requests from the user.

Figure 12E:
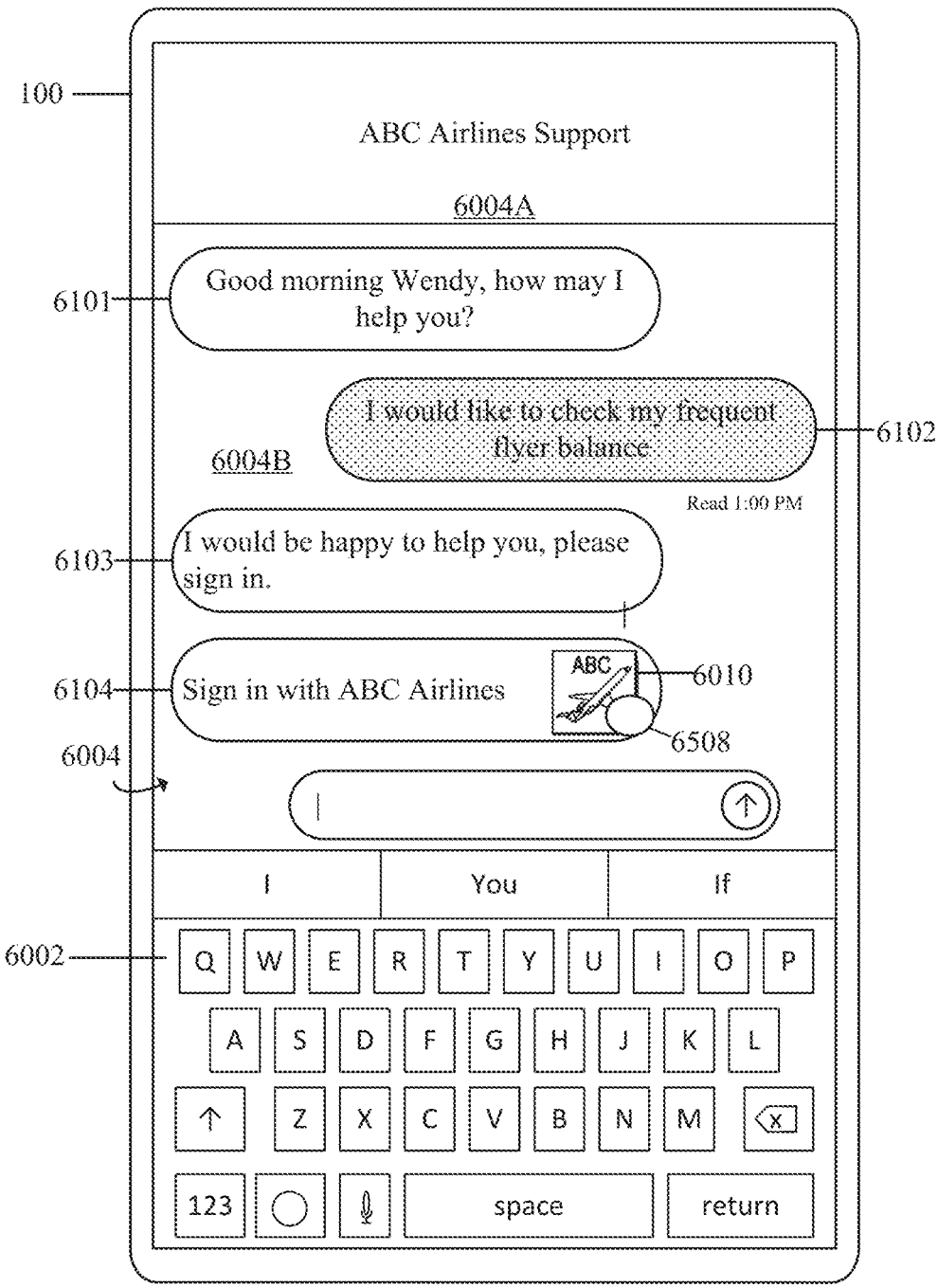

FIG. 12E illustrates displaying a request from the representative to sign into the user's account with ABC Airlines in message bubble 6103 and displaying a credential verification affordance 6010 to sign into the user's account with ABC Airlines in message bubble 6104. In some embodiments, a "credential verification affordance" is an affordance that the user interacts with to verify the user's credential. In other embodiments, where the user may grant the representative with access to the user's account, the credential verification affordance is an affordance the user interacts with to grant or to deny a request from the representative to access the user's account. In the illustrated embodiment, credential verification affordance 6010 includes a logo of ABC Airlines. In further embodiments, credential verification affordance 6010 also includes an un-displayed portion that extends beyond the area covered by the logo of ABC Airlines. In one or more of such embodiments, the boundaries of credential verification affordance 6010 are defined by the boundaries of message bubble 6104. In such embodiments, the user selects credential verification affordance 6010 if the user selects any portion of message bubble 6104. Although FIG. 12E illustrates displaying credential verification affordance 6010 in message bubble 6104, in other embodiments, credential verification affordance 6010 is displayed in body section 6004B of messaging user interface 6004. In one or more of such embodiments, credential verification affordance 6010 is displayed in a region of body section 6004B that is not overlaid by message bubbles. In further embodiments, credential verification affordance 6010 is displayed in the background of messaging user interface 6004. In further embodiments, credential verification affordance 6010 is displayed in header section 6004A of messaging user interface 6004, or a different region of messaging user interface 6004 that accessible to the user.

Figure 12F:
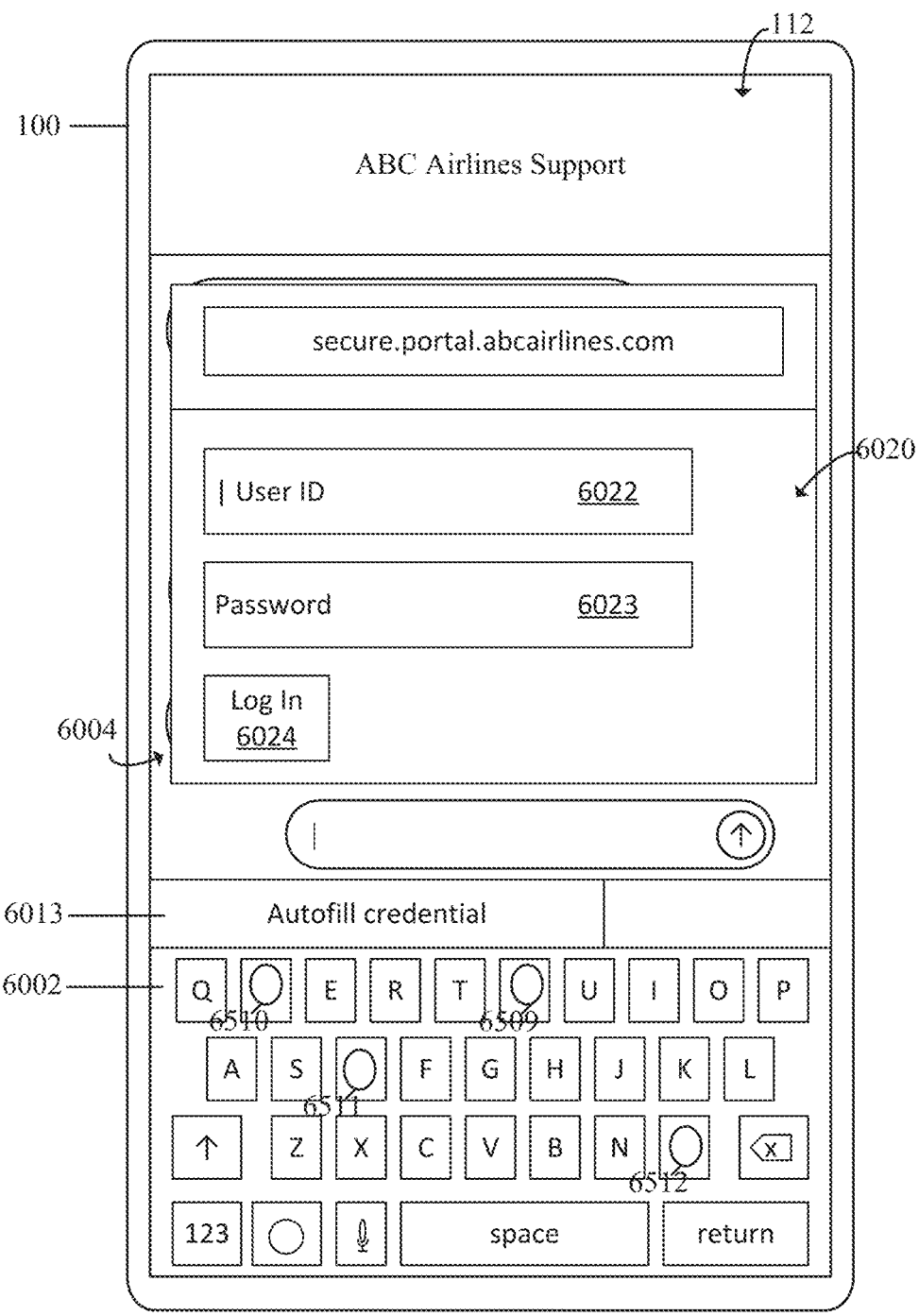
Figure 12F:
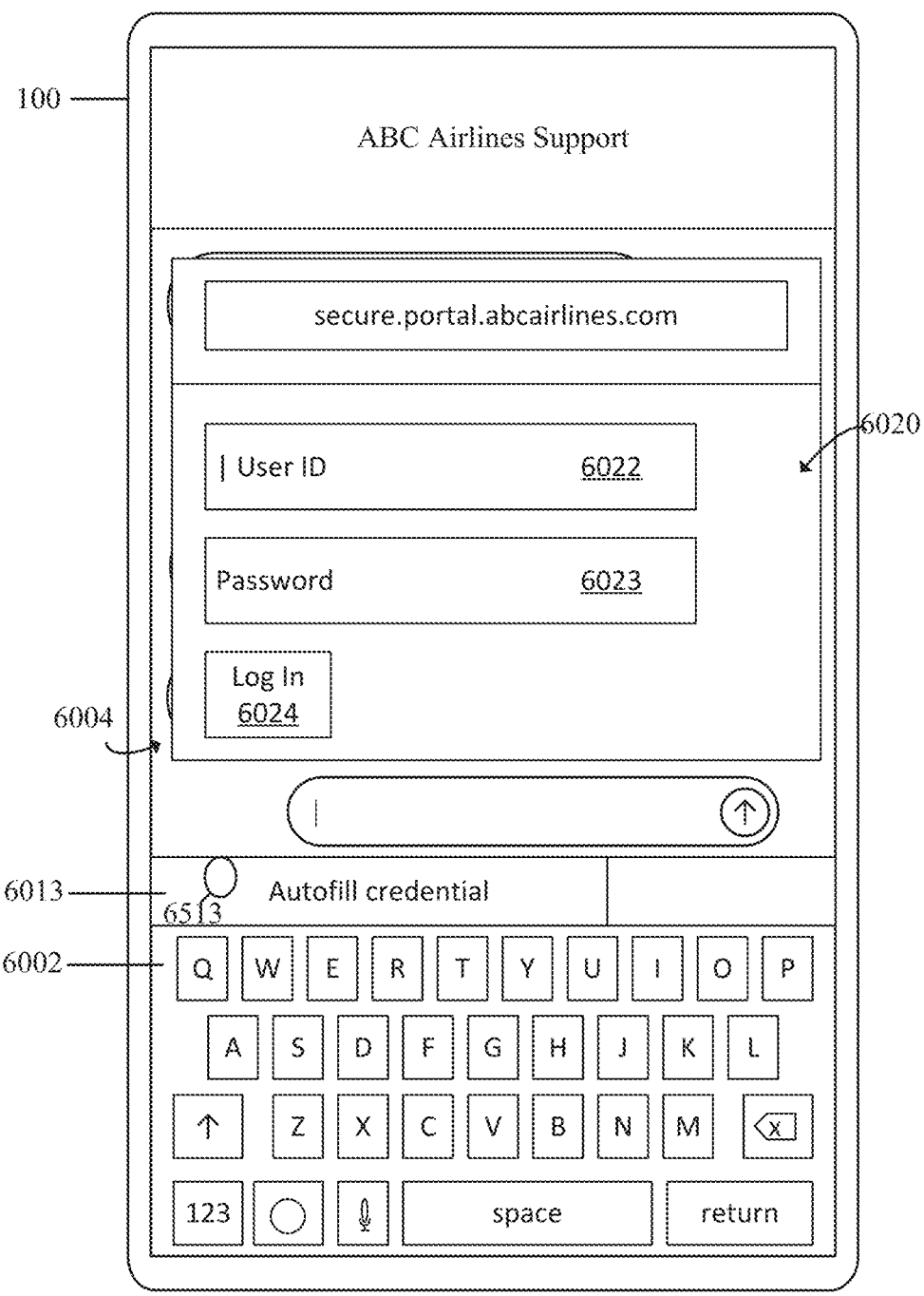
Figure 12G:
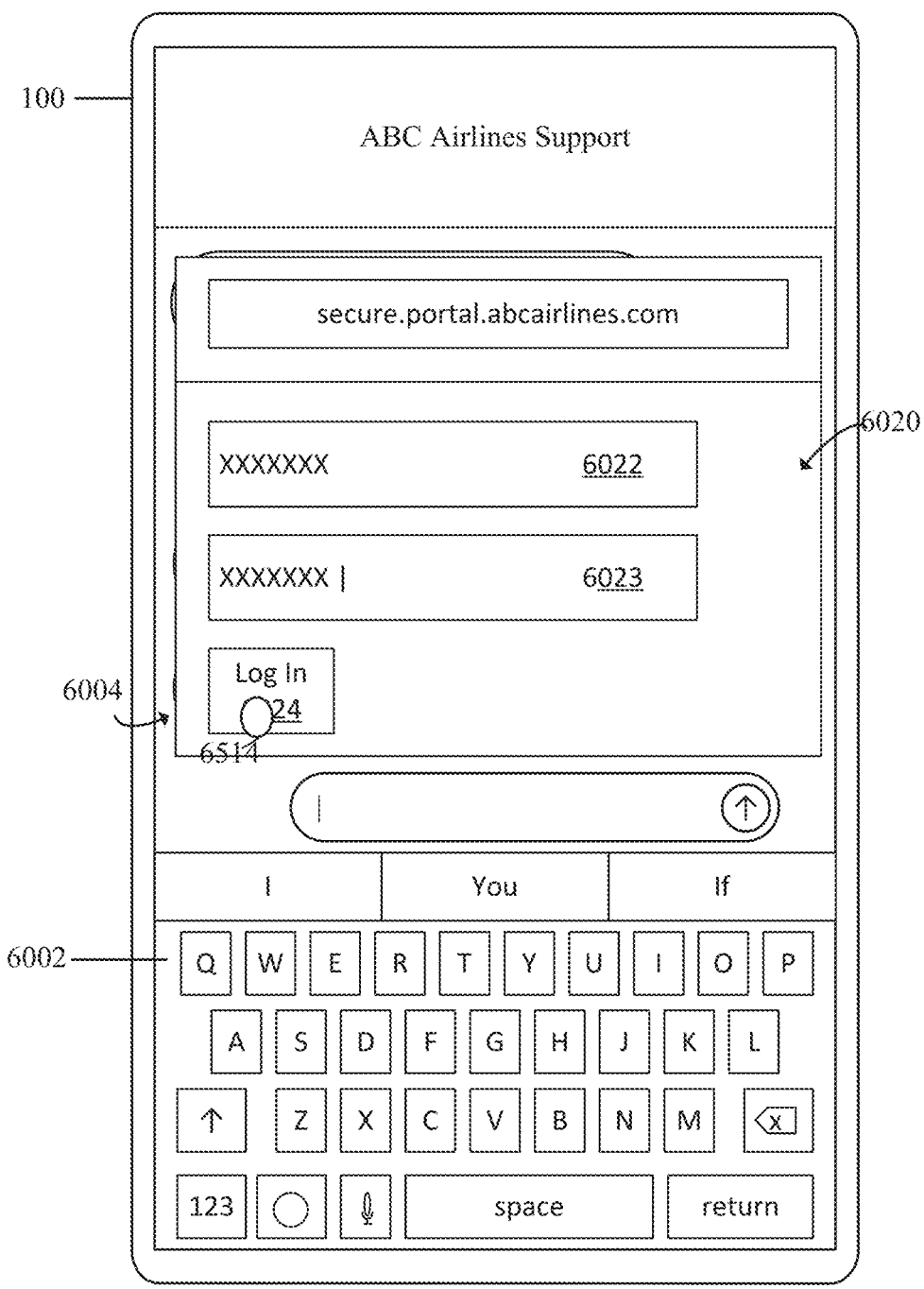

FIGS. 12E-12F illustrate detecting a tap gesture with contact 6508 over credential verification affordance 6010, and in response to the tap gesture, displaying a user credential user interface 6020 on display 112, where user credential user interface 6020 is overlaid on a portion of messaging user interface 6004. As used herein, a user credential user interface is any user interface through which the user enters the user's credential. In the illustrated embodiment, user credential user interface 6020 is a web portal of ABC Airlines. In the illustrated embodiment, user credential user interface 6020 includes a user identification field 6022 and a user password field 6023. Further, the user's credential includes the user's identification and password, which may be entered in user identification field 6022 and user password field 6023, respectively. After the user has entered the user's identification and password, the user may select a log in affordance 6024 to submit the user's credential. As used herein, log in affordance is an affordance the user selects to submit the user's credential. FIGS. 12F-12G illustrate detecting tap gestures with contacts 6509-6512 over soft keyboard 6002, and in response to the tap gestures, entering the user's identification and password in user identification field 6022 and user password field 6023, respectively.

In some embodiments, the user's credential to access the user's account with a business entity such as ABC Airlines is a biometric measurement of the user. Examples of the user's biometrics include, but are not limited to the user's finger prints, the user's facial features, the user's voice tone, the user's accent, or another suitable biometric of the user that may be used to verify the identity of the user or the credential of the user. In one or more of such embodiments, device 100, after detecting the user's biometric measurements (e.g., finger prints, facial features, etc.), displays a graphical representation of the user's biometric measurements (e.g., a finger print scan of the user, an image of the user's face, etc.) in the user credential user interface 6020. In some embodiment, device 100, after obtaining a biometric measurement of the user, provides the biometric measurement obtained from the user to the representative. In other embodiments, the representative is not responsible or authorized to process the user's credential. In one or more of such embodiments, device 100 provides the user's biometric measurements to a remote electronic device or server that is responsible for verifying the user's credential.

FIGS. 12F and 12F' also illustrate an autofill credential affordance 6013. Further, FIG. 12F' illustrates an alternative embodiment, where the user selects autofill credential affordance 6013 to autofill the user's credential. As used herein, the user's credential is autofilled if the user's credential is automatically entered into user credential user interface 6020 or another user interface that is displayed on display 112. In some embodiments, the user's credential is stored on device 100 or stored at a remote location that is accessible by device 100. In the illustrated embodiment, the user's credential is autofilled in user identification field 6022 and user password field 6023 after a prerequisite condition is satisfied. In some embodiment the prerequisite condition is satisfied if device 100 detects a user selection of autofill credential affordance 6013. In other embodiments, the prerequisite condition is satisfied if device 100 detects a biometric measurement of the user. In one of such embodiments, the prerequisite condition is satisfied if device 100 determines that a scan of a recently detected finger print of the user matches a scan of a verified finger print of the user. In one of such embodiments, where the user's finger print has not been detected within a threshold period of time, a request for the user to submit the user's finger print is displayed in user credential user interface 6020 or another user interface that is overlaid on messaging user interface 6004. In another one of such embodiments, the prerequisite condition is satisfied if a recently detected facial identification of the user matches a verified facial identification of the user. In further embodiments, the prerequisite condition is satisfied if the accent of a recently detected voice command from the user matches a verified accent of the user. In further embodiments, the prerequisite condition is satisfied after the user enters a portion of the user's credential, such as a portion of the user's identification (e.g., the first letter of the user's username), a pin number that is associated with the user's account, a keyword that is associated with the user's account, or a pre-established question associated with logging into the user's account. In further embodiments, device 100 autofills the user's credential without requiring the user to satisfy a prerequisite condition.

FIGS. 12F-12G and 12F'-12G illustrate detecting tap gestures with contacts 6509-6512 over soft keyboard 6002 to input the user's credential, and alternatively detecting a tap gesture with contact 6513 over autofill credential affordance 6013 to autofill the user's credential, and in response to the tap gestures illustrated in FIGS. 12F and 12F', displaying characters indicative of the user's credential in user identification field 6022 and user password field 6023. In the illustrated embodiment, the user selects log in affordance 6024 to submit the user's credential. In other embodiments, the user's credential is not verified by the representative to reduce the likelihood that the representative may engage in unauthorized activities with the user's credential. In one or more of such embodiments, the user's credential is submitted to another remote service that is associated with ABC Airlines to authenticate the user's credential.

In some embodiments, device 100, after detecting the user's inputs to enter the user's credential or to autofill the user's credential, encrypts the user's credential to protect the user's credential from being accessed by an unauthorized party. In one or more of such embodiments, device 100 generates an encrypted token based on the user's credential and provides, via messaging user interface 6004, the encrypted token to the electronic device of the representative or another electronic device (e.g., an electronic device of a remote service that is associated with the business entity) that is responsible for verifying the user's credential. In one or more of such embodiments, device 100 receives an encrypted token from an electronic device of the representative or from another electronic device that is responsible for verifying the user's credential. In one or more of such embodiments, device 100 uses the encrypted token to encrypt the user's credential, and provides the encrypted credential to the electronic device of the representative or to another electronic device that is responsible for verifying the user's credential. In one or more of such embodiments, the encrypted token contains a security key that is used by device 100 to encrypt the user's credential. In further embodiments, device 100 utilizes another suitable data encryption technology to encrypt the user's credential.

In some embodiments, device 100, after encrypting the user's credential, transmits the user's encrypted credential (or in some embodiments, an encrypted token containing or based on the user's credential) to the electronic device of the representative or to another electronic device that is responsible for verifying the user's credential. In one or more of such embodiments, device 100 transmits the user's encrypted credential via messaging user interface 6004 to the electronic device of the representative or to another electronic device that is responsible for verifying the user's credential. In one or more of such embodiments, device 100, after providing the user's credential or an encryption of the user's credential (e.g., an encrypted token containing the user's credential, an encrypted token based on the user's credential, etc.) to the representative, also displays a notification that the user's credential or the encryption of the user's credential has been provided to the representative. Similarly, device 100, after providing the user's credential or an encryption of the user's credential to an electronic device that is responsible for verifying the user's credential, also displays a notification that the user's credential or the encryption of the user's credential has been provided to a third party to verify the user's credential. In one or more of the foregoing embodiments, the notification is displayed in a messaging user interface, such as messaging user interface 6004 of FIG. 12H. In one or more of such embodiments, the notification is displayed in header section 6004A of messaging user interface 6004 of FIG. 12H. In one or more of such embodiments, the notification is displayed in body section 6004B of message user interface 6004 of FIG. 12H.

After the user's credential to access the user's account with ABC Airlines has been successfully verified, device 100 provides an indication that the user has successfully authenticated the user's credential to the representative via messaging user interface 6004. In some embodiments, where the user's credential is processed by a remote service that is associated with ABC Airlines, device 100 also provides an indication that the user has successfully authenticated the user's credential to the remote service.

Figure 12H:
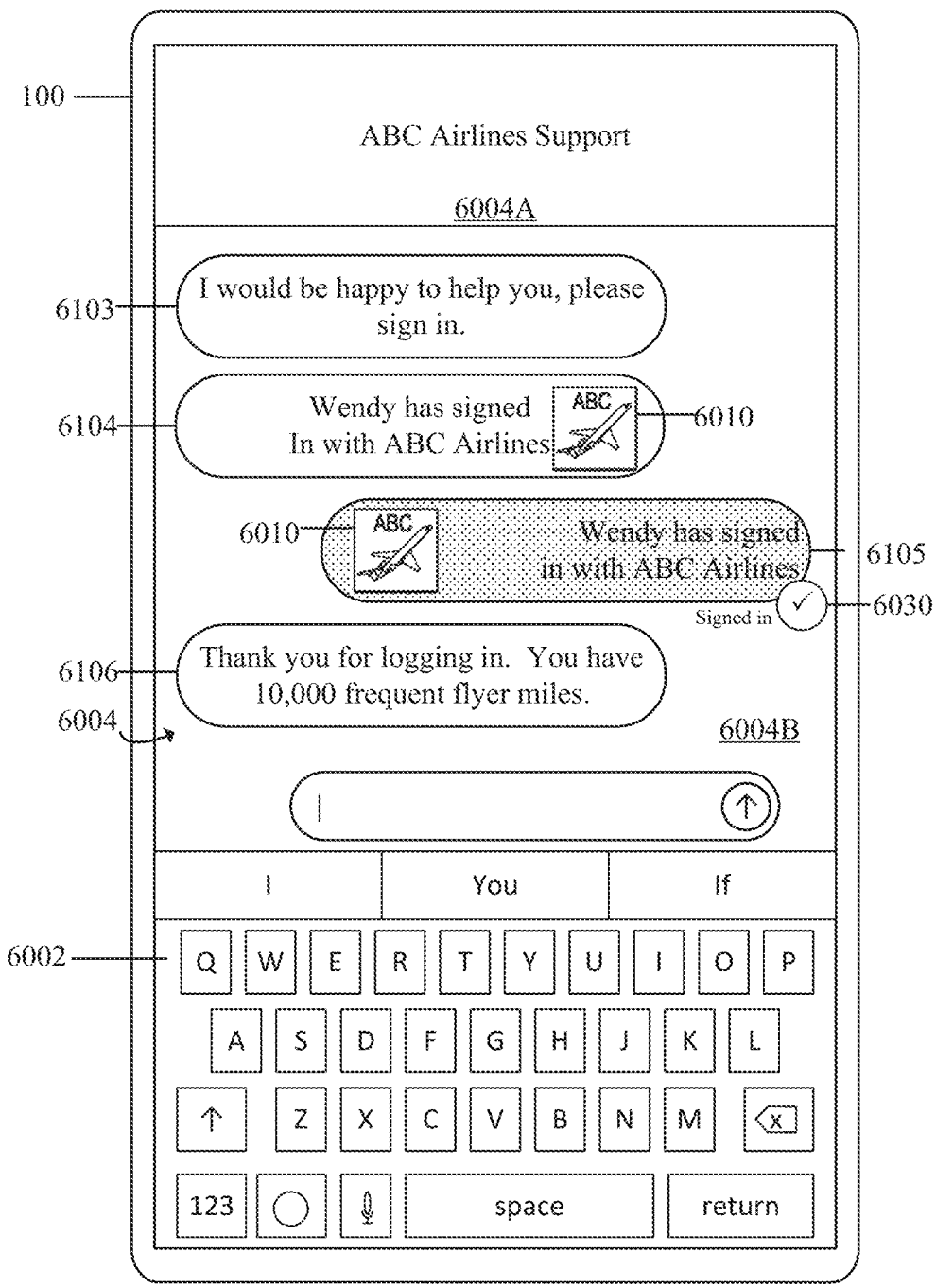

FIGS. 12G-12H illustrate detecting a tap gesture with contact 6514 over log in affordance 6024, and in response to the tap gesture, displaying an indication that the user has successfully authenticated with the user account in messaging user interface 6004. As illustrated in FIG. 12H, messages indicating that the user has logged into the user's account with ABC Airlines are displayed in consecutive message bubbles 6104 and 6105, which are displayed on opposite sides of messaging user interface 6004. Optionally, only one of message bubbles 6104 and 6105 is displayed in messaging user interface 6004 after the user has successfully authenticated with the user's account. A verified credential indicator 6030 is displayed next to message bubble 6015 together with a message that the user has "signed in" to notify the user that the user has successfully authenticated with the user account. As illustrated in FIG. 12H, verified credential indicator 6030 is a check mark. In other embodiments, verified credential indicator 6030 may include any other visual content that indicates that the user has successfully authenticated with the user's account. A response from the representative is displayed in messaging user interface 6004 after the user has successfully authenticated with the user's account with ABC Airlines. In some embodiments, privileged content, which may not be shared with the user before the user's credential is verified, is provided by the representative and is displayed in messaging user interface 6004. In the illustrated embodiment, the privileged content includes a message from the representative informing the user that the user has 10,000 frequent flyer miles and is displayed in message bubble 6106. Once the user has successfully authenticated with the user's account, the user may continue to communicate with the representative through messaging user interface 6004.

Figure 12I:
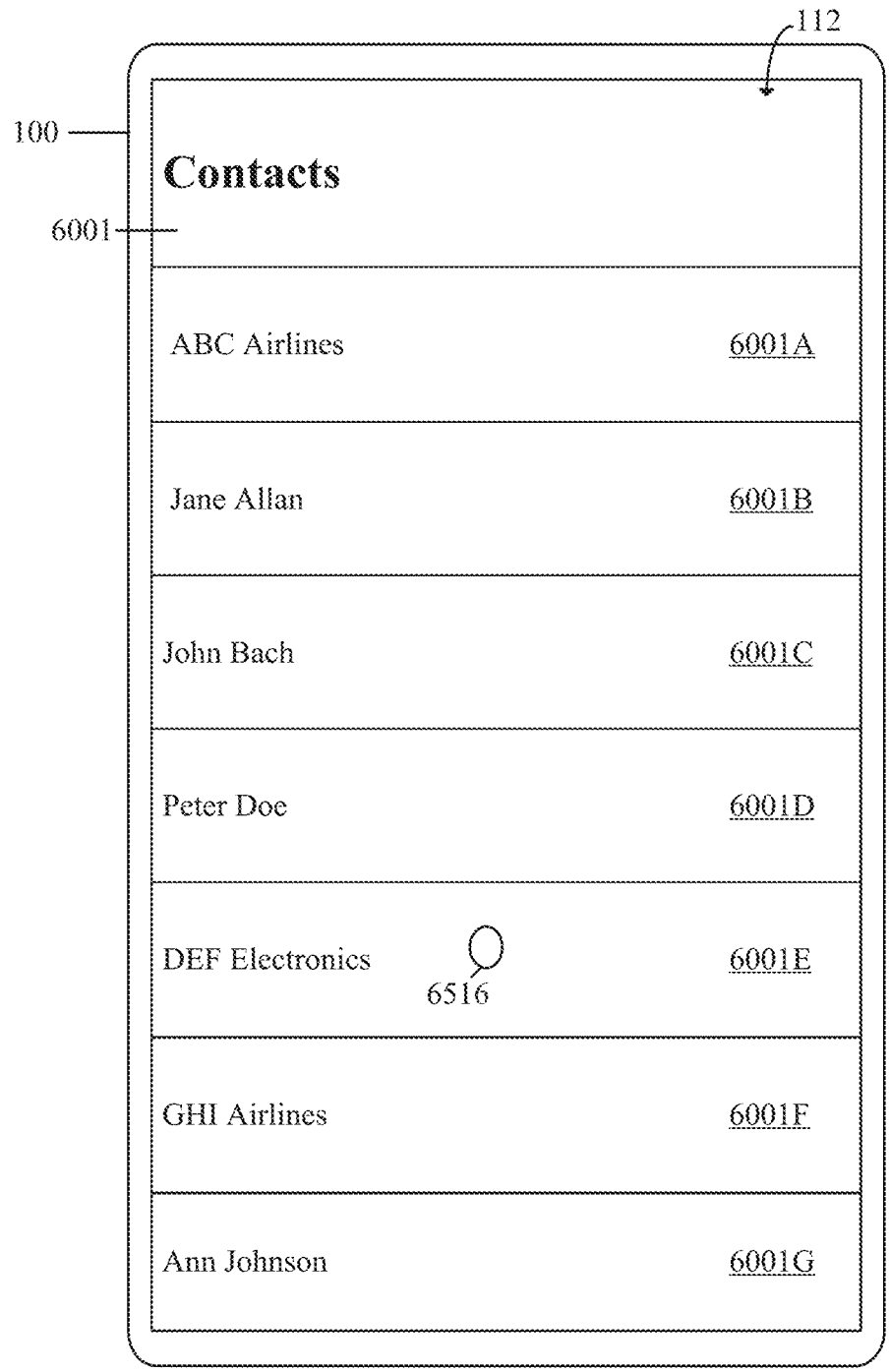
Figure 12J:
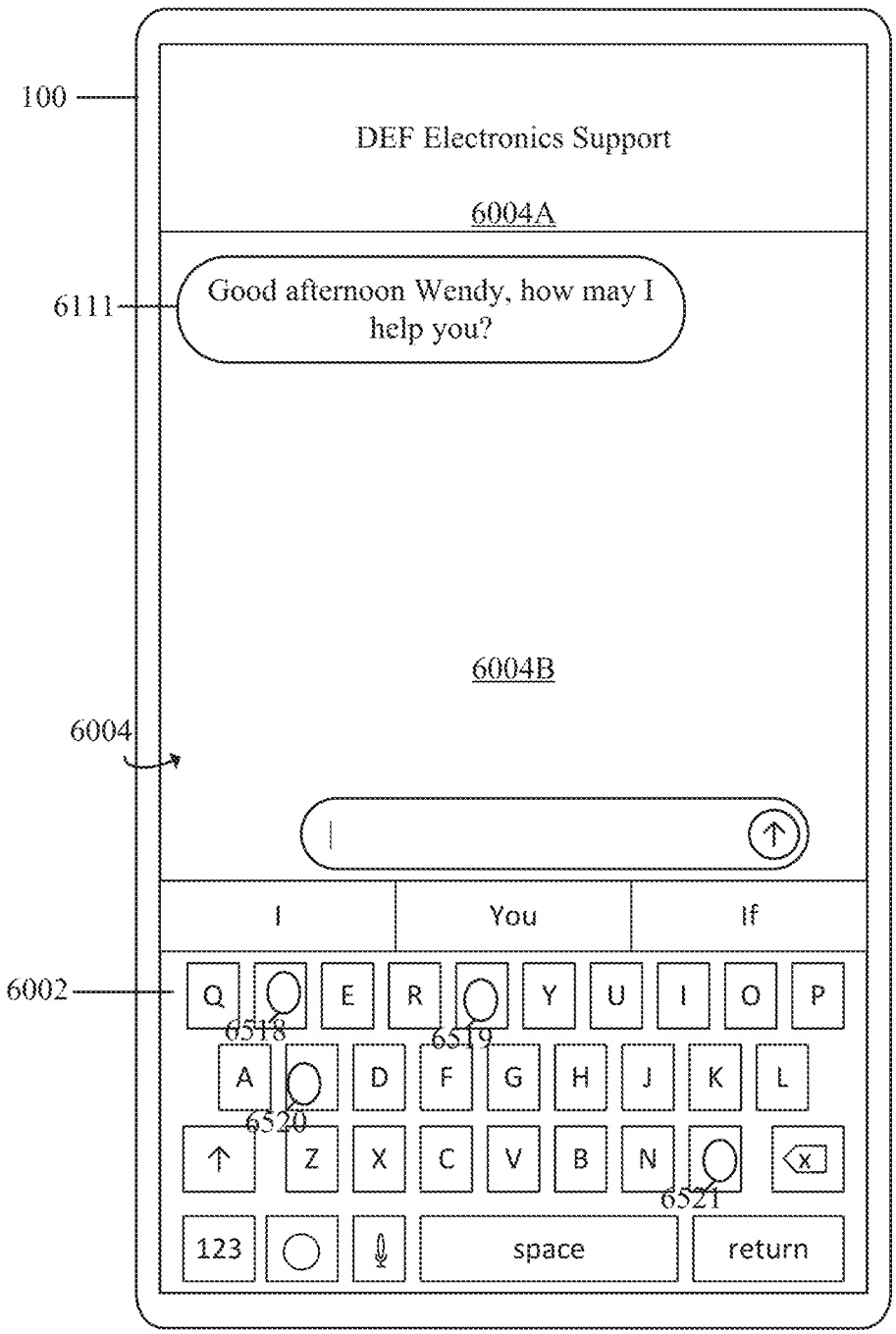

FIG. 12I, Similar to FIG. 12A, illustrates displaying contact user interface 6001 on display 112. Further, FIGS. 12I-12J illustrate detecting a tap gesture with contact 6516 over a region of display 112, on which contact 6001E for DEF Electronics is displayed, and in response to the tap gesture, displaying a messaging session between the user and a representative of DEF Electronics in messaging user interface 6004. As illustrated in FIG. 12J, "DEF Electronics Support" is displayed in header section 6004A of messaging user interface 6004 to assist the user to identify the business entity and the group within the business entity the user has contacted. In some embodiments, a business indicia, such as an avatar of DEF Electronics, a logo of DEF Electronics, a trademark of DEF Electronics, an animation associated with a product or service of DEF Electronics, a profile picture of DEF Electronics or another business indicia described in the foregoing paragraphs and illustrated in FIGS. 8A-8C is also displayed in header section 6004A to help the user identify DEF Electronics and associate the representative as a representative of DEF Electronics.

As illustrated in FIG. 12J, message bubble 6111 contains a message from the representative, and is displayed in body section 6004B of messaging user interface 6004. In some embodiments, an indication that the representative is associated with DEF Electronics, such as a description of the representative's role with DEF Electronics, is also displayed in message bubble 6111, next to message bubble 6111, or another region of messaging user interface 6004 to help the user identify the identity of the representative as well as the representative's relationship with DEF Electronics. In some embodiments, a business indicia of DEF Electronics is also displayed in body section 6004B.

Figure 12K:
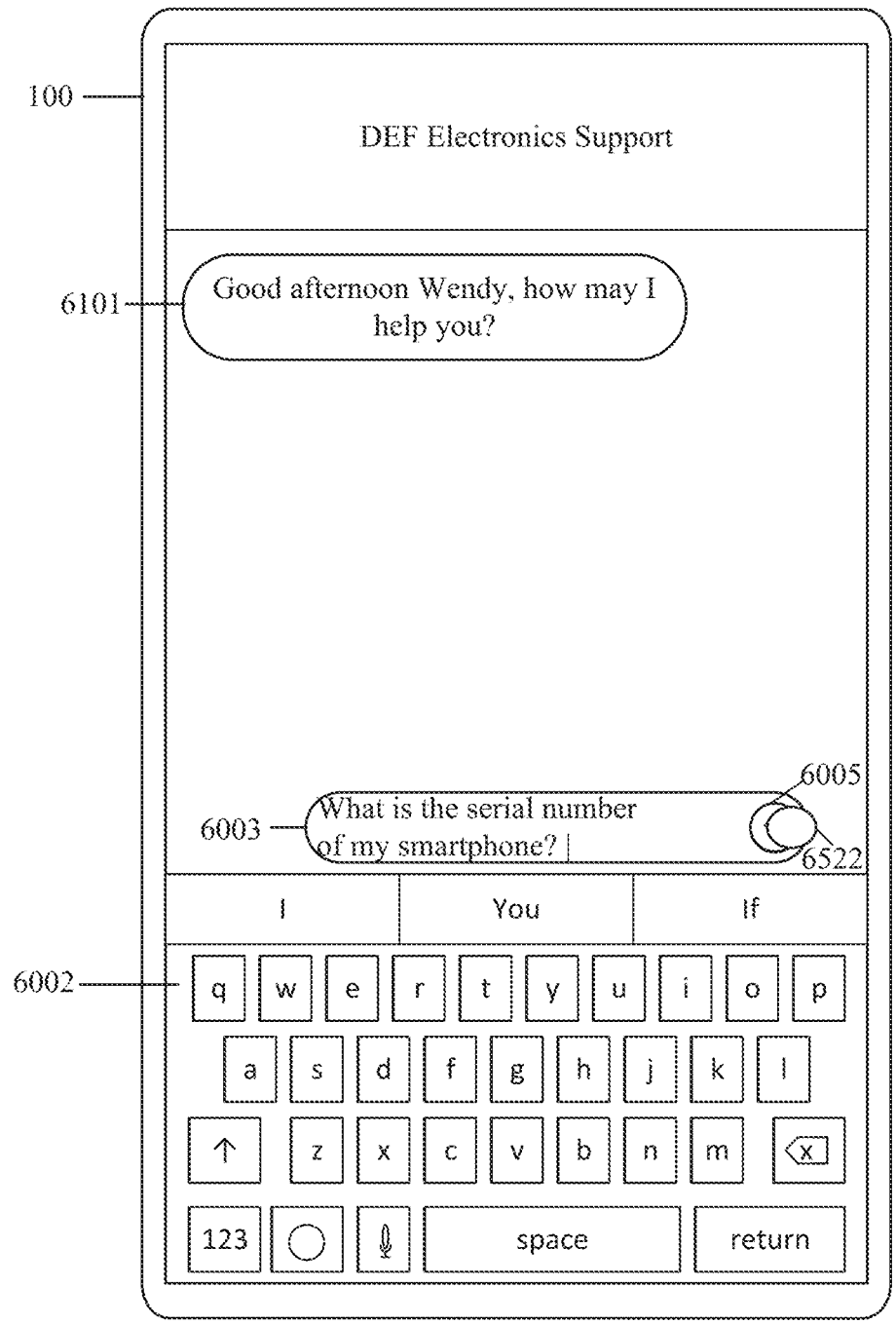
Figure 12L:
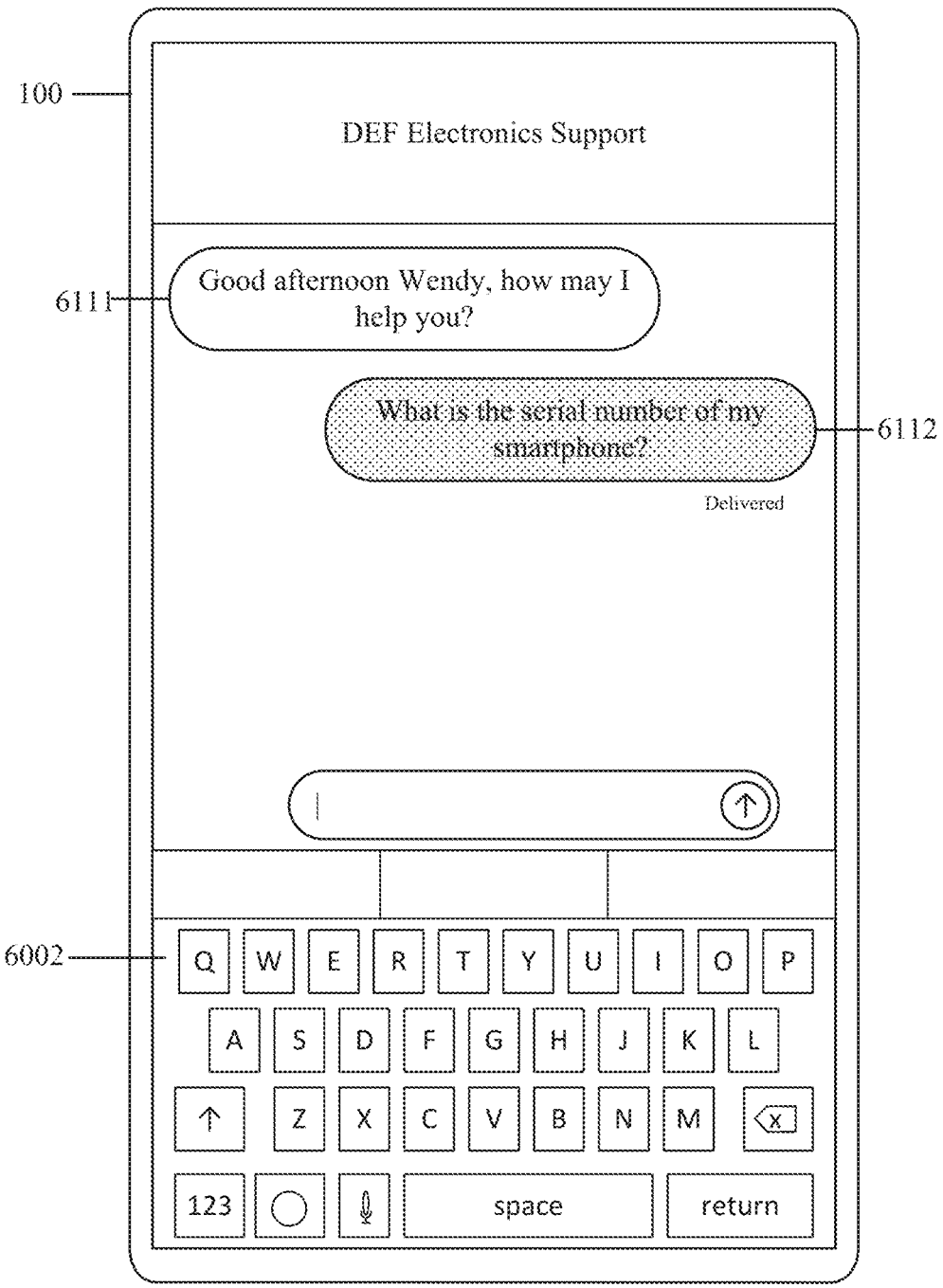

FIGS. 12J-12K illustrate detecting tap gestures with contacts 6518-6521 over soft keyboard 6002 to type a question regarding the serial number of the user's smartphone, and in response to the tap gestures, displaying the question in a message input box 6003. As illustrated in FIG. 12K, the question regarding the serial number of the user's smartphone is displayed in message input box 6003. FIGS. 12K-12L illustrate detecting a tap gesture with contact 6522 over message submission affordance 6005 to submit the question regarding the regarding the serial number of the user's smartphone, and in response to the tap gesture, displaying the question in message bubble 6112.

Figure 12M:
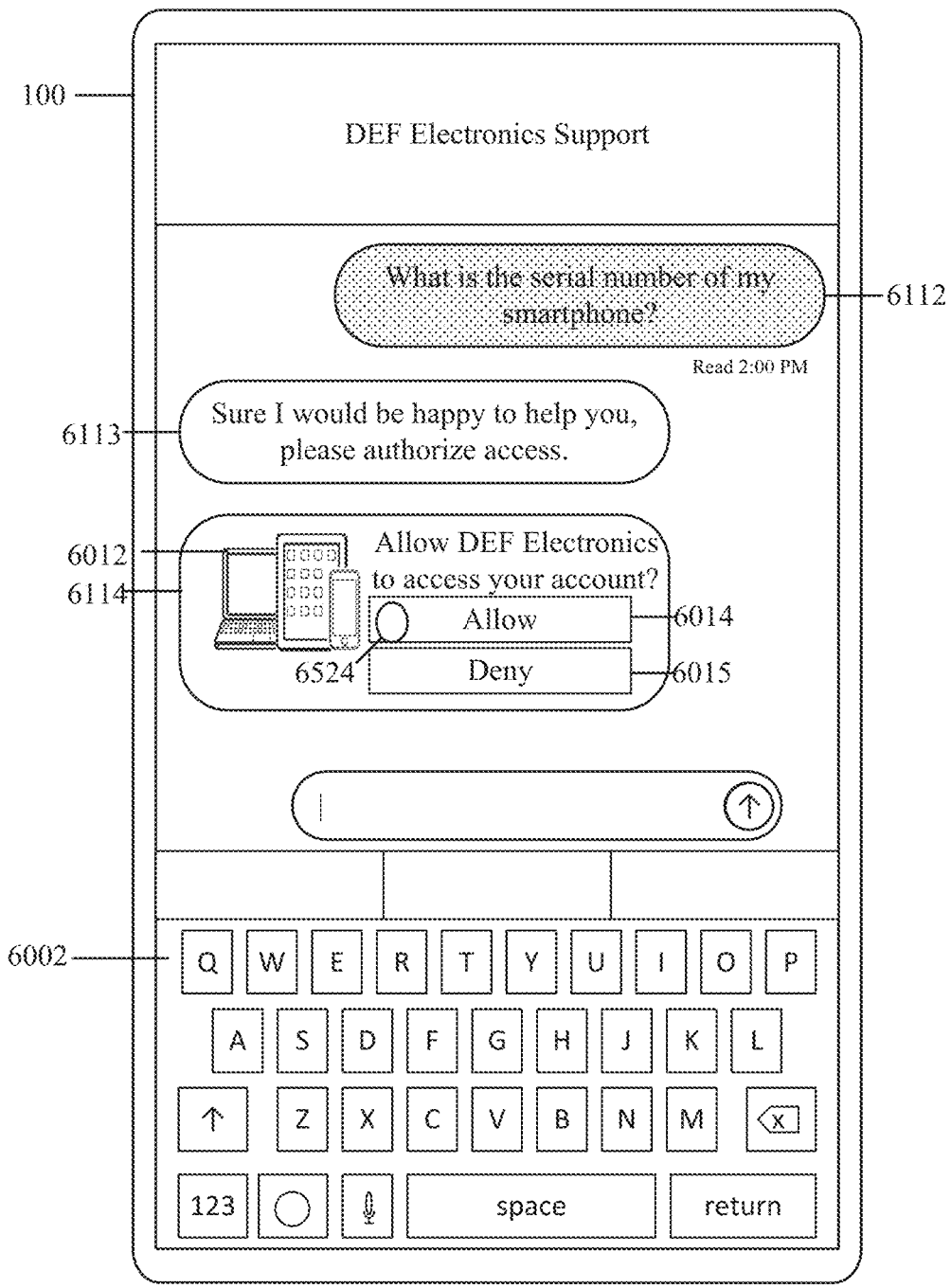

In the embodiment illustrated in FIGS. 12I-12N, the representative is not authorized to access the user's account without approval from the user. FIG. 12M illustrates displaying a request from the representative for the user to grant the representative with access to the user's account in message bubble 6113. FIG. 12M further illustrates displaying an allow affordance 6014 and a deny affordance 6015 in message bubble 6114. Allow affordance 6014 and deny affordance 6015 are affordances the user selects to authorize or deny the representative's request to access the user's account. In the illustrated embodiment, each of allow affordance 6014 and deny affordance 6015 is also a credential verification affordance described herein. FIG. 12M further illustrates displaying a graphical representation 6012 of DEF Electronics in message bubble 6114 to help the user identify the source of the request to access the user's account.

Figure 12N:
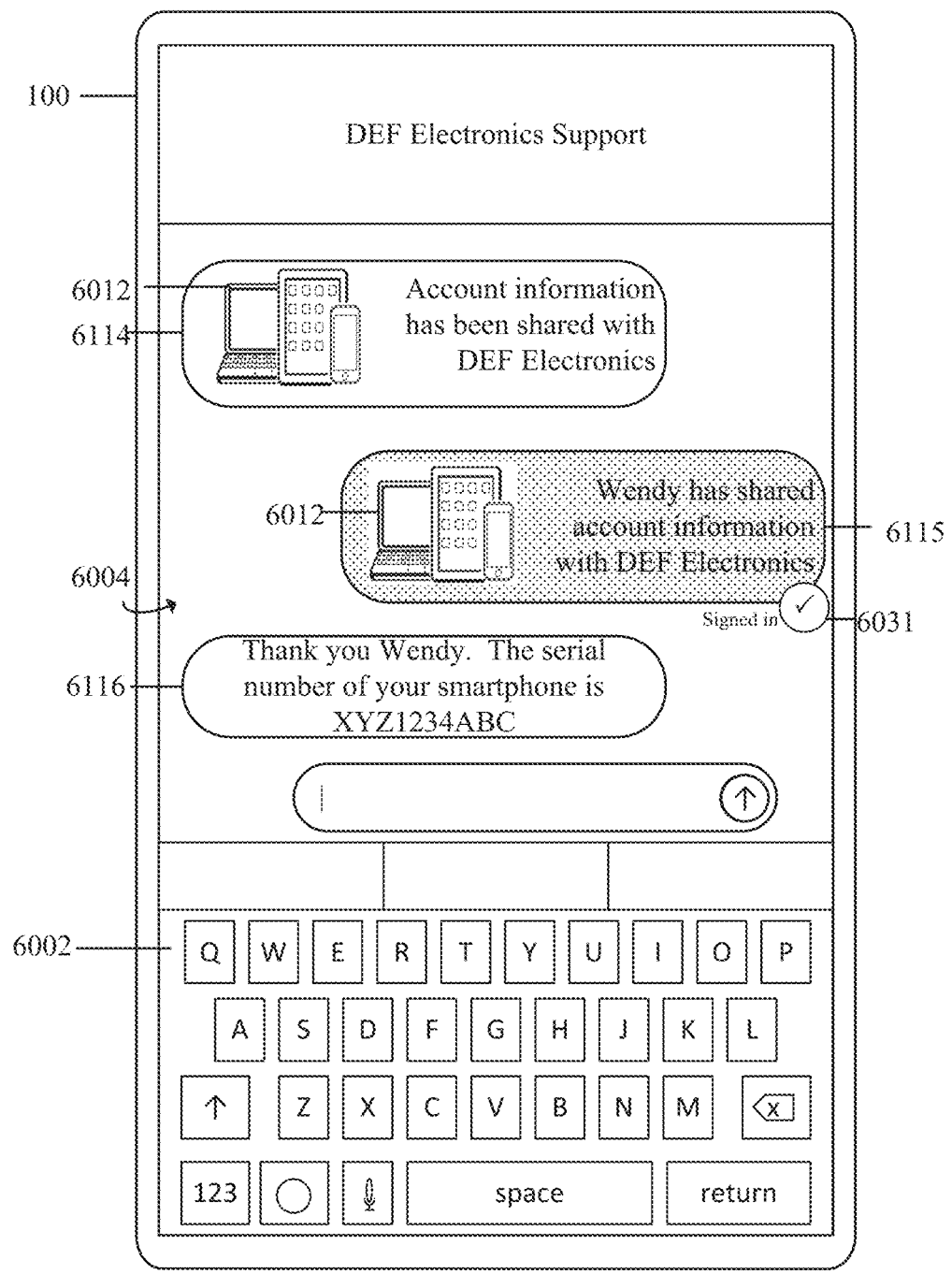

FIGS. 12M-12N illustrate detecting a tap gesture with contact 6524 over allow affordance 6014, and in response to the tap gesture, displaying an indication that the user has granted the representative with access to the user's account in messaging user interface 6004. As illustrated in FIG. 12N, messages indicating that the user has granted the representative with access to the user's account are displayed in consecutive message bubbles 6114 and 6115, which are displayed on opposite sides of messaging user interface 6004. Optionally, only one of message bubbles 6114 and 6115 is displayed in messaging user interface 6004 after the user has granted the representative access to the user's account. A verified credential indicator 6031 is displayed next to message bubble 6015 together with a message that the representative has been granted access to the user's account. As illustrated in FIG. 12N, verified credential indicator 6031 is a check mark. In other embodiments, verified credential indicator 6031 may include any other visual content that indicates that the representative has been granted access to the user's account. A response from the representative is displayed in messaging user interface 6004 after the user has granted the representative with access to the user's account. In some embodiments, privileged content regarding information that the representative is not authorized to access without permission from the user is provided by the representative and are displayed in messaging user interface 6004. In the illustrated embodiment, the privileged content includes the serial number of the user's smartphone and is displayed in message bubble 6116. Although FIGS. 12M-12N illustrate interactions between the user and the representative to grant the participant with access to the user's account with DEF Electronics, in some embodiments, similar interactions may also be performed to grant the representative with access to device 100, to another account of the user that is not associated with DEF Electronics, or to another device of the user. For example, where the user requires the representative to perform a remote diagnosis of device 100, a message from the representative requesting the user to grant the representative access to device 100 may also be displayed in messaging user interface 6004 of FIG. 12M. In such embodiments, the user selects allow or deny affordances 6014 and 6015 to grant or to deny the representative access to device 100.

Figure 12O:
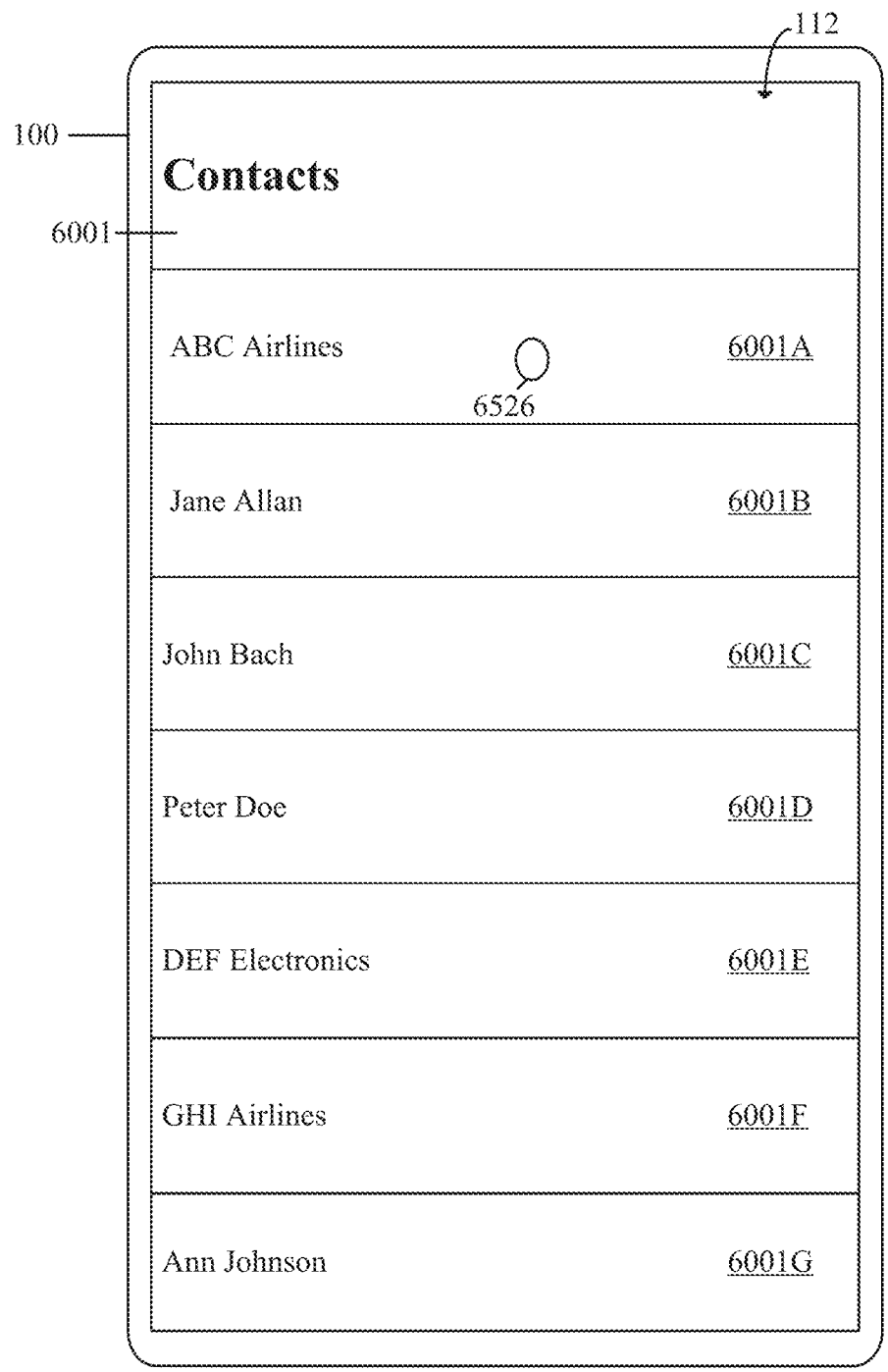
Figure 12P:
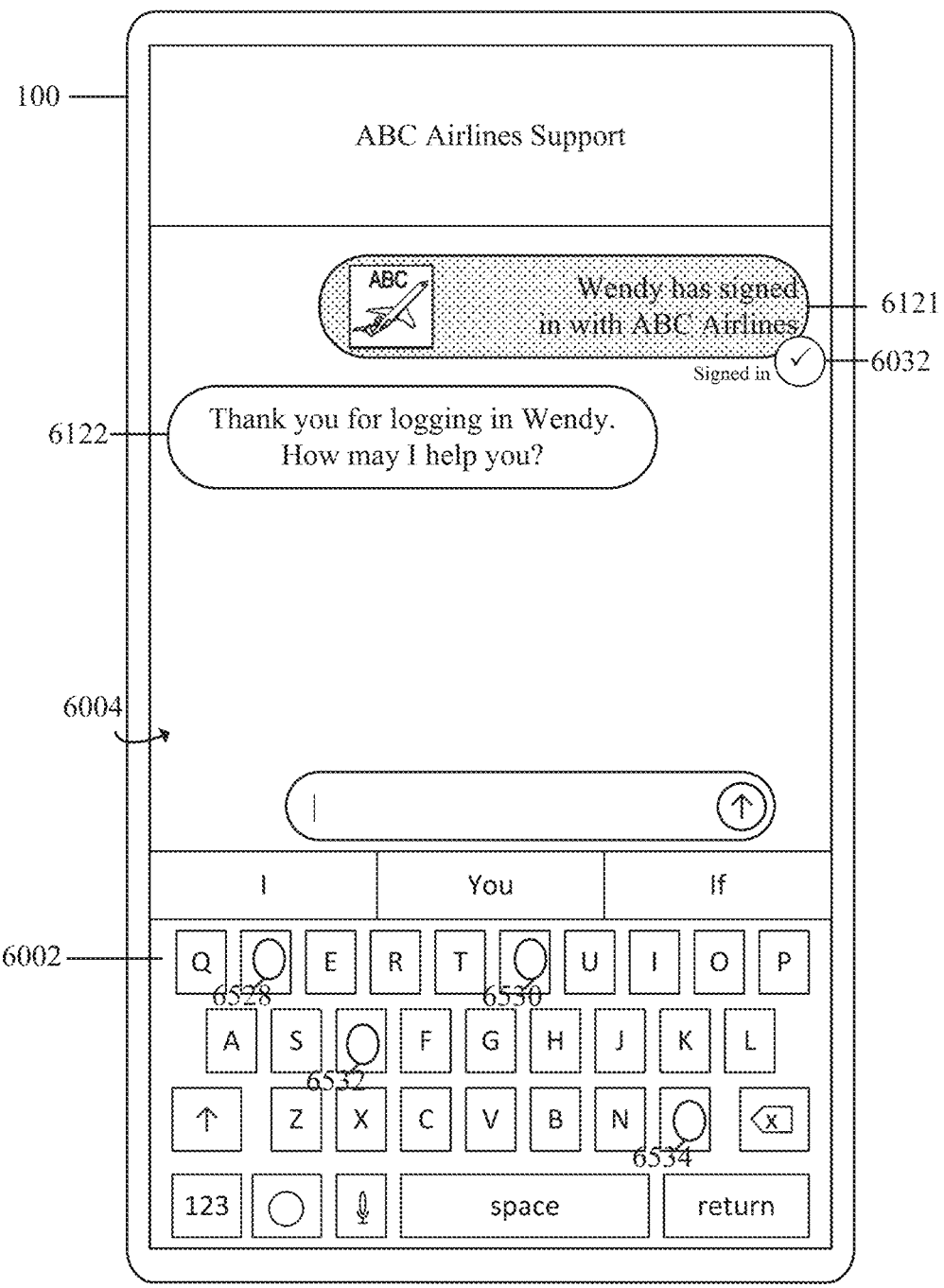

FIG. 12O, similar to FIG. 12A, also illustrates displaying contact user interface 6001 on display 112. Further, FIGS. 12O-12P illustrate detecting a tap gesture with contact 6526 over a region of display 112, on which contact 6001A for ABC Airlines is displayed, and in response to the tap gesture, displaying a second messaging session between the user and a representative of ABC Airlines in messaging user interface 6004. In the illustrated embodiment of FIG. 12P, the user's credential, which was entered during the previous session (illustrated in FIGS. 12A-12H) to access the user's account with ABC Airlines, has not expired at the commencement of the second messaging session. As such, a message indicating that the user is still logged in with the user's account with ABC Airlines is displayed in message bubble 6121. FIG. 12P, similar to FIG. 12H, illustrates displaying a verified credential indicator 6032 next to message bubble 6121 together with a message that the user is "signed in" to notify the user that the user has successfully authenticated with the user account with ABC Airlines. In other embodiments, device 100 displays a different message that indicates that the user's credential has been authenticated. In some embodiments, device 100 maintains display of verified credential indicator 6032 in messaging user interface 6004 if the previously entered credential has not expired. Further, the user is not required to re-authenticate the user's credential if the previously entered credential has not expired. In the illustrated embodiment, a message from the representative confirming that the user has logged into the user's account with ABC Airlines is displayed in message bubble 6122.

Figure 12Q:
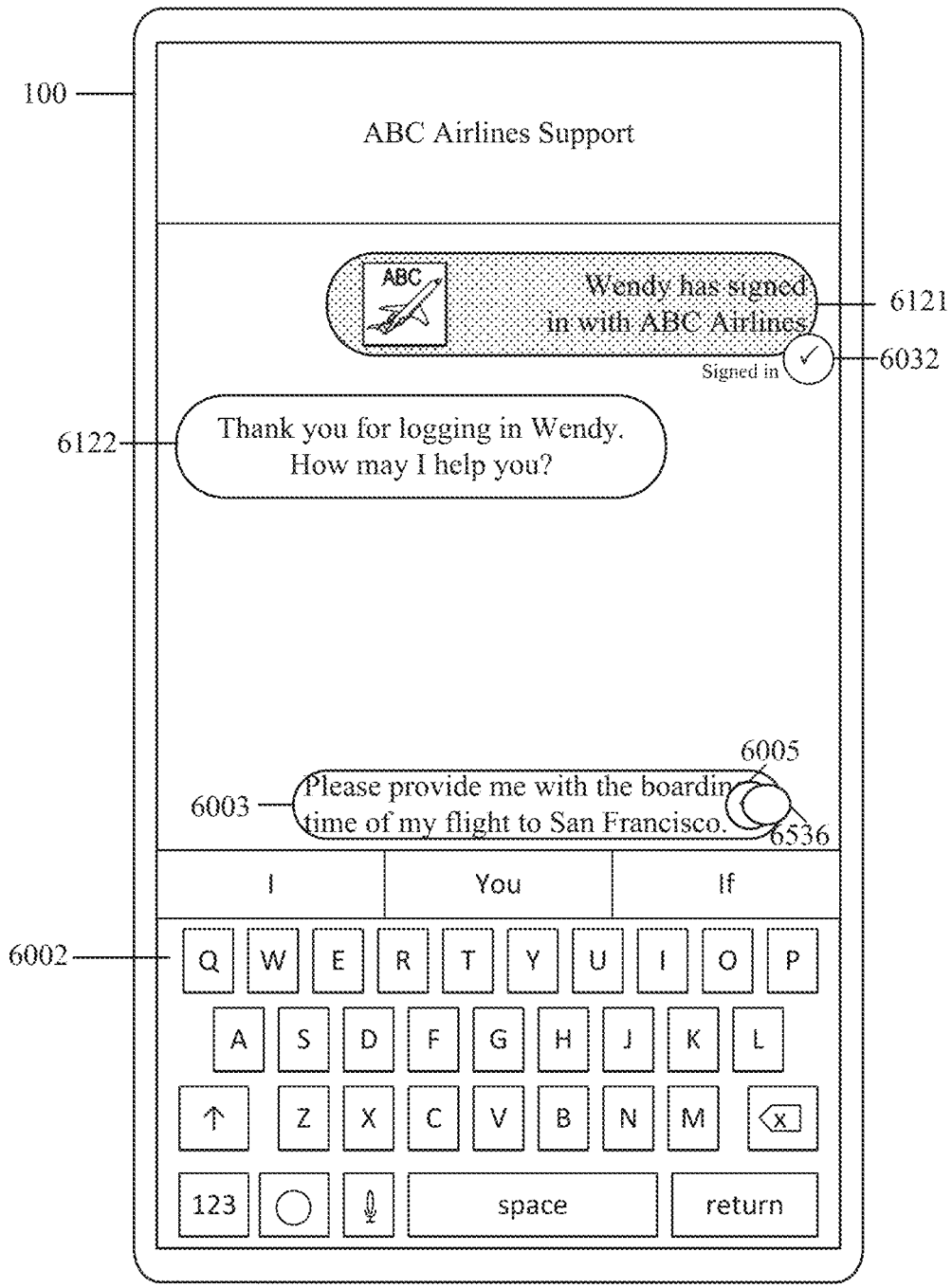
Figure 12R:
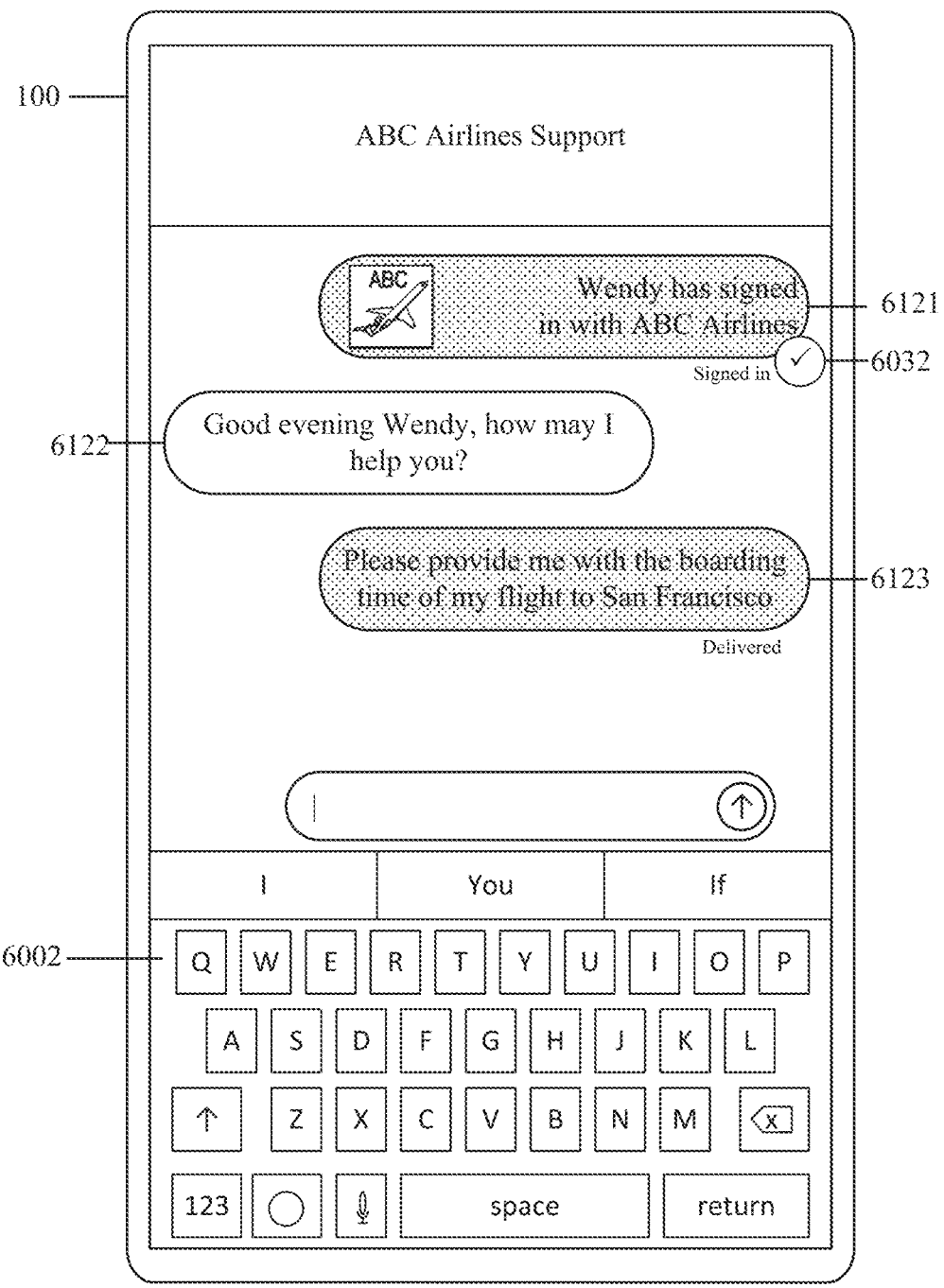

FIGS. 12P-12Q illustrate detecting tap gestures with contacts 6528, 6530, 6532, and 6534 over soft keyboard 6002 to type a question regarding the boarding time of the user's upcoming flight to San Francisco, and in response to the tap gestures, displaying the question in a message input box 6003. FIGS. 12Q-12R illustrate detecting a tap gesture with contact 6536 over message submission affordance 6005 to submit the question regarding the user's upcoming flight to San Francisco, and in response to the tap gesture, displaying the question in message bubble 6123. In the illustrated embodiment, the user's credential has not expired at the time the user's question is received by the representative. As such, the representative provides privileged content containing information about the user's upcoming flight to San Francisco to the user without requesting the user to re-authenticate the user's credential.

Figure 12S:
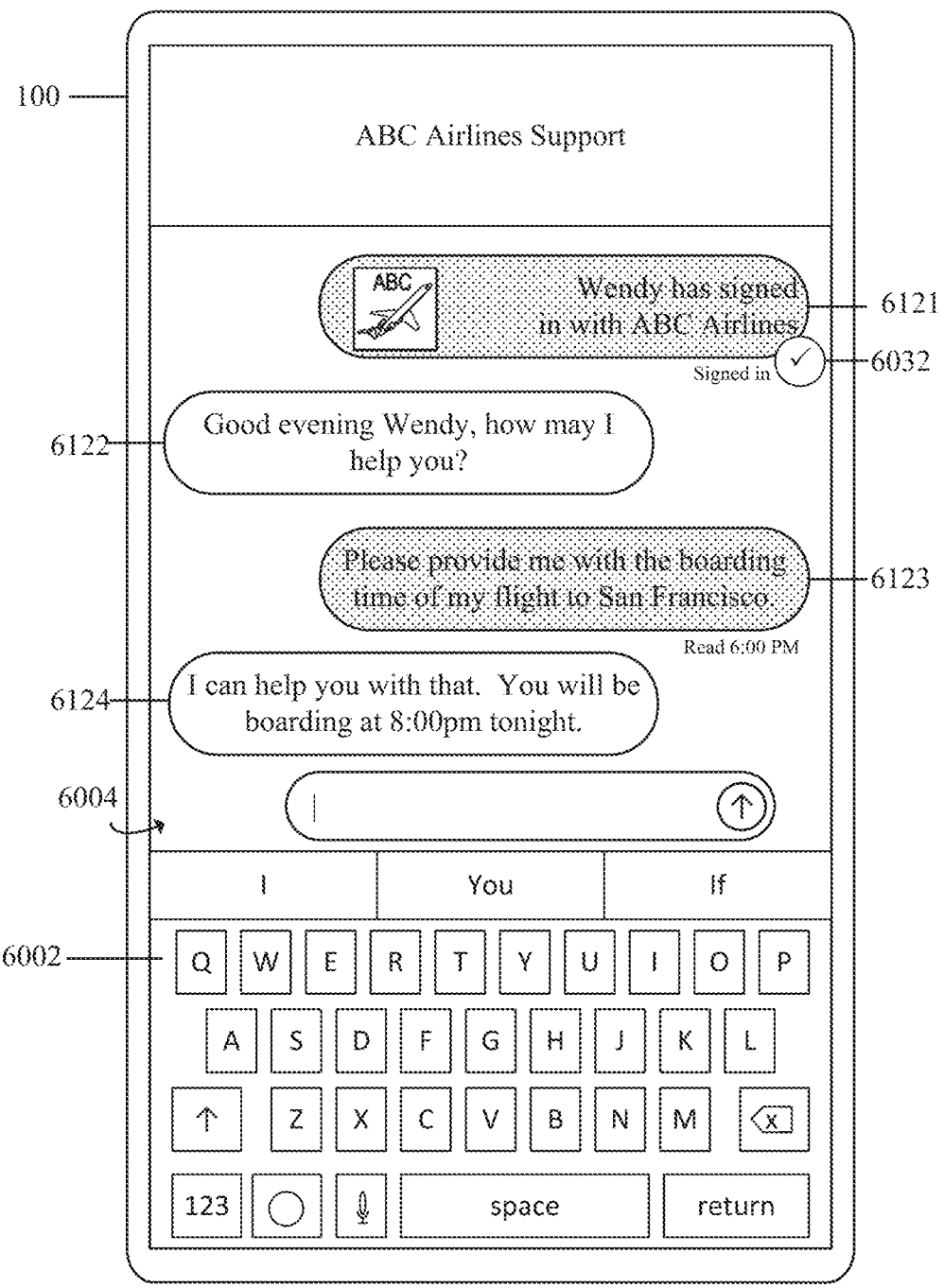

FIG. 12S illustrates displaying a response from the representative informing the user that the boarding time of the user's upcoming flight to San Francisco is 8:00 pm in a message bubble 6124. In some embodiments, the user may continue to communicate with the representative through messaging user interface 6004 without having to re-authenticate the user's credential as long the user's previously provided credential has not expired. In other embodiments, the user may periodically request privileged information or request the representative to perform tasks that requires the user's re-authenticate or to provide additional credential. For example, while the credential the user entered in FIG. 12F may be sufficient to authorize the representative to provide the user with information about the user's boarding time of the user's flight to San Francisco, additional credential is needed if the user desires to cancel the user's flight to San Francisco. In one of such embodiments, another credential verification affordance similar to credential verification affordance 6010 of FIG. 12E is displayed in messaging user interface 6004.

Figure 12T:
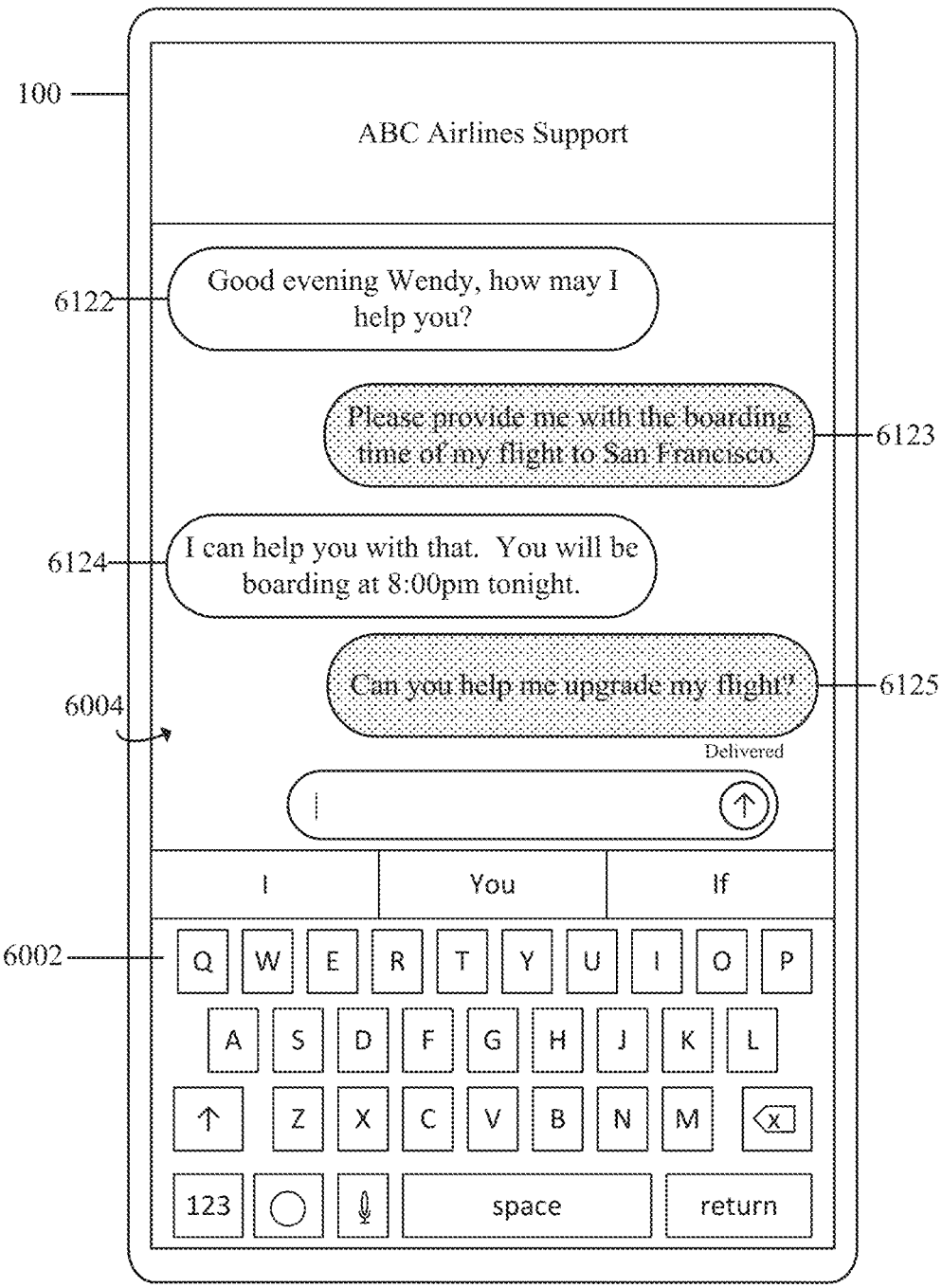

FIG. 12T illustrates displaying a request from the user for assistance to upgrade the user's flight to San Francisco sometime after the representative provided the user with the boarding time of the user's flight to San Francisco. In the illustrated embodiment, the user's credential to access the user's account with ABC Airlines had expired at the time the user's request to upgrade the user's flight to San Francisco was delivered to the representative. As such, the user would need to re-authenticate the user's credential in order to receive additional assistance from the representative. In the illustrated embodiment, device 100 removed display of verified credential indictor 6032, which was displayed in messaging user interface 6004 of FIGS. 12P-12S while the user's credential had not expired, from messaging user interface 6004 after the user's credential had expired.

FIG. 12U, similar to FIG. 12E, illustrates displaying a second request from the representative to sign into the user's account in message bubble 6126. FIG. 12U also illustrates displaying credential verification affordance 6010 to sign into the user's account with ABC Airlines in message bubble 6127. The user may enter inputs similar to the inputs illustrated in FIGS. 12E-12G to re-authenticate the user's credential. Once the user has successfully re-authenticated the user's account with ABC Airlines, the representative may assist the user with upgrading the user's flight to San Francisco, or to respond to other requests from the user.

FIGS. 13A-13C are flow diagrams illustrating various embodiments of a method for verifying user credential through a messaging user interface. More particularly, FIGS. 13A-13C are flow diagrams illustrating a method for verifying user credential, using, for example, the user interfaces of FIGS. 12A-12U. As described in reference to FIGS. 12A-12U, method 1300 can be utilized to verify user credential through a messaging user interface. Method 1300 is performed at an electronic device (e.g., device 100, 300, 500 illustrated in FIGS. 1, 3A, and 5A, respectively) with a display and one or more input devices. In one of such embodiments, the display is a touch screen display and the touch-sensitive surface is on or integrated with the display. In some embodiments, the display is separate from the touch-sensitive surface. In other embodiments, the processes described herein may be implemented with devices having physical user-interfaces, voice interfaces, or other suitable interfaces. Some operations in method 1300 are, optionally, combined and/or the order of some operations is, optionally, changed.

As described below, method 1300 provides an intuitive way for verifying the user credential of a user of an electronic device during a messaging session between the user and a respective participant of the messaging session. Method 1300 allows the user to participate in the messaging session and to initiate a credential verification process through a common messaging user interface. Method 1300 reduces the cognitive burden on the user by allowing the user to engage in the messaging session and to verify the user's credential through a common messaging user interface without having to navigate through multiple user interfaces, thereby creating a more efficient human-machine interface. For battery-operated computing devices, enabling a user to verify the user's credential faster and more efficiently conserves power and increases the time between battery charges.

Device 100 displays (1302) a messaging session between a user of device 100 and a respective participant in the messaging session other than the user of device 100 in a messaging user interface, wherein the respective participant is associated with a user account of the user. FIGS. 12B-12E, for example, show displaying a messaging session between the user and a participant, who is a representative of ABC Airlines, in messaging user interface 6004.

In some embodiments, the user account and the respective participant are associated with an identical organization (1304). FIGS. 12J-12N, for example, show displaying messages from a participant who is a representative of DEF Electronics support. Further, the user's account is an account with DEF Electronics. Allowing the user to engage in the messaging session with a participant who is associated with the user account of the user and allowing the user to verify the user's credential in a common user interface reduces the number of extraneous user interfaces needed to verify the user's credential with the participant, thereby reducing the cognitive burden on the user. The foregoing also enhances the operability of the device and creates a more efficient human-machine interface. For battery-operated computing devices, enabling the user to verify the user's credential with a participant who is associated with the user's account faster and more efficiently conserves power and increases the time between battery charges.

In some embodiments, an indication that the respective participant is associated with the organization is displayed in the messaging user interface (1306). FIG. 12J-12L, for example, show displaying a message from the participant in message bubble 6111. In some embodiments, a description of the participant's relationships with DEF Electronics (such as a technical support analyst of ABC Electronics) is displayed in message bubble 6111, next to message bubble 6111, or in another region of messaging user interface 6004. Displaying an indication that the respective participant is associated with the organization allows the user to quickly and efficiently determine the identity of the respective participant without having to exit from the messaging user interface, thereby creating a more efficient human-machine interface. Displaying an indication that the respective participant is associated with the organization also allows the user to determine the identity of the respective participant without requesting a third party representative of the organization to confirm the identity of the respective participant, thereby reducing bandwidth on networks, and preserving energy. For battery-operated computing devices, enabling the user to determine the identity of the respective participant faster and more efficiently conserves power and increases the time between battery charges.

Device 100, while the messaging session is active, displays (1308), on display 112, a first credential verification affordance in the messaging user interface. FIG. 12E, for example, illustrates displaying credential verification affordance 6010 in message bubble 6104.

In some embodiments, device 100 displays (1310) a first conversation bubble of a message from the respective participant in the messaging user interface, where the first credential verification affordance is displayed in the first conversation bubble. FIG. 12E, for example, illustrates displaying credential verification affordance 6010 in message bubble 6104. Displaying the credential verification affordance in a conversation bubble of a message allows the user to quickly and easily identify the credential verification affordance, which creates a more efficient human-machine interface. Displaying the credential verification affordance in a conversation bubble of a message from the respective participant also allows the user to quickly determine that the credential verification affordance is from the respective participant, which reduces the cognitive burden on the user. For battery-operated computing devices, enabling a user to determine a source of the credential verification affordance quickly and more efficiently conserves power and increases the time between battery charges.

Device 100 detects (1312), via the one or more input devices, one or more user inputs to authenticate with the user account. FIG. 12F, for example, illustrates detecting tap gestures with contacts 6509-6512 over soft keyboard 6002 to enter the user's credential to authenticate with the user's account with ABC Airlines. FIG. 12F', for example, illustrates detecting a tap gesture with contact 6513 over autofill credential affordance 6013.

In some embodiments, device 100 detects (1314), via the one or more input devices, a first user input of the one or more user inputs to select the first credential verification affordance. FIG. 12E, for example, illustrates detecting a tap gesture with contact 6508 over credential verification affordance 6010 to verify the user's credential to access the user's account with ABC Airlines.

In some embodiments, after detecting the first user input, device 100 displays (1314) a user credential user interface that is overlaid on a portion of the messaging user interface, where at least one of the one or more inputs to authenticate with the user account is entered through the user credential user interface. FIG. 12F, for example, illustrates displaying user credential user interface 6020 overlaid on messaging user interface 6004. In the illustrated embodiment, user credential user interface 6020 is a web portal of ABC Airlines. Further, the user's credential to access the user's account with ABC Airlines may be entered in user identification and user password fields 6022 and 6023 that are displayed on ABC Airlines' web portal. Overlaying a user credential user interface on a portion of the messaging user interface allows the user to quickly and efficiently transition between the messaging user interface and the user credential user interface, thereby creating a more efficient human-machine interface. Displaying a user credential user interface that is overlaid on a portion of the messaging user interface also allows the user to easily identify the user credential user interface as a user interface the user interacts with to enter the user's credential, thereby reducing the cognitive burden on the user. For battery-operated computing devices, enabling the user to easily and efficiently access a user interface, through which the user's credential is entered, conserves power and increases the time between battery charges.

In some embodiments, the user credential user interface is a web portal of an organization associated with the respective participant, and at least one of the one or more inputs to authenticate the user account are entered through the user credential user interface of the organization (1316). FIG. 12F, for example, illustrates displaying a web portal of ABC Airlines. Further, the user's credential to access the user's account with ABC Airlines may be entered in user identification and user password fields 6022 and 6023 of ABC Airlines' web portal. Overlaying a web portal of an organization that is associated with the respective participant, where inputs to enter the user's credential are entered through the web portal, allows the user to quickly identify a source of a request to verify the user's credential, thereby reducing the cognitive burden on the user. Overlaying the web portal on a portion of the messaging user interface also allows the user to quickly and efficiently transition between the web portal and the messaging user interface, thereby creating a more efficient human-machine interface. For battery-operated computing devices, enabling the user to easily and efficiently access a web portal, through which the user's credential is entered, conserves power and increases the time between battery charges.

In some embodiments, the first credential of the user is stored on device 100, and device 100, after detecting the first user input, enters (1318) the first credential in the user credential user interface when a predetermined condition is met. FIG. 12F', for example, illustrates detecting a tap gesture with contact 6513. In some embodiments, the predetermined condition is a user input (such as the tap gesture with contact 6513 as illustrated in FIG. 12F') to select autofill credential affordance 6013 and the predetermined condition is met after device 100 detects the tap gesture illustrated in FIG. 12F' or another user input to select autofill credential affordance 6013. Storing the user's credential on device 100 and entering the user's credential after a predetermined condition is met allows the user to verify the user's credential without having to remember the user's credential, thereby reducing the burden on the user. Further, automatically entering the credential of the user in the user credential user interface once the predetermined condition is met reduces the number of user inputs required to enter the user's credential, thereby reducing the likelihood of erroneous user inputs, and also creating a more efficient human-machine interface. For battery-operated computing devices, enabling the user to verify the user's credential faster, more efficiently, and more accurately conserves power and increases the time between battery charges.

In some embodiments, after the user credential user interface is displayed, device 100 detects (1320), via the one or more input devices, a second user input of the one or more user inputs to enter a biometric measurement of the user via the user credential user interface. FIGS. 12F and 12F', for example, illustrate displaying user identification and user password fields 6022 and 6023 in user credential user interface 6020. In some embodiments, the user's credential is a biometric measurement of the user, such as the user's finger print, the user's facial features, the user's accent, or another biometric measurement of the user. In one or more of such embodiments, device 100 detects a biometric measurement of the user and displays a graphical representation of the biometric measurement in user credential user interface 6020. Utilizing biometric measurements of the user to verify the user's credential allows the credential of the user to be based on a biological trait that is personal to the user rather than a traditional credential that may be submitted by any individual with knowledge of the credential, thereby improving the likelihood that the user's credential is submitted by the user, and not by an unauthorized individual. Utilizing biometric measurements of the user to verify the user's credential also alleviates a need for the user to remember traditional credentials, such as username and passwords, which are not biological measurements personal to the user, and alleviates a need for the user to periodically update the user's credential, thereby reducing the cognitive burden on the user. For battery-operated computing devices, enabling the user to verify the user's credential faster and more accurately conserves power and increases the time between battery charges.

In some embodiments, the biometric measurement of the user is a facial identification of the user, and detecting the second user input of the one or more user inputs includes detecting the facial identification of the user (1322). FIGS. 12F and 12F', for example, illustrate displaying user identification and user password fields 6022 and 6023 in user credential user interface 6020. In some embodiments, the user's credential is based on the user's facial features. In one or more of such embodiments, device 100 detects (e.g., via a camera component) the user's facial features and displays an image of the user's facial features in user credential user interface 6020. Utilizing a facial identification of the user to verify the user's credential allows the credential of the user to be based on a biological trait that is personal to the user rather than a traditional credential that may be submitted by any individual with knowledge of the credential, thereby improving the likelihood that the user's credential is submitted by the user, and not by an unauthorized individual. Utilizing a facial identification of the user to verify the user's credential also alleviates a need for the user to remember traditional credentials that are not biological measurements personal to the user, such as username and passwords, and alleviates a need for the user to periodically update the user's credential, thereby reducing the cognitive burden on the user. For battery-operated computing devices, enabling the user to verify the user's credential faster and more accurately conserves power and increases the time between battery charges.

In some embodiments, device 100, after detecting the one or more user inputs to authenticate with the user account, obtains (1324) a first encrypted token based on the one or more user inputs. In some embodiments, device 100 provides (1324) the first encrypted token to the respective participant via the messaging user interface. FIGS. 12F and 12F', for example, illustrate displaying text indicative of the user's credential in user credential user interface 6020. In some embodiments, device 100 also encrypts the user's credential to protect the user's credential from unauthorized access. In one of such embodiments, device 100 obtains an encrypted token to encrypt the user's credential. In one or more of such embodiments, the encrypted token is generated by device 100. In another one of such embodiments, the encrypted token is obtained from an electronic device of the participant. In another one of such embodiments, the encrypted token is obtained from another electronic device that is responsible for verifying the user's credential. In one or more embodiments, device 100 also provides the encrypted token to the participant via a messaging user interface, such as messaging user interface 6004 of FIG. 12G. Utilizing an encrypted token as part of the process to verify the user's credential adds a security layer to the process to verify the user's credential and reduces the likelihood that the user's credential would be accessed by an unauthorized individual, thereby reducing the cognitive burden on the user that the user's credential may be accessed by an unauthorized individual. Providing the encrypted token through the messaging user interface also reduces a need to switch to different user interfaces during the verification process, thereby also reducing the cognitive burden on the user and creating a more efficient human-machine interface. For battery-operated computing devices, enabling the user to verify the user's credential faster and more efficiently conserves power and increases the time between battery charges.

In some embodiments, after the first encrypted token has been provided to the respective participant, device 100 displays (1326), in the messaging user interface, a notification that the first encrypted token has been provided to the respective participant. Continuing with the foregoing example, where device 100c provides an encrypted token to the participant via messaging user interface 6004 of FIG. 12G, a notification may also be displayed in a region of messaging user interface 6004 to notify the user that the encrypted token has been sent to the participant. Displaying a notification that an encrypted token has been provided to the respective participant reduces the number of extraneous user inputs needed to query the respective participant about the process to verify the user's credential, thereby reducing the cognitive burden on the user. Displaying the notification and the messaging session between the user and the respective participant in a common user interface allows the user to determine the status of the process to verify the user's credential while engaging in the messaging session, thereby creating a more efficient human-machine interface. The foregoing also reduces a need for the respective participant to notify the user that the encrypted token has been provided to the respective participant, thereby reducing bandwidth on networks that support the messaging user interface, and preserving energy.

Device 100, after detecting the one or more user inputs to authenticate with the user account, in accordance with a determination that the authentication with the user account was successful, provides (1328) an indication that the user was successfully authenticated with the user account to the respective participant via the messaging user interface. FIG. 12H, for example, displays messages that the user has successfully signed into the user's account with ABC Airlines in message bubbles 6104 and 6105. As illustrated in FIG. 12H, messages in message bubbles 6104 and 6105 are text-based indications that the user has successfully logged into the user's account with ABC Airlines. Further, both messages have been transmitted to the participant and are both displayed in the messaging session between the user and the participant.

In some embodiments, device 100, after providing the indication that the user was successfully authenticated with the user account to the respective participant, receives (1330) privileged content from the respective participant. In some embodiments, device 100, after receiving the privileged content, displays (1330) the privileged content in the messaging user interface. FIG. 12H, for example, displays a message from the participant informing the user that the user has 10,000 frequent flyer miles in message bubble 6106. The number of frequent flyer miles the user has is privileged information that is provided to the user only after the user has verified the user's credential to access the user's account with ABC Airlines. Displaying privileged content associated with the user's account during the messaging session between the user and the respective participant and in a common user interface allows the user to access the content of the messaging session and the privileged content without switching between different user interfaces, thereby reducing the cognitive burden on the user and creating a more efficient human-machine interface. For battery-operated computing devices, enabling the user to access privileged content faster and more efficiently conserves power and increases the time between battery charges.

In some embodiments, device 100, in accordance with the determination that the authentication with the user account was successful, displays (1332) a verified credential indicator in the messaging user interface. FIG. 12H, for example, illustrates displaying verified credential indicator 6030 in messaging user interface 6004 after the user has successfully verified the user's credential to access the user's account with ABC Airlines. Displaying a verified credential indicator in the messaging user interface reduces the number of extraneous user inputs needed to query the respective participant about whether the user's credential has been verified, thereby reducing the cognitive burden on the user. Displaying the verified credential indicator and the messaging session between the user and the respective participant in a common user interface allows the user to determine that the user's credential has been verified while engaging in the messaging session, thereby creating a more efficient human-machine interface. The foregoing also reduces a need for the respective participant to notify the user that the user's credential has been verified, thereby reducing bandwidth on networks that support the messaging user interface, and preserving energy.

In some embodiments, the verified credential indicator is displayed in a background of the messaging user interface (1334). FIG. 12H, for example, illustrates displaying verified credential indicator 6030 next to message bubble 6105. In some embodiments, verified credential indicator 6030 is displayed in a background region of messaging user interface 6004. Displaying a verified credential indicator in the background of the messaging user interface reduces the number of extraneous user inputs needed to query the respective participant about whether the user's credential has been verified, thereby reducing the cognitive burden on the user. Displaying the verified credential indicator and the messaging session between the user and the respective participant in a common user interface allows the user to determine that the user's credential has been verified while engaging in the messaging session, thereby creating a more efficient human-machine interface. The foregoing also reduces a need for the respective participant to notify the user that the user's credential has been verified, thereby reducing bandwidth on networks that support the messaging user interface, and preserving energy.

In some embodiments, device 100, after the determination that the authentication with the user account was successful, maintains (1336) display of the verified credential indicator in the messaging user interface for a period of time, during which the authentication of the user account is accepted by an organization that is associated with the respective participant. FIG. 12S illustrates displaying verified credential indicator 6032 in a subsequent messaging session between the user and the participant. In the illustrated embodiment, device 100 maintains the display of a verified credential indicator 6032 in messaging user interface 6004 until the user's credential expires.

In some embodiments, device 100 removes (1336) the verified credential indicator from being displayed in the messaging user interface after the period of time has elapsed. FIGS. 12T-12U, for example, illustrate interactions between the user and the participant that occurred after the interactions illustrated in FIG. 12S. In the embodiments illustrated in FIGS. 12T-12U, the user's credential to access the user's account with ABC Airlines had expired and verified credential indicator 6032 is no longer displayed in messaging user interface 6004 at the time the user submitted the request illustrated in message bubble 6125. Displaying a credential verification indicator in the messaging user interface allows the user to determine the status of the user's credential without contacting the respective participant, thereby reducing the cognitive burden on the user. The foregoing also reduces bandwidth on networks that support the messaging user interface. Further, displaying the verified credential indicator in the messaging user interface during the period of time and subsequently removing the verified credential indicator from being displayed in the messaging user interface after the period of time allows the user to determine when the user should re-authenticate the user's credential without exiting from the messaging session or the messaging user interface, thereby creating a more efficient human-machine interface. The foregoing also reduces a need for the respective participant to notify the user that the user's credential has been verified or that the user's credential has expired, thereby reducing bandwidth on networks that support the messaging user interface, and preserving energy.

In some embodiments, during the period of time after the determination that the authentication with the user account was successful, device 100 displays (1338) a second messaging session between the user and the respective participant in the messaging user interface. FIG. 12P-12S, for example, illustrate interactions between the user and the participant that occurred after the interactions illustrated in FIG. 12H. Further, FIG. 12H displays an initial messaging session between the user and the participant, and FIGS. 12P-12S illustrate displaying a subsequent messaging session between the user and the participant.

In some embodiments, device 100 automatically provides (1338) the indication that the user was successfully authenticated with the user account to the respective participant via the messaging user interface. FIGS. 12O-12P, for example, illustrate detecting tap gesture over contact 6001A for ABC Airlines, and in response to the tap gesture, displaying a second messaging session between the user and the participant in messaging user interface 6004. Further, FIG. 12P displays a message that the user has successfully signed into the user's account with ABC Airlines as the first message in the second messaging session. As illustrated in FIG. 12P, the message is a text-based indication that the user has successfully logged into the user's account with ABC Airlines. Further, the message was automatically transmitted to the participant after the user performed tap gesture 6526 as illustrated in FIG. 12O to select contact 6001A for ABC Airlines. Displaying the initial messaging session and the second messaging session in a common user interface allows the user to scroll through the conversation transcript of both messaging sessions without switching between different user interfaces, thereby reducing the cognitive burden on the user and providing a more efficient human-machine interface. Further, automatically providing the respective participant with the indication that the user has successfully authenticated with the user account reduces the processing demands on electronic systems of the respective participant, thereby reducing power consumption and improving the battery life of the electronic systems.

In some embodiments, during the period of time after the determination that the authentication with the user account was successful, device 100 displays (1340) a second verified credential indicator in the messaging user interface. FIGS. 12P-12S, for example, illustrate interactions between the user and the participant that occurred after the interactions illustrated in FIG. 12H. However, the user's credential has not expired at the time the interactions illustrated in FIGS. 12P-12S were performed. As such, FIG. 12P illustrates displaying verified credential indicator 6032 in messaging user interface 6004 to indicate that the user credential has not expired. Displaying a second verified credential indicator in the messaging user interface during the period of time that the verified credential indicator is accepted reduces the number of extraneous user inputs needed to query the respective participant about whether the user's credential has been verified, thereby reducing the cognitive burden on the user. Further, displaying the second verified credential indicator and the second messaging session in a common user interface also allows the user to determine that the user's credential has been verified without switching between different user interfaces, thereby making the human-machine interface more efficient. The foregoing also reduces a need for the respective participant to notify the user that the user's credential has been verified or that the user's credential has expired, thereby reducing bandwidth on networks that support the messaging user interface, and preserving energy.

In some embodiments, device 100, after the period of time has elapsed, displays (1342) a second credential verification affordance in the messaging user interface, where the second credential verification affordance is from the respective participant and is used to re-authenticate with the user account. FIGS. 12T-12U, for example, illustrate interactions between the user and the participant that occurred after a previously-verified credential of the user had expired. The user's credential to access the user's account with ABC Airlines had expired at the time the user submitted the request illustrated in message bubble 6125. FIG. 12U illustrates displaying a response from the participant requesting the user to sign into the user's account with ABC Airlines and displaying credential verification affordance 6010 in message bubbles 6126 and 6127, respectively.

In some embodiments, device 100 detects (1342), via the one or more input devices, one or more user inputs to re-authenticate the user account. Continuing with the foregoing example, the user may perform a tap gesture with contact over credential verification affordance 6010 of FIG. 12U to re-authenticate the user account. In one or more embodiments, the user then performs interactions similar to the user interactions illustrated in FIGS. 12F-12G to re-authenticate the user account.

In some embodiments, device 100, after detecting the one or more user inputs to re-authenticate with the user account, provides (1342) a second indication that the user has successfully re-authenticated with the user account to the respective participant via the messaging user interface. In some embodiments, after the user has successfully verified the user's credential, another message (a second indication), similar to the messages displayed in message bubbles 6104 and 6105 of FIG. 12H, is transmitted to the participant to notify the participant that the user has successfully re-authenticated with the user account. Displaying a second credential verification affordance in the messaging user interface allows the user to initiate the process to re-authenticate the user's credential from the messaging user interface, thereby reducing the cognitive burden on the user. Further, providing the respective participant with the indication that the user has successfully re-authenticated with the user account reduces the processing demands on electronic systems of the respective participant, thereby reducing power consumption and improving the battery life of the electronic systems.

In some embodiments, device 100, after detecting the one or more user inputs to authenticate with the user account, provides (1344) a credential of the user account to a remote service that is associated with the user account and the respective participant, where the credential is based on the one or more inputs, and where the credential is used by the remote service to determine the authentication with the user account. In some embodiments, the user's credential is processed by a remote service that is associated with ABC Airlines to reduce the likelihood of unauthorized usage of the user's credential by the participant. Providing the indication that the user was successfully authenticated with the user account to a remote service that is associated with the user account instead of directly to the respective participant reduces the likelihood that the respective participant may engage in unauthorized activities with the user's credential, thereby reducing the cognitive burden on the user. For battery-operated computing devices, enabling the user to easily and safely verify the user's credential conserves power and reduces the time between battery charges.

The particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, details of the processes described above with respect to method 1300 (e.g., FIGS. 13A-13C) are also applicable in an analogous manner to the methods described above. For example, methods 700, 900, and 1100 optionally include one or more of the characteristics of the various methods described above with reference to method 1100. For example, the methods for verifying the user's credential described above with reference to 1300 are optionally used by method 700 to verify the user's credential during a process to initiate a messaging session with a business entity, are optionally used by method 900 to provide a business messaging user interface that allows the user to verify the user's credential through the business messaging user interface, and are optically used by method 1100 to verify the user's credential before performing tasks. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method at an electronic device that is in communication with a display device and one or more input devices, the method comprising:
   displaying, via the display device, a messaging user interface that corresponds to a messaging session between a user of the electronic device and a respective participant in the messaging session other than the user of the electronic device, wherein the respective participant is associated with a user account of the user, and wherein displaying the messaging user interface includes concurrently displaying, via the display device:
   a plurality of messages from one or more participants in the messaging session; and a message compose region for composing a new message;
while displaying, via the display device, the messaging user interface, receiving a request from the respective participant for the user of the electronic device to authenticate with the user account that is associated with the respective participant;
in response to receiving the request from the respective participant, updating the messaging user interface to concurrently display, via the display device:
one or more messages from one or more of the participants in the messaging session;
a first credential verification affordance in messaging user interface; and
the message compose region for composing a new message;
detecting, via the one or more input devices, one or more user inputs to authenticate with the user account, wherein the one or more user inputs includes an input corresponding to selection of the first credential verification affordance in the messaging user interface; and
after detecting the one or more user inputs to authenticate with the user account, in accordance with a determination that an authentication with the user account was successful, providing an indication that the user was successfully authenticated with the user account to the respective participant.

2. The method of claim 1, further comprising:
after providing the indication that the user was successfully authenticated with the user account to the respective participant, receiving privileged content from the respective participant; and
after receiving the privileged content, displaying the privileged content in the messaging user interface.

3. The method of claim 1, further comprising in accordance with the determination that the authentication with the user account was successful, displaying a verified credential indicator in the messaging user interface.

4. The method of claim 3, wherein displaying the verified credential indicator comprises displaying the verified credential indicator in a background of the messaging user interface.

5. The method of claim 3, further comprising:
after the determination that the authentication with the user account was successful,
maintaining display of the verified credential indicator in the messaging user interface for a period of time, during which, the authentication of the user account is accepted by an organization that is associated with the respective participant; and
removing the verified credential indicator from being displayed in the messaging user interface after the period of time has elapsed.

6. The method of claim 5, further comprising:
after the period of time has elapsed,
displaying a second credential verification affordance in the messaging user interface, wherein the second credential verification affordance is from the respective participant and is used to re-authenticate with the user account;
detecting, via the one or more input devices, one or more user inputs to re-authenticate with the user account; and
after detecting the one or more user inputs to re-authenticate with the user account, providing a second indication that the user has successfully re-authenticated with the user account to the respective participant via the messaging user interface.

7. The method of claim 5, further comprising:
during the period of time after the determination that the authentication with the user account was successful:
displaying a second messaging session between the user and the respective participant in the messaging user interface; and
automatically providing the indication that the user was successfully authenticated with the user account to the respective participant via the messaging user interface.

8. The method of claim 7, further comprising:
during the period of time after the determination that the authentication with the user account was successful, displaying a second verified credential indicator in the messaging user interface.

9. The method of claim 1, further comprising displaying a first conversation bubble of a message from the respective participant in the messaging user interface, wherein the first credential verification affordance is displayed in the first conversation bubble.

10. The method of claim 1, further comprising:
detecting, via the one or more input devices, a first user input of the one or more user inputs to select the first credential verification affordance; and
after detecting the first user input, displaying a user credential user interface that is overlaid on a portion of the messaging user interface, wherein at least one of the one or more user inputs to authenticate with the user account is entered through the user credential user interface.

11. The method of claim 10, wherein the user credential user interface is a web portal of an organization associated with the respective participant, and wherein the at least one of the one or more user inputs to authenticate with the user account is entered through the user credential user interface of the organization.

12. The method of claim 10, wherein a first credential of the user is stored on the electronic device, and wherein after detecting the first user input, the method further comprises entering the first credential in the user credential user interface when a predetermined condition is met.

13. The method of claim 10, further comprising after displaying the user credential user interface, detecting, via the one or more input devices, a second user input of the one or more user inputs to enter a biometric measurement of the user via the user credential user interface.

14. The method of claim 13, wherein the biometric measurement of the user is a facial identification of the user, and wherein detecting the second user input of the one or more user inputs comprises detecting the facial identification of the user.

15. The method of claim 1, further comprising:
after detecting the one or more user inputs to authenticate with the user account,
obtaining a first encrypted token based on the one or more user inputs; and
providing the first encrypted token to the respective participant via the messaging user interface.

16. The method of claim 15, further comprising after the first encrypted token has been provided to the respective participant, displaying, in the messaging user interface, a notification that the first encrypted token has been provided to the respective participant.

17. The method of claim 1, further comprising after detecting the one or more user inputs to authenticate with the user account, providing a credential of the user account to a remote service that is associated with the user account and the respective participant, wherein the credential is based on the one or more user inputs, and wherein the credential is used by the remote service to determine the authentication with the user account.

18. The method of claim 1, wherein the user account and the respective participant are associated with an identical organization.

19. The method of claim 18, further comprising displaying an indication that the respective participant is associated with the organization in the messaging user interface.

20. The method of claim 1, further comprising:
after detecting the one or more user inputs to authenticate with the user account, in accordance with a determination that the authentication with the user account was successful, updating the messaging to concurrently display, via the display device:
one or more messages from one or more of the participants in the messaging session;
a visual indication, in messaging user interface, that the user was successfully authenticated with the user account; and
the message compose region for composing a new message.

21. An electronic device, comprising:
a display;
one or more input devices;
one or more processors;
memory; and
one or more programs, wherein the one or more programs are stored in the memory and configured to be executed by the one or more processors, the one or more programs including instructions for:
displaying, via the display device, a messaging user interface that corresponds to a messaging session between a user of the electronic device and a respective participant in the messaging session other than the user of the electronic device, wherein the respective participant is associated with a user account of the user, and wherein displaying the messaging user interface includes concurrently displaying, via the display device:
a plurality of messages from one or more participants in the messaging session; and
a message compose region for composing a new message;
while displaying, via the display device, the messaging user interface, receiving a request from the respective participant for the user of the electronic device to authenticate with the user account that is associated with the respective participant;
in response to receiving the request from the respective participant, updating the messaging user interface to concurrently display, via the display device:
one or more messages from one or more of the participants in the messaging session;
a first credential verification affordance in messaging user interface; and
the message compose region for composing a new message;
detecting, via the one or more input devices, one or more user inputs to authenticate with the user account, wherein the one or more user inputs includes an input corresponding to selection of the first credential verification affordance in the messaging user interface; and
after detecting the one or more user inputs to authenticate with the user account, in accordance with a determination that an authentication with the user account was successful, providing an indication that the user was successfully authenticated with the user account to the respective participant.

22. A non-transitory computer readable storage medium storing one or more programs, the one or more programs comprising instructions which, when executed by one or more processors of an electronic device with a display and one or more input devices, cause the electronic device to:
display, via the display device, a messaging user interface that corresponds to a messaging session between a user of the electronic device and a respective participant in the messaging session other than the user of the electronic device, wherein the respective participant is associated with a user account of the user, and wherein displaying the messaging user interface includes concurrently displaying, via the display device:
a plurality of messages from one or more participants in the messaging session; and
a message compose region for composing a new message;
while displaying, via the display device, the messaging user interface, receive a request from the respective participant for the user of the electronic device to authenticate with the user account that is associated with the respective participant;
in response to receiving the request from the respective participant; updating the messaging user interface to concurrently display, via the display device:
one or more messages from one or more of the participants in the messaging session;
a first credential verification affordance in messaging user interface; and
the message compose region for composing a new message;
detect, via the one or more input devices, one or more user inputs to authenticate with the user account, wherein the one or more user inputs includes an input corresponding to selection of the first credential verification affordance in the messaging user interface; and
after detecting the one or more user inputs to authenticate with the user account, in accordance with a determination that the authentication with the user account was successful, provide an indication that the user was successfully authenticated with the user account to the respective participant.

* * * * *